United States Patent [19]
Yokoyama et al.

[11] Patent Number: 5,384,676
[45] Date of Patent: Jan. 24, 1995

[54] MAGNETIC HEAD POSITION CONTROLLER IN A MAGNETIC RECORDING AND REPRODUCING APPARATUS

[75] Inventors: Eiji Yokoyama; Masato Nagasawa, both of Kyoto, Japan

[73] Assignee: Mitsubishi Denki Kabushiki Kaisha, Tokyo, Japan

[21] Appl. No.: 870,459

[22] Filed: Apr. 17, 1992

[30] Foreign Application Priority Data

| Apr. 19, 1991 | [JP] | Japan | 3-088573 |
| Jul. 11, 1991 | [JP] | Japan | 3-171064 |
| Sep. 2, 1991 | [JP] | Japan | 3-221895 |
| Feb. 14, 1992 | [JP] | Japan | 4-028526 |

[51] Int. Cl.⁶ .................................................. G11B 5/588
[52] U.S. Cl. .................................................. 360/77.13
[58] Field of Search ............... 360/75, 77.12, 77.13, 360/77.14, 77.15, 77.16, 77.17

[56] References Cited

U.S. PATENT DOCUMENTS

| 4,080,636 | 3/1978 | Ravizza | 360/77.13 |
| 4,296,443 | 10/1981 | Sakamoto et al. | 360/77.13 |
| 4,389,686 | 6/1983 | Isaka et al. | 360/77.13 |
| 4,393,416 | 7/1983 | Takeuchi et al. | 360/77.13 |
| 4,412,259 | 10/1983 | Hiraguri | 360/77.13 |
| 4,774,606 | 9/1988 | Uhde | 360/77.13 |
| 4,910,615 | 3/1990 | Monard | 360/77.13 |
| 5,034,829 | 7/1991 | Mahr | 360/77.13 |

FOREIGN PATENT DOCUMENTS

| 0361381 | 4/1990 | European Pat. Off. . |
| 52-117107 | 10/1977 | Japan . |
| 55-122231 | 9/1980 | Japan . |
| 55-125532 | 9/1980 | Japan . |
| 56-117326 | 9/1981 | Japan . |
| 1253881 | 8/1990 | Japan . |

*Primary Examiner*—Willis R. Wolfe

[57] ABSTRACT

In a magnetic recording and reproducing apparatus having a solenoid-driven actuator to move a magnetic head in the tracking direction, a magnetic head position controller includes a state estimator for estimating the moving speed of the actuator from a drive voltage and a drive current supplied to the actuator; and a damping control loop for feeding back the estimated speed signal estimated by the state estimator to the actuator drive voltage. The state estimator is formed of a combination of equivalent circuits that electrically simulate modeled characteristics of the solenoid-driven actuator and receives the drive voltage and the drive current of the actuator and produces the estimated speed signal representing the speed of the actuator. The state estimator includes equivalent circuits that electrically simulate a drive coil resistance and inductance characteristic of the solenoid-driven actuator; a force constant of a magnetic circuit of the solenoid-drive actuator; and an inertia, a spring constant, and a counter electromotive force of the solenoid-driven actuator.

47 Claims, 96 Drawing Sheets

WITHOUT MAGNET $I(s) - I'(s) = v(s)K_G$ → SPEED $V(s)$
$I(s) = Z(s)V(s)$

WITH MAGNET $V(s)$
$I'(s) = I(s) - v(s)K_G$

FIG. 7(a) GAIN (dB)

FIG. 7(b) PHASE (DEG)

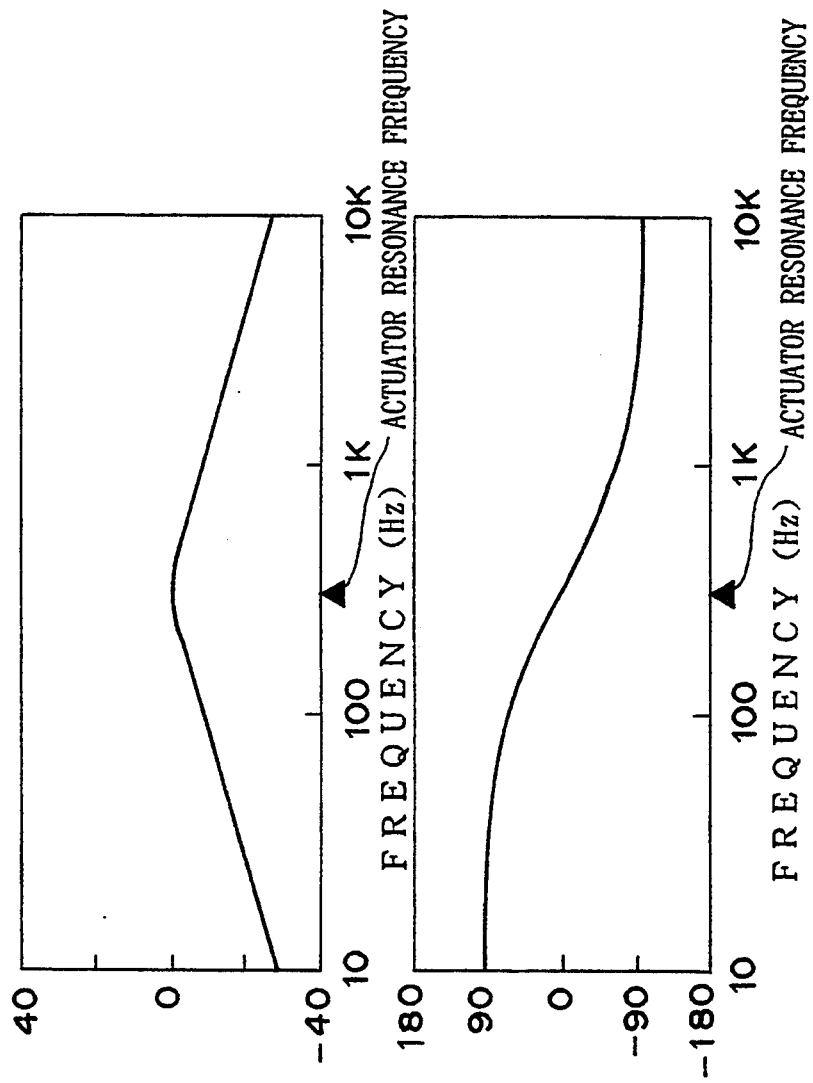

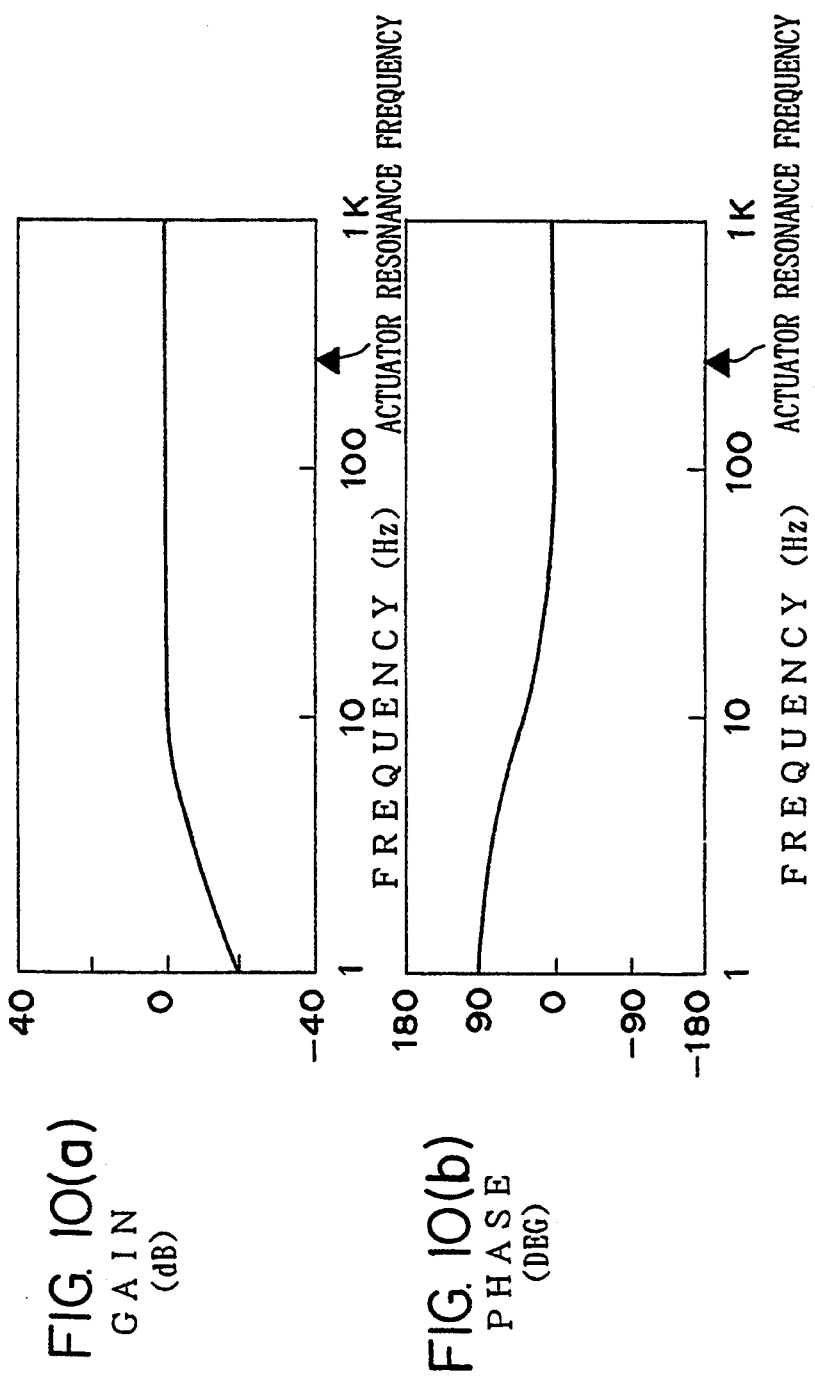

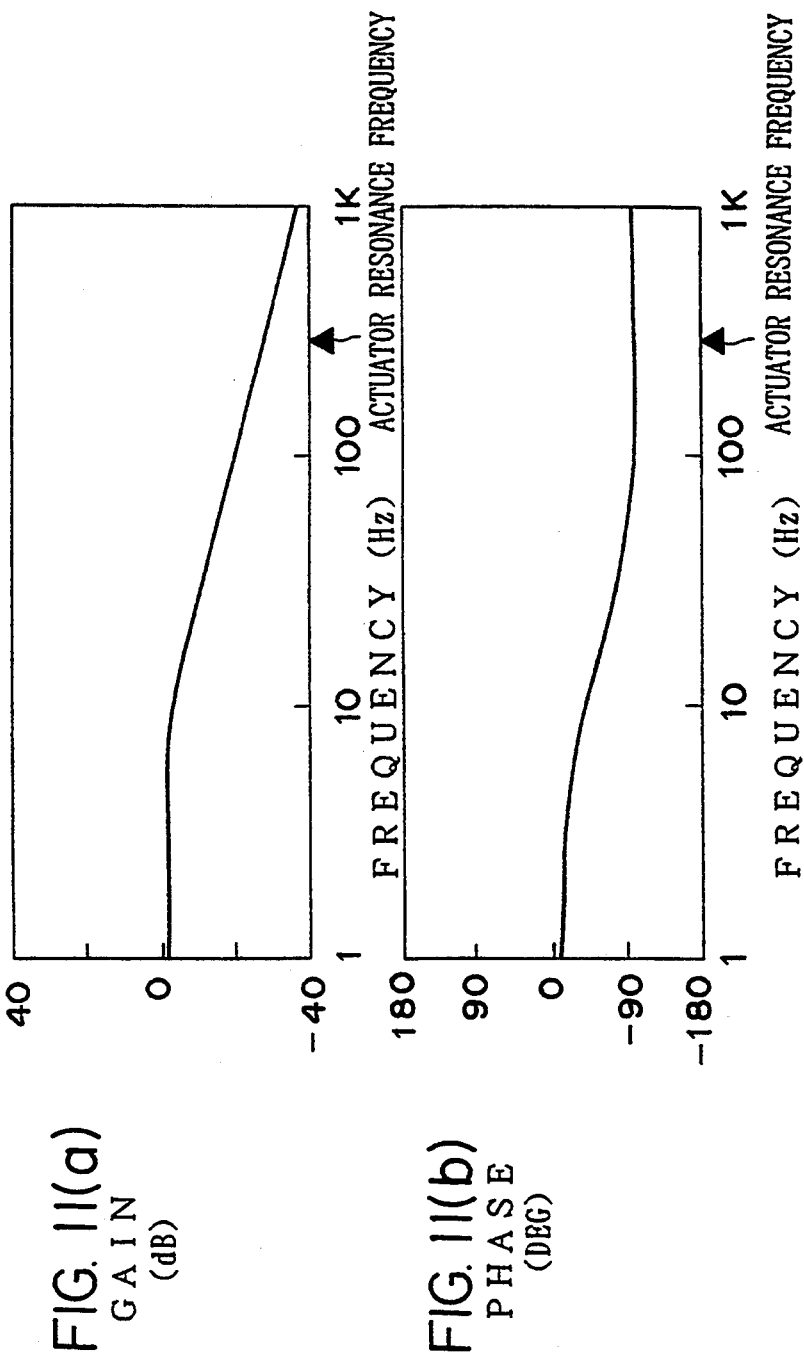

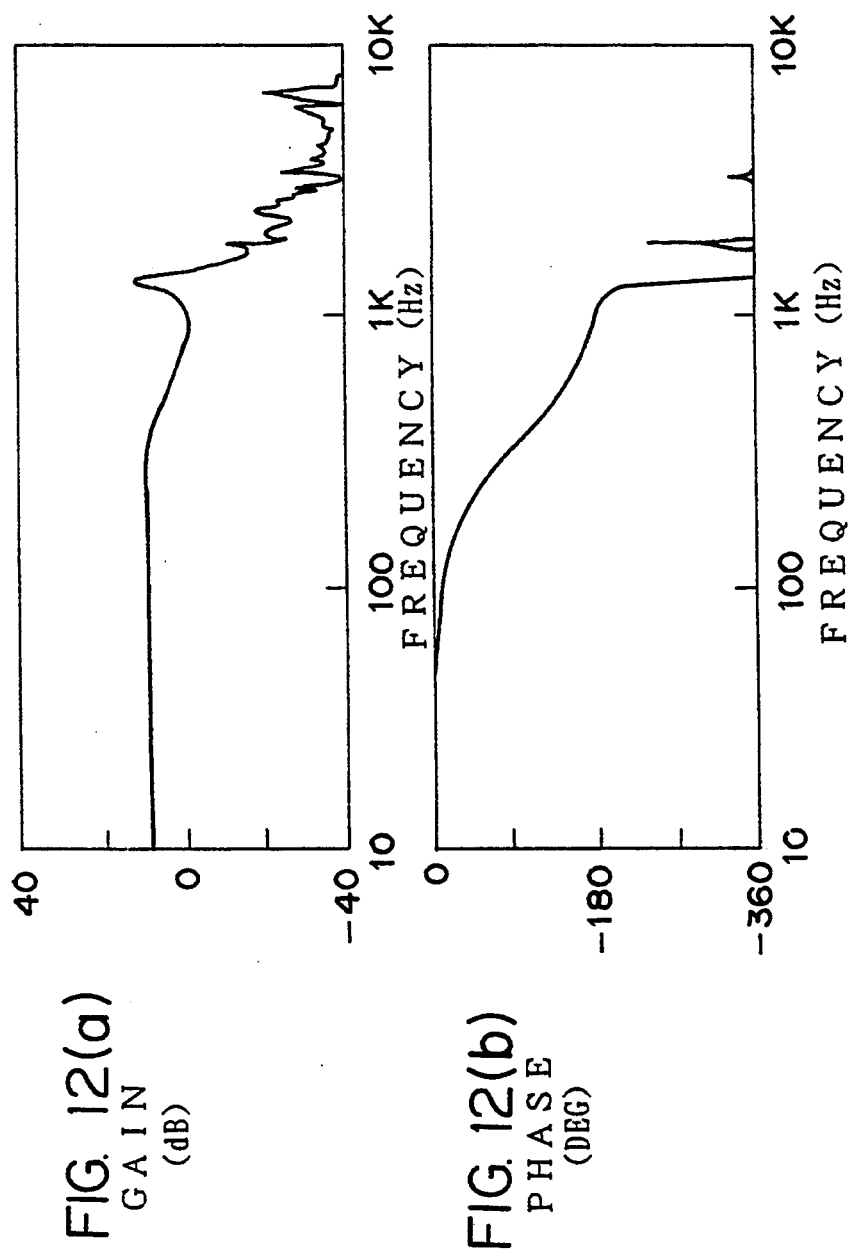

WITHOUT DISTURBANCE CONTROL

WITH DISTURBANCE CONTROL

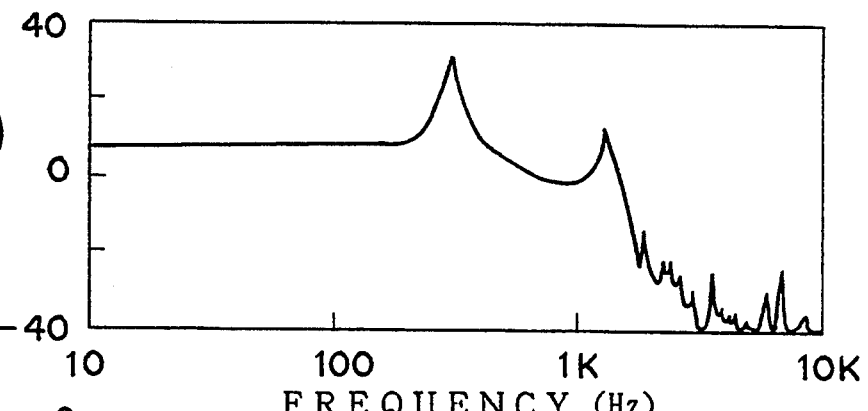
FIG. 34(a) GAIN (dB)
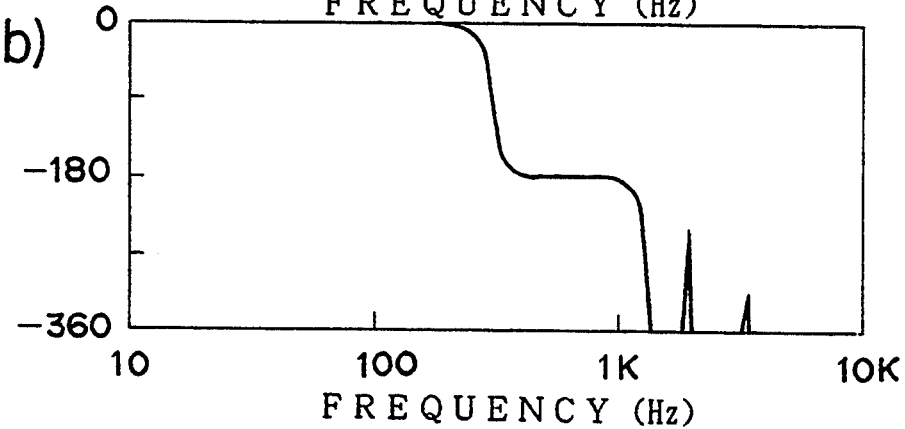
FIG. 34(b) PHASE (DEG)
FIG. 35
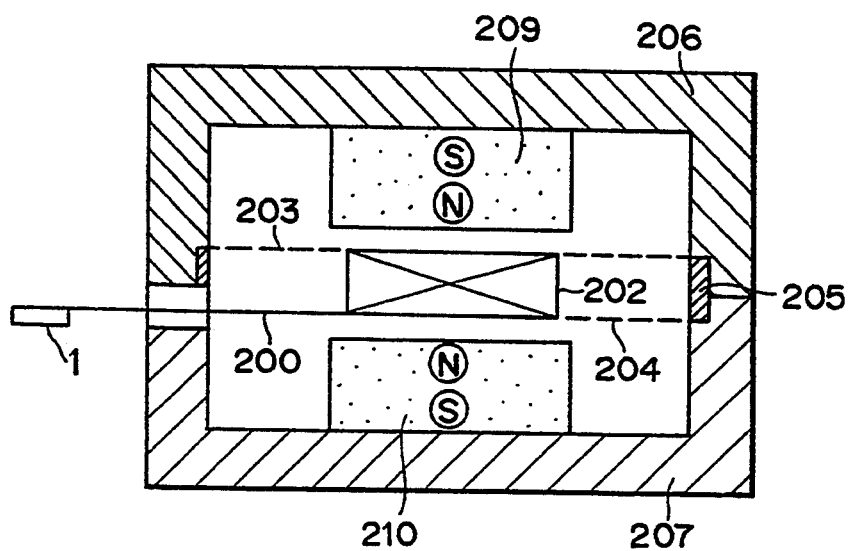

FIG. 36(a) GAIN (dB)

FIG. 36(b) PHASE (DEG)

FIG. 41(a) GAIN (dB)

FIG. 41(b) PHASE (DEG)

FIG. 45(a) WITHOUT DISTURBANCE CONTROL

FIG. 45(b) WITH DISTURBANCE CONTROL

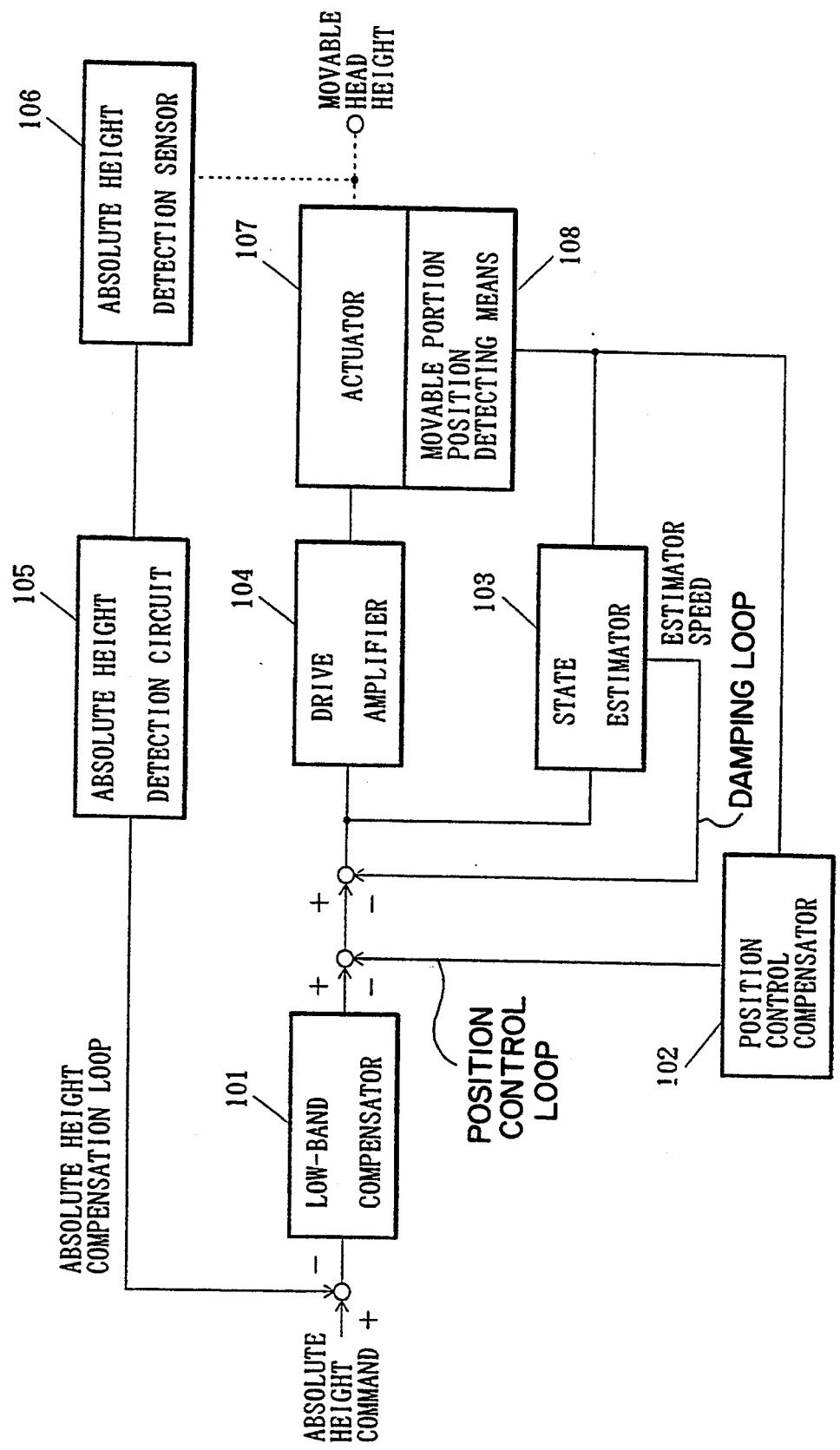

LOW-BAND COMPENSATION CIRCUIT (a) $\dfrac{1+ST_2}{1+ST_1}$    (b) $\dfrac{1}{1+ST_3}$    (c) $\dfrac{1}{1+ST_4+S^2T_5}$

POSITION CONTROL COMPENSATOR

ESTIMATED SPEED : $O_1$
POSITION CONTROL OUT : $O_2$
ABSOLUTE HEIGHT
COMPENSATION OUT : $O_3$

ACTUATOR x : POSITION SENSOR OUTPUT (MOVABLE HEAD POSITION)

y : ACTUATOR DRIVE VOLTAGE $K_1 = \dfrac{Kd \cdot Kt}{R}$ $K_2 = K$ $K_3 = F_1$ $K_4 = F_2$ $K_5 = F_3$ FIG. 95
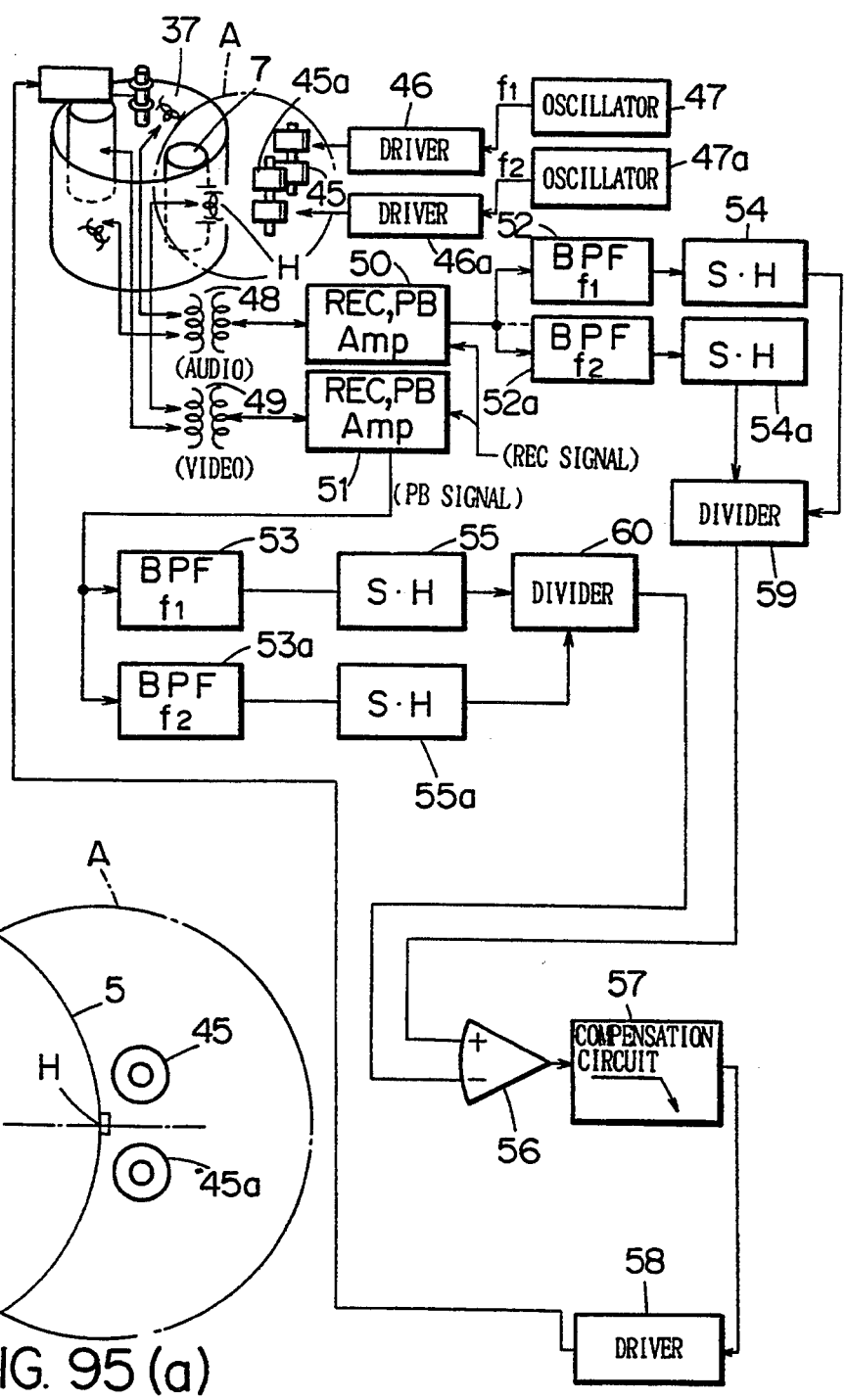
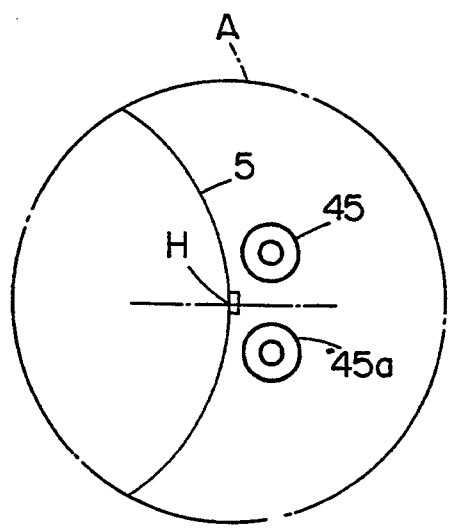
FIG. 95(a)

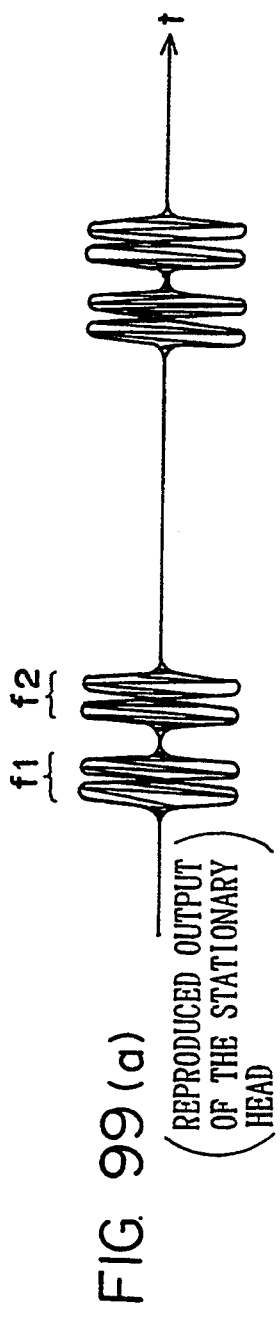
FIG. 99 (a) (REPRODUCED OUTPUT OF THE STATIONARY HEAD)
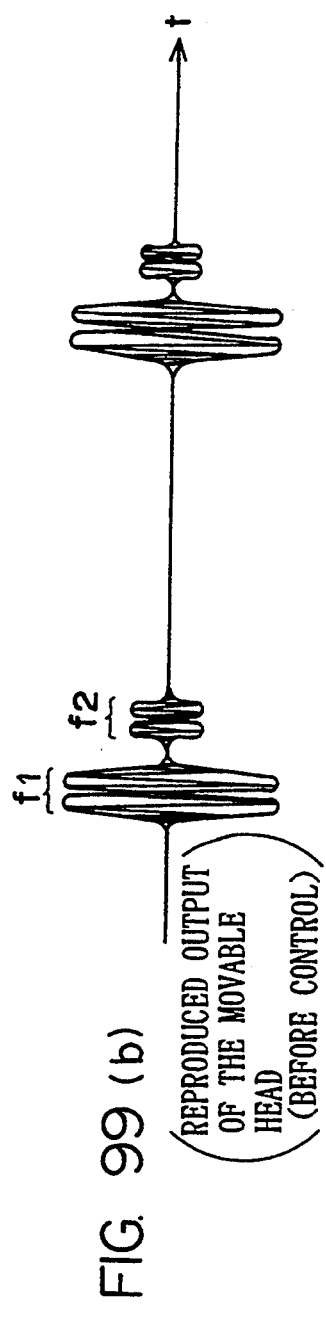
FIG. 99 (b) (REPRODUCED OUTPUT OF THE MOVABLE HEAD (BEFORE CONTROL))
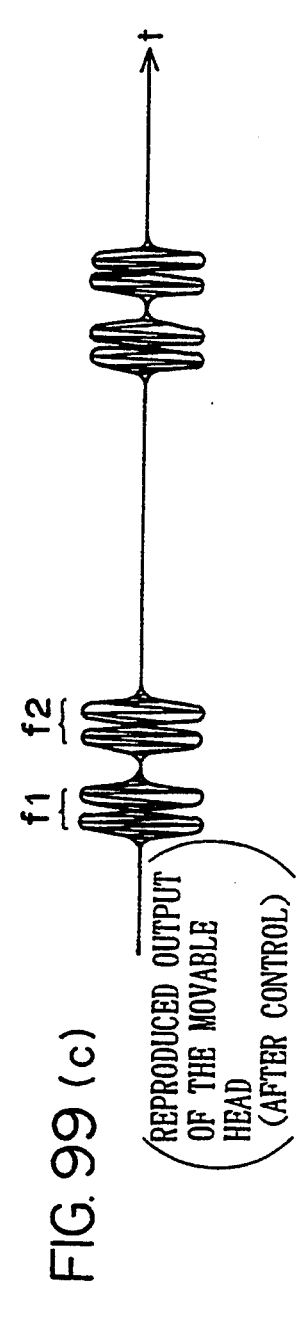
FIG. 99 (c) (REPRODUCED OUTPUT OF THE MOVABLE HEAD (AFTER CONTROL))

F I G. 1 0 2
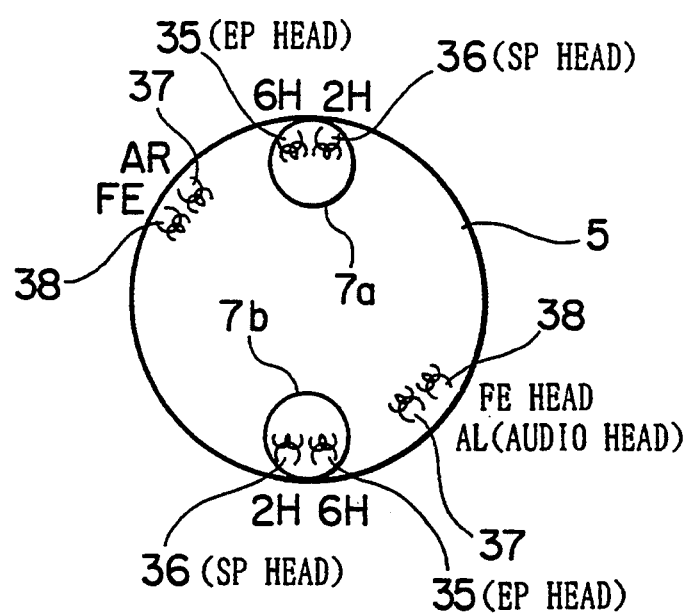

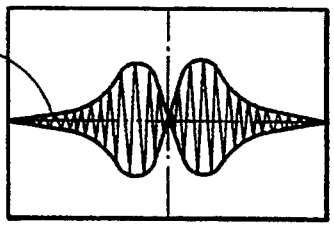
FIG. 108(a) PLANE A
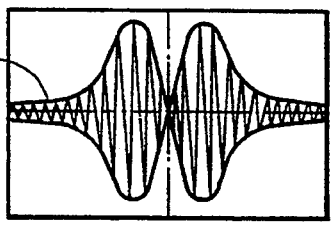
FIG. 108(b) PLANE B
FIG. 108(c) PLANE C
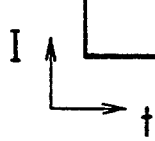
FIG. 109
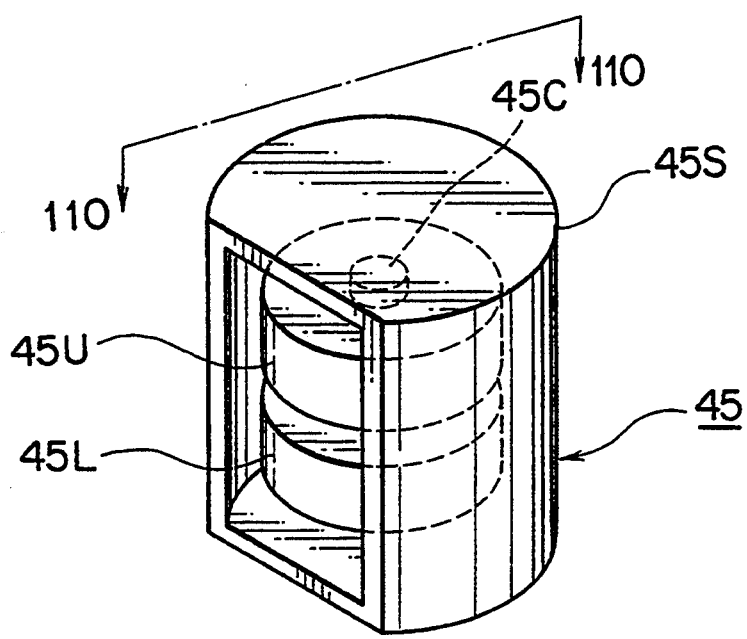

MAGNETIC HEAD POSITION CONTROLLER IN A MAGNETIC RECORDING AND REPRODUCING APPARATUS

BACKGROUND OF THE INVENTION

1. Field of the Invention

The present invention relates to a magnetic head position controller in a magnetic recording and reproducing apparatus, such as video tape recorders and digital tape recorders, in which a movable magnetic head mounted on a rotating drum is controlled in its position along the length of the magnetic tape by an actuator.

2. Description of the Prior Art

In magnetic recording and reproducing apparatuses such as VTR, reproducing data recorded on the magnetic tape requires that the magnetic head follow the recording track accurately. For making the magnetic head follow the recording track accurately, conventional improved VTRs control the position of the magnetic head for correct tracking.

For this purpose, the magnetic head is mounted on the rotating drum in such a way that it is deflected by an actuator in the tracking direction in order to prevent deviations from the correct track. In a special replay operation such as a fast replay, the magnetic head is moved in a large span toward the tracking direction to perform various fast and synchronous replay in good condition.

FIG. 47 shows an external view of a piezo-electric bimorph element 500. A pair of piezo-electric bimorph elements 500 are provided symmetrically on the diagonally opposite sides of the rotating drum 520 and each has a magnetic head H mounted thereon.

FIG. 48 shows an improved version of the bimorph element 500 shown in FIG. 47. The bimorph elements 500 extend in a semicircular arc along the circumference of the rotating drum 520 so that the effective length of each bimorph element 500 will be longer than that of FIG. 47.

FIG. 49 also shows an improved version of the bimorph element 500 illustrated in FIG. 47. The bimorph elements 500 are arranged parallel to the chord of the rotating drum 520 so that the effective length of each bimorph element 500 is longer than that of FIG. 47.

FIG. 50 shows the state of the bimorph element 500 and the magnetic head H when the bimorph element 500 drives the head H. When the bimorph element 500 having the effective length equal to radius R is bent through an angle $\theta$, the magnetic head H moves the distance $\xi$.

FIG. 51 shows the geometric relationship between the inclination of the magnetic head H ($\theta$ in FIG. 50) and the effective length of the bimorph when the bimorph 500 is driven. The abscissa represents the effective length of the bimorph and the ordinate represents the inclination of the magnetic head H.

FIG. 52 shows one example frequency characteristic of the piezo-electric bimorph element 500.

The control of the position of the magnetic head by bending the bimorph element to perform correct tracking should be accurately carried out while at the same time it is also necessary to precisely control damping of mechanical resonance of a spring mass system for the magnetic head and the drive actuator.

FIG. 53 shows a block diagram of the magnetic head driving apparatus using the conventional bimorph actuator disclosed in Japanese Patent Preliminary Publication No. Showa 52-117107.

The magnetic head driving apparatus using the conventional bimorph actuator has the following constitutional elements: the piezo-electric bimorph element 500 which performs a bending operation according to the applied voltage to perform a desired tracking control by moving the magnetic head H in a direction perpendicular to the direction of the tape travel; a sensor 501 made up of a piezo-voltage generator formed as part of the piezo-electric bimorph element 500; a high-input impedance amplifier 502 which amplifies the detected voltage while applying practically no load to the sensor 501; an adder 503 that adds an output from the high-impedance amplifier 502 and an output from a potentiometer 509 described later; a differentiator 504 to differentiate the output from the adder 503; a low-pass filter 505 having a cutoff frequency that is so selected as to attenuate only the signal which contributes to the secondary resonance characteristic and high-order resonance characteristic; a phase advance circuit 506 to compensate for a phase delay of the output from the low-pass filter; a gain variable amplifier 507 to variably reverse-amplify the output from the phase advance circuit 506; an adder 508 that adds an output signal from a frequency compensator 511 described later and an output signal from the gain variable amplifier 507; a potentiometer 509 to which the output signal from the adder 508 is supplied; and a drive amplifier 510 which amplifies the output signal from the adder 508 and applies a desired drive voltage to the bimorph actuator 500.

The magnetic head driving apparatus also includes; a video signal processing circuit 514 which videoprocesses the output from the magnetic head H supported at the free end of the cantilevered piezo-electric bimorph element 500; a head position regulating circuit 513 which outputs a tracking compensation signal based on the output signal of the magnetic head H to form a wobbling servo system; a frequency compensator 511 that compensates the frequency in response to the output signals from the head position regulating circuit 513 and from a convertor reset signal generator 512 described later; and a convertor reset signal generator 512 which generates a reset signal to be applied to a deflectable support arm, i.e., the prizo-electric bimorph element 500, in order to selectively reset the magnetic head H to the initial position of tracking.

Now, the operation of the magnetic head driving apparatus using the conventional bimorph actuator will be described.

The sensor 501 formed integral with the piezo-electric bimorph element 500 generates a signal representing the instantaneous deflection position of the magnetic head H.

The output signal lags the signal for driving the piezo-electric bimorph element 500 by 90 degrees in phase.

This output signal is supplied to the high input impedance amplifier 502. The reason why the amplifier 502 is of a high input impedance is that since the sensor 501 is equivalent to a capacitor connected in series with a voltage source, the sensor 501 must have a small electrical load to achieve effective coupling of a low-frequency signal from the sensor 501.

The output of the high impedance amplifier 502 is sent to the adder 503, which also receives at another input an output signal from the potentiometer 509 described later. The output signal of the adder 503 is given to the differentiator 504, which differentiates the head position signal from the sensor 501 to convert the head position signal representing the instantaneous head position into a signal representing the instantaneous head speed.

Since the differentiator 504 has a frequency characteristic similar to that of the high-pass filter, the signal that has passed through it is advanced in phase. The head speed signal produced by the differentiator 504 is supplied to the low-pass filter 505, whose cutoff frequency is so selected as to virtually attenuate a signal that contributes to the secondary resonance characteristic and high-order resonance characteristic of the bimorph element 500.

The low-pass filter 505 delays the signal in phase that passes through it and, to compensate for the total phase delay, caused by the low-pass filter, of a signal near the resonance position, a phase advance circuit 506 is provided. The phase advance circuit 506 shifts the phase of the signal component whose frequency is close to the resonance point of the bimorph element 500 so that the signal, when output from the phase advance circuit 506, has a phase of zero degree.

The output signal of the phase advance circuit 506 is sent to the gain variable amplifier 507 where it is inverted and then sent to the adder 508, which adds an output signal from a frequency compensator 511 described later to the inverted signal of the amplifier 507 to attenuate the resonance oscillation of the bimorph element.

The output of the adder 508 is amplified by the drive amplifier 510 and is output as a deflection drive signal for the bimorph element 500. The gain variable amplifier 507 is so constructed as to be able to adjust the gain to cope with variations in characteristic of the bimorph element 500.

A signal component close to an antiresonance point is effectively adjusted to zero by partially coupling the drive signal supplied to the bimorph element 500. The deflection signal of the adder 508 is given to the potentiometer 509, whose output is supplied to the other input terminal of the adder 503 where it is added with the deflection position signal, which is entered from the high impedance amplifier 502 and detected by the sensor 501.

The phase of the deflection signal is shifted 180 degrees as it is detected by the sensor 501 through the bimorph element 500, so that the frequency component of the deflection signal near the antiresonance point is zero-adjusted by the adder 503 to stabilize the loop at the frequency near the antiresonance point.

In this way, the bimorph element 500 is damped to enable a stable tracking control.

However, since the bimorph element 500 in FIG. 53 is mounted on the rotating drum 520, as explained in FIG. 47, a large amplitude operation as during the special replay operation of the VTR causes the magnetic head H to be displaced upward in FIG. 50 and inclined by an angle $\theta$.

This degrades the contact condition between the magnetic head H and the magnetic tape, an important factor that deteriorates the high frequency characteristic of the recording and reproducing signal.

To make an improvement on this drawback, it is proposed to increase the effective length of the bimorph element 500 as previously shown in FIGS. 48 and 49. While the longer effective length reduces the head inclination in FIG. 50, the resonance frequency and antiresonance frequency of FIG. 52 shift toward the lower side.

General bimorph elements have a characteristic in which the signal in a frequency band higher than the first-order resonance frequency is shifted in phase by 180 degrees. Hence, in the tracking system using a movable head, the control frequency band must be set sufficiently lower than the resonance frequency.

If the first-order resonance frequency and the second-order resonance frequency or the antiresonance frequency are sufficiently apart from each other, the phase advance compensation makes it possible to provide the control frequency band between the first-order and the second-order resonance frequency or the antiresonance frequency.

However, the bimorph element 500 with too long an effective length cannot have a sufficiently large control frequency band, making it difficult to form a control system that can reliably follow the track curve on the magnetic tape.

Although it is possible to reduce the resonance peak gain of the bimorph element 500 to a certain extent by using the differential circuit described earlier, the gain of the damping loop cannot be set sufficiently large because the differential operation increases the noise contained in the deflection position signal.

As mentioned above, in the magnetic head driving apparatus using the bimorph element 500, providing a good contact between the magnetic head H and the magnetic tape during the tracking operation (i.e., to reduce the head inclination) is not consistent with shifting the mechanical resonance of the bimorph element 500 toward higher frequency or reducing the resonance peak gain. These two conflicting requirements are difficult to meet at the same time.

In the damping control circuit using a differential circuit, there is a limit to the performance improvement because the noise of the position sensor increases with the performance enhancement.

In addition, there are mechanical restrictions. Since the position signal must be taken out when forming a damping loop, it is necessary to install a printed circuit card for damping in the rotating drum or the position signal must be taken out by a slip ring.

The damping method employed in the conventional magnetic head driving actuator differentiates the position signal of the actuator to find the actuator speed, as described above. This also increases noise contained in the position signal, making it difficult to obtain a good damping performance.

The conventional magnetic head driving actuator has a drawback of mechanically complicated construction. That is, the position sensor is necessary to pick up the above-mentioned position signal; and when the position signal is to be taken out of the rotating drum, it is necessary to increase the number of slip ring channels.

Furthermore, since the resonance frequency depends on a mechanical spring and mass system, a substantial improvement of the response characteristic of the actuator is so far not possible.

Moreover, the rigidity against external load disturbance (periodical impact of the tape and head) depends only on the mechanical rigidity of the spring and mass system and on the magnetic damper effect of the magnetic circuit system, so that the mechanical design requires special considerations which in turn provide constraints on the actuator design.

SUMMARY OF THE INVENTION

This invention has been accomplished to overcome the above-mentioned problems and is intended to provide a damping means for the head driving actuator of the magnetic recording and reproducing apparatus which can apply a stable and heavy damping only by using inexpensive electric circuits without requiring a position sensor or differentiator or without having to make mechanical changes even in an actuator that has large mechanical oscillations.

The invention is also intended to improve a poor actuator with low mechanical rigidity of the spring and mass system and with bad controllability into an actuator with good controllability and response which can detect actuator position signal accurately by an inexpensive electric circuit containing a position feedback loop.

The invention is further intended to improve a poor actuator with a low mechanical rigidity of the spring and mass system and with bad controllability into an actuator with high rigidity and which can detect external load disturbance accurately by an inexpensive electric circuit containing an external disturbance feedforward loop.

Further, with the conventional movable head position control apparatus, when the position of the movable magnetic head is to be controlled by the absolute height from the deck base, there is a severe requirement on the mounting precision of the ac magnetic field generating coil used to detect the position of the movable magnetic head. When the ac magnetic field produced by the ac magnetic field generating coil is to be detected by utilizing a stationary head on the rotating drum, the height of the movable magnetic head can only be controlled to the same height of the stationary head.

Since the detection of the ac magnetic field produced by the ac magnetic field generating coil is performed only at one location for every turn of the rotating drum, the recording track that is recorded during one rotation of the rotating drum may be bent by vibrations unless the movable portion rigidity of the actuator is considered.

To eliminate the above problems, this invention provides a magnetic head position control apparatus, which can maintain the movable magnetic head at a specified absolute height (from the deck base to the head) regardless of the mounting precision of the ac magnetic field generating coil, suppresses height shifts and vibrations of the movable magnetic head that occur in one rotation of the rotating drum, can be applied to magnetic tape apparatuses of various track formats, and can also form an ideal recording track pattern.

In a magnetic recording and reproducing apparatus having a solenoid-driven actuator to move the magnetic head toward the tracking direction, the magnetic head position controller includes a state estimator which estimates the moving speed of the actuator from the drive voltage and drive current supplied to the actuator and a damping control loop for feeding the estimated speed signal produced by the state estimator back to the actuator drive voltage, in order to control damping of the actuator.

The state estimator consists of a combination of equivalent circuits that electrically simulate the modeled characteristics of the solenoid-driven actuator. The estimator takes in the drive voltage and the drive current and produces an estimated speed signal representing the estimated speed of the actuator. The estimator can be formed by a combination of equivalent circuits that electrically simulate the drive coil resistance and the inductance characteristic of the solenoid-driven actuator, the force constant of the magnetic circuit, inertia, spring constant and counter solenoid-driven force.

The estimation process of the actuator speed by the state estimator consists of: estimating the actuator drive current not including counter electromotive force through the equivalent circuit, which electrically simulates the drive coil resistance and inductance characteristic of the actuator from the actuator drive voltage signal entered; and comparing the estimated actuator drive current with the actuator drive current influenced by the counter electromotive force.

The state estimator, depending on the characteristic of the solenoid-driven actuator used, may be an equivalent circuit, such as a low-pass filter, which simulates the impedance characteristic including the coil reactance of the solenoid-driven actuator. The state estimation output from the equivalent circuit is fed back through a damping control loop, which includes a band-pass filter which takes as the center frequency the resonance frequency of the solenoid-driven actuator.

By providing a current feedback loop-which feeds back the actuator drive current or the actuator drive current estimated by the state estimator-inside the damping control loop, it is possible to compensate for temperature variations over time of the solenoid-driven actuator.

It is also possible to increase the apparent resonance frequency of the solenoid-driven actuator by generating the position estimation signal representing the position of the solenoid-driven actuator by the state estimator and then feeding back the position estimation signal to the actuator drive voltage.

The load disturbance of the solenoid-driven actuator may be canceled by generating the estimated disturbance signal representing the load disturbance of the solenoid-driven actuator by the state estimator and then feeding forward the estimated disturbance signal to the actuator drive voltage.

The magnetic recording and reproducing apparatus has a solenoid-driven actuator for moving the movable magnetic head toward the tracking direction and the field detection element mounted at a specified height, both installed inside the rotating drum, and at least one field generating coil fixed to the deck mechanism arranged close to and supporting the rotating drum where it is not wound with the magnetic tape. In this magnetic recording and reproducing apparatus, the movable magnetic head height is controlled in such a way that two ac signals produced by the ac field of the field generating coil as the field detection element and the movable magnetic head moves past the field generating coil have such amplitudes as will fall in a certain relationship.

A position detecting means to detect the height of the movable magnetic head is mounted to the actuator. In a period during which no ac output is generated from the movable magnetic head by the field generating coil, the actuator control unit may be made to perform the head position control according to the output from the position detecting means. It is desired that the actuator control unit includes the state estimator which estimates the speed of the actuator.

In the magnetic recording and reproducing apparatus which has the movable magnetic head driven by the actuator, the stationary head and a signal transmission rotary transformer, all installed inside the rotating drum, the signal transmission rotary transformer has the windings from the movable head and the stationary head arranged close together on the rotating drum installed in a continuous channel in the rotary transformer. In this rotary transformer, the winding from the field detection means is inserted between the channels of the rotary transformer, to which the heads are connected to not be close together, or between the channels to which the audio head and the video head are connected. The signal from the field detecting means should preferably be amplified by a dedicated amplifier through a switching element connected to the rotary transformer.

The state estimator, one of the major constitutional elements of this invention, is intended to electrically simulate the characteristic of the solenoid-driven actuator. By supplying to the state estimator the same drive voltage and current as applied to the actuator, the real actuator operation can be simulated to predict the speed, position, drive current and external disturbance of the actuator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The constitution of the invention as described in the claims and the working and advantages according to the constitution will become apparent from the accompanying drawings, which are given by way of illustration only and thus are not limitative of the present invention, and wherein:

FIGS. 9(a) and 9(b) are graphs showing the frequency characteristic of a compensation filter used in the second embodiment.

FIGS. 10(a) and 10(b) are graphs showing the frequency characteristic of a compensation filter used in the second embodiment.

FIGS. 11(a) and 11(b) are graphs showing the frequency characteristic of a compensation filter used in the second embodiment.

FIGS. 12(a) and 12(b) are graphs showing the "displacement/voltage" frequency characteristic of the improved solenoid-driven actuator in the second embodiment.

FIGS. 34(a) and 34(b) are graphs showing the "displacement/voltage" frequency characteristic of the solenoid-driven actuator of FIG. 33.

FIG. 35 is a cross section of another example of the solenoid-driven actuator used in the invention.

FIG. 66 is a block diagram showing the overall configuration of the magnetic head position controller of the ninth embodiment.

FIG. 95 is a conceptual diagram showing a third example of the conventional magnetic head position controller using the ac magnetic field generator.

FIGS. 99(a), 99(b) and 99(c) are diagrams showing the reproduced output of the magnetic head in the conventional example shown in FIG. 98.

FIG. 102 is a diagram showing the conventional arrangement of each head mounted on the rotating drum.

FIGS. 108(a), 108(b) and 108(c) are diagrams showing the reproduced output waveform on each plane of FIGS. 106 and 107.

FIG. 109 is a perspective view showing one example of the conventional ac magnetic field generating coil.

DETAILED DESCRIPTION OF PREFERRED EMBODIMENT

Figure 47:
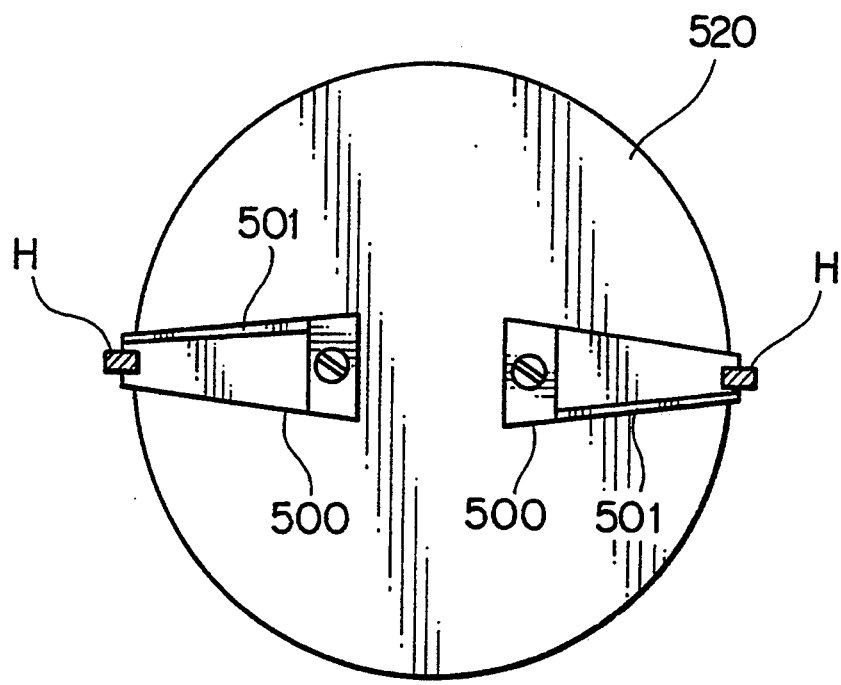
FIG. 47 is a diagram showing the relationship between an example of a bimorph element and the rotating drum, both used in a conventional magnetic head actuator.
Figure 48:
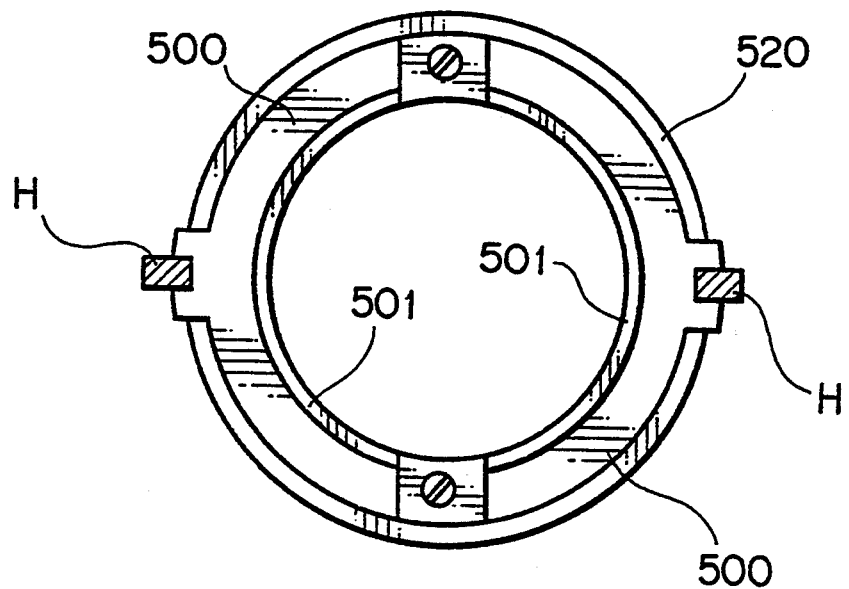
FIG. 48 is a diagram showing the relationship between another example of the bimorph element and the rotating drum, both used in a conventional magnetic head actuator.
Figure 49:
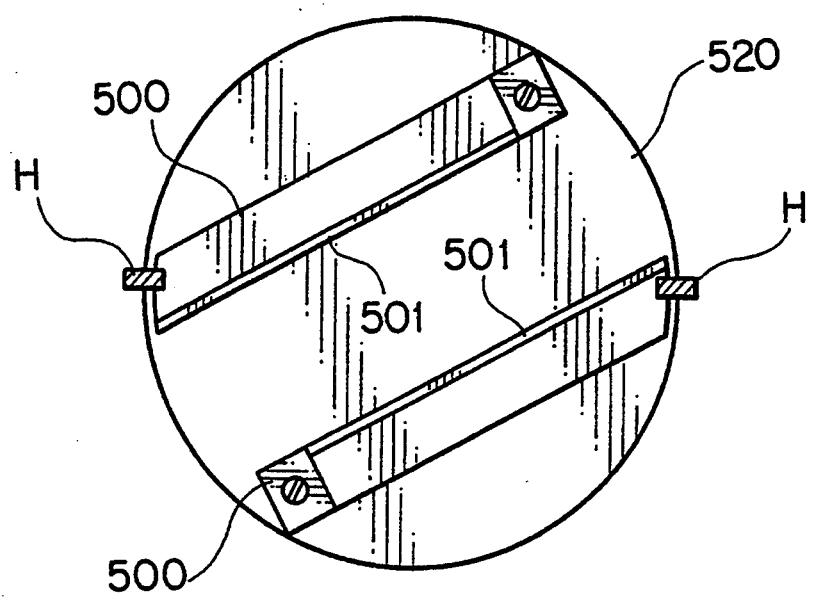
FIG. 49 is a diagram showing the relationship between a further example of the bimorph element and the rotating drum, both used in a conventional magnetic head actuator.
Figure 50:
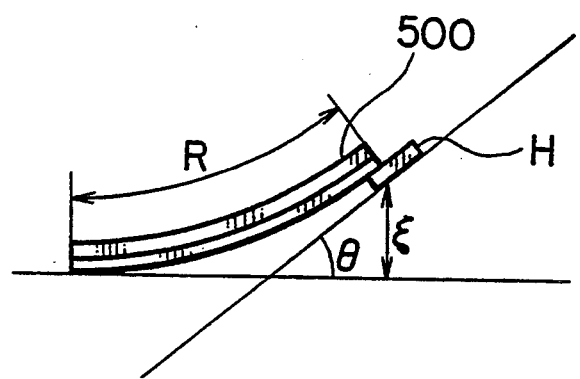
FIG. 50 is a diagram showing the geometrical relationship between the displacement of the bimorph element and the inclination angle of the magnetic head.
Figure 51:
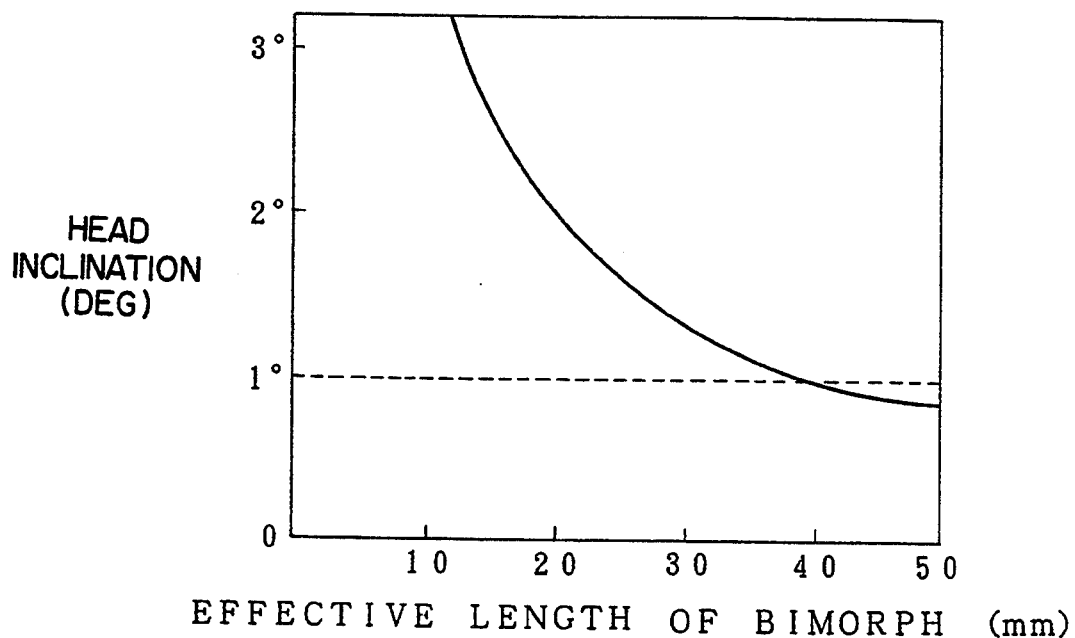
FIG. 51 is a diagram showing the geometrical relationship between the effective length of the bimorph element and the inclination angle of the magnetic head.

Before proceeding to explain preferred embodiments of this invention, let us first describe the solenoid-driven actuator, which is an object to be controlled by the movable head position control system of the invention by referring to the accompanying drawings. Such an actuator is useful because it does not cause the magnetic head to be tilted as in the case with the bimorph element actuator shown in FIGS. 47, 48 and 49.

Figure 4A:
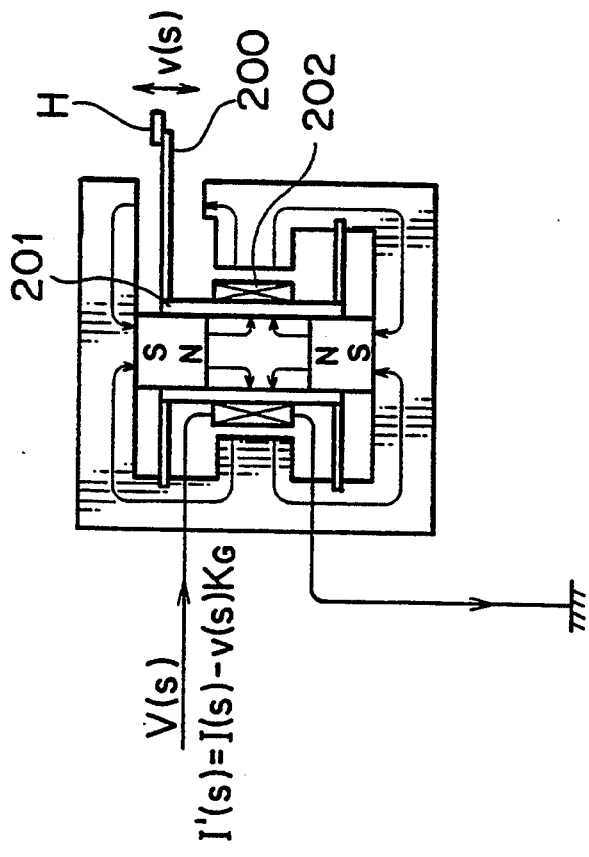
FIGS. 4a and 4b are schematic cross sections of the solenoild-driven actuator used in the first embodiment of the invention.
Figure 5:
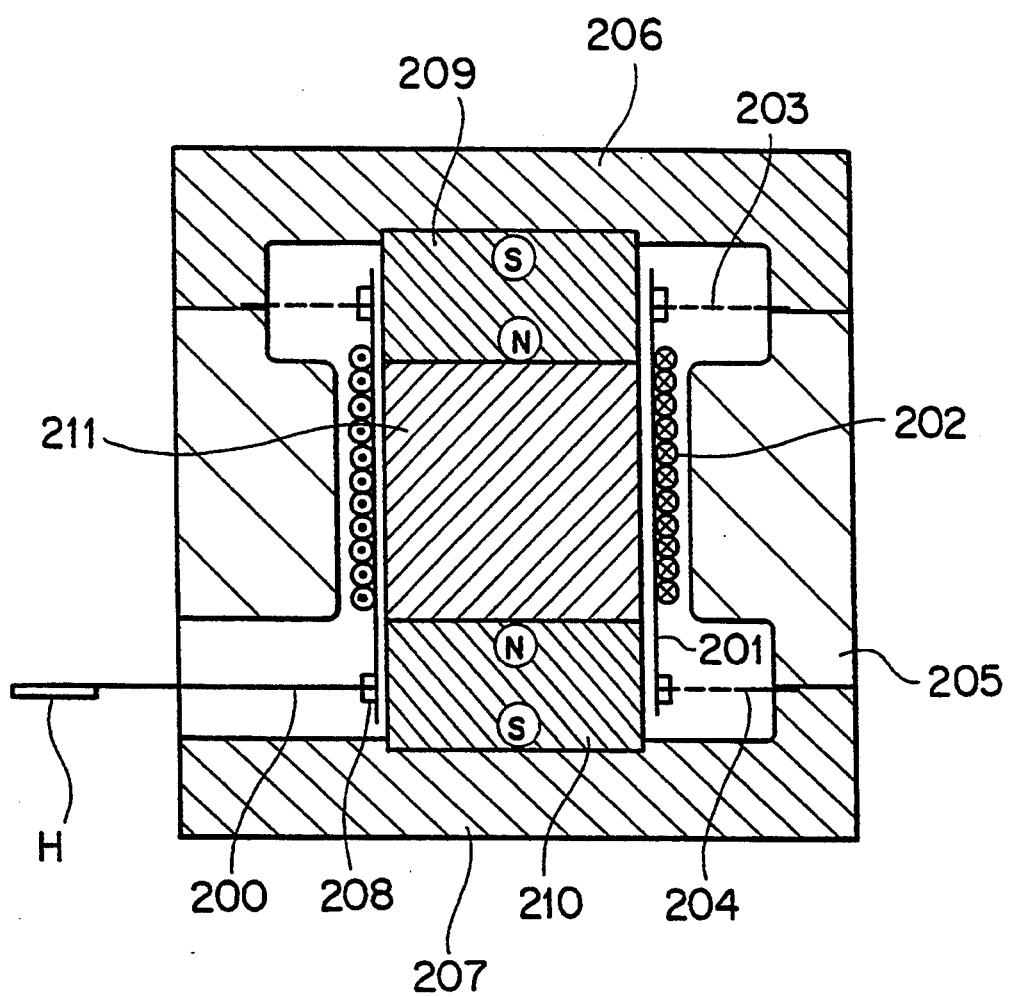
FIG. 5 is a detailed cross section of the solenoid-driven actuator used in the first embodiment of this invention.
Figure 6:
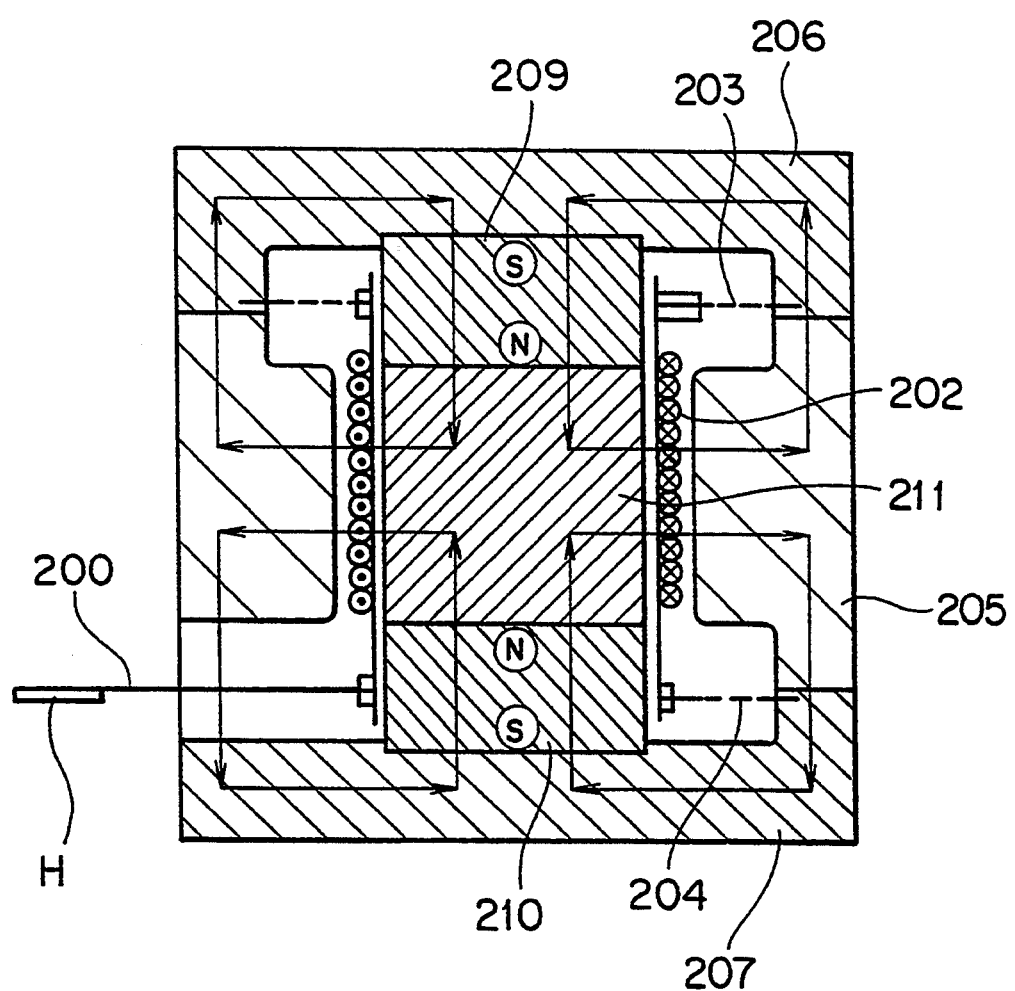
FIG. 6 is a detailed cross section of the solenoid-driven actuator of FIG. 5 showing the state of the flux.

FIG. 4 is a cross section showing schematically the solenoid-driven actuator of this invention. FIGS. 5 and 6 shows more details of the construction.

In FIG. 5, the magnetic head H is supported through a leaf spring 200 on a coil bobbin 201, around which a drive coil 202 is wound.

The coil bobbin 201 is supported at both ends through gimbals springs 203, 204 by a cylindrical yoke 205 and disk-shaped yokes 206, 207 in such a way that it can be moved in axial direction. The connecting portion between the coil bobbin 201 and each gimbals spring 203, 204 is provided with a mounting member 208 made of polymer material.

Inside the coil bobbin 201, cylindrical permanent magnets 209, 210 are fixed between the yokes 206, 207. A center yoke 211 is installed between the two permanent magnets.

The magnetic circuit of this actuator is arranged so that the two permanent magnets 209, 210 repel each other to increase the density of the magnetic flux piercing through the drive coil 202. Hence, by supplying a drive current of an appropriate magnitude to the drive coil 202, the magnetic head H can be adjusted to a desired position.

In this construction, the magnetic head moves in the same attitude and thus the contact between the magnetic head and the tape is kept in good condition even during the large amplitude movement.

Figure 52:
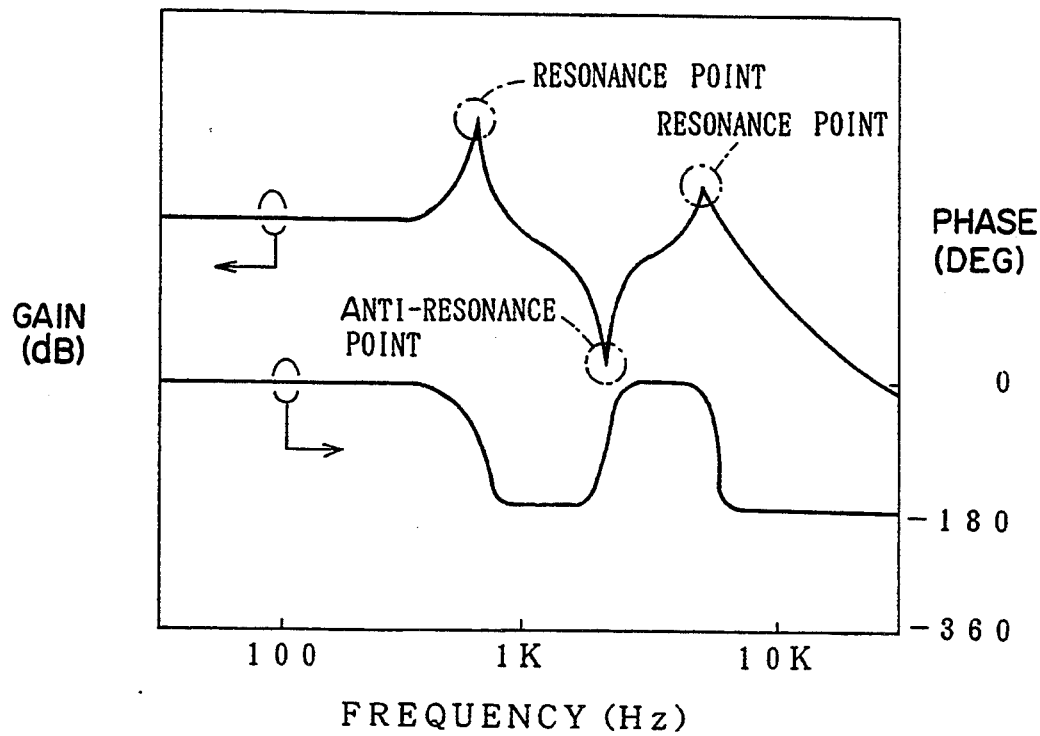
FIG. 52 is a diagram showing the "displacement/voltage" frequency characteristic of the conventional bimorph element.
Figure 53:
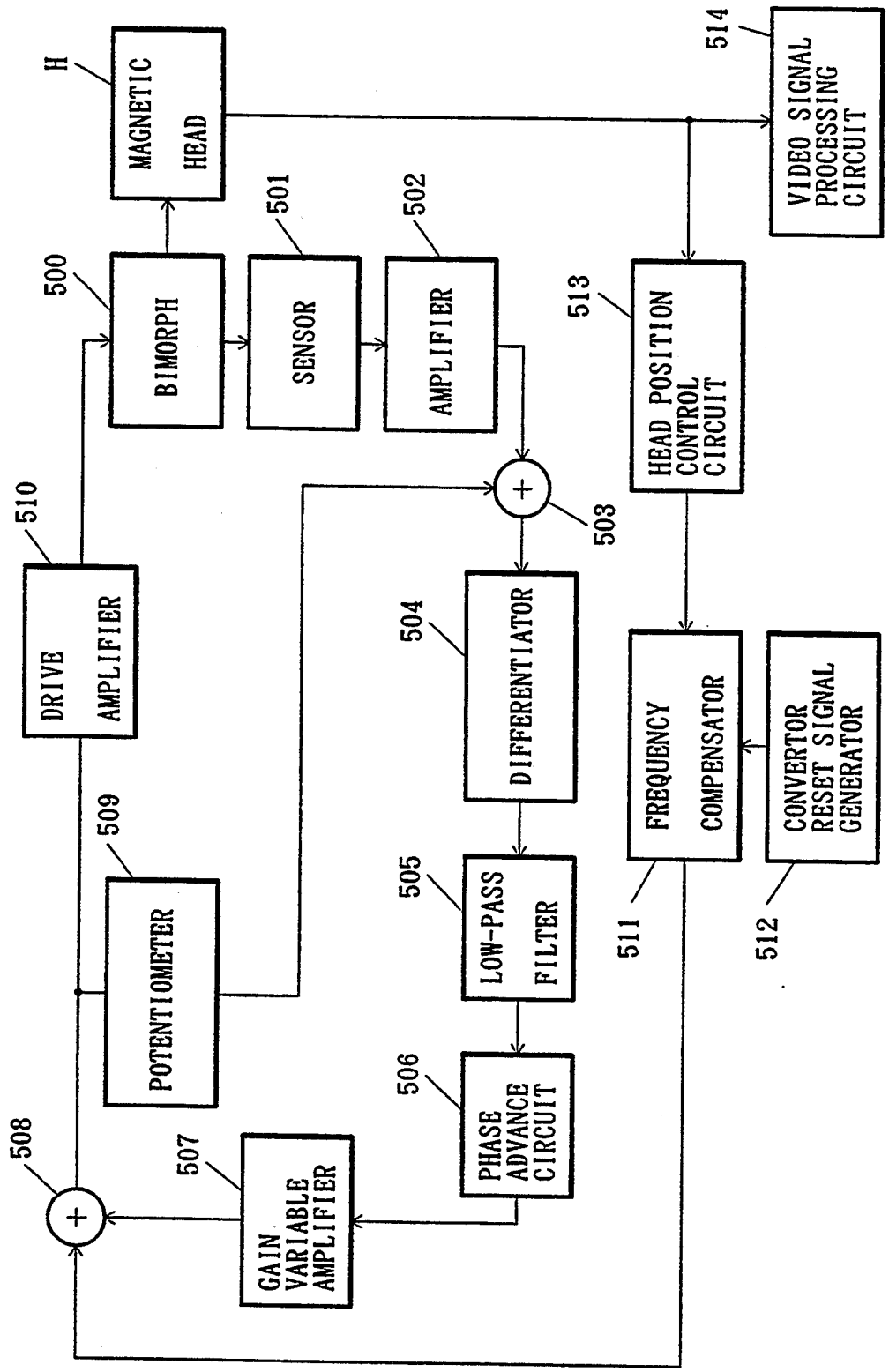
FIG. 53 is a block diagram showing the conventional magnetic head position controller using the bimorph element as the magnetic head actuator.

However, even in such a solenoid-driven actuator C, mechanical resonance of the gimbals springs 203, 204 and leaf spring 200 causes a phase shift of more than 180 degrees in a frequency band higher than the first-order resonance as shown in FIG. 52, so that the tracking control frequency band can only be set to frequencies sufficiently lower than the first-order resonance, as with the bimorph element 500.

A possible solution may be to increase the stiffness of the gimbals springs 203, 204 and leaf spring 200 and thereby increase the resonance frequency. This, however, also increases the resonance peak gain, making it necessary to provide a position sensor and apply damping according to the output of the sensor as in the case with the bimorph element 500.

Figure 7:
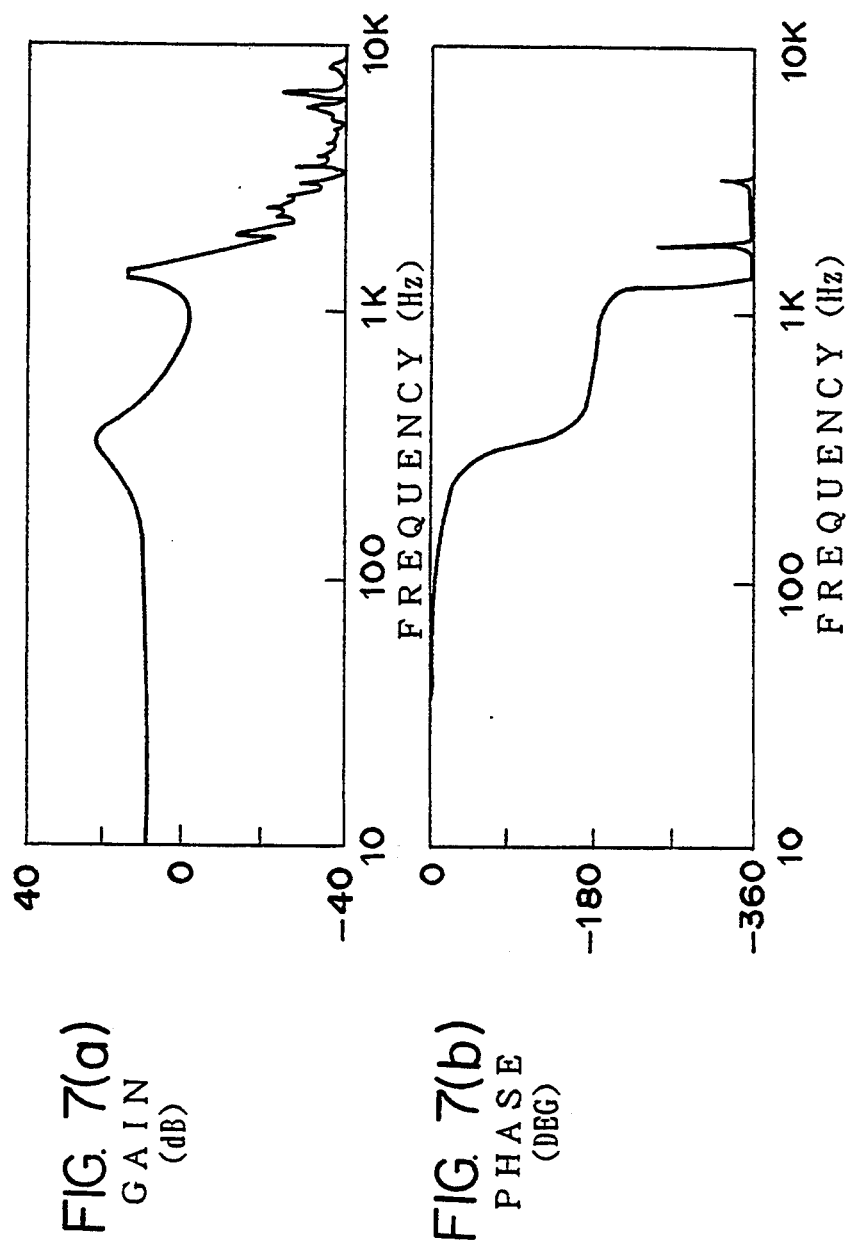
FIGS. 7(a) and 7(b) are graphs showing the "displacement/voltage" frequency characteristic of the solenoid-driven actuator of FIG. 5.

FIG. 7 shows the frequency characteristic of the solenoid-driven actuator.

The solenoid-driven actuator mentioned above is also used in this invention.

Figure 4B:
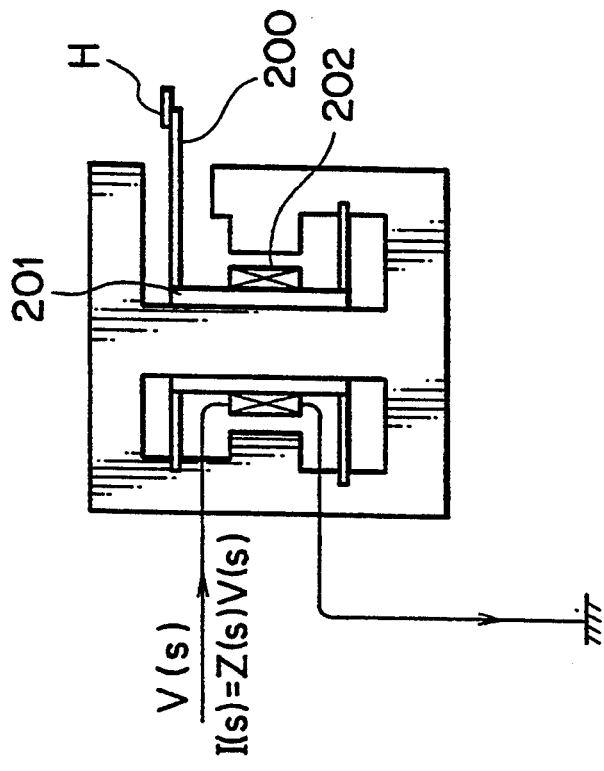

Returning to FIGS. 4, 4a represents the actuator without a permanent magnet and FIG. 4b represents the actuator with a permanent magnet. Assuming that the actuators of FIG. 4a and 4b are applied with the same drive voltage V(s), a current that passes through the coil 202 is taken as I(s) in the case of FIG. 4a and I'(s) in the case of FIG. 4b.

In the case of FIG. 4a, there is no magnetic flux threading through the drive coil 202. Let Z(s) stand for the coil impedance. Then the next equation holds.

$$I(s) = Z(s) V(s)$$

Next, in the case of FIG. 4b, a magnetic flux linking with the drive coil 202 exists, so that as the current flows through the coil 202, a force is generated that acts between the magnetic flux linking with the coil and the current flowing in the coil 202. As a result, the generated force moves the drive coil 202 at a speed v(s). At this time, since the coil 202 moves through the magnetic flux at the speed v(s), a counter electromotive force is produced in the coil 202. Let the counter electromotive force constant be KG (A.sec/m). Then, the current I'(s) flowing in the coil is given by $$I'(s) = I(s) - v(s).KG$$

Therefore, if the two currents I(s) and I'(s) can be measured accurately, the counter electromotive force v(s)·KG which is proportional to the speed of the coil 202 can be derived from the following equation.

$$v(s).KG = I(s) - I'(s)$$

The counter electromotive force, or the speed of the coil 202, are fed back to the actuator control voltage to ensure stabilized damping.

The above description is based on the condition that the currents I(s) and I'(s) are measured accurately. In practice, however, there are electrical characteristic variations as in resistors used for current detection, making the accurate measurement of currents I(s), I'(s) difficult and causing gain variations.

Because the counter electromotive force v(s)·KG is detected as a difference between I(s) and I'(s), gain variations, when they occur, cause the current information for driving the coil to enter into the pure counter electromotive force information generated by the coil motion.

If the counter electromotive force mixed with unwanted information is simply fed back, the low-frequency gain may vary or become unstable.

First Embodiment

A first embodiment employs a state estimator, which is formed by a same-dimensional observer using the modern control logic, in performing the position control of the movable head by the solenoid-driven actuator at high precision.

Figure 1:
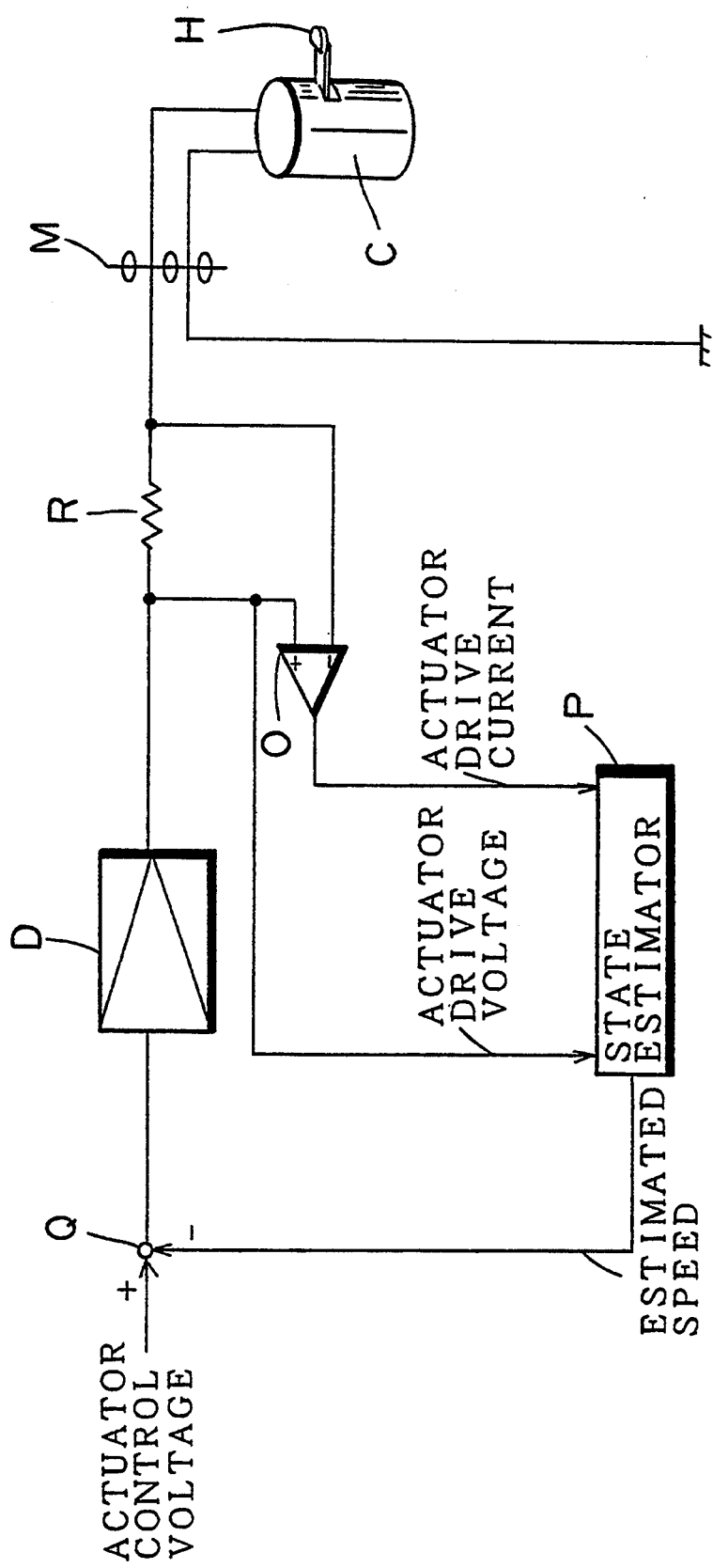
FIG. 1 is a block diagram showing the outline circuitry of a first embodiment of the magnetic head position controller in the magnetic recording and reproducing apparatus according to this invention.

FIG. 1 shows the first embodiment of the head driving actuator controller in the magnetic recording and reproducing apparatus according to this invention. In FIG. 1, denoted H is a magnetic head mounted on the rotating drum not shown, which is controlled in its movement by the solenoid-driven actuator C to perform correct tracking.

Designated M is a slip ring to supply current from outside the rotating drum to the actuator C inside the drum. Denoted D is a drive amplifier to supply a drive current to the actuator C; and Q a subtractor to subtract an estimated speed signal described later from the actuator control voltage signal.

Reference symbol R represents a current detecting resistor to detect a current flowing into the actuator C. The resistor, in this embodiment, is provided in the current path between the drive amplifier D and the actuator C. It may also be provided in the current path between the actuator and the earth. Denoted O is a differential amplifier which detects a voltage difference between the terminals of the current detecting resistor and which produces a voltage corresponding to the current flowing in the actuator C.

Designated P is a state estimator, one of the features of this invention, which receives a voltage on the drive amplifier D side of the current detecting resistor (i.e., actuator drive voltage) and the differential amplifier output (i.e., actuator drive current) to estimate the speed of the actuator C and thereby output an estimated speed signal.

Figure 2:
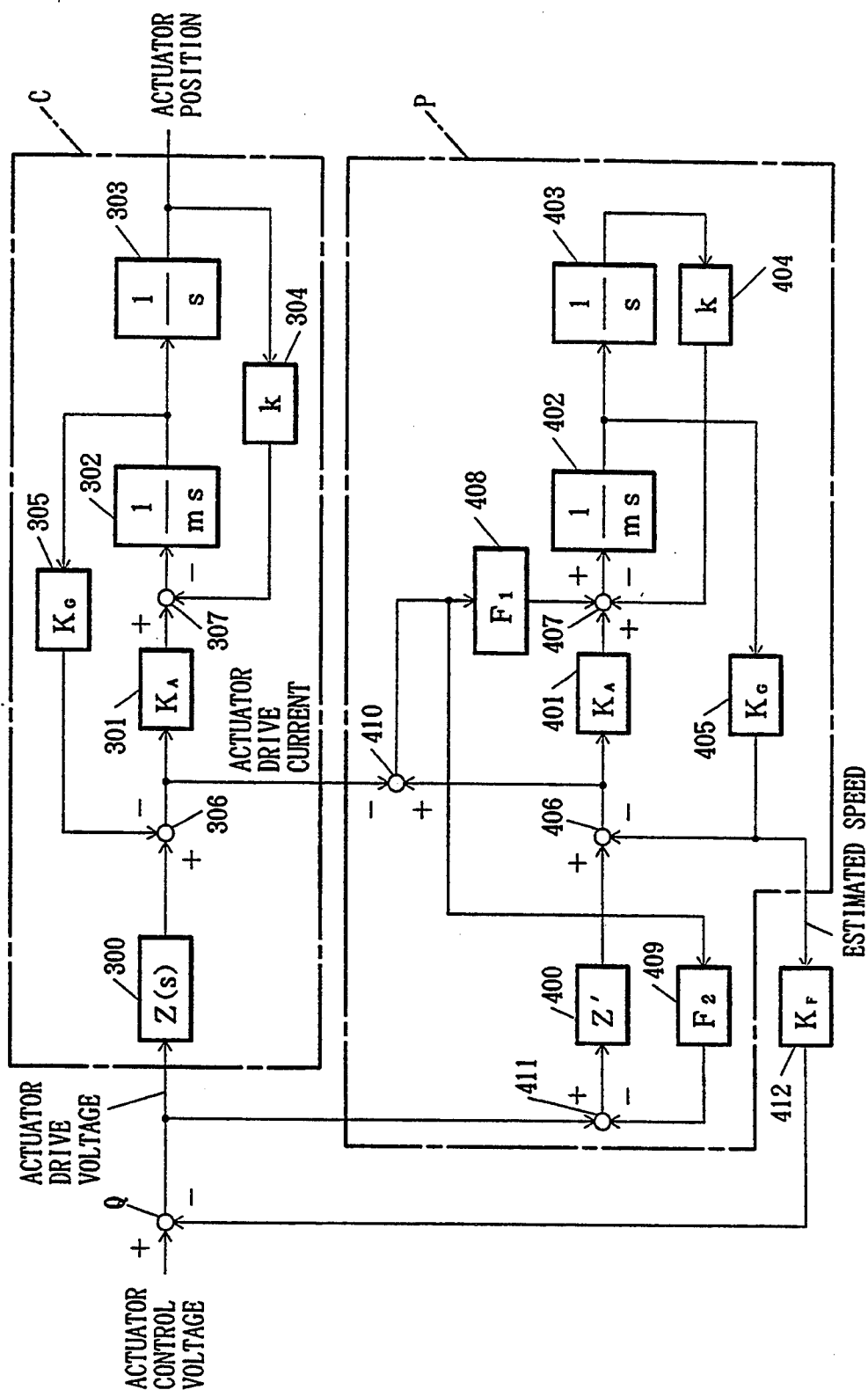
FIG. 2 is a block diagram showing the magnetic head position controller of the first embodiment by using a transfer function of the control logic.

FIG. 2 is a block diagram representing the control logic of FIG. 1, with transfer function or transfer coefficient shown in each block.

In FIG. 2, a block C represents the characteristic of the actuator C by means of transfer functions. An element 300 contained in the block is a transfer coefficient representing the impedance characteristic of the actuator C and an element 301 is a transfer coefficient representing the force constant of the magnetic circuit in the actuator C.

Elements 302, 303, 304 are transfer functions and transfer coefficients that represent the mechanical characteristic of the actuator C, with m indicating a mass of movable portion, k a spring constant of the actuator C, and S a Laplacean.

Element 305 is a transfer function representing a counter electromotive force constant of the actuator C;

and element 306 is a calculating element representing the relationship between the drive current and the counter electromotive force that physically occur in the magnetic circuit of the actuator C.

Denoted 307 is a subtraction element which indicates the balance between the torque mechanically generated by the magnetic circuit of the actuator and the opposing force of the gimbals spring.

The state estimator P simulates the transfer characteristic of the actuator and elements contained in it are as follows.

Element 400 is a transfer coefficient that electrically simulates the transfer coefficient 300; element 401 is a transfer coefficient electrically simulating the above transfer coefficient 301; elements 402, 403 are transfer functions consisting of integrators which electrically simulate the transfer functions 302, 303; elements 404, 405 are transfer coefficient that electrically simulate the transfer coefficients 304, 305; and elements 406, 407 are subtractive elements that electrically simulate the above subtractive elements 306, 307.

The subtractor 410 compares an actuator drive current including a counter electromotive force of the actuator C with an actuator drive current including a counter electromotive force estimated by the electric circuit. Elements 408, 409 are transfer coefficients which represent a gain when the subtractive element 410 feeds back an error signal. A subtractor 411 subtracts the feedback signal from the element 409 from the actuator drive voltage signal for the actuator C.

Element 412 is a transfer coefficient that represents a gain when the estimated speed given by the state estimator P is fed back to the actuator control voltage.

Figure 3:
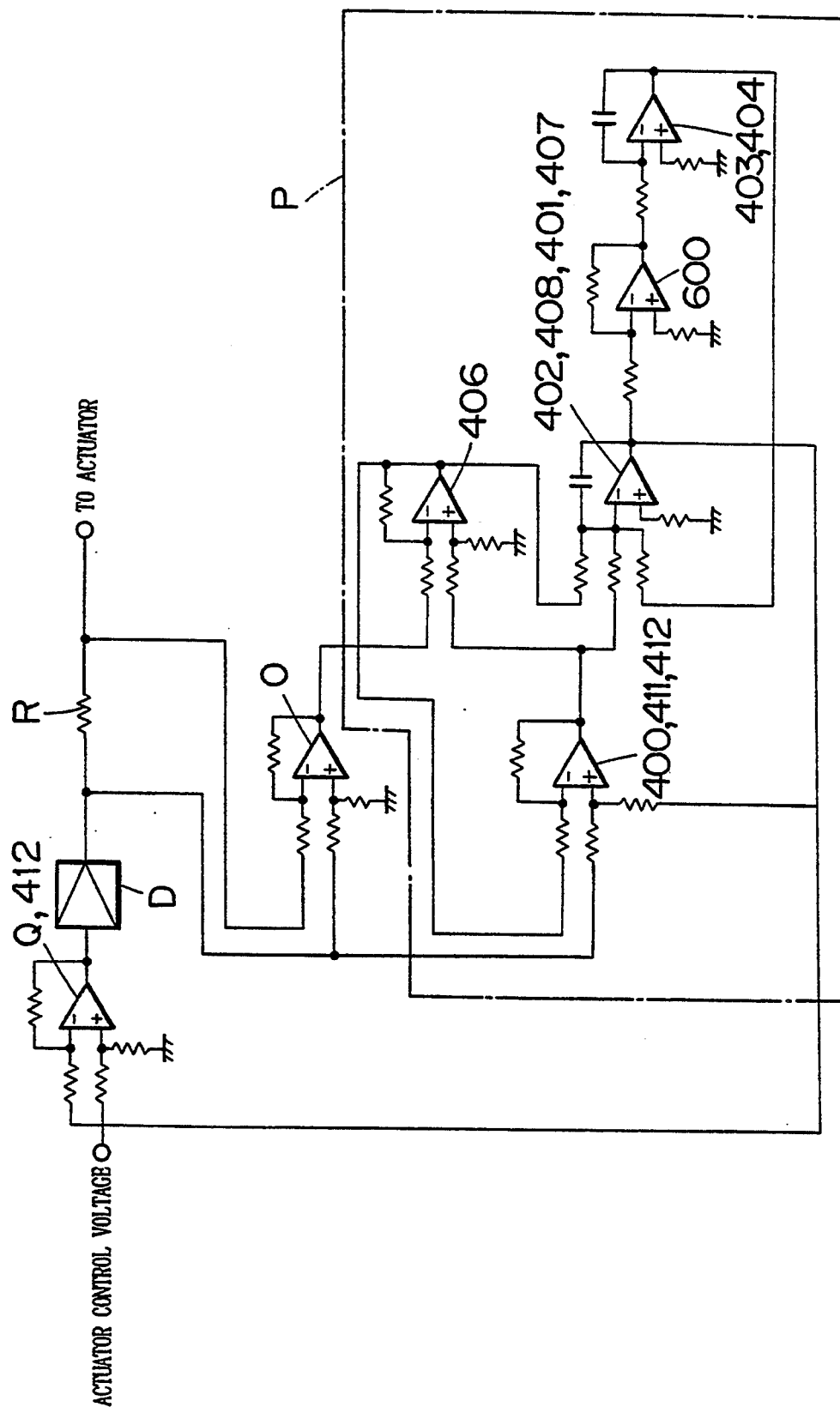
FIG. 3 is a circuit diagram showing an example electric circuit of the first embodiment.

Each of the transfer coefficients of the state estimator P in FIG. 2 that has a circuit configuration of FIG. 3 can be set to a desired value by selecting an appropriate characteristic of differential amplifier and a proper resistance connected to the input terminal side of the amplifier.

The state estimator P of this embodiment shown in FIG. 1 is formed by the same-dimensional observer employing the modern control logic. The detail of the state estimator is shown in FIG. 2 in a transfer function representation.

In FIG. 2, the block C enclosed by one-dot line represents the transfer function of the solenoid-driven actuator and the block P is a state estimator of this invention.

The state estimator P is made up of equivalent circuits 400–411 that simulate characteristics such as drive voltage, drive current, drive torque, speed, displacement, counter electromotive force, and external disturbance of the actuator C.

The actuator operation is considered in the following.

The actuator drive voltage is converted into a current by the impedance characteristic Z(s) (element 300) of the drive coil 202 in the actuator C. The current, from which the counter electromotive force described later is subtracted, is multiplied with the force constant KA (N/A) 301 to determine a force that acts on the mechanism portions 302, 303 made up of the spring and mass system of the actuator C.

This force acts on the actuator C to change the speed and position of the drive coil 202 of the actuator C. When the coil 202 of the actuator C moves at a certain speed, a counter electromotive force proportional to this speed is generated.

If the counter electromotive force constant is taken to be KG (A·sec/m) as represented by the element 305, it is understood that the counter electromotive force is equivalently fed back to the actuator drive current.

Since the actuator movable portion is supported by the gimbals springs 203, 204 as shown in FIG. 5, a reactionary force proportional to the spring constant k (N/m) 304 is produced according to the Hooke's law. If this is represented by transfer function, the reactionary force is understood to be equivalent to the torque feedback.

The operation of the actuator C can be represented by the transfer function as mentioned above, so that simulating this characteristic with electric circuit and picking up a signal corresponding to the counter electromotive force permits correct simulation of the speed signal v(s) of the actuator C.

The state estimator P electrically simulates the characteristics 300–307 of the real actuator C with electrical circuit elements 400–407. The actuator drive current including the electrically estimated counter electromotive force is compared with the actuator drive current including the actually detected counter electromotive force (in FIG. 1 it is detected by the current detecting resistor R) by the subtractor 410. The error signal is fed back through a gain $F_1$ provided before the integrator 402 to regulate it at zero.

The state estimator P of this configuration has not only the frequency characteristic but also the dynamic characteristic (characteristic in time axis) equal to those of the real actuator C.

In other words, since the error signal is fed back through the gain $F_1$, $F_2$ so that the dynamic characteristic error-the difference between the actuator drive current including a specified counter electromotive force and the actual signal-converges to zero, the estimated error will become zero by the action of the feedback gain of the state estimator a certain period of time later.

Under this condition, if the state estimator outputs a signal corresponding to the counter electromotive force, it equivalently represents the speed of the real actuator.

With the state estimator P formed in this manner, even when there are detection gain changes due to characteristic variations in the current detecting resistor R or there are temperature changes or degradation over time of the actuator C leading to characteristic variations, the feedback loop consisting of the feedback gain $F_1$ (element 408) and $F_2$ (element 409) in the state estimator can reliably absorb these variations, preventing them from affecting the estimated speed signal, which corresponds to the counter electromotive force.

Hence, the state estimator P of the above configuration is able to estimate the speed correctly even when the gain of the actuator drive current detecting system changes or characteristic variations occur in the solenoid-driven actuator C. By feeding back the estimated speed through the feedback gain KF of the element 412 to the actuator control voltage, it is possible to perform effective damping in a low frequency band without gain variations.

FIG. 3 is an electric circuit showing one example analog circuit that forms the head driving actuator controller in the magnetic recording and reproducing apparatus of the first embodiment of the invention shown in FIGS. 1 and 2.

In the circuit of FIG. 3, the calculation among the transfer function elements of FIG. 2 is realized by an analog operation circuit consisting of an operational amplifier.

The operational amplifiers of FIG. 3 identical with the corresponding elements of FIG. 2 are assigned like reference numerals. The operational amplifiers perform functions equal to those of the corresponding elements and detailed explanation is not given here.

The circuit shown in FIG. 3 is only one example and any other circuit may be used as long as it can realize the concept of FIG. 2. While the embodiment of FIG. 3 is formed by an analog electric circuit, it is also possible to realize it with a digital circuit using microprocessor and digital signal processor.

The first embodiment is a system which has high tolerance against variations in the current detecting resistor R of the solenoid-driven actuator C and against characteristic variations of the solenoid-driven actuator itself.

Theoretically, the feedback gain $F_1$ (element 408) of the state estimator has a function of compensating for the variations in the current detection resistor and the coil resistance (dc component) of the drive coil 202 of the actuator C.

Another feedback gain $F_2$ (element 409) has the function of compensating for variations and degradation over time of mechanism characteristics such as spring constant of the gimbals springs 203, 204 and mass of the coil bobbin 201 and the drive coil 202 in the actuator C. The feedback gain $F_2$ also compensates for changes in mechanical characteristic caused by an external disturbing force applied to the movable portion of the actuator C.

However, increasing the loop gain of the loop (referred to as loop A) including the feedback gain $F_1$ (element 408) infinitely ($F_1 \to \infty$) will also compensate for the mechanical characteristic variations due to changes over time of the actuator mechanism portion and external disturbing force that are supposed to be compensated for by another loop (referred to as loop B) including the second feedback gain $F_2$ (element 409).

Since the estimated speed signal of the state estimator P is part of the loop B, the estimated speed signal cannot correctly represent the actual speed of the actuator.

On the other hand, let us consider a case in which the loop gain of the second loop B is increased infinitely ($F_2 \to \infty$). In an ideal condition where there is no variation in the current detecting resistance, the state estimator forms a perfect observer, as it is called in the modern control logic, so that very precise state estimation of speed, position and external disturbance becomes possible.

However, in practice, there are variations in the current detection resistance. This means that the gain variations of the current detection resistance that are supposed to be compensated for by the loop A are inevitably compensated for by the loop B.

Since this variation can be interpreted, in terms of state quantity, as an acceleration (=current flowing into the actuator), the acceleration information enters into what is originally intended to be the speed information (=counter electromotive force) of the loop B.

In this way, since in the state estimator of this invention the state quantities to be compensated for by the two feedback gains are already determined, increasing the both gains infinitely at the same time will make the normal state estimation impossible for the reasons mentioned above. Therefore, not only the gain values of the two feedback gains $F_1$ (element 408) and $F_2$ (element 409) but the ratio of the two gains become an important matter that should be considered in designing the state estimator.

The configuration of the head actuator of this invention is as shown in FIG. 5, and the displacement/frequency characteristic is as shown in FIG. 7.

Since it is obvious that the first-order resonance frequency is easily oscillated when subjected to load disturbance, the frequency band that should be compensated for dominantly by the loop B is the one having the first-order resonance frequency as the center frequency, The frequency band that should be compensated for dominantly by the loop A therefore need only be a band that is lower than the first-order resonance frequency and includes the current detection resistance variations or dc components.

Since the state quantities to be covered by the loop A and the loop E are different, as stated above, it is seen that the problem can be solved by separating from each other the frequency bands where these two loops function dominantly.

For example, when the loop A is set to a high gain for the entire frequency, the loop B need only be formed so that its frequency band including the first-order resonance frequency has a higher gain than the loop A.

Second Embodiment

Figure 8:
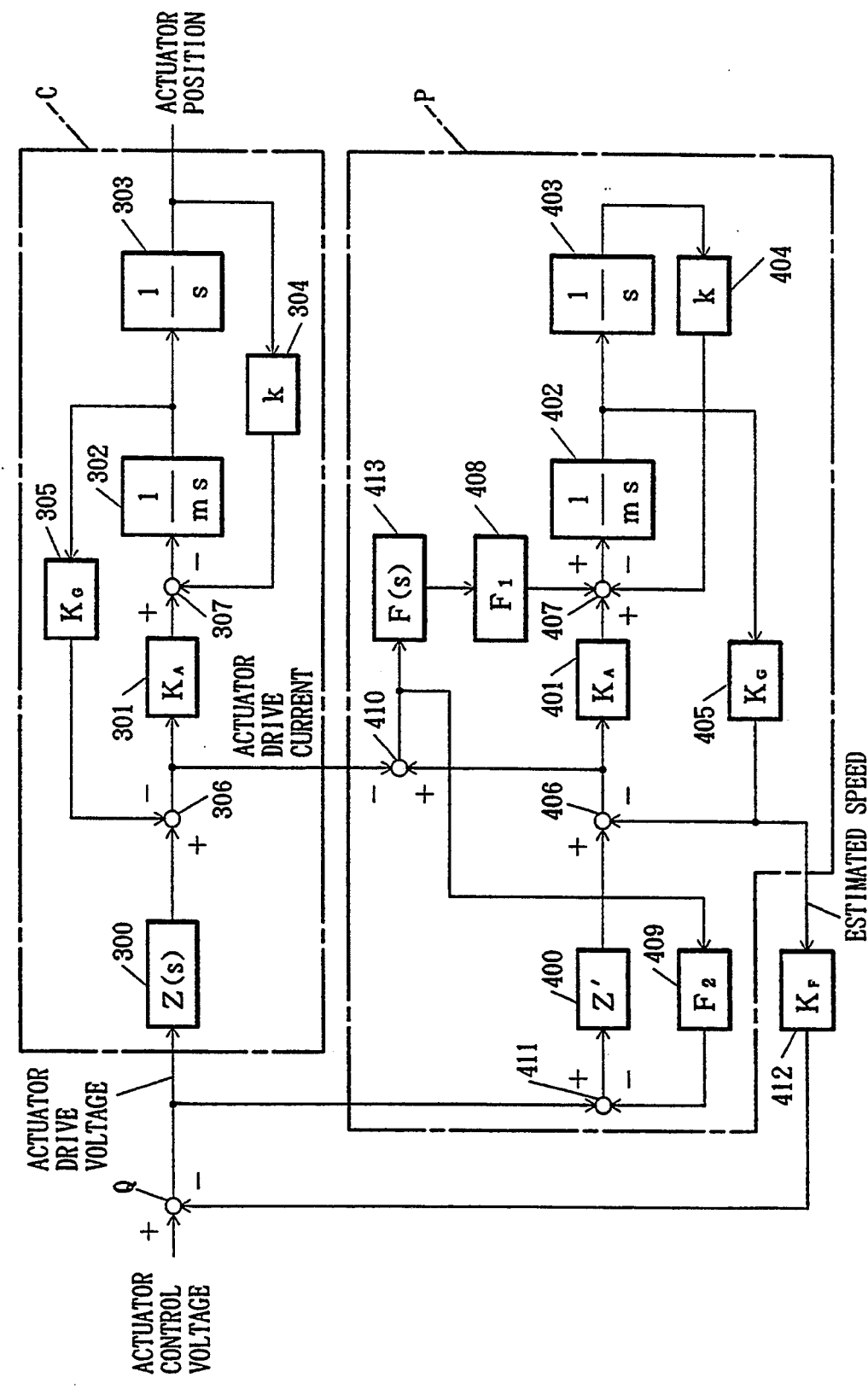
FIG. 8 is a block diagram showing the magnetic head position controller in the magnetic recording and reproducing apparatus as a second embodiment of the invention by using a transfer function of the control logic.

FIG. 8 shows a second embodiment in which the loop B feeds back the error signal through a compensation filter 413 to solve the above problem.

FIGS. 9 and 11 show frequency characteristic of the compensation filter 413 used in the second embodiment.

In this embodiment, since the loop B need only cover the damping of the excited vibration at the first-order resonance frequency caused by the external disturbing force, the compensation filter 413 should preferably be a band-pass filter whose center frequency is the first-order resonance frequency of the actuator C as shown in FIG. 9 and which is not phase-shifted at the first-order resonance frequency.

The compensation filter 413 may also be formed by a high-pass filter. In this case also, it is preferred that the characteristic of F(s) (element 413) have no phase shift also at the first-order resonance frequency of the actuator C, as shown in FIG. 10.

When the loop B is set to a high gain over the entire frequency range, the loop A need be formed so that the low-frequency band including the dc components is set to a higher gain than the loop B. In this case, the loop A should feed back the error signal through the compensation filter 413.

The compensation filter 413 is preferably a low-pass filter whose cut-off frequency is set below the first-order resonance frequency, as shown in FIG. 11.

The state estimator P of the above configuration therefore can correctly estimate the speed even when there are gain variations in the actuator drive current detecting system or characteristic variations in the actuator itself or when it is subjected to load disturbing vibrations. By feeding back the estimated speed through the element 412 or feedback gain KF, an effective damping without gain variations in the low-frequency band is possible.

As mentioned above, FIG. 7 shows the displacement/voltage frequency characteristic of the actuator C before the damping is effected. When the damping according to the second embodiment is invoked, the characteristic is improved as shown in FIG. 12.

That is, it is seen that there is no gain variation in the low-frequency range and that only the first-order resonance frequency is effectively attenuated. As mentioned above, even when the gain variation in the actuator drive current detecting system is more than 50%, a reliable damping can be effected without causing any characteristic changes.

Figures 13A, 13B:
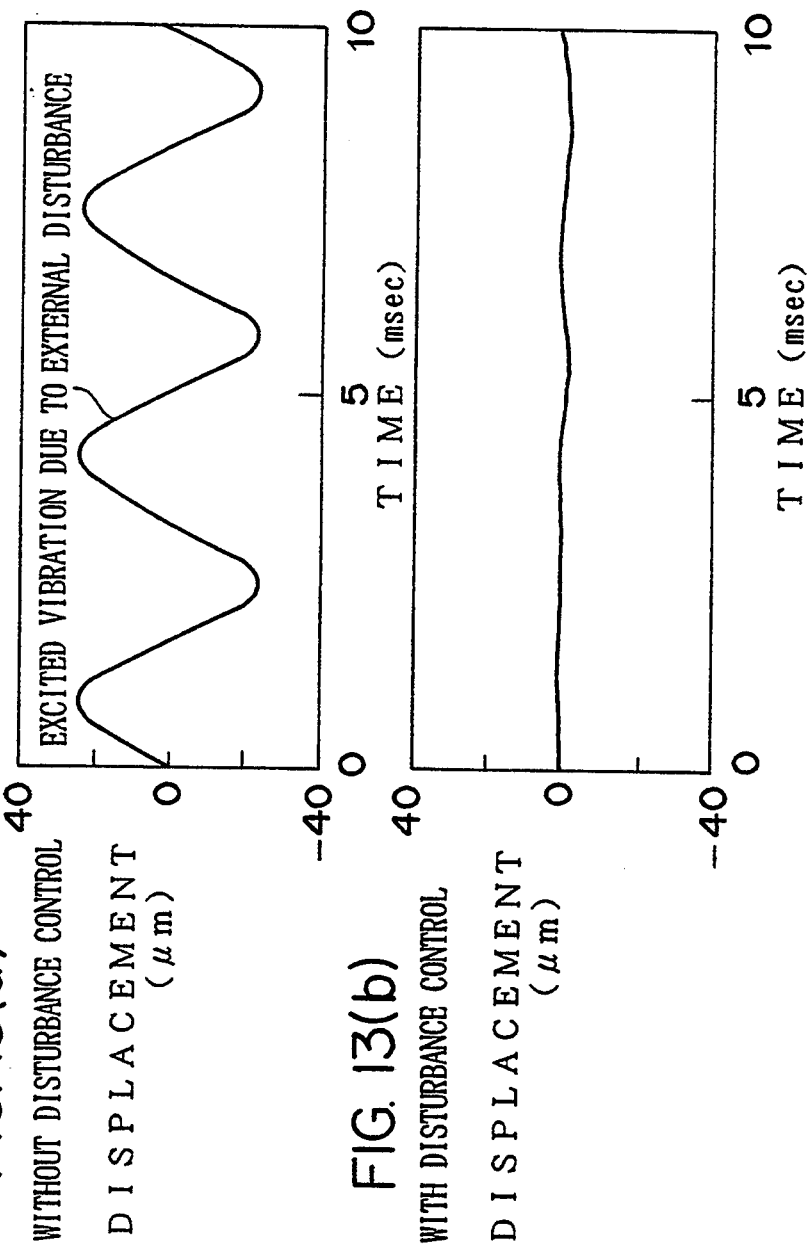
FIGS. 13(a) and 13(b) are diagrams showing an improved effect of the load disturbance characteristic of the second embodiment.

This invention can also perform effective damping on vibrations excited by load disturbances, as shown in FIG. 13.

Figure 14:
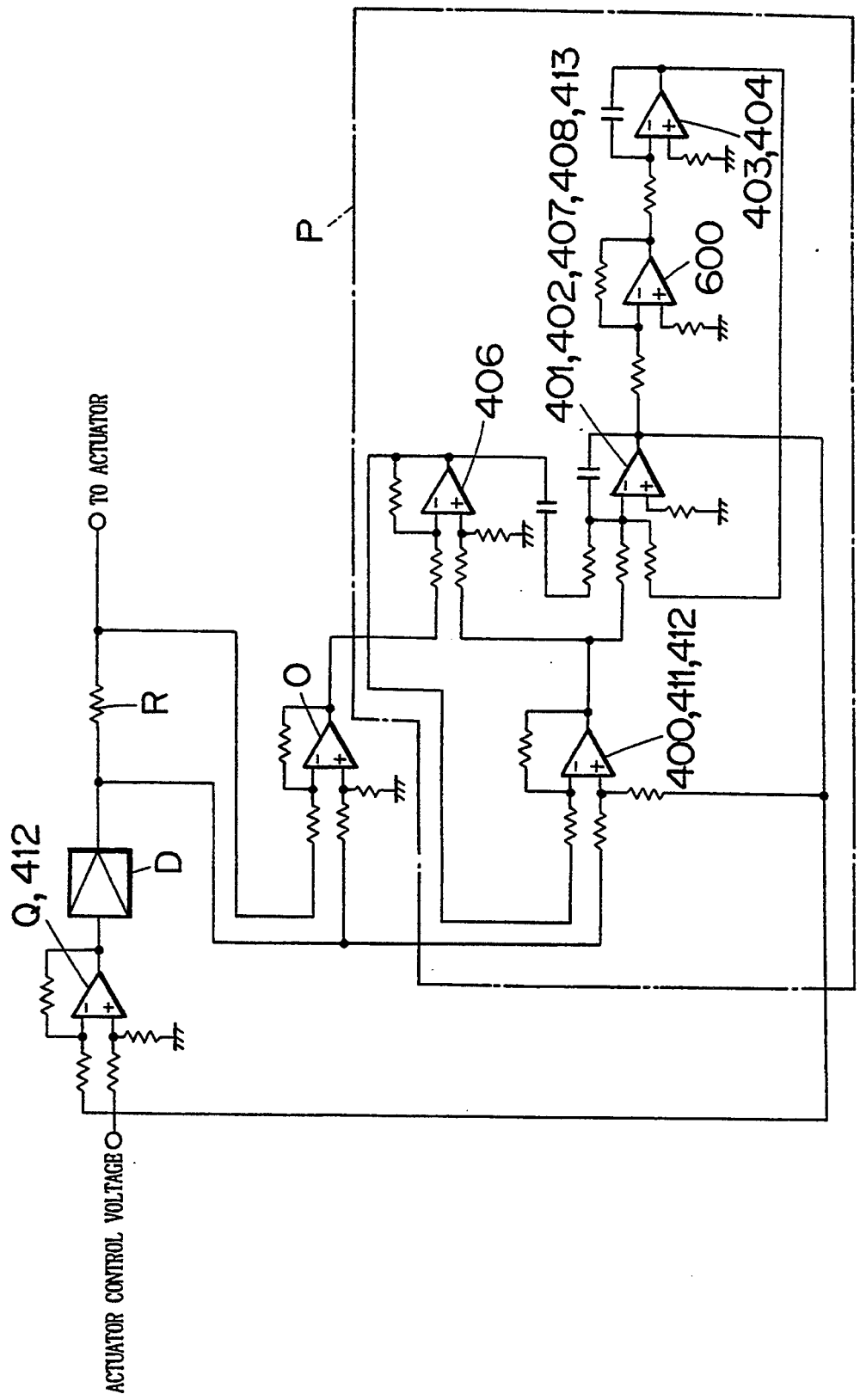
FIG. 14 is a circuit diagram showing an example electric circuit of the second embodiment.

An electric circuit that realizes such an actuator damping is shown in FIG. 14.

In FIG. 14, calculation among the transfer function elements of FIG. 8 is realized by an analog operation circuit. The operational amplifiers identical with the corresponding elements of FIG. 8 are assigned like reference numerals.

The circuit shown in FIG. 14 is only one example and any other circuits may be used as long as they realize the concept shown in FIG. 8. While the circuit of this example is formed by an analog circuit, it is also possible to use a digital circuit employing microprocessor and digital signal processor.

In cases where the current detection resistance R has high precision, characteristic variations of the solenoid-driven actuator C are small, and the characteristic variations, after being damped, are below a level not affecting the actual operation, the system can be formed as a simple and less expensive system.

Third Embodiment

Figure 15:
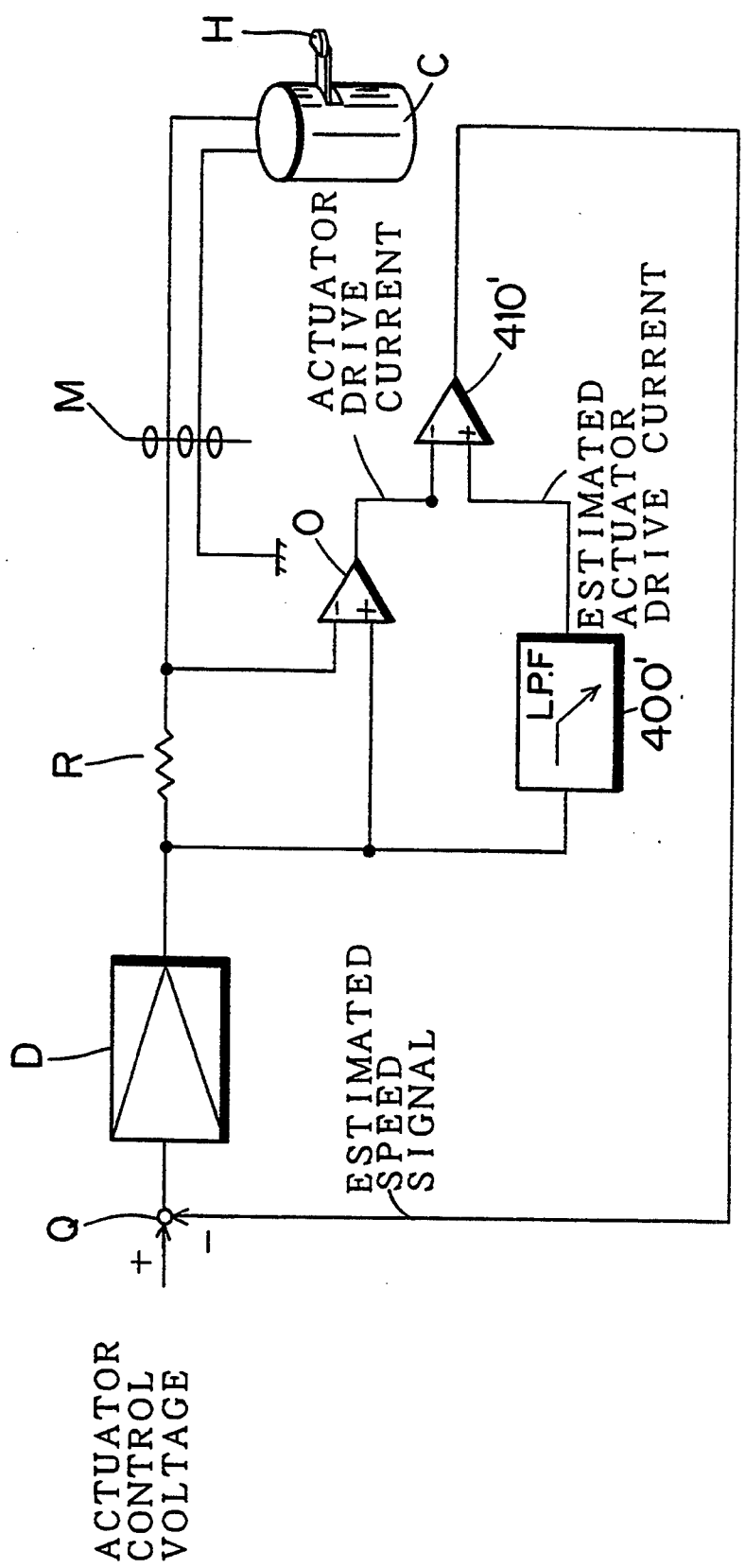
FIG. 15 is a block diagram showing the magnetic head position controller in the magnetic recording and reproducing apparatus as a third embodiment of the invention.

FIG. 15 shows a third embodiment of the invention. In FIG. 15, the movable head position controller includes an LPF 400' and a differential amplifier 410'. The LPF 400' electrically simulates the impedance characteristic of the solenoid-driven actuator C to estimate the voltage-current characteristic when there is no magnetic flux in the actuator or the movable coil is fixed, i.e., to estimate the actuator drive current not including the counter electromotive force. The differential amplifier 410' compares the actuator drive current including the counter electromotive force with the actuator drive current not including the estimated counter electromotive force.

Figure 16:
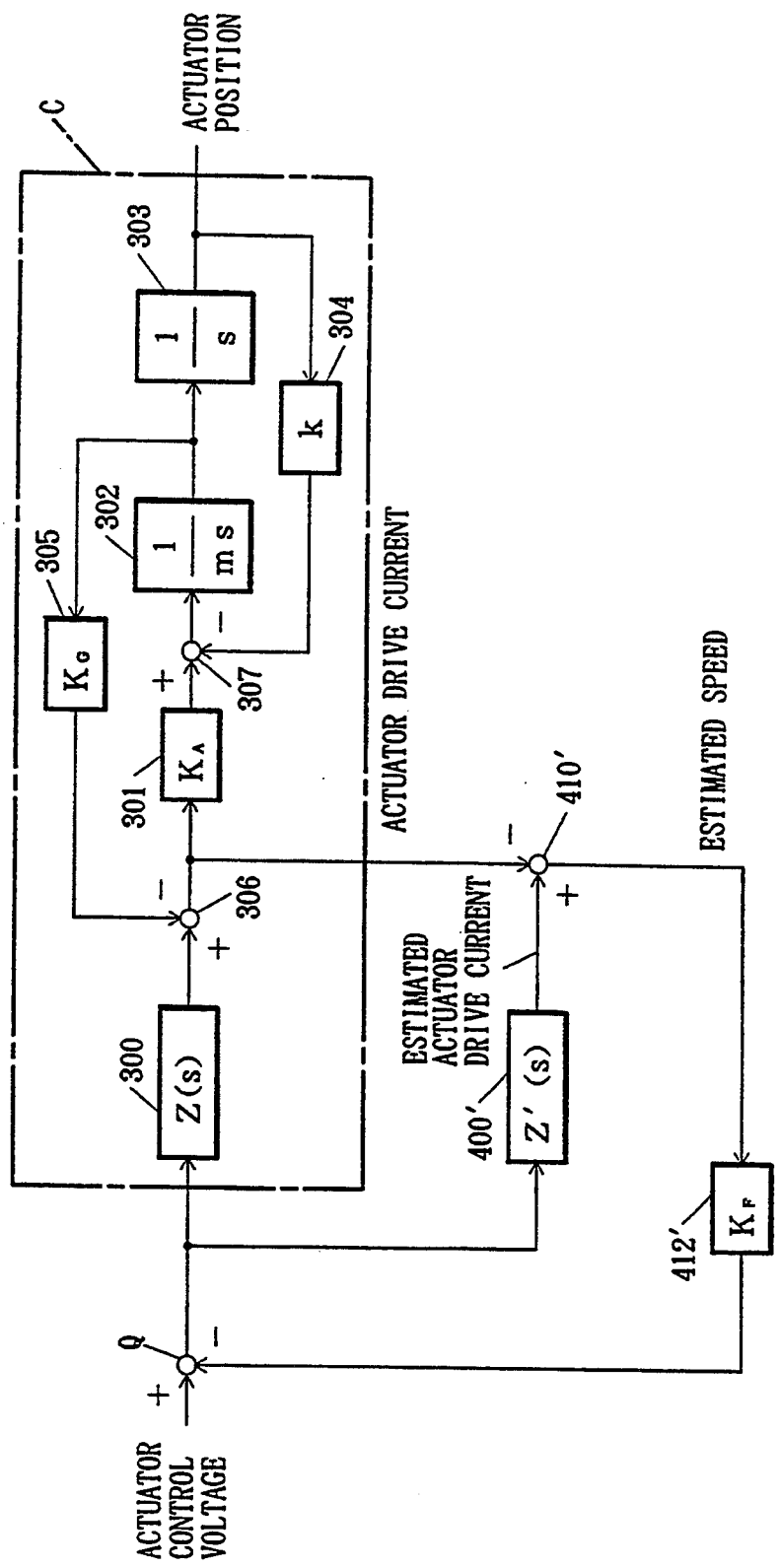
FIG. 16 is a block diagram showing the third embodiment by using a transfer function of the control logic.

FIG. 16 is a block diagram showing the control logic of the third embodiment shown in FIG. 15.

In FIG. 16, the impedance characteristic Z' (s) of the equivalent circuit 400' is formed by a primary filter which simulates, with an electric circuit, impedance characteristic including the coil reactance of the drive coil 202.

If the cut-off frequency for the phase shift caused by the coil reactance is sufficiently higher, for example by more than 10 times, than the frequency band to be controlled, the impedance characteristic Z' (s) simply becomes a gain and the system has no frequency characteristic.

The subtractor 410' represents the differential amplifier 410' and the transfer coefficient KF (element 412') represents a gain when feeding back the estimated speed.

In the third embodiment, the constitutional elements identical with those of the second embodiment are assigned like reference numerals.

The head driving actuator damping apparatus shown in FIGS. 15 and 16 is based on the assumption that the error of the actuator drive current detection system is small, so that the comparison between the actuator drive current including the detected counter electromotive force and the actuator drive current not including the counter electromotive force estimated by the electric circuit 400' enables the counter electromotive force to be derived with a small error.

The counter electromotive force (i.e., estimated speed) may be fed back through a certain feedback gain KF (element 412'), as in the first embodiment, to produce a similar effect to that of the first embodiment.

Figure 17:
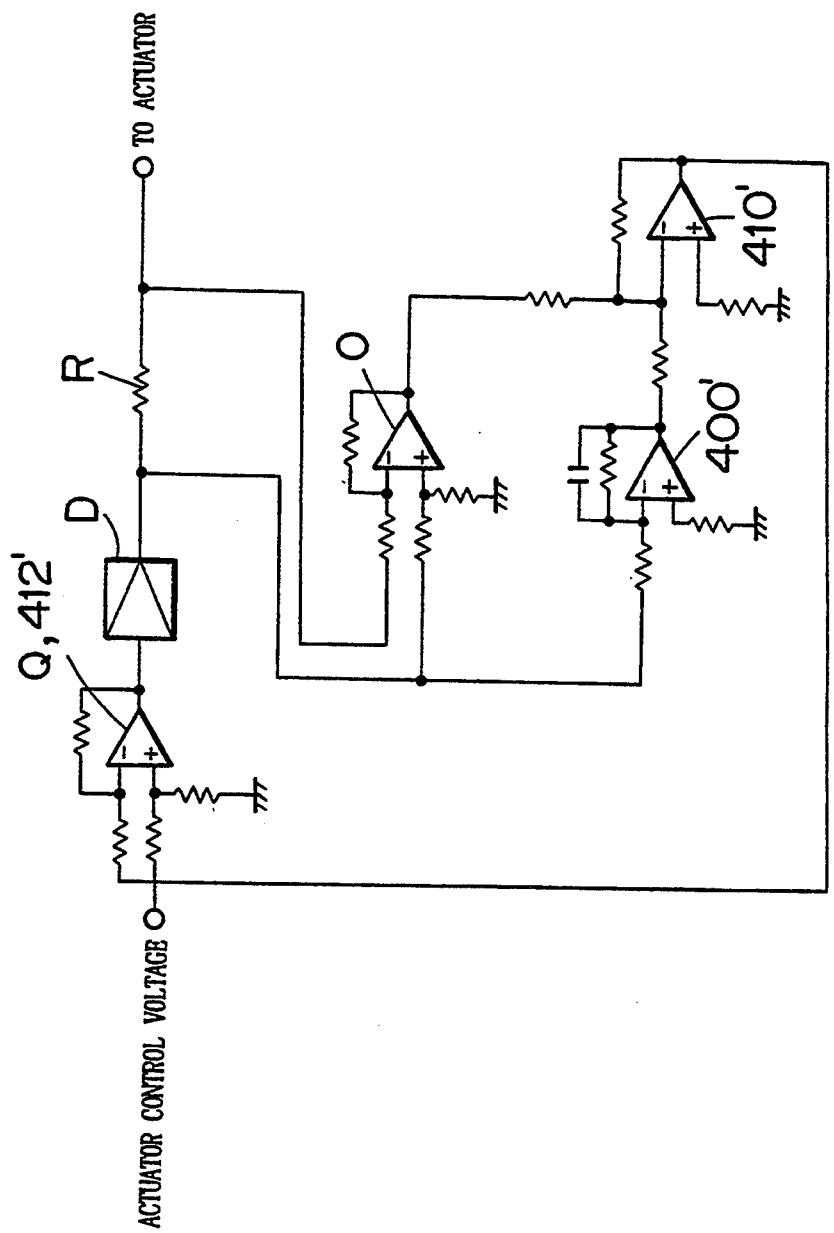
FIG. 17 is a circuit diagram showing an example electric circuit of the third embodiment.

FIG. 17 shows an embodiment that realizes the head driving actuator damping apparatus of FIG. 16 with electric circuit. As in the case of FIG. 3, the operational amplifiers identical with the corresponding elements of FIG. 16 are assigned like reference numerals.

As in the case of FIG. 3, the circuit shown in FIG. 17 is only one example and any other circuits may be used as long as they realize the concept shown in FIG. 16. For example, it may be realized by a digital circuit to produce a similar effect.

Fourth Embodiment

Next, a fourth embodiment will be explained which can cope with variations in resistance of the current detecting resistor.

The third embodiment mentioned above can also tolerate variations in the current detection resistance to a certain degree (for example, up to 10–20%).

Figure 18:
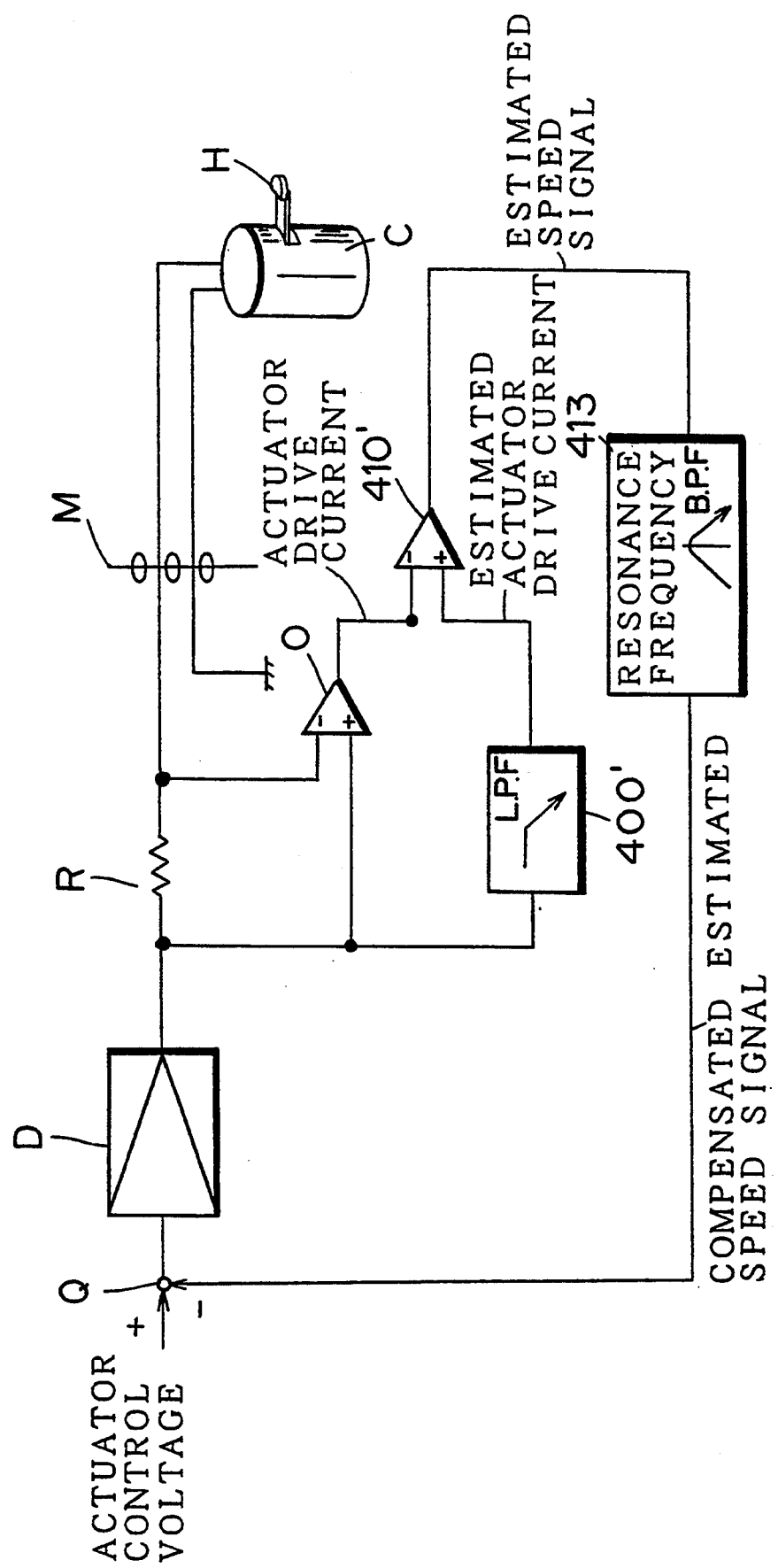
FIG. 18 is a block diagram showing the magnetic head position controller in the magnetic recording and reproducing apparatus as a fourth embodiment of the invention.

In FIG. 18, a BPF 413 is a band-pass filter which has as the center frequency the first-order resonance frequency of the solenoid-driven actuator C.

Figure 19:
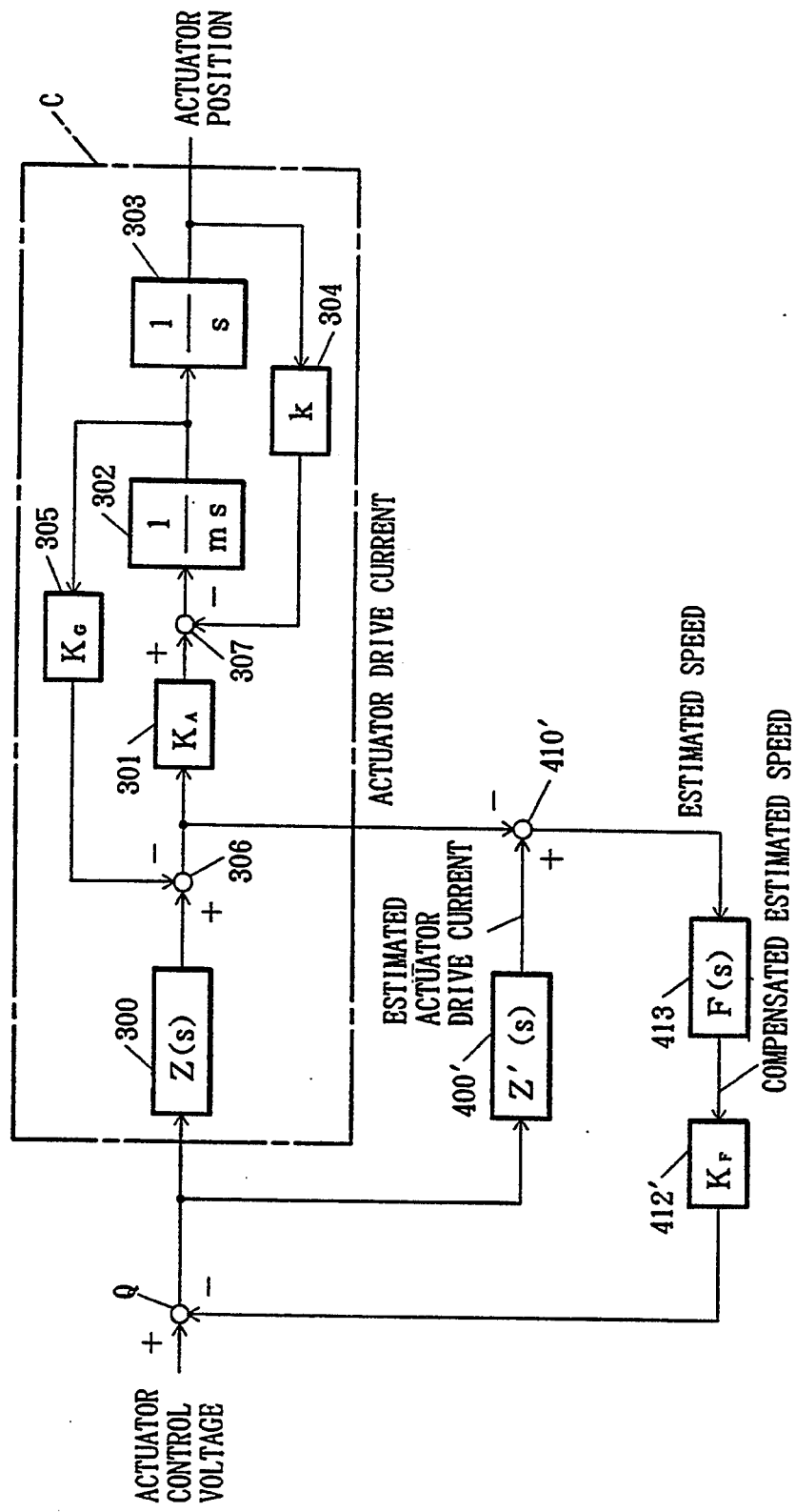
FIG. 19 is a block diagram showing the fourth embodiment by using a transfer function of the control logic.

The configuration of BPF 413 is represented by transfer function of the control logic as shown in the block diagram of FIG. 19.

In this embodiment, the estimated speed of the third embodiment is fed back through the band-pass filter F(s) (element 413) whose center frequency is the resonance frequency of the solenoid-driven actuator C and through the gain KF of the block 412'.

The band-pass filter F(s) (element 413) can be realized by a primary high-pass filter and a primary low-pass filter that are set at the resonance frequency of the solenoid-driven actuator C or at a frequency close to it.

For example, let us consider a case where the gain changes due to variations in the current detection resistance causing actuator drive current information to enter into the estimated speed signal. In this case, the low-frequency components in a frequency band sufficiently lower than the resonance frequency of the estimate speed have a small amplitude of the speed information, so that the component of the actuator drive current becomes dominant.

Furthermore, in the low-frequency range, no phase shift occurs and therefore the error signal of the estimated speed represents the position information. Hence, feeding back this information as is results in gain variations in the low-frequency range, as mentioned above.

Since it is evident that in the low-frequency range the estimated speed is replaced with the position information, the speed information need only be compensated for by the high-pass filter that differentiates only the low-frequency component.

Moreover, because the estimated speed in a higher frequency range than the first-order frequency is not directly involved in damping, it is effective in improving the stability to integrate the high-frequency component of the estimated speed by the low-pass filter whose cut-off frequency is the first-order resonance frequency of the solenoid-driven actuator C.

In other words, it is effective to compensate for the estimated speed by the band-pass filter 413 which performs both the functions of high-pass filter and low-pass filter simultaneously.

The band-pass filter 413 preferably has its center frequency selected at the first-order resonance frequency of the solenoid-driven actuator C. It should also be formed so that there is no phase shift at the first-order resonance frequency.

Depending on circumstances, the band-pass filter 413 may be formed only by high-pass filter. In that case, too, the characteristic F(s) of the band-pass filter 413 should preferably be formed so that a phase shift will not occur also at the first-order resonance frequency of the solenoid-driven actuator C.

When the estimated speed thus compensated for is fed back, a good damping effect with little variation in low-frequency gain is obtained, as in the first embodiment, even if there are some variations in parts characteristics. Although there may be some variations in characteristics of the solenoid-driven actuator C near the first-order resonance frequency, there is no problem for uses where the low-frequency characteristic is dominant as when the solenoid-driven actuator C is used only for special replay operation.

Figure 20:
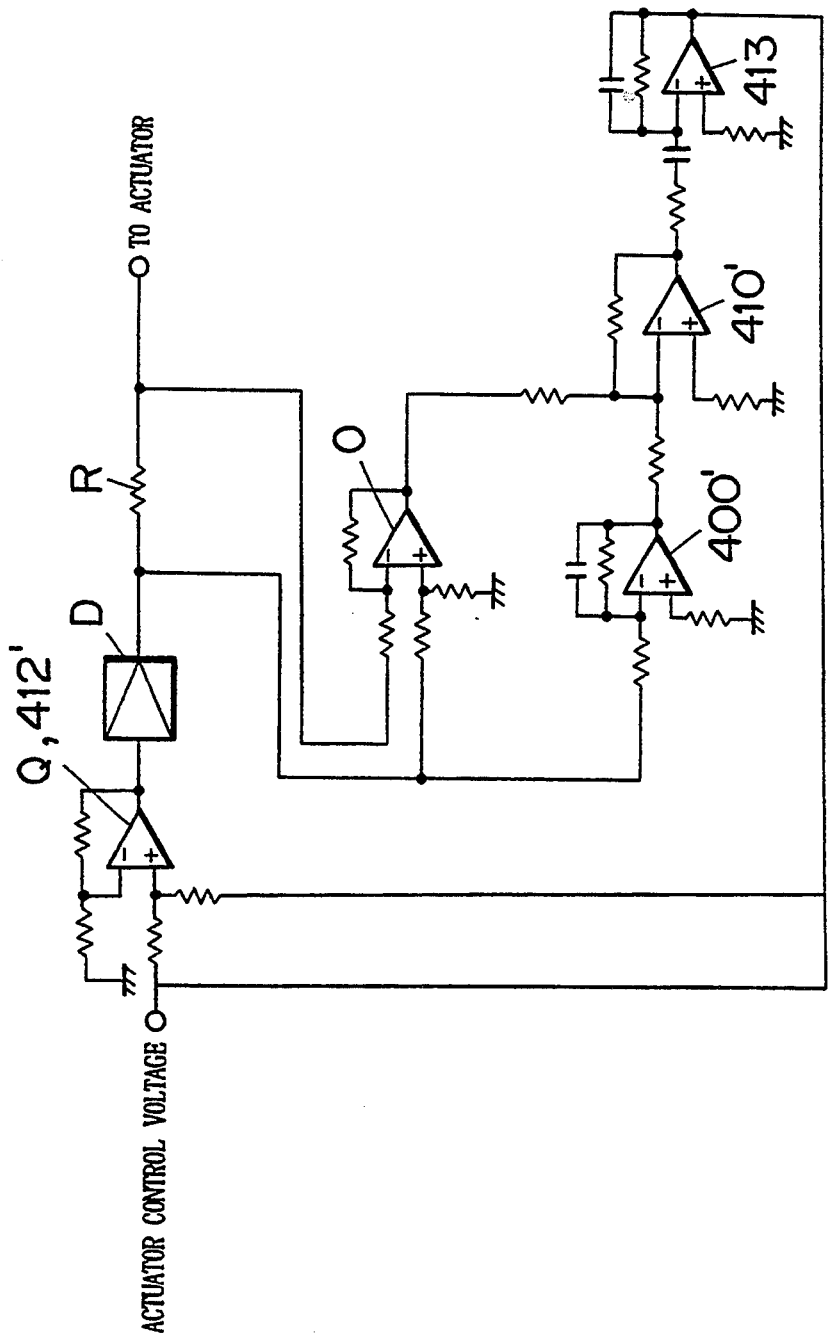
FIG. 20 is a circuit diagram showing an example electric circuit of the fourth embodiment.

FIG. 20 shows one example electric circuit that realizes the configuration of the head drive actuator damping device shown in FIGS. 18 and 19. As with the case of FIG. 3, the operational amplifiers identical with the corresponding elements of FIG. 19 are assigned like reference numerals. The circuit shown in FIG. 20 is only one example and any other circuits may be used as long as they can realize the concept of FIG. 19. It is possible to form the device as a digital circuit and still have a similar effect.

During the process of damping the actuator in the above embodiments, when the actuator is driven in large amplitudes as during the special replay operation, a large current flows in the drive coil, heating it.

In that case, since the impedance of the drive coil changes due to heat, the displacement/voltage sensitivity also changes.

Fifth Embodiment

Now, a fifth embodiment will be described which compensates for this problem.

In the previous embodiment the control signal is given as a voltage. Since the state quantity that operates the solenoid-driven actuator C is a current, it is only necessary to form the control system such that the actuator drive current follows the control voltage.

This is generally called a current drive method, which consists of measuring the actuator drive current and feeding back that signal to the actuator control voltage with high gain.

What should be noted here is that the actuator drive current, detected by the current detection resistor R, includes the counter electromotive force.

Feeding the actuator drive current containing the counter electromotive force back to the actuator control voltage compensates for the coil impedance variations. But at the same time it also compensates for the damping effects produced by the counter electromotive force of the solenoid-driven actuator C itself.

Hence, when the actuator drive current containing the counter electromotive force is fed back, the damping effect produced by the counter electromotive force of the actuator is eliminated, which in turn undesirably increases the mechanical resonance peak gain.

To effectively damp the increased mechanical resonance peak gain, it is only necessary to add a current feedback loop inside the damping loop explained in the preceding embodiment. With this configuration, the relation between these two loops can nearly be ignored.

Figure 21:
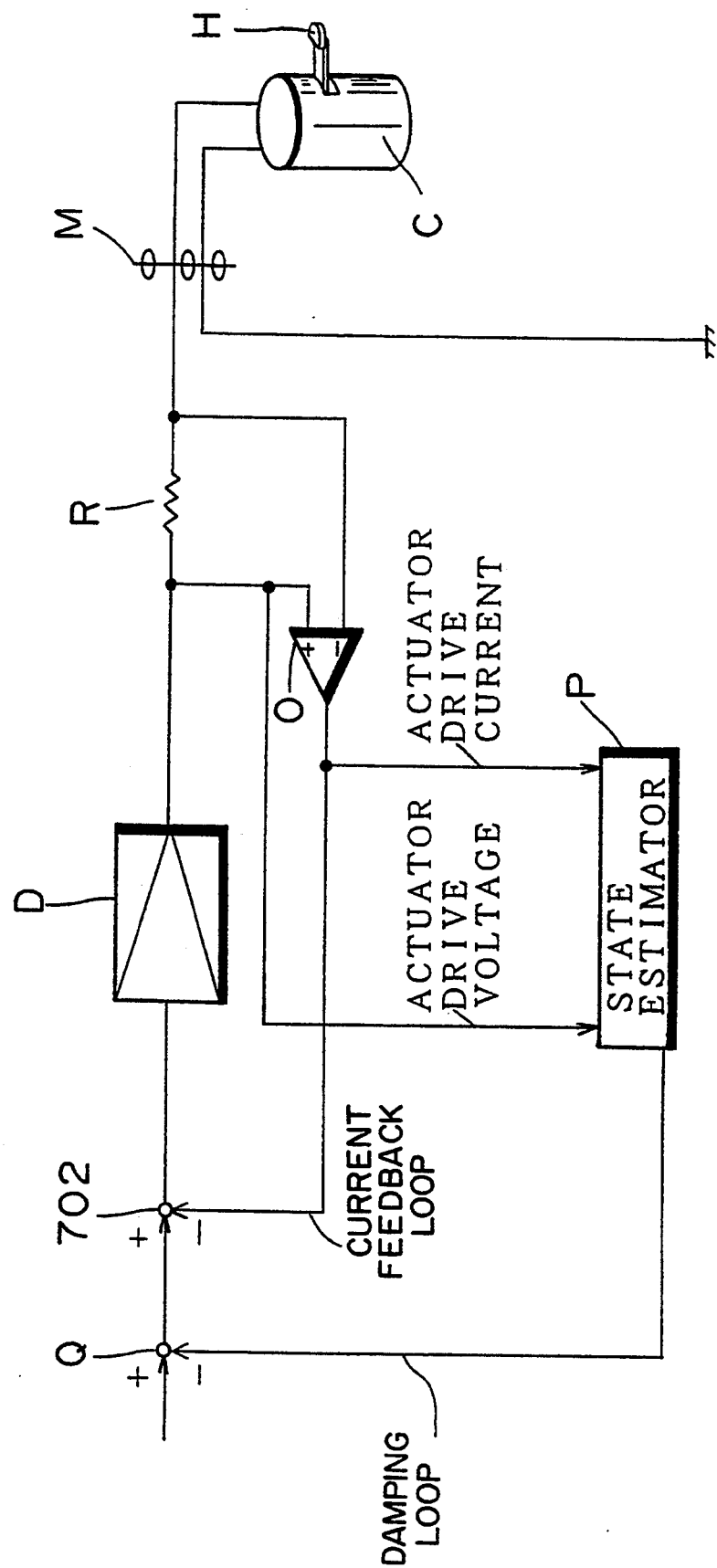
FIG. 21 is a block diagram showing the outline of a fifth embodiment which is the first embodiment additionally including a current feedback loop.
Figure 22:
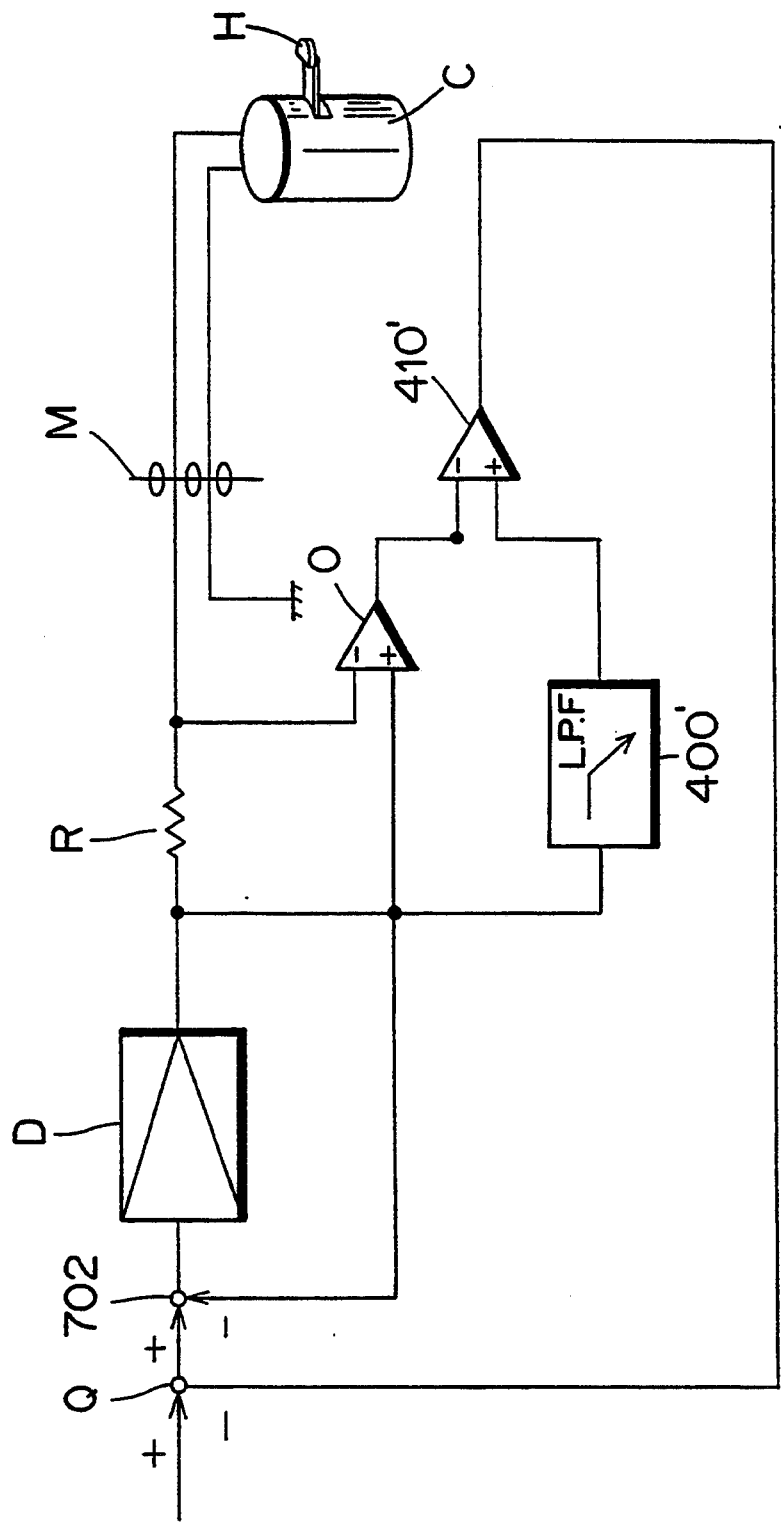
FIG. 22 is a block diagram showing the outline of an additional embodiment which is the third embodiment including a current feedback loop.
Figure 23:
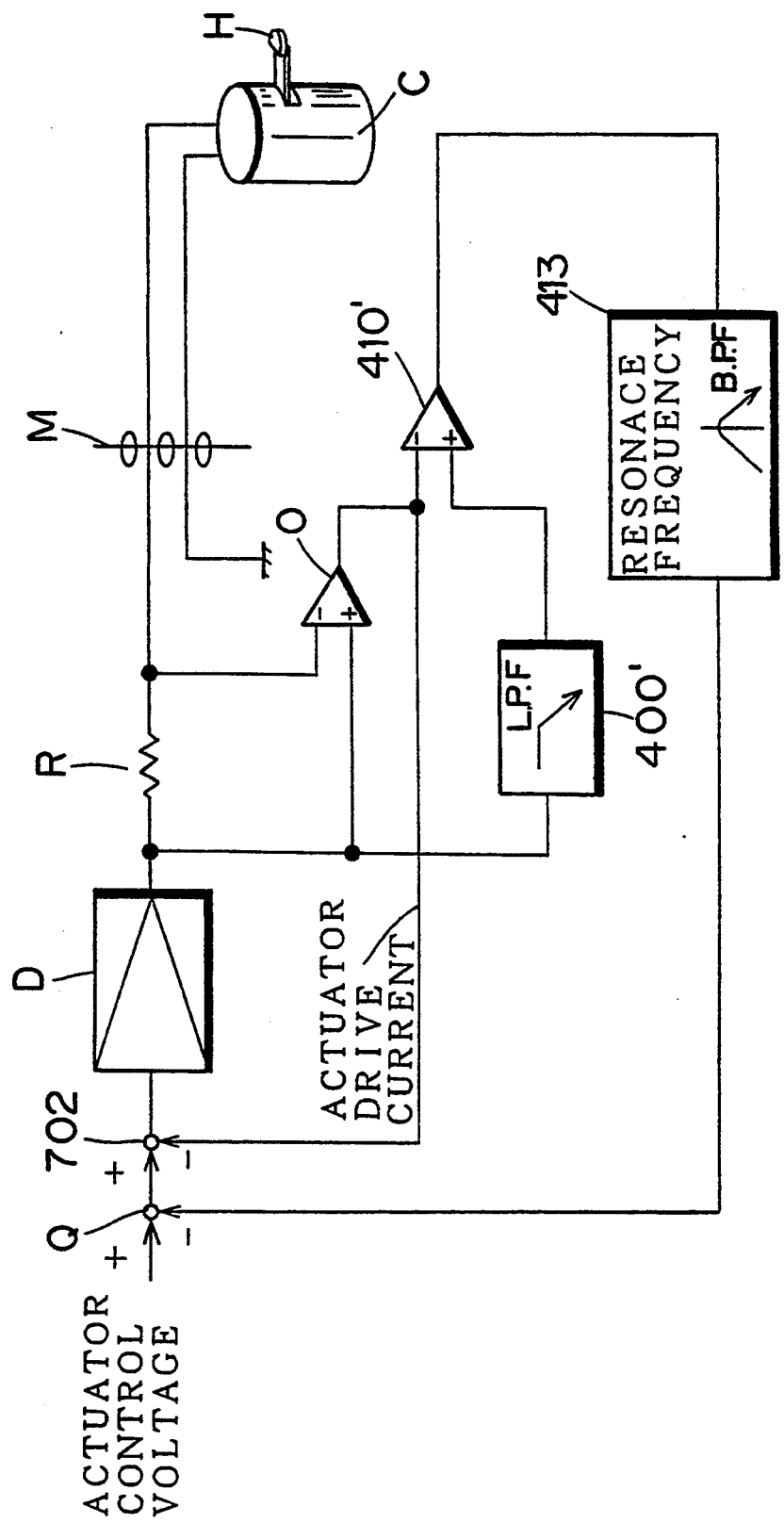
FIG. 23 is a block diagram showing the outline of an additional embodiment which is the fourth embodiment including a current feedback loop.

The configuration of this embodiment is shown in FIGS. 21, 22 and 23.

As shown in FIGS. 21, 22 and 23, a current feedback loop to feed back the actuator drive current is added inside the damping loop in the configuration of FIGS. 1, 15 and 18.

Figure 24:
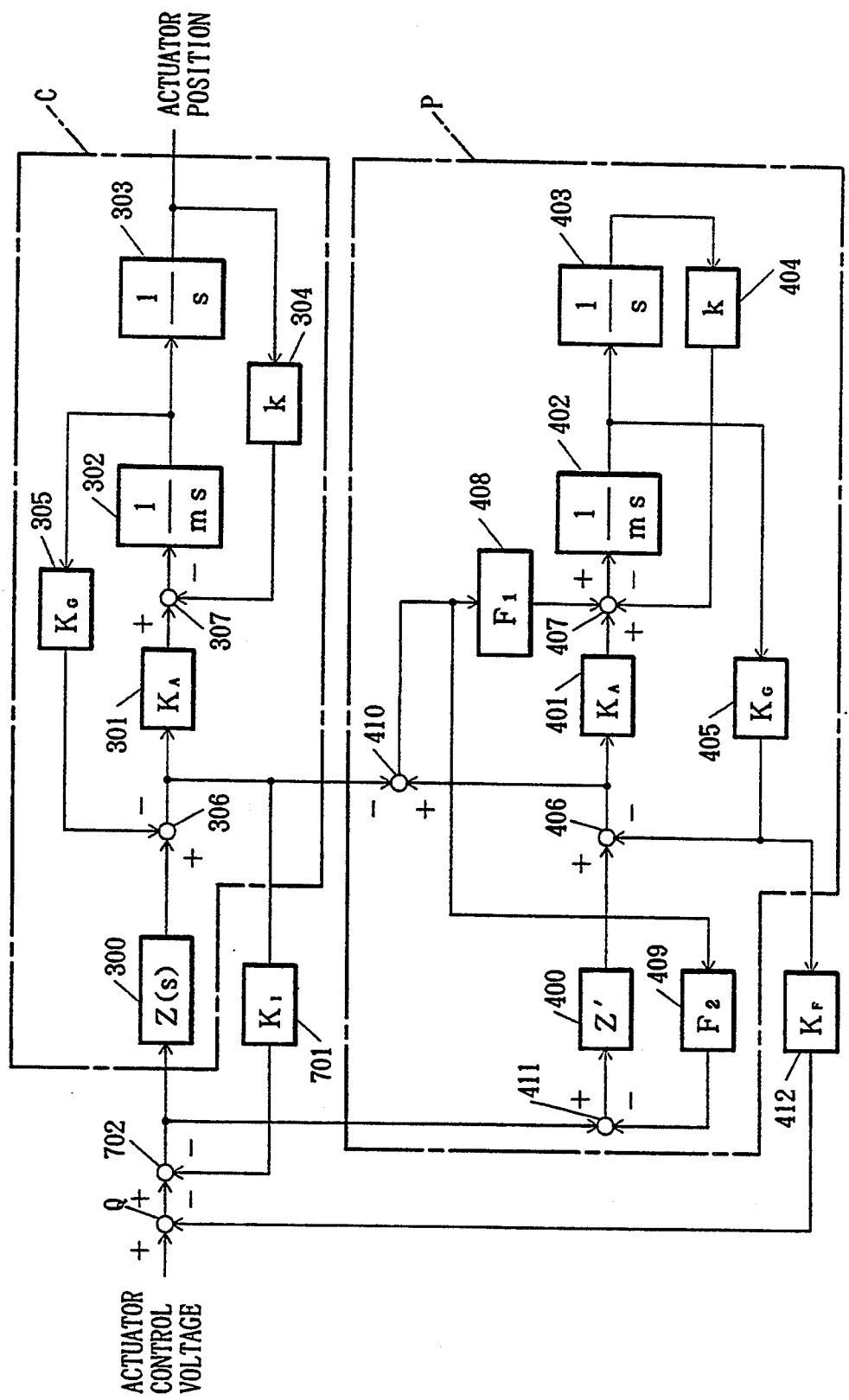
FIG. 24 is a block diagram showing the additional embodiment having a current feedback loop added to the first embodiment, by using the transfer function of the control logic.
Figure 25:
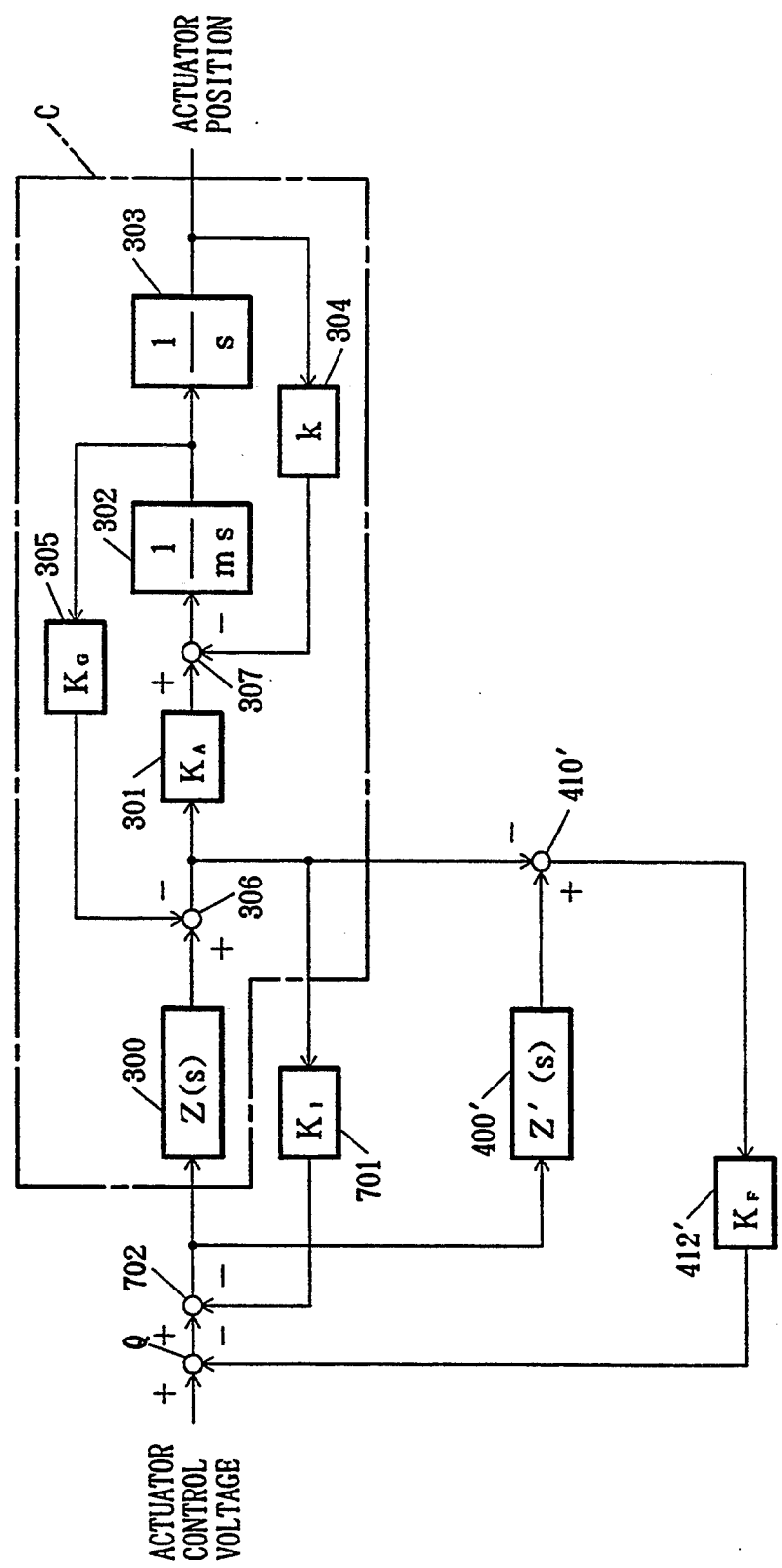
FIG. 25 is a block diagram showing the additional embodiment having a current feedback loop added to the third embodiment, by using the transfer function of the control logic.
Figure 26:
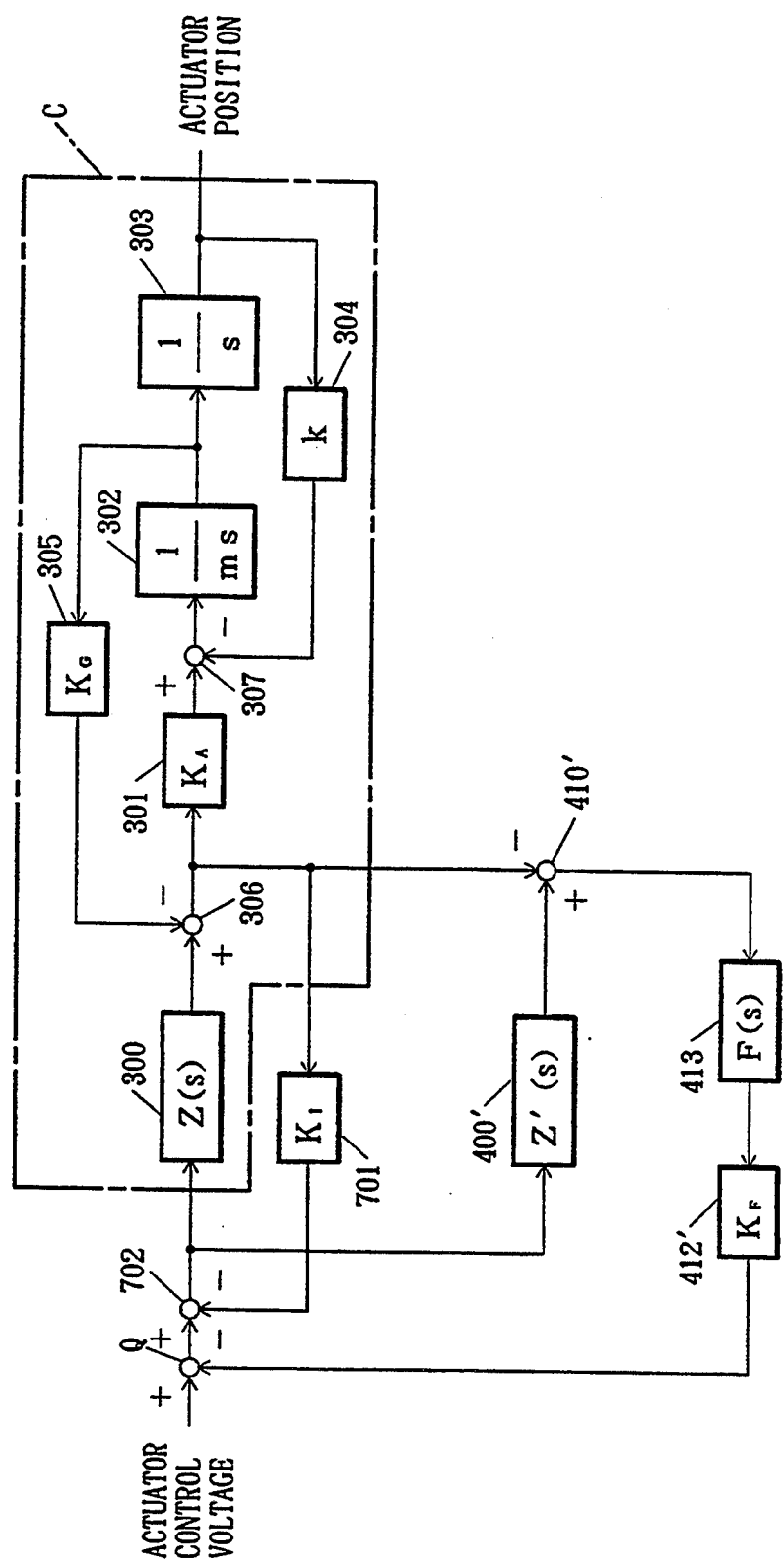
FIG. 26 is a block diagram showing the additional embodiment having a current feedback loop added to the fourth embodiment, by using the transfer function of the control logic.

The configurations of FIGS. 21, 22 and 23 are represented as block diagrams using transfer functions of control logic in FIGS. 24, 25 and 26.

In these figures, the transfer coefficient KI of element 701 indicates the current feedback loop gain and the element 702 is a subtractor.

The detail of the damping method of each embodiment in FIGS. 24, 25 and 26 is already described and thus is not given here.

Since the system of this embodiment has a current feedback loop inside the damping loop, it can compensate for variations in the displacement/voltage dc sensitivity resulting from the coil impedance change due to heated actuator drive coil 202 and also effect a large damping.

While the drive amplifier D of this embodiment is of a current drive type, a voltage drive type may also be used to provide a similar effect.

Figure 27:
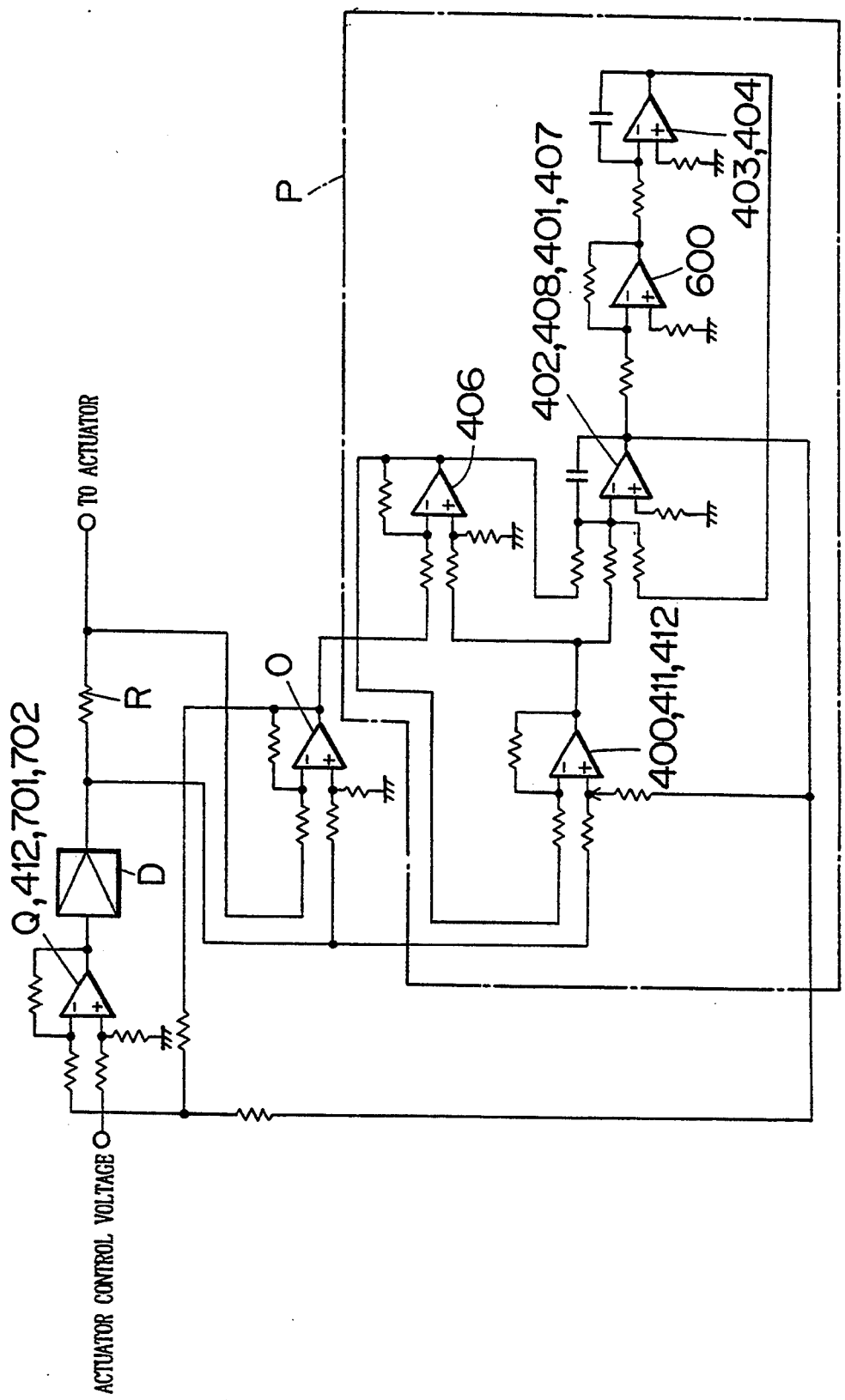
FIG. 27 is a circuitry showing an example electric circuit of the fifth embodiment having a current feedback loop added to the first embodiment.
Figure 28:
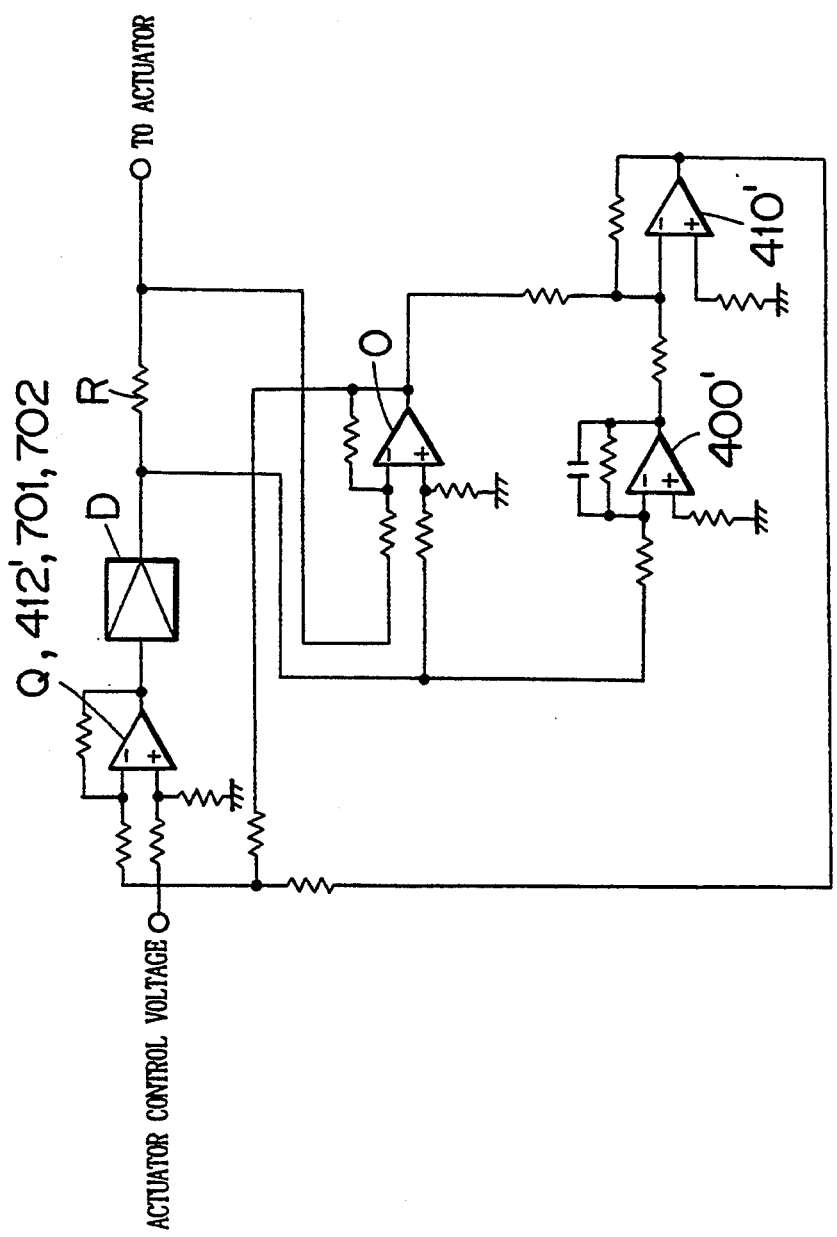
FIG. 28 is a circuitry showing an example electric circuit of the additional embodiment having a current feedback loop added to the third embodiment.
Figure 29:
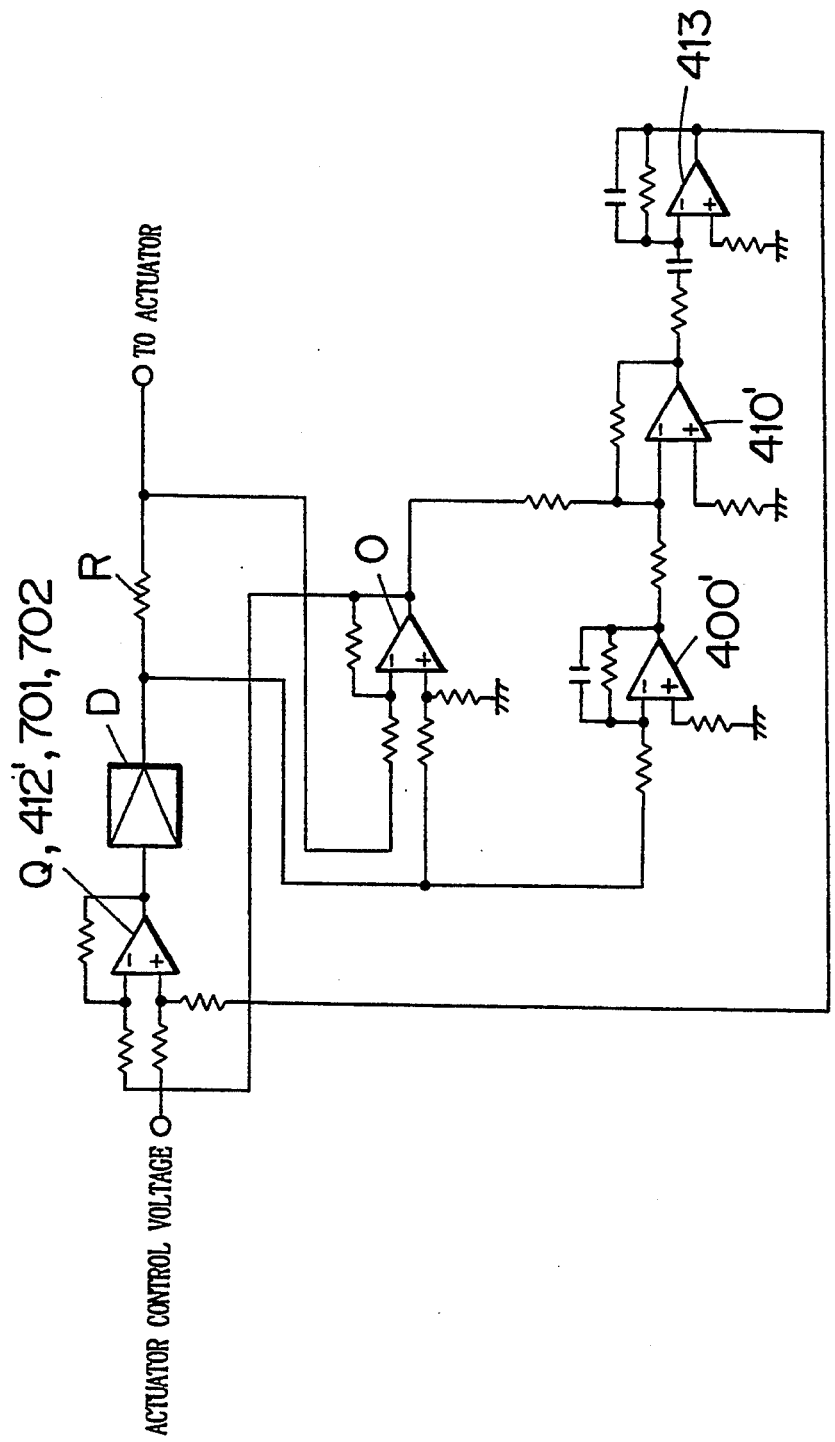
FIG. 29 is a circuitry showing an example electric circuit of the additional embodiment having a current feedback loop added to the fourth embodiment.

FIGS. 27, 28 and 29 show example analog electric circuits that realize the configurations of FIGS. 24, 25 and 26.

The operational amplifiers in these analog circuits that perform functions identical with the corresponding elements of FIGS. 24, 25 and 26 are given like reference numerals.

These circuits are shown only as examples and any other circuits may be used as long as they can realize the concept of FIGS. 24, 25 and 26. It is also possible to form the system as a digital circuit and still have a similar effect.

In the fifth embodiment described above, a method is described which compensates for degradation over time of the actuator itself due to heating by feeding back the actuator drive current including the counter electromotive force detected by the current detection resistor R.

Sixth Embodiment

In the sixth embodiment, considering the fact that the state estimator P of the first embodiment can estimate the actuator drive current not including the counter electromotive force, the feedback control loop is formed to feed back the estimated current in such a way that it will not become the control voltage command.

In this case, the current signal to be fed back does not include the counter electromotive force information, so that the feedback does not affect the damping characteristic of the solenoid-driven actuator C at all.

Figure 30:
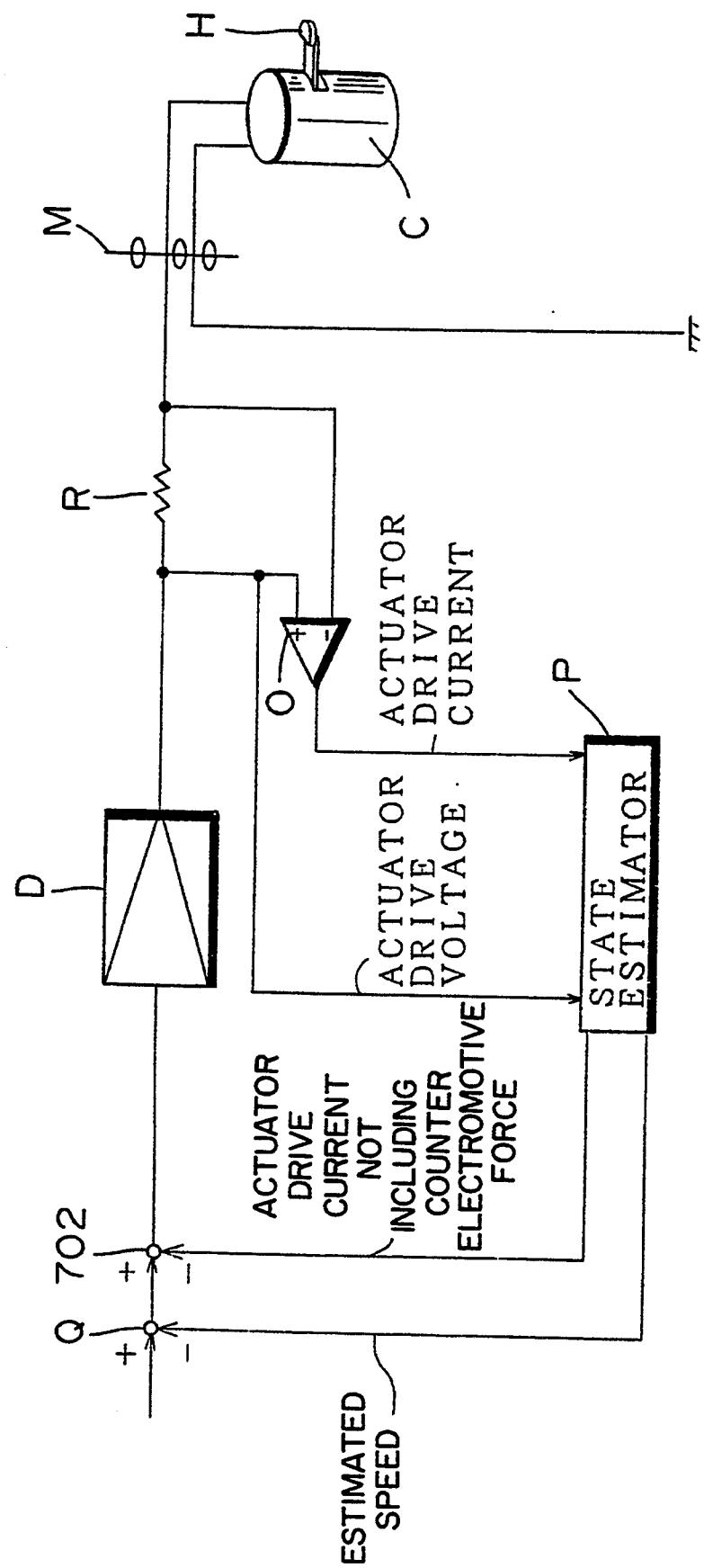
FIG. 30 is a block diagram showing the magnetic head position controller in the magnetic recording and reproducing apparatus as a sixth embodiment of the invention.

FIG. 30 shows the outline of the sixth embodiment in which the current not including the counter electromotive force from the state estimator P is fed back to the actuator control voltage that contains the damping signal.

Figure 31:
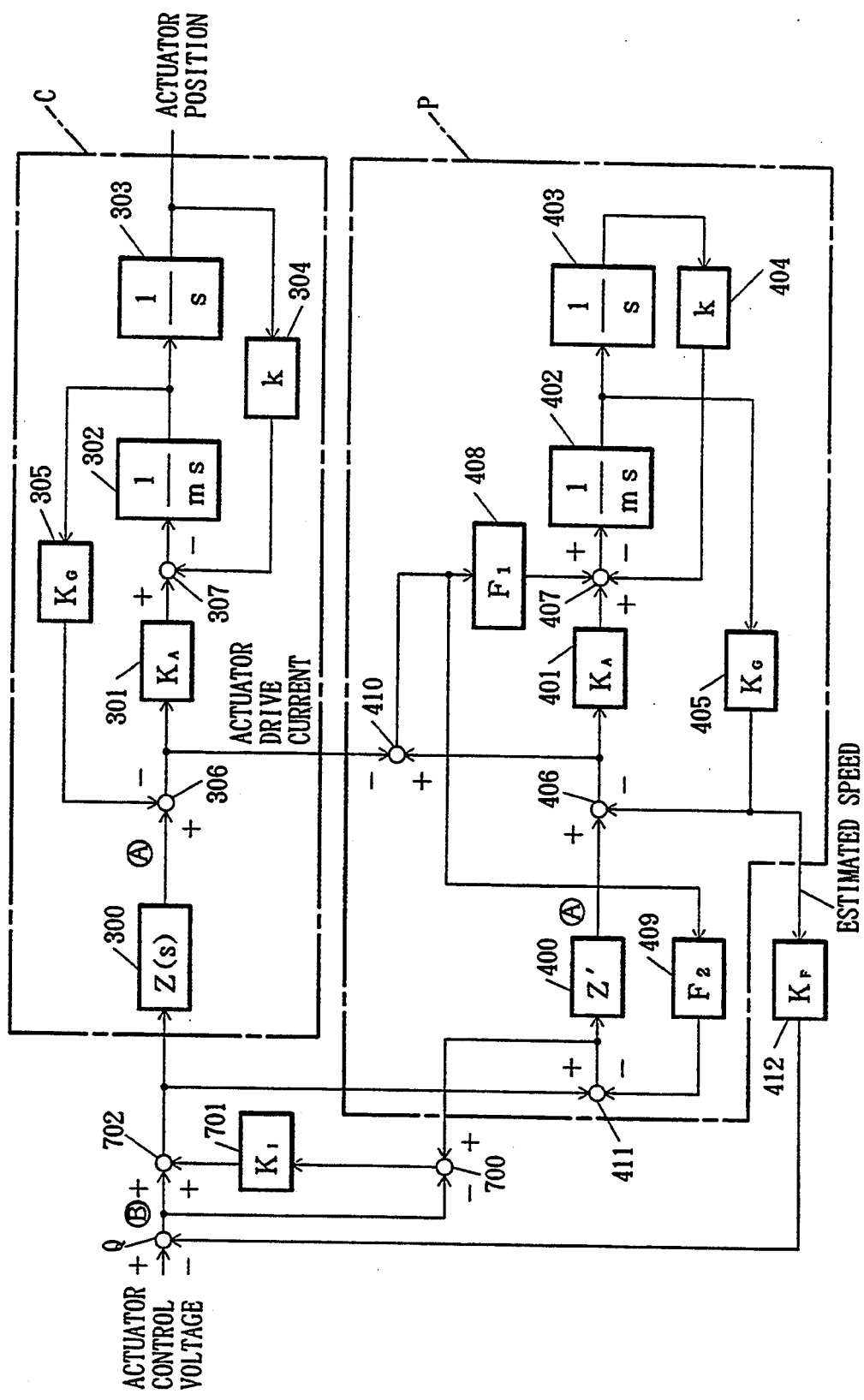
FIG. 31 is a block diagram showing the sixth embodiment by using a transfer function of the control logic.

FIG. 31 is a block diagram representing the embodiment of FIG. 30 by transfer functions of control logic. The embodiment has a configuration of the damping system of FIG. 1 added with a new current feedback loop.

An actuator drive current from the state estimator P not including the counter electromotive force is multiplied with a reciprocal of the coil impedance change to derive an actuator drive voltage of the state estimator. This actuator drive voltage is then compared with the actuator control voltage containing the damping signal by the subtractor 700 to produce an error signal.

The error signal is amplified by the gain KI of element 701 and added to the actuator control voltage containing the damping signal.

With the current loop formed as mentioned above, the actuator drive current not including the counter eletromotive force shown at A in FIG. 31 follows the actuator control voltage B mixed with the damping signal, so that the solenoid-driven actuator C becomes equivalent to the current drive, permitting the coil impedance changes to be compensated for.

Further, since the current feedback loop does not affect the damping loop at all, the damping characteristic of the solenoid-driven actuator C does not change.

Figure 32:
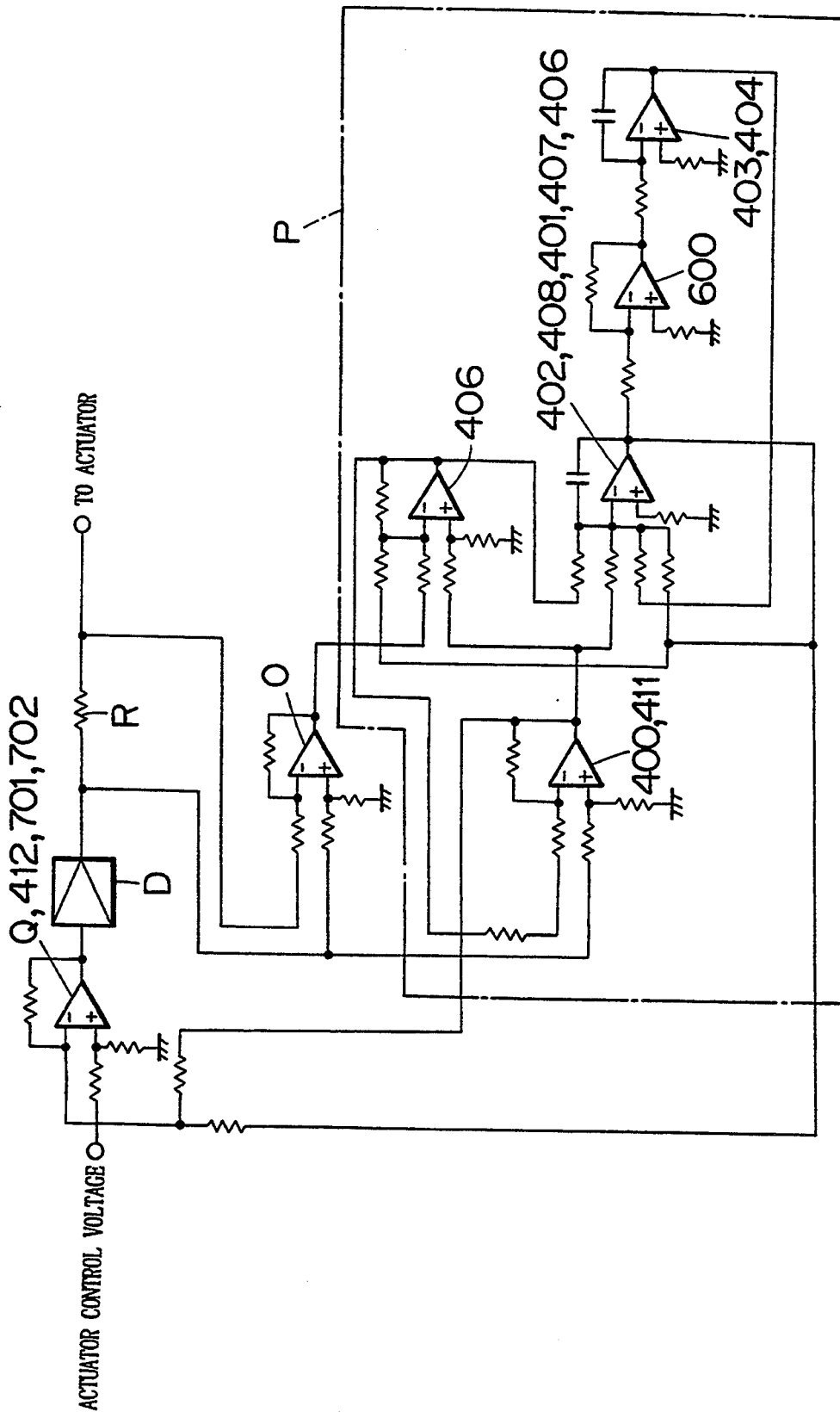
FIG. 32 is a circuitry showing an example electric circuit of the sixth embodiment.

FIG. 32 is an example electric circuit that realizes the configuration of FIG. 31. As in the case of FIG. 3, the operational amplifiers identical with the corresponding elements of FIG. 31 are assigned like reference numerals. The circuit shown in FIG. 32 is only an example and any other circuits may be used as long as they can realize the concept of FIG. 31. It is possible to form the device as a digital circuit and still have a similar effect.

Seventh Embodiment

While the actuator to be controlled in the above embodiment has a characteristic with relatively good controllability as shown in FIG. 5, this invention can also be applied to actuators with poor controllability.

Figure 33A:
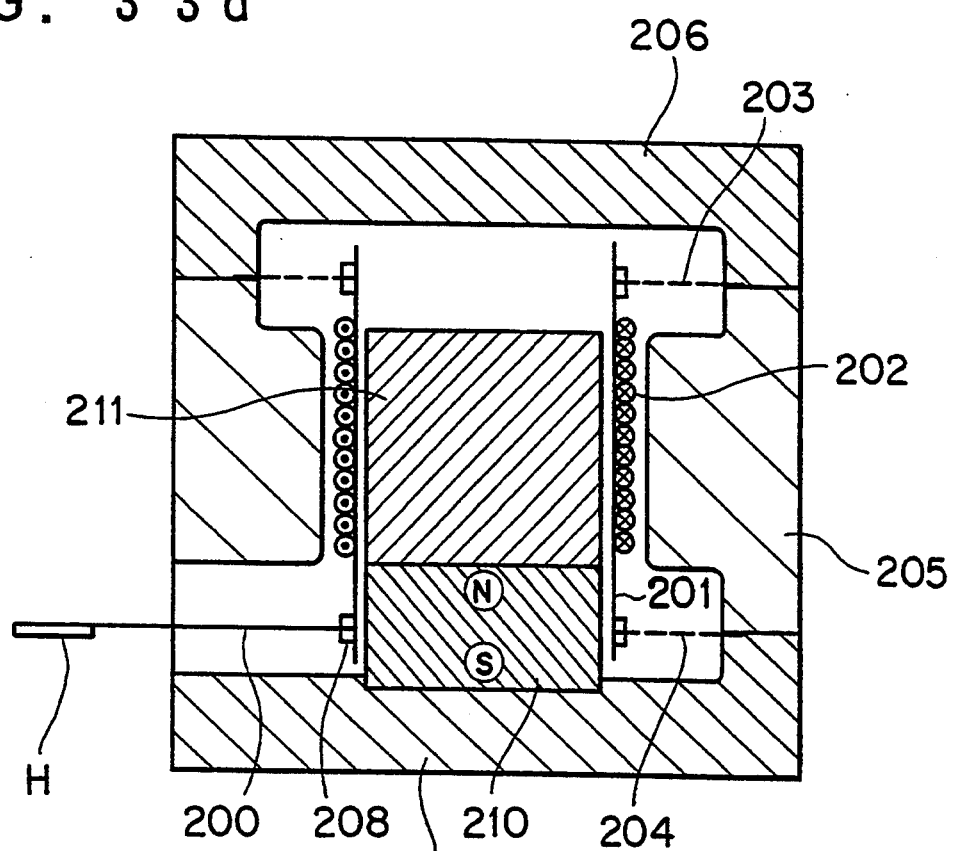
FIGS. 33(a) and 33(b) are cross sections of an example solenoid-driven actuator used in a seventh embodiment.
Figure 33B:
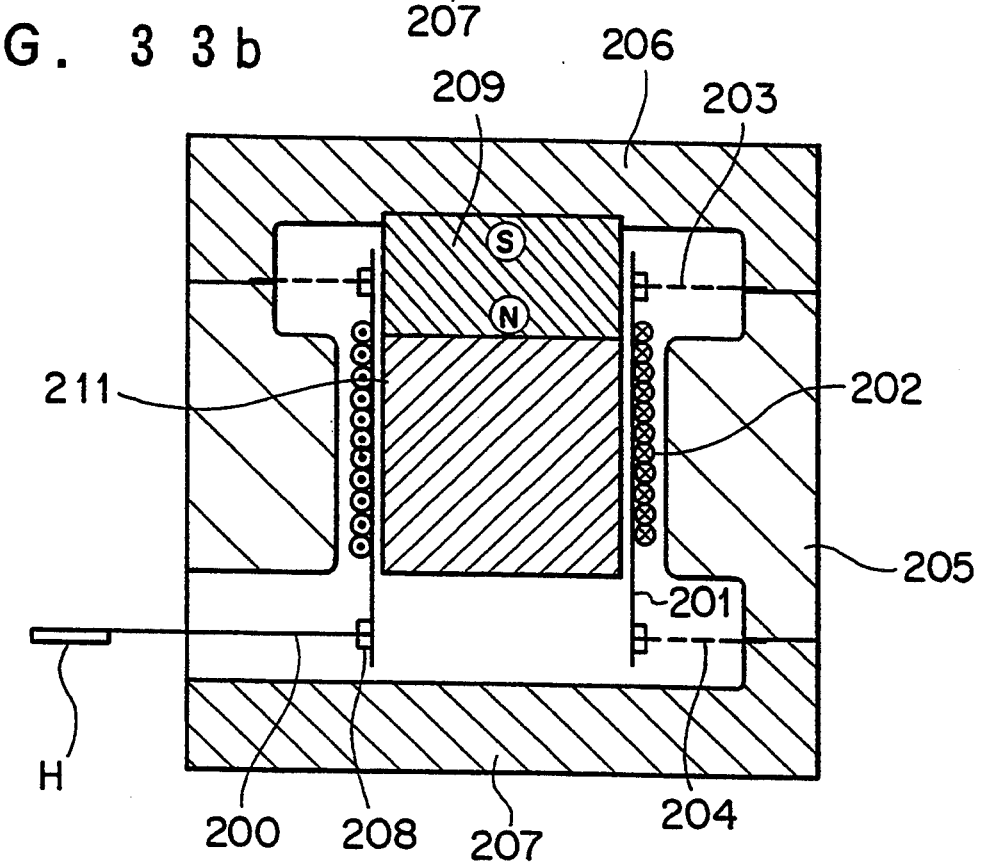

The embodiment of the invention as applied to the actuators shown in FIGS. 33(a) and 33(b) is described below. In the actuators of FIG. 33, the constitutional elements identical with those of FIG. 5 are given like reference numerals and their explanation omitted.

The actuators of FIG. 33 are similar to the actuator of FIG. 5 with the permanent magnet 209 or 210 removed. Because one of the expensive permanent magnets is eliminated and the yield has improved thanks to an improved assembly performance, the actuator can be manufactured at a substantially less cost than that for the configuration of FIG. 5.

However, since the two permanent magnets are combined into one magnet, the flux density between the center yoke 211 and the cylindrical yoke 205, i.e., the flux density threading through the drive coil becomes small, reducing the magnetic damping effect generated by the counter electromotive force. As a result, the displacement/voltage frequency characteristic of the actuator, as shown in FIG. 34(a) has a very high peak gain at the first-order resonance, deteriorating the controllability.

To effectively damp the increased resonance peak gain, it is only needed to add an electrical damping loop, which was explained in the second embodiment.

This enables a large damping that is not possible with conventional systems and thus the actuator even with bad controllability, if equipped with this system, can be used like an expensive actuator with good controllability. The method of damping the actuator according to this embodiment is similar to the one already detailed in the second embodiment and its explanation is not given here.

FIG. 35 shows another example of the solenoid-driven actuator that can be used in the same way as the above-mentioned solenoid-driven actuator.

The problem of this actuator is that when the magnetic flux density decreases and the drive coil 202 is equivalent to the conventional one, the drive force becomes smaller, deteriorating the current sensitivity. When such an actuator is to be used for a special replay operation that requires a large amplitude operation, a large current must be applied. This poses a problem of heating.

Figure 36:
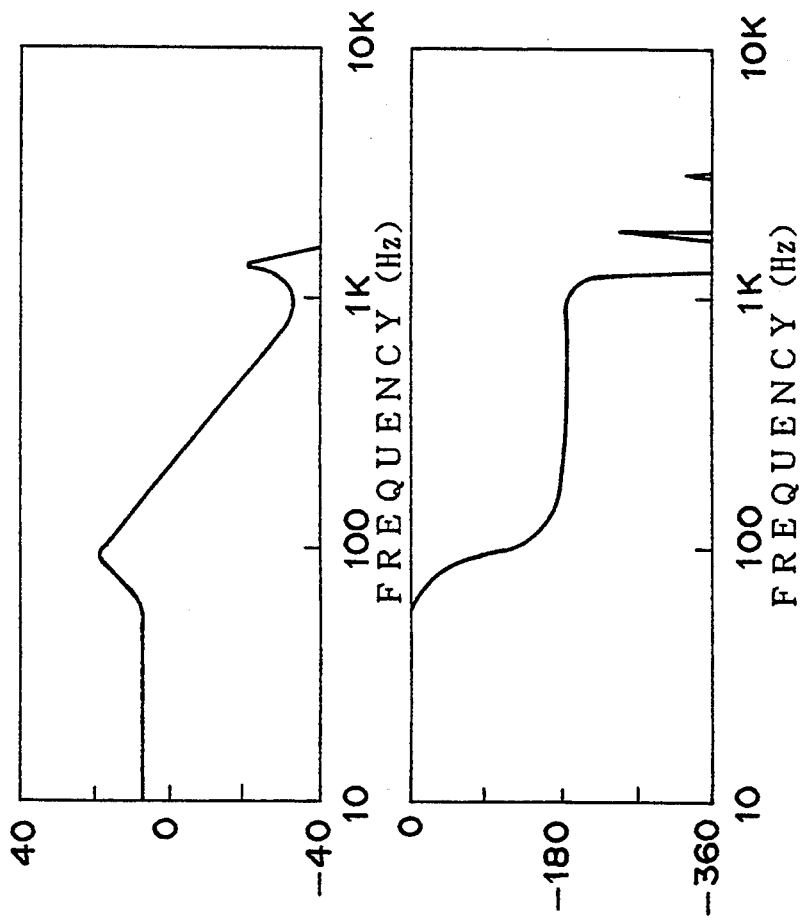
FIGS. 36(a) and 36(b) are graphs showing the "displacement/voltage" frequency characteristic of a solenoid-driven actuator with a small spring stiffness.

This problem can be solved by reducing the spring stiffness of the spring-mass system of the actuator. This ensures large amplitudes of head movement even with a small current, i.e., a small drive force. However, the reduced spring stiffness results in a lowered resonance frequency, which is determined by the spring-mass system, as shown in FIG. 36 deteriorating the response.

When the actuator is used for the tracking control during normal replay operation, the control frequency band becomes narrow as mentioned above.

In the solenoid-driven actuator, the head movement amplitude (movable range) and the response (controllable frequency range) are two conflicting requirements, which are difficult to be met at the same time with the conventional control system.

In this embodiment, the actuator position is fed back in order to electrically set the apparent resonance frequency at high value for solving this problem.

There is no need to provide a position sensor for the actuator, and the actuator can be controlled by using the estimated position, which is detected by an inexpensive externally attached electric circuit.

Figure 37:
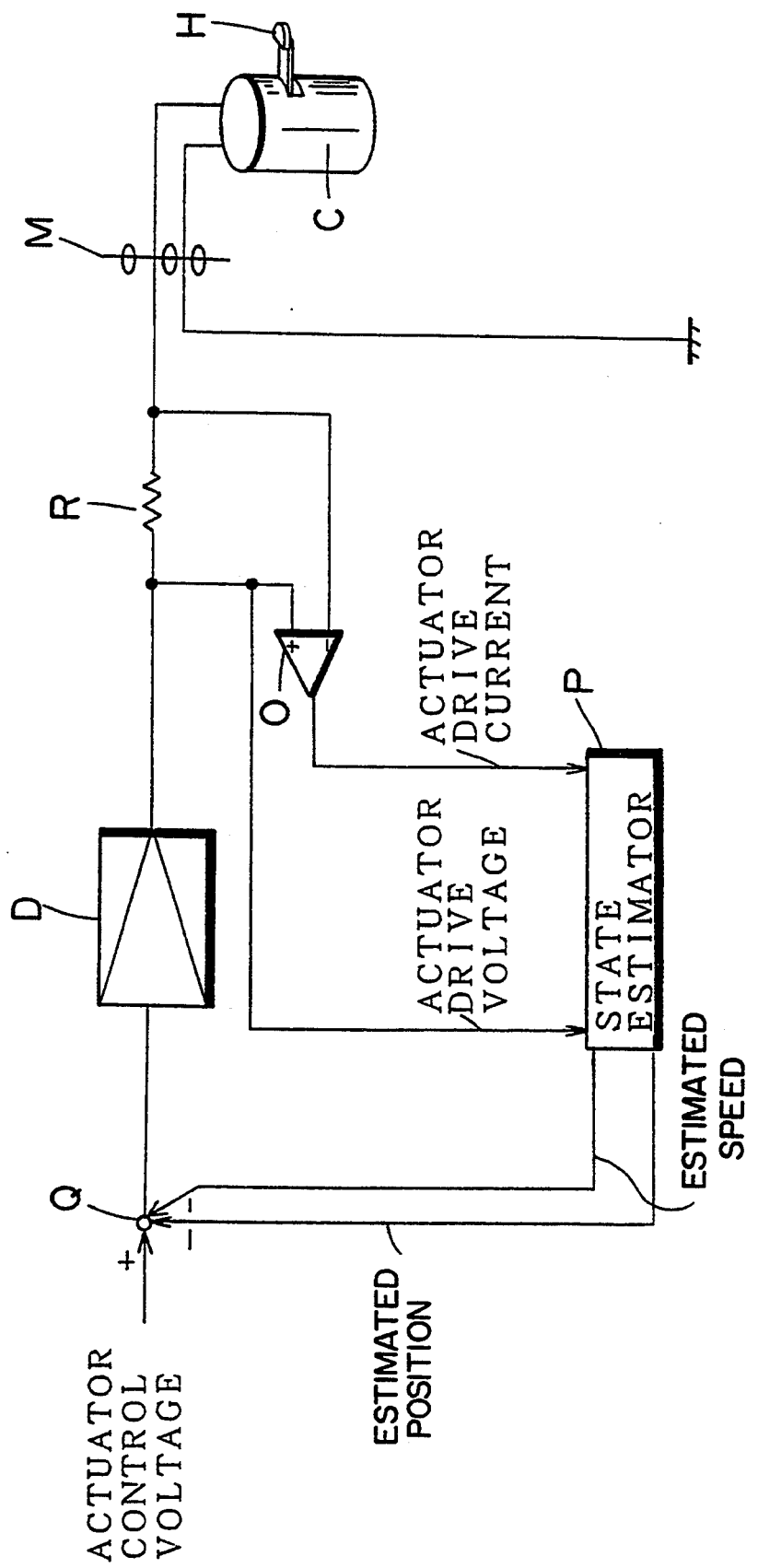
FIG. 37 is a block diagram showing the magnetic head position controller in the magnetic recording and reproducing apparatus as a seventh embodiment of the invention.

FIG. 37 is a schematic diagram showing the actuator controller of this embodiment. Designated P is a state estimator which has the same configuration of the state estimator of the second embodiment shown in FIG. 8.

The actuator controller of this embodiment feeds back the estimated position from the state estimator P to the actuator control voltage in order to set the apparent mechanical resonance frequency at a high value.

Figure 38:
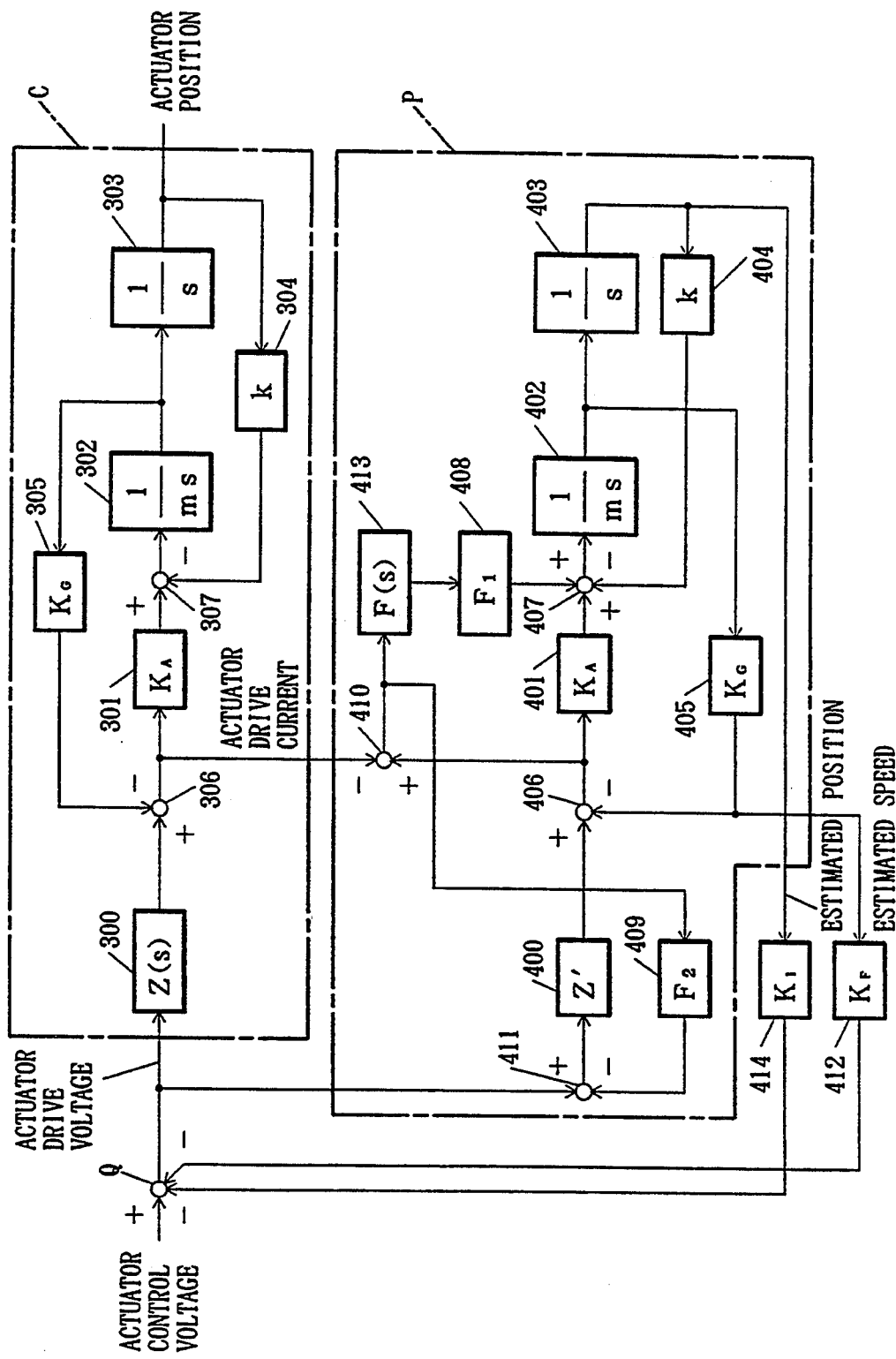
FIG. 38 is a block diagram showing the seventh embodiment by using a transfer function of the control logic.

FIG. 38 is a block diagram representing the control logic of FIG. 37 with the transfer functions.

Designated 414 is an amplifier that amplifies the estimated position from the state estimator P by the factor of KI. Denoted Q is a subtractor that takes a difference between the actuator control voltage, the signal from the estimated speed amplifier 412 explained in the second embodiment, and the signal from the amplifier 414.

Figure 39:
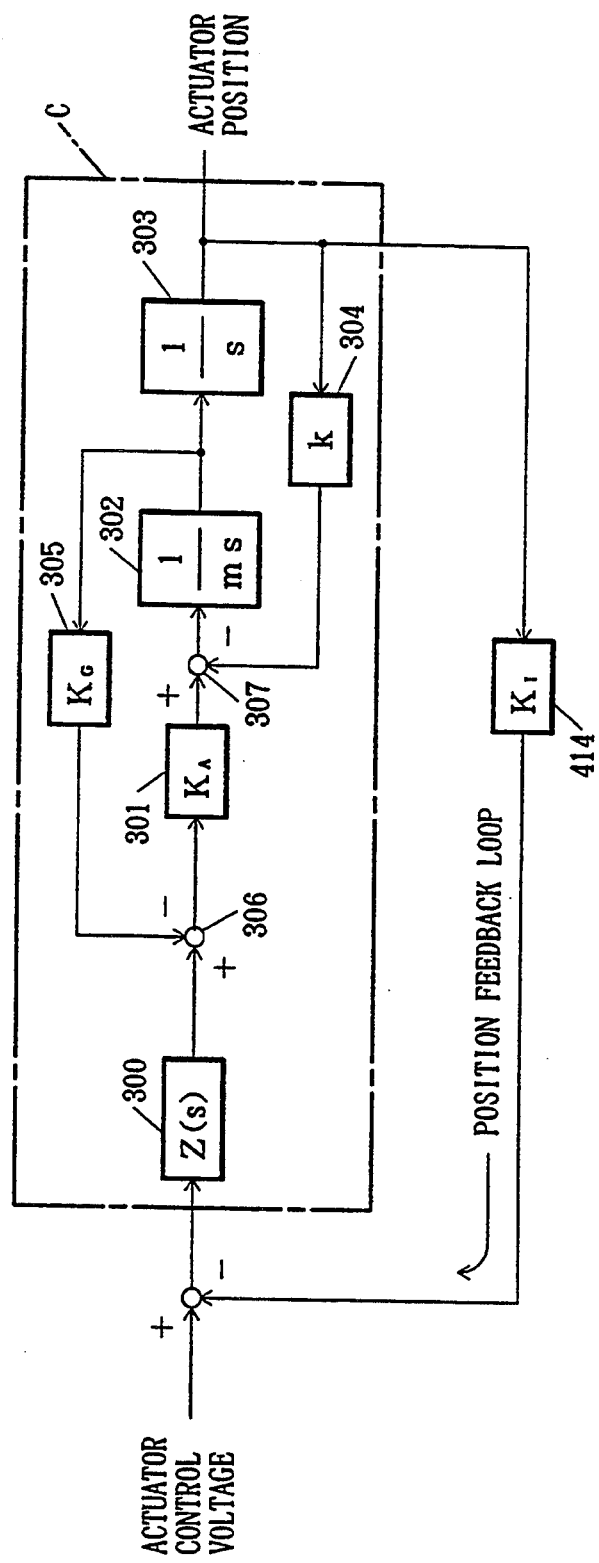
FIG. 39 is a block diagram showing by a transfer function of the control logic that the resonance frequency of the solenoid-driven actuator can be increased by feeding back the position.

Here, we well explain about the principle of setting the resonance frequency at high value by the position feedback, while referring to FIG. 39.

From FIG. 39, the actuator transfer function G(s) can be expressed as follows.

$$G(s) = Z(s) KA / (mS \cdot S + KA \cdot KG \cdot S + k)$$

Suppose that the actuator position is detected and that the transfer function when the position is fed back with a gain of KI is taken to be $G_1(s)$, then we obtain $$G_1(s) = Z(s) \cdot KA / (mS \cdot S + KA \cdot KG \cdot S + (k + Z(s) \cdot KA \cdot kI))$$

When the above two formulas are compared, it is seen that the zeroth order of term s in the denominator polynomial changes. This term represents a spring stiffness of the actuator's mechanical characteristic. Hence, it is seen from these equations that electrically feeding back the position results in an apparent increase in the spring stiffness, which is a mechanical characteristic, by (Z(s)·KA·KI).

The mechanical resonance frequency f is expressed as follows by using the mass m of the movable portion and the spring constant k.

$$f = (\tfrac{1}{2}\pi) \cdot (k/m)^{\tfrac{1}{2}}$$

Since the apparent spring constant can be set high by the position feedback, the mechanical resonance frequency can also be set high, which in turn electrically improves the mechanical response of the actuator.

FIG. 38 is a block diagram of the control system that can improve the mechanical characteristic of the actuator C by feeding back the electrical position and speed.

In FIG. 38, denoted P is a state estimator having the same configuration of the state estimator explained in the second embodiment.

As mentioned earlier, the state estimator P can estimate not only the speed but also the position, so that this embodiment has an additional loop in the control system of the second embodiment for feeding back the estimated position from the state estimator P. The detail of the damping control involving the state estimator P and the speed feedback is not given here.

As mentioned earlier, the output of the integrator 403 in the state estimator P corresponds to the position of the actuator C and can be picked up as the estimated position signal. The position feedback loop can be formed by multiplying the estimated position signal by a factor of KI by the amplifier 414 and subtracting it from the actuator control voltage by the subtractor Q.

With this position feedback, it is possible to increase the spring constant k to k+Z(s)·KA·KI. For example, FIG. 36 shows the position/voltage frequency characteristic of the actuator shown in FIG. 33.

Since the spring stiffness is reduced so that a large amplitude operation can be performed with a small drive force, the resonance frequency is small and the controllability bad.

Figure 40:
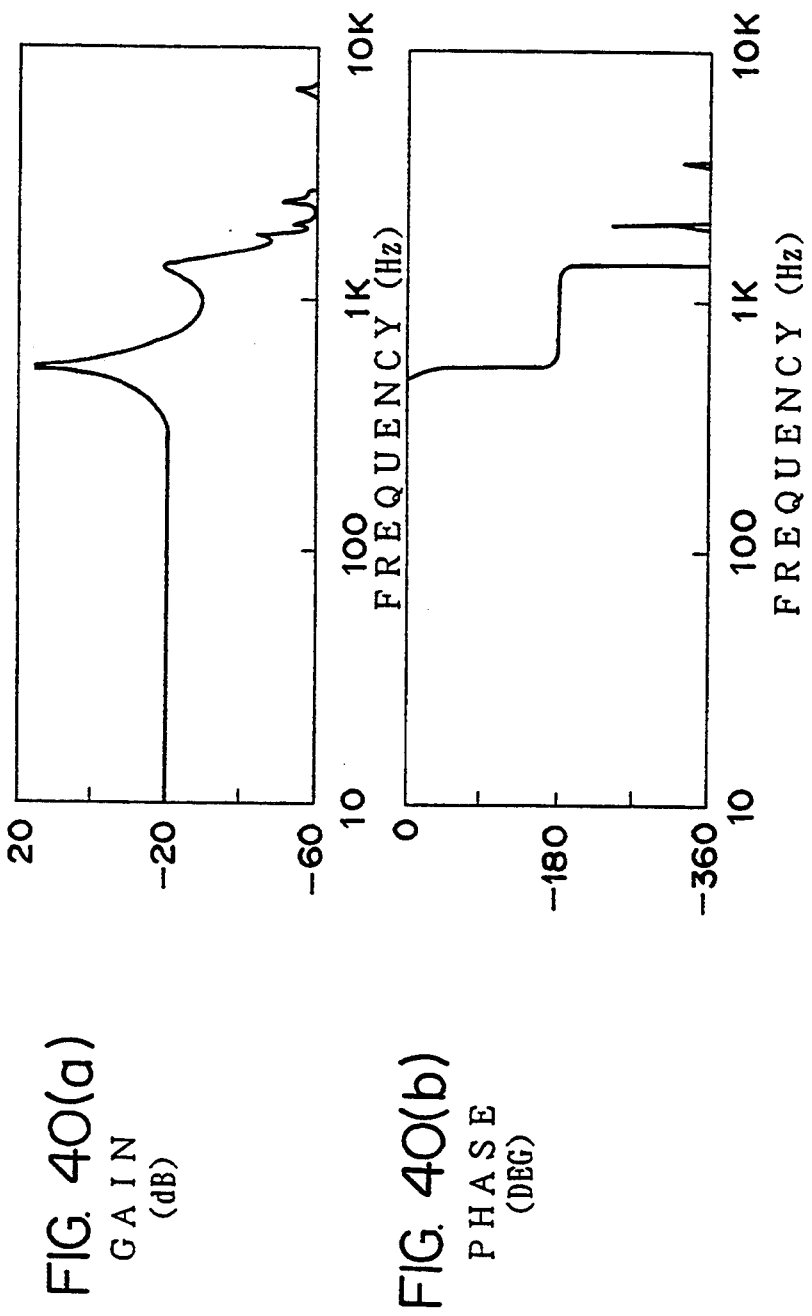
FIGS. 40(a) and 40(b) are graphs showing the "displacement/voltage" frequency characteristic of the solenoid-driven actuator when the position is fed back.
Figure 41:
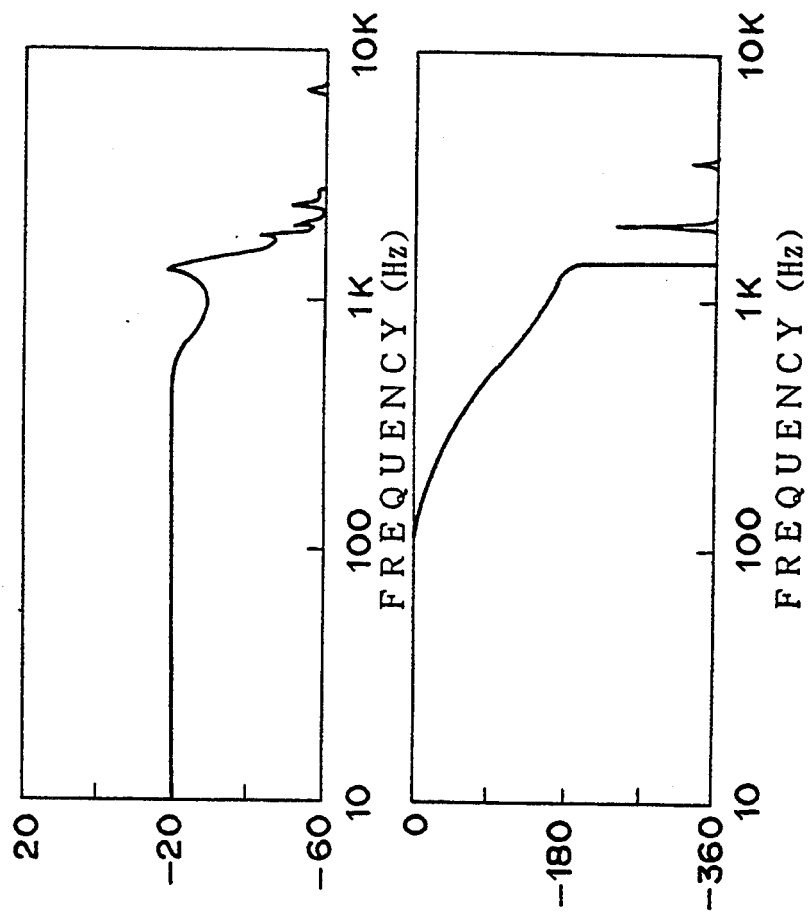
FIG. 41 is a graph showing the "displacement/voltage" frequency characteristic of the improved solenoid-driven actuator in the seventh embodiment.

When the electrical position feedback is applied to such an actuator, the resonance frequency can be set high as shown in FIG. 40. The position feedback increases only the apparent mechanical spring stiffness, so that the resonance peak gain increases making the actuator easy to be vibrated. Applying the damping of the second embodiment to the actuator improves the actuator characteristic into the one with a very good controllability.

Figure 42:
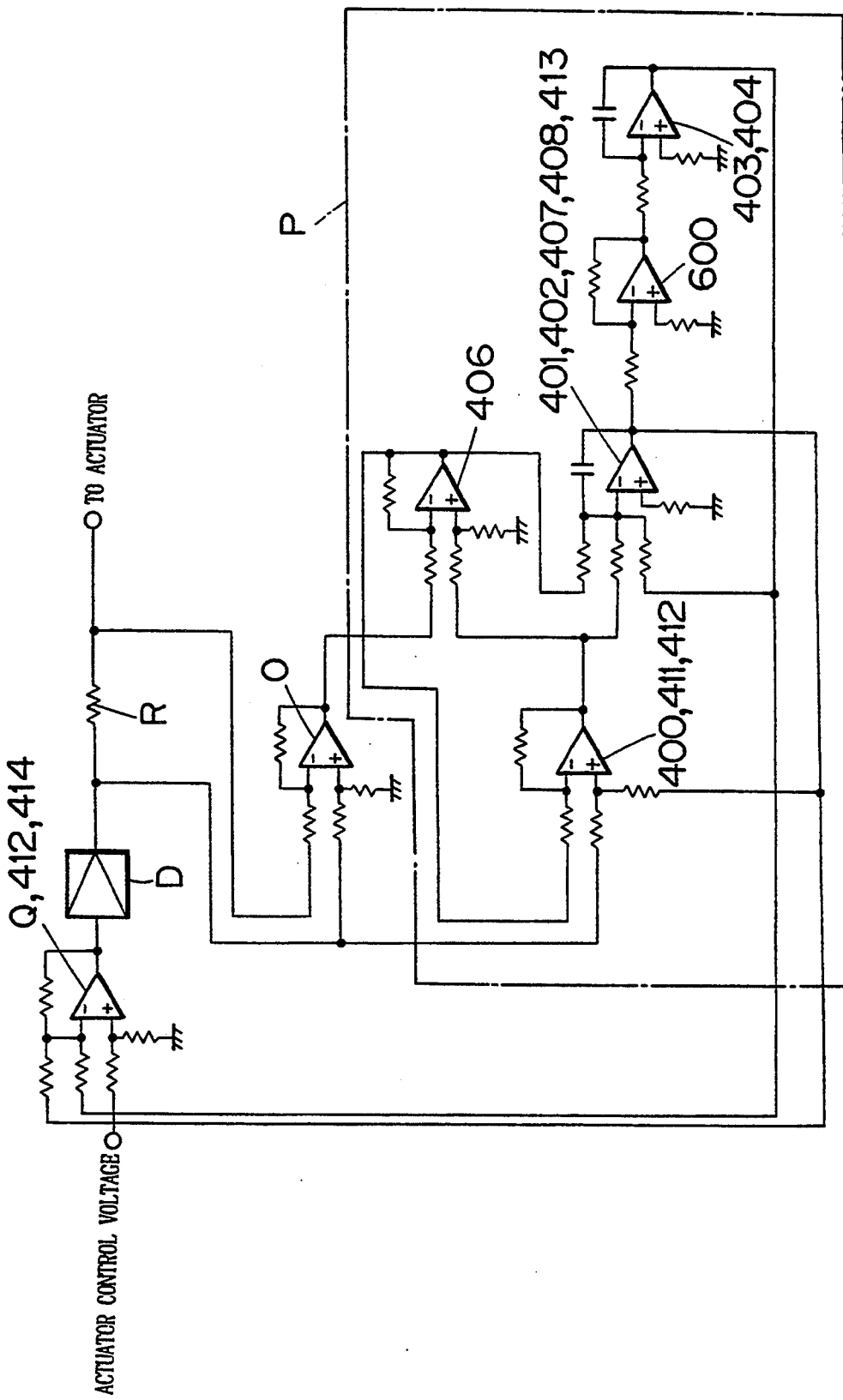
FIG. 42 is a circuitry showing an example eletric circuit of the seventh embodiment.

FIG. 42 is an example analog electric circuit using operational amplifiers that realizes the control system of FIG. 38. In the figure, circuit components identical with the corresponding elements of FIG. 38 are given like reference numerals.

This circuit is made up of simple adder, subtractor, integrator and primary filter, all formed of operational amplifiers. By selecting the resistance of each operational amplifier and the capacitances at predetermined values so that the relationship of FIG. 38 can be satisfied, appropriate setting can be done for any actuator.

The circuit shown in FIG. 42 is only one example and any other circuits may be used as long as they realize the method of FIG. 38. For example, it may be realized as a digital circuit using microprocessor and digital signal processor.

Eighth Embodiment

In the seventh embodiment, the characteristic improvement is achieved by reducing the actuator spring stiffness to increase an electrical spring stiffness for the purpose of widening the movable range and by applying an electrical damping.

The eighth embodiment is so formed as to improve the stiffness against the load disturbance of the solenoid-driven actuator, which includes the seventh embodiment.

Figure 43:
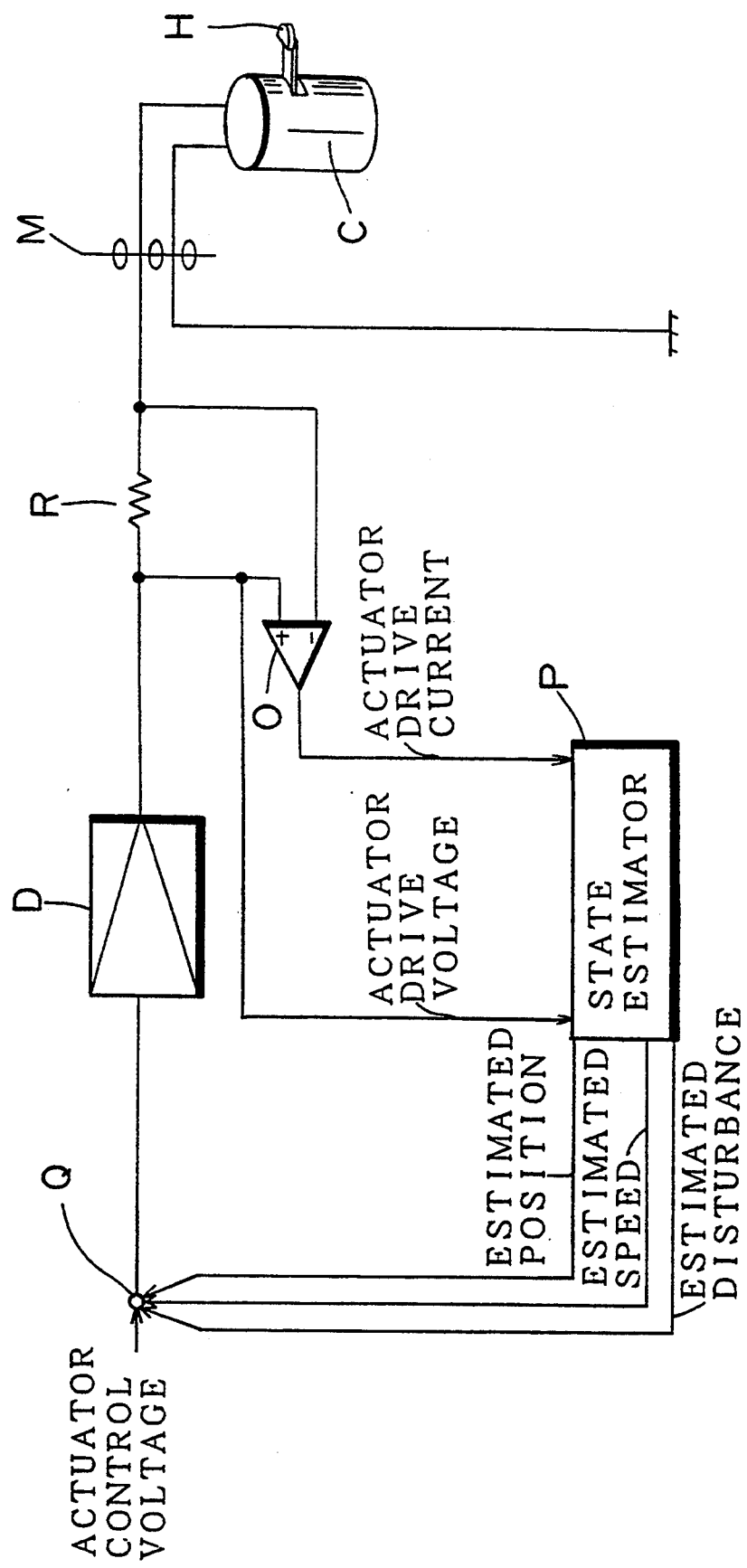
FIG. 43 is a block diagram showing the magnetic head position controller in the magnetic recording and reproducing apparatus as an eighth embodiment of the invention.

FIG. 43 shows the configuration of this embodiment, which is the seventh embodiment of FIG. 37 added with an external disturbance feedforward loop.

Figure 44:
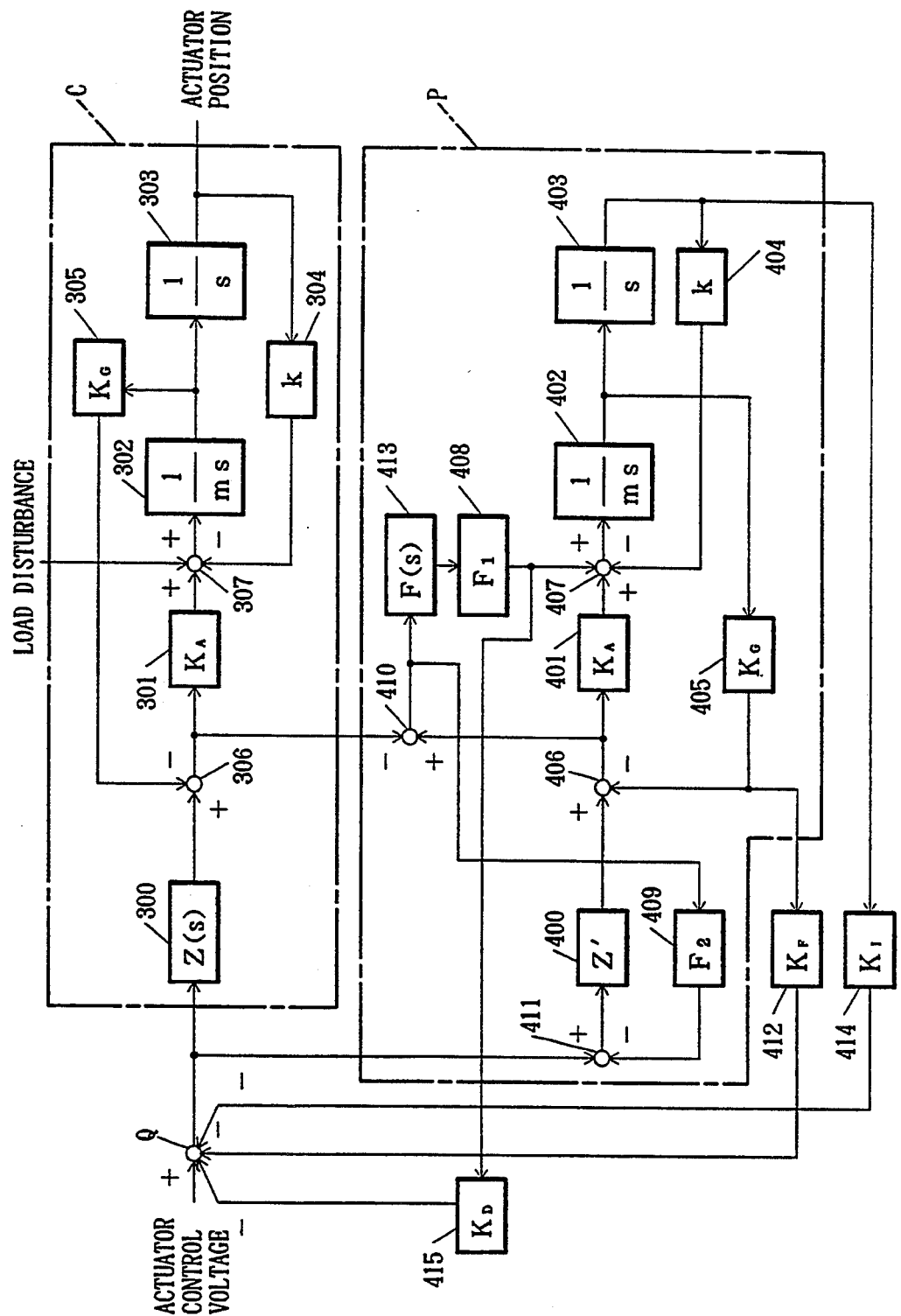
FIG. 44 is a block diagram showing the eighth embodiment by using a transfer function of the control logic.

FIG. 44 is a block diagram of control logic representing the system configuration of FIG. 43.

An element 415 is an amplifier with a gain KD. Other constitutional elements are identical with those of the previous embodiment and thus assigned same reference numerals, and their explanation is not given here.

The principle in which the state estimator P estimates the load disturbance of the actuator C is described by referring to FIG. 44.

Since the load disturbance acting on the actuator is an acceleration (or force) in terms of dimension, it corresponds to the output node of the force constant 301 in FIG. 44. In other words, the load disturbance is added to the subtraction element 307. The subtraction block 307 represents the balance between the force generated by the current flowing through the magnetic circuit, the reactionary force of the actuator spring stiffness and the force resulting from the load disturbance.

Referring to the state estimator P described in the second embodiment (FIG. 8), the subtraction element 307 in the block 2 of the actuator characteristic corresponds to the subtraction element 407 of the state estimator P, and the node corresponding to the load disturbance is the output node of the transfer coefficient $F_1$ (element 408).

That is, by realizing the state estimator P with electric circuit and deriving a signal from the location corresponding to the output node of the transfer coefficient $F_1$ (element 408), it is possible to detect the load disturbance without using a sensor.

In this embodiment, therefore, the estimated disturbance detected by the state estimator P and amplified with a gain KD by the amplifier 415 is subtracted from the actuator control voltage by the subtractor element Q, thus forming the external disturbance feedforward loop.

This loop electrically feeds forward the signal, which is in inverted phase with the load disturbance, in such a way as to cancel the load disturbance acting on the actuator C. This allows the actuator C to operate as if no load disturbance is acting on it. Since the disturbance loop is a feedforward loop, the gain KD of the amplifier 415 is selected below unity.

Figure 45:
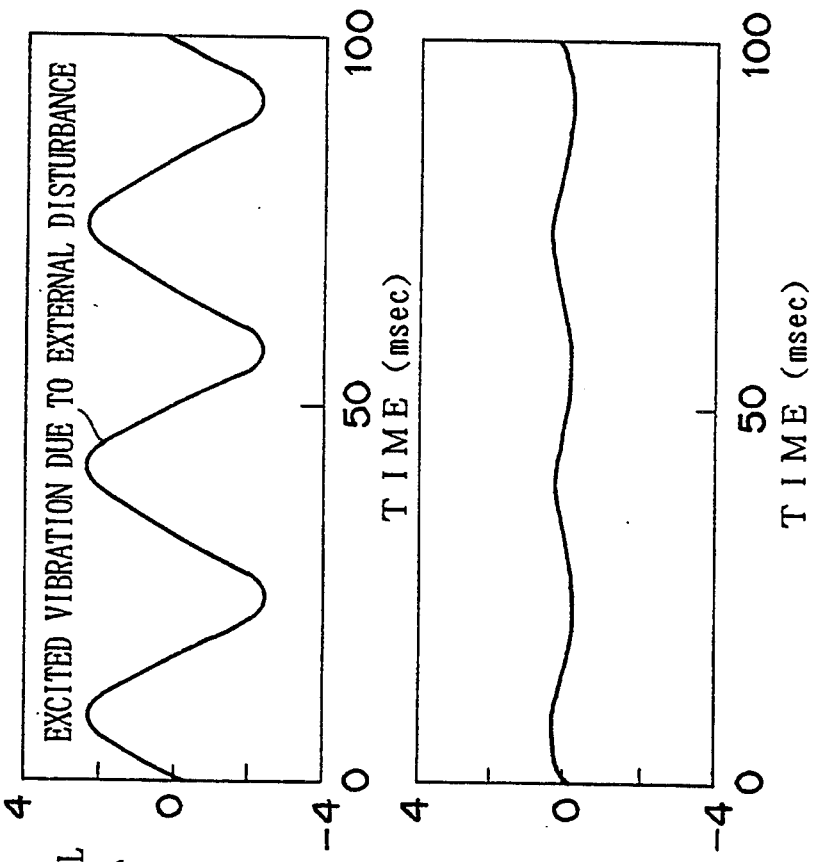
FIGS. 45(a) and 45(b) are diagram showing an external disturbance suppressing effect of the eighth embodiment.

The effect of the eighth embodiment is shown in FIG. 45. FIG. 45a shows characteristic of the actuator position change obtained when a 30 Hz periodical load disturbance force is applied to a system where the damping control explained in the second and seventh embodiment is thoroughly performed on the actuator C. FIG. 45b shows the characteristic obtained with this embodiment.

In the case of FIG. 45a where no external disturbance control is performed, the actuator C is periodically vibrating due to periodic disturbance. When the disturbance control is performed in this embodiment, the amplitude of the periodical vibration greatly decreases as shown in FIG. 45b, indicating that the stiffness against load disturbance has increased.

In this way, with the eighth embodiment, it is possible to improve the actuator characteristic from the low mechanical stiffness to the high electrical stiffness.

Figure 46:
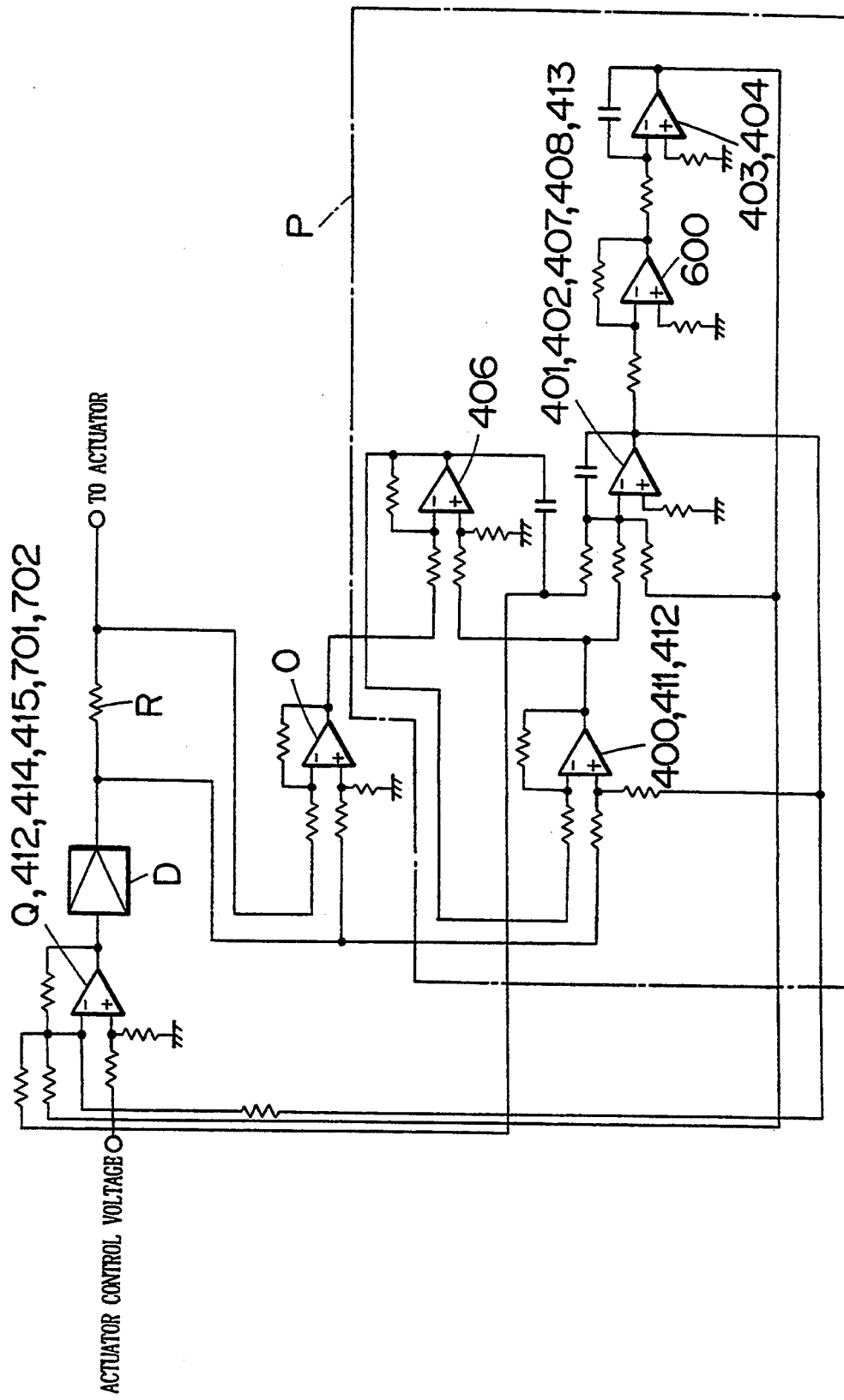
FIG. 46 is s circuitry showing an example electric circuit of the eighth embodiment.

FIG. 46 shows one example analog electric circuit using operational amplifiers that realizes the control system of FIG. 44. In the figure, circuit components identical with the corresponding elements of FIG. 44 are assigned like reference numerals.

This circuit is made up of simple adder, subtractor, integrator and primary filter, all formed of operational amplifiers. By selecting the resistance of each operational amplifier and the capacitances at predetermined values so that the relationship of FIG. 28 can be satisfied, it is possible to make appropriate setting for any actuator.

The circuit shown in FIG. 46 is only one example and any other circuits may be used as long as they realize the control system of FIG. 44. For example, it may be realized as a digital circuit using microprocessor and digital signal processor.

Ninth Embodiment

With the conventional movable head position control apparatus, when absolute height of the magnetic head from the deck base is to be controlled, there is a severe requirement on the mounting precision of the ac magnetic field generating coil.

When the movable portion stiffness of the movable head actuator is not considered, the head height is detected at only one location during one complete rotation, so that the locus of the movable head is deflected as by vibration during one rotation.

The ninth embodiment is intended to solve this problem and provide a movable head position controller, which can control and position the movable head at a specified absolute height (head height from the deck base) regardless of the mounting precision of the ac magnetic field generating coil and which can suppress the height deviation and vibration of the movable head during one rotation and form an ideal tracking locus of the movable head in the magnetic tape apparatus having various track formats.

With this embodiment, since the movable magnetic head can be used both for recording and for reproducing including a special replay operation, the number of heads mounted on the rotating drum can be reduced to lower the production cost and reduce the size of the apparatus.

First, we will described the construction of the conventional movable head.

Figure 82:
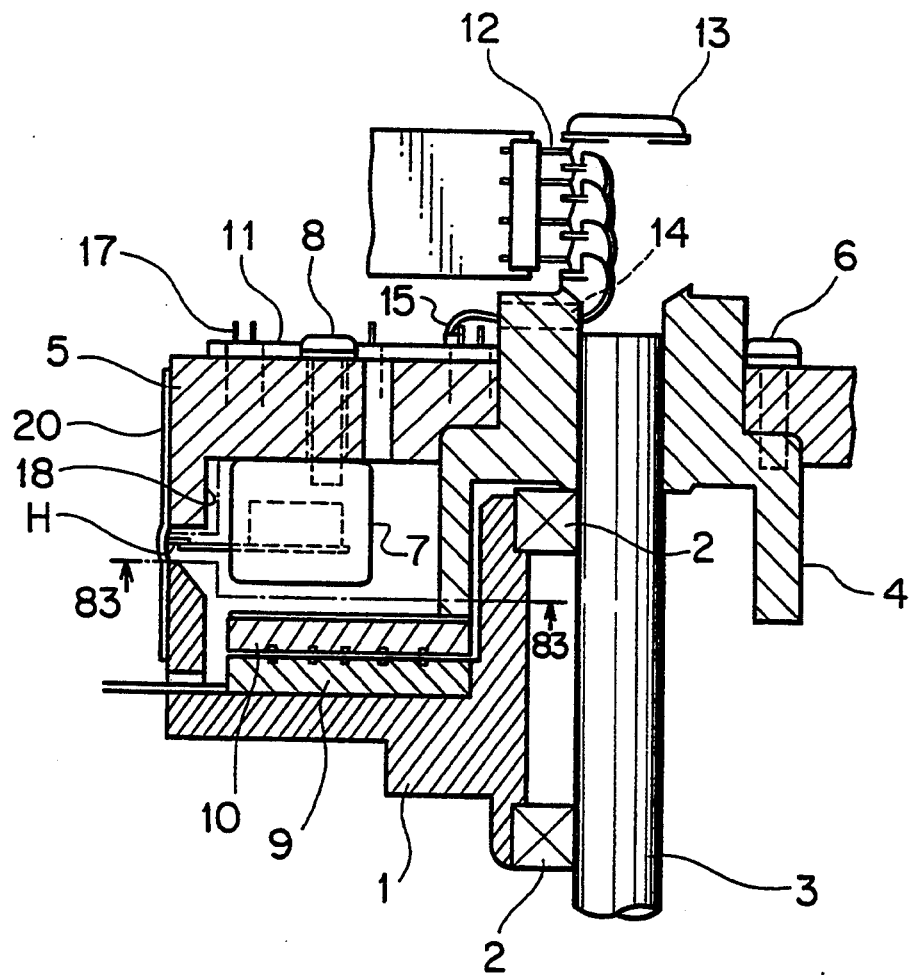
FIG. 82 is a partial cross section showing the construction of the conventional rotating drum.
Figure 83:
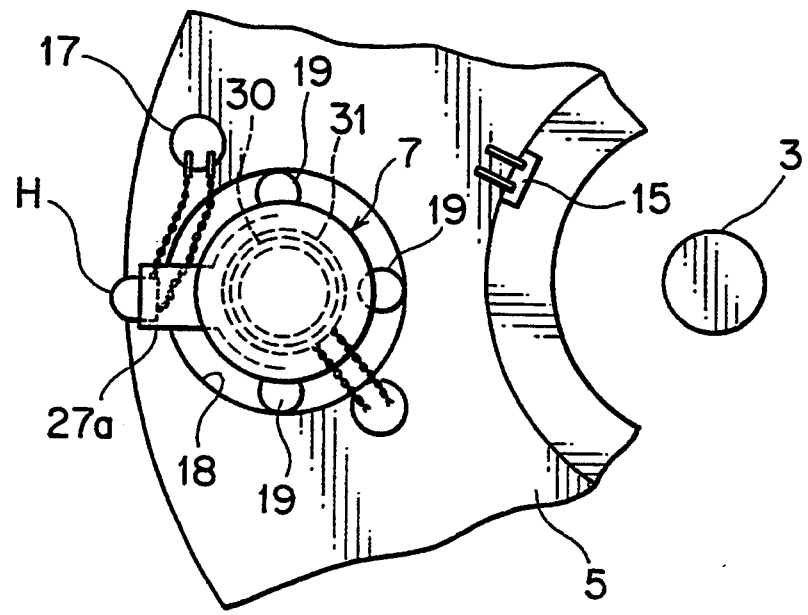
FIG. 83 is a cross section of the rotating drum taken along the line 83—83 of FIG. 82.

FIG. 82 is a cross section showing an essential portion of the conventional magnetic recording and reproducing apparatus. FIG. 83 is a cross section taken along the line 83—83 in FIG. 82 with the mounting base removed.

In the figure, designated 1 is a stationary drum; 2 a bearing mounted on the stationary drum; 3 a rotating shaft rotatably supported on the bearing 2; 4 a mounting base secured to one end of the rotating shaft 3; 5 a rotating drum mounted on the mounting base 4 by screw 6; 7 an actuator mounted to the rotating drum 5 by screw 8; 9 a lower transformer mounted to the stationary drum 1; 10 an upper transformer mounted to the mounting base 4; 11 a wiring board attached to the rotating drum 5; 12 a contact that does not rotate for supplying control current to the actuator 7; 13 a rotary electrode provided to a part of the mounting base 4 so that it is in sliding contact with the contact 12; 14 a connection for providing an electrical connection from the electrode 13 to the actuator 7 through connection 15 and wiring board 11; and H a magnetic head (referred to as movable head) mounted to the actuator 7 which electrically connects to the actuator control unit through connection 17, wiring board 11 and connections 15.

Designated 18 is a recess formed in one part of the rotating drum 5 to accommodate the actuator 7. The recess 18 is formed larger than the actuator 7 to allow the position adjustment of the movable head H. Denoted 19 is a plurality of position adjust holes for adjusting the position of the movable head H; and 20 a magnetic tape that travels wound around the outer circumferential surface of the stationary drum 1 and the rotating drum 5 and is in sliding contact with the movable head.

Figure 84:
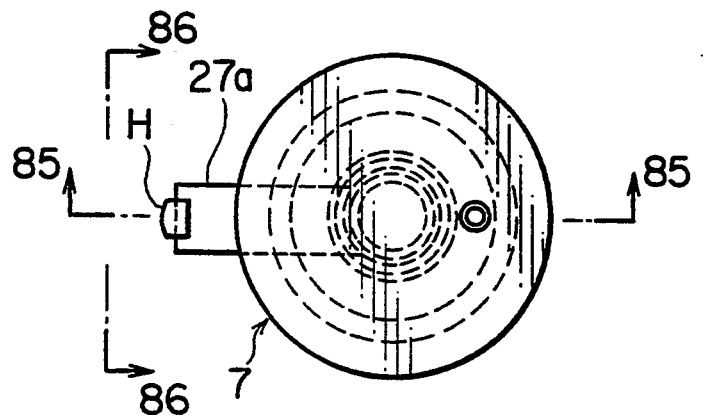
FIG. 84 is a bottom view of the actuator in FIG. 83.
Figure 85:
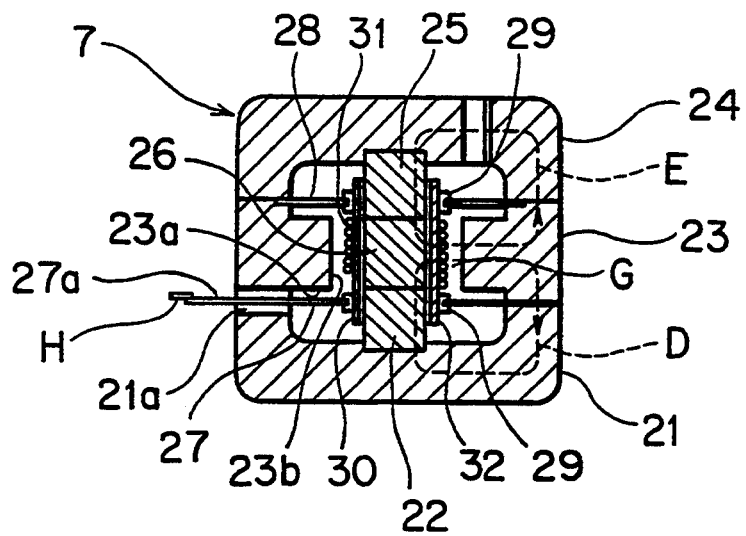
FIG. 85 is a cross section of the actuator taken along the line 85—85 in FIG. 84.
Figure 86:
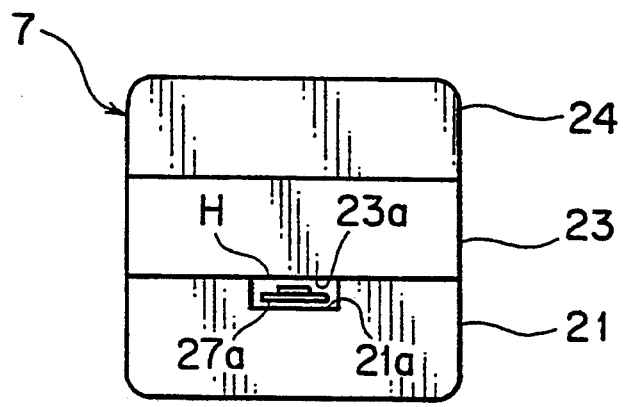
FIG. 86 is a side view taken along the line 86—86 of FIG. 84.

FIG. 84 is a plan view of the actuator 7; FIG. 85 is a cross section taken along the line 85—85 in FIG. 84; and FIG. 86 is a side view as seen from arrow 86—86. Denoted 21 is a first yoke; 22 a first cylindrical permanent magnet fixed to the first yoke 21; 23 a second yoke made of magnetic material which is mounted to the first yoke 21 and has a projected portion 23b at one part of the inner surface thereof; 24 a third yoke made of magnetic material which is mounted to the second yoke 23; 25 a second cylindrical permanent magnet secured to the third yoke 24 with a pole opposed to the same pole of the first permanent magnet 22; 26 a pole piece made of magnetic material which is installed between the second permanent magnet 25 and the first permanent magnet 22 and which is fixed to either magnet; and 27 a thin leaf spring made of nonmagnetic material which is held at its periphery by the first yoke 21 and the second yoke 23 and which has an extended portion 27a that extends outwardly through windows 21a, 23a in the first yoke 21 and the second yoke 23 with the movable head H mounted at the end.

A thin leaf spring 28 is made of nonmagnetic material and is held by the second yoke 23 and the third yoke 24. Denoted 29 is a fixing member held by the leaf spring 27, 28. Designated 30 is a bobbin which is bonded by a bonding agent 32 to the fixing member 29 at a position where there is a gap between its inner circumference and the outer circumference of the first permanent magnet 22, second permanent magnet 25 and pole piece 26. A coil 31 of a covered wire wound around the bobbin 30 is held in an annular gap G formed between the bobbin 30 and the projected portion 23b of the second yoke 23.

Figure 87:
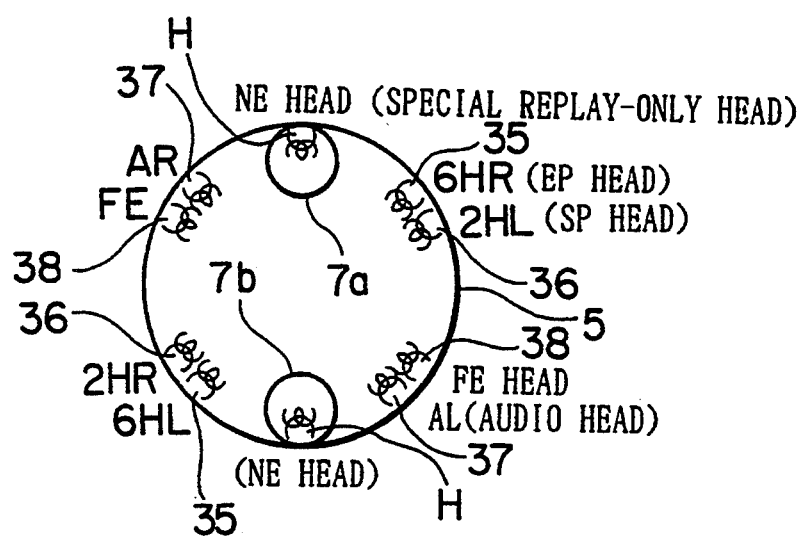
FIG. 87 is a diagram showing the arrangement of a plurality of heads incorporated in the conventional rotating drum.

FIG. 87 shows the magnetic head mounted on the rotating drum 5 in the magnetic tape apparatus based on the current VHS format. The movable head H is used as one of the paired magnetic heads dedicated for a special replay mode which includes such operations as fast replay and slow replay of the recorded video information.

Designated 35 are paired EP heads for long-hour mode with narrow track width to record long hours of video information on the video tape. Reference numeral 36 represents paired SP video heads having a wide track width for recording normal video information. Denoted 37 are paired audio heads for recording and reproducing audio information. Denoted 38 is a flying erase (FE) head to erase recording tracks one at a time during the tape-connected recording.

Figure 88:
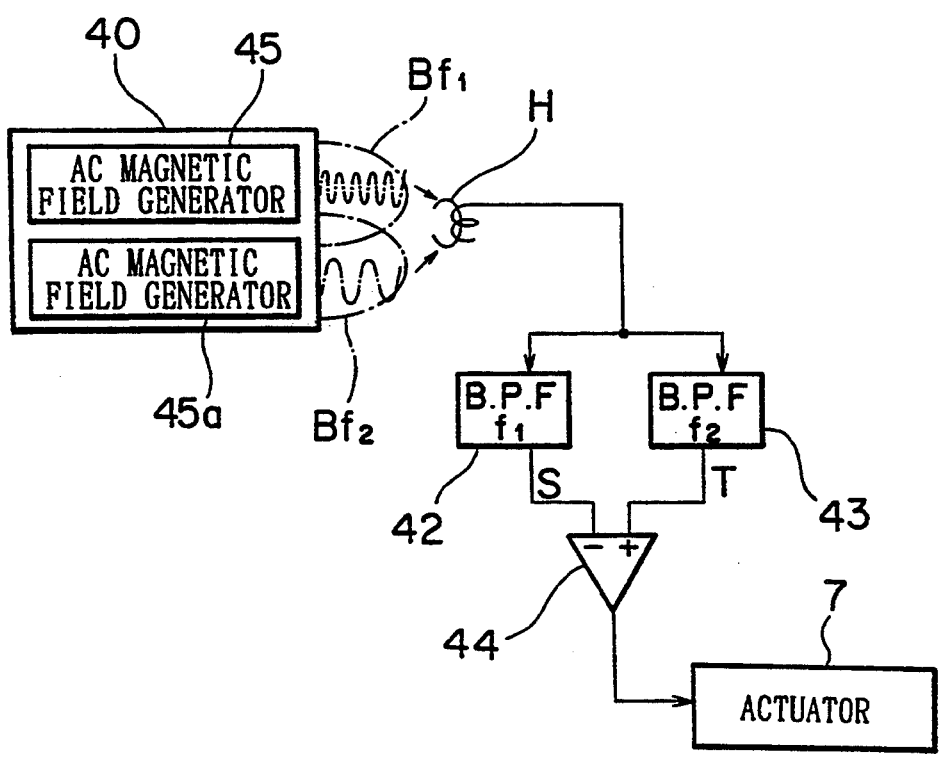
FIG. 88 is a conceptual diagram showing a first example of the conventional magnetic head position controller using the ac magnetic field generator.
Figure 89:
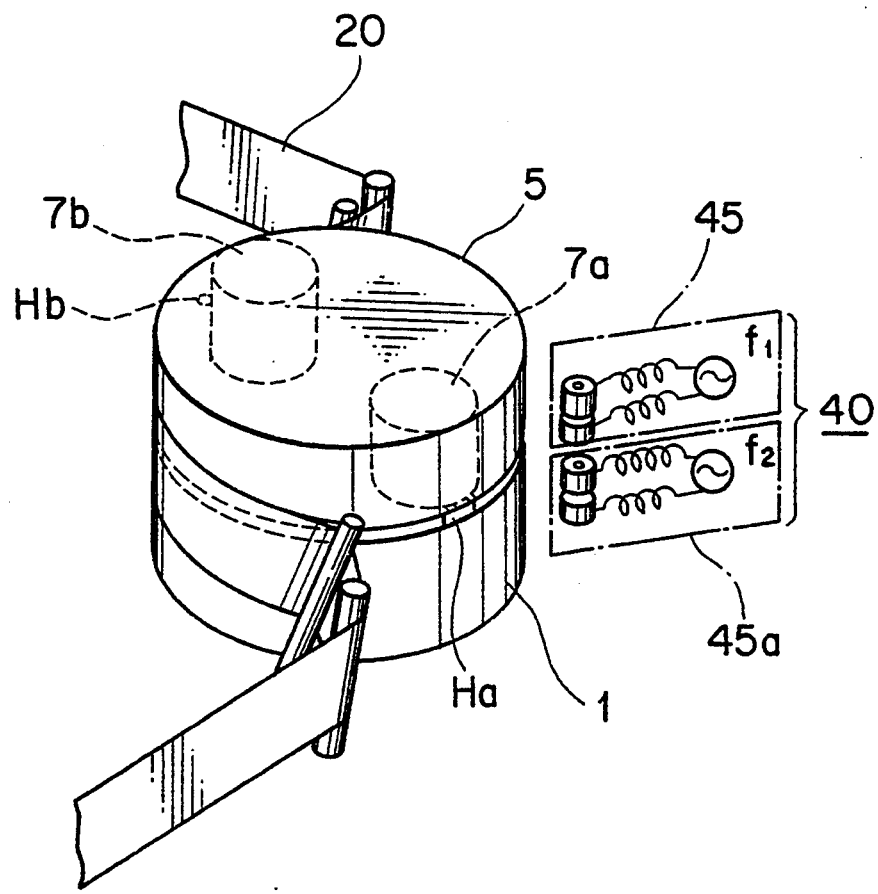
FIG. 89 is a perspective view showing the relationship between the conventional ac magnetic field generator and the rotating drum.

FIG. 88 is a block diagram of the first conventional control system. FIG. 89 is a perspective view showing the arrangement of the conventional magnetic field generating device.

In the figure, reference numeral 40 indicates an ac magnetic field generating device which applies two magnetic fields $Bf_1$, $Bf_2$ with different frequencies to the movable head H. The ac magnetic field generating device 40 is located near the outer circumference of the rotating drum 5 and the stationary drum 1 on the side where the magnetic tape 20 is not wound. The position of the field generating device is adjustable.

The ac magnetic field generating device 40 has two ac magnetic field generating coils 45, 45a arranged in the direction of axis of the rotating drum 5 to generate two magnetic fields $Bf_1$, $Bf_2$ with different frequencies $f_1$, $f_2$.

Designated 42 is a band-pass filter that passes the component of $f_1$, 43 a band-pass filter that passes the component of $f_2$, and 44 a different amplifier.

The movable head H detects the magnetic fields $Bf_1$, $Bf_2$ produced by the ac magnetic field generating coils 45, 45a as it passes near the ac magnetic field generating device 40 and outputs detection signals proportional to the strengths of the fields.

The band-pass filter 42 passes a signal component S of frequency $f_1$ and the band-pass filter 43 passes a signal component T of frequency $f_2$.

Figure 90:
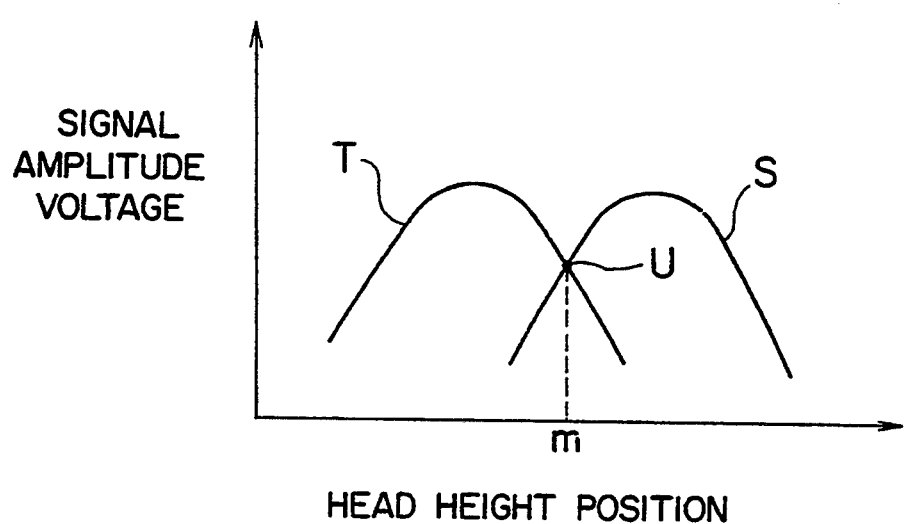
FIG. 90 is a diagram showing the relationship between the head height position and the amplitude of the detected ac signal in the conventional example.

The levels of the two signal components S, T, as shown in FIG. 90, changes as the movable head H is moved in the direction of axis of the rotating drum 5, i.e., according to changes in the height of the movable head H.

Let m stand for the height position of the movable head H where the two signal components S, T have the same level.

In FIG. 88, a substractor 44 takes a difference between the two signal components S, T and feeds back the difference signal to the actuator C to move the movable head H in a direction that makes the difference zero.

That is, in FIG. 90, the movabe head H is moved so that two signal components S and T are at the same level, i.e., the height of the movable head H is m.

Changing the positions of the ac magnetic field generating coil 45 45a allows the position of the intersection U between the two signal components S and T to be changed. This in turn makes it possible to change the height position m of the movable head H and therefore freely set the reference position of the movable head H.

In the above conventional example the description concerns the case of one movable head. In the apparatus equipped with multiple movable heads Ha, Hb, the similar control is performed to each head to eliminate any height difference between channels when the movable heads are recording.

Figure 91A:
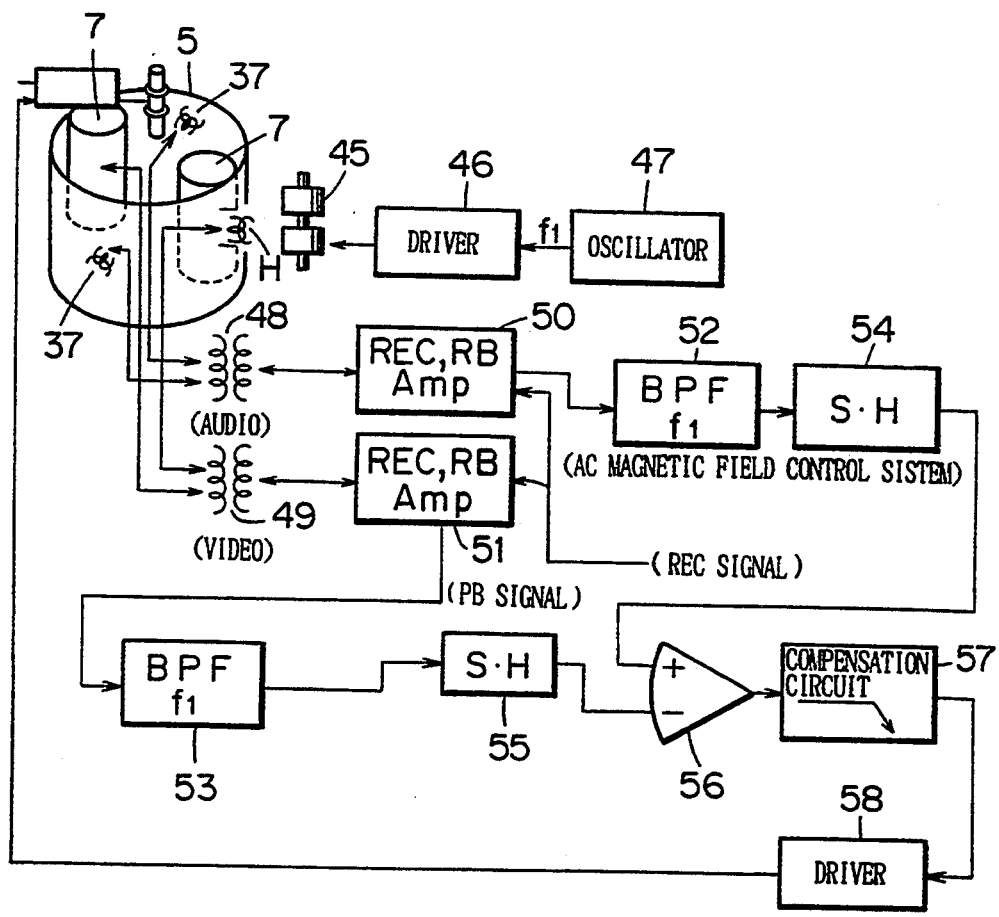
FIG. 91a is a conceptual diagram showing a second example of the conventional magnetic head position controller using the ac magnetic field generator and FIG. 91(b) is an explanatory graph.

FIG. 91(a) is a second conventional circuit block diagram. Reference numeral 46 represents a driver for supplying current to an oscilation coil 45. Designated 47 is an oscillation circuit to generate an ac voltage.

Denoted 48, 49 are rotary transformers to transfer signals to and from the magnetic head in the rotating drum; 50, 51 recording and reproducing amplifiers to amplify the signals from the audio head and video head and supply recording current; 52 a band-pass filter that passes only the signal which is reproduced from the audio head 37 fixed in the rotating drum 5 through the electromagnetic induction by the oscillation coil 45; 53 a bandpass filter that passes only the signal reproduced from the movable head H through electromagnetic induction by the oscillation coil 45; 54 a sample hold circuit which holds an amplified value from the audio head 37 which is reproduced in every other rotation of the rotating drum 51 through electromagnetic induction by the oscillating coil 45; 55 a sample hold circuit which holds an amplified value from the movable head H which is reproduced in every other rotation of the rotating drum 51 through electromagnetic induction by the oscillating coil 45; 56 a differential amplifier to take a difference between the sample hold circuits 54 and 55; 57 a servo compensation circuit made up of a low-pass filter that assures stability in the position fixing control loop; and 58 a driver to supply a drive current to the actuator 7.

Figure 92:
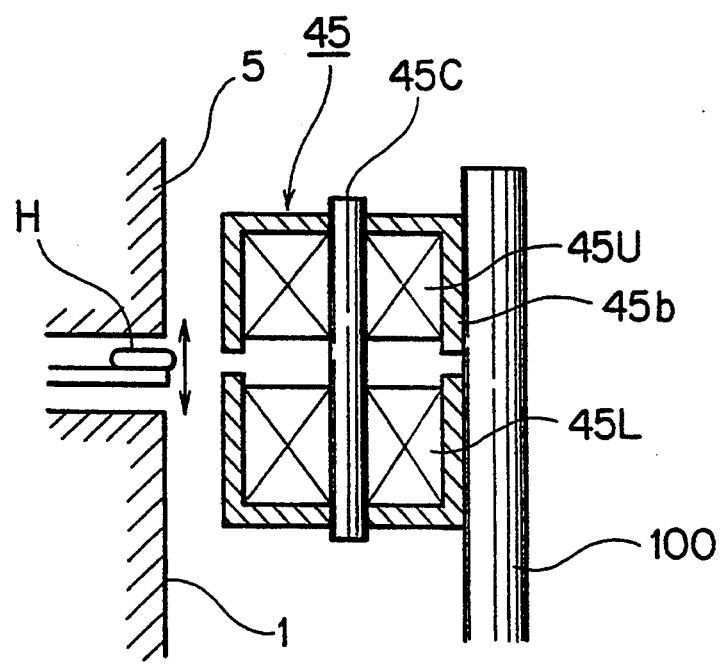
FIG. 92 is a diagram showing an example of the ac magnetic field generator.
Figure 93:
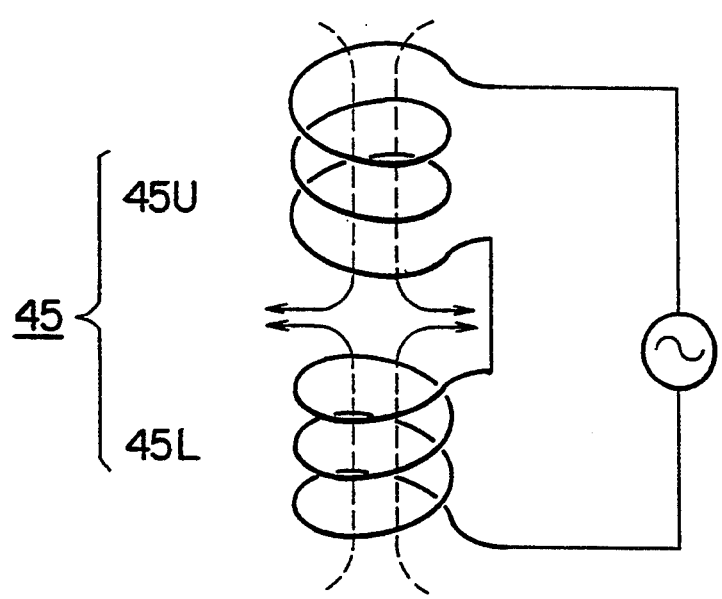
FIG. 93 is a diagram showing the magnetic flux distribution of the ac magnetic field generator of FIG. 92.

FIG. 92 is a cross section of the ac magnetic field generating coil 45. Denoted 45c is a core for concentrating the coil magnetic flux; 45U a coil for generating the ac magnetic flux in the core 45c by passing ac current in the coil; 45L a coil for generating a magnetic field whose direction is opposite to that of the coil 45U; 45b a coil holder for accomodating the coils 45U and 45L; and 100 a mounting member on which the ac magnetic field generating coil 45 is fixed. FIG. 93 shows the direction of flux generated by the ac magnetic field generating coil 45.

Figure 94:
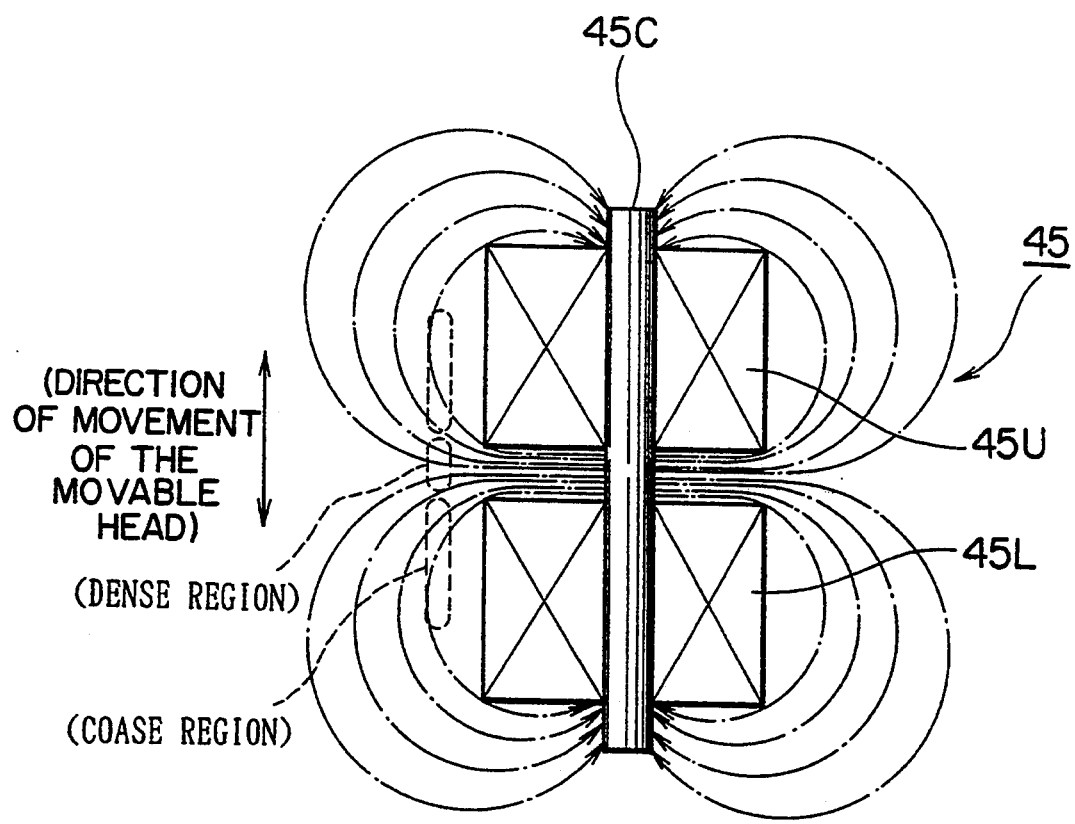
FIG. 94 is a diagram showing in more detail the magnetic flux distribution of the conventional magnetic field generator.

In the second conventional head, as shown in FIG. 94, the ac magnetic fluxes of frequency $f_1$ generated by the two coils 45U, 45L of the ac magnetic field generating coil 45 repel each other at the intermediate portion between the coils so that a high flux density portion and low flux density portions are formed vertically separated.

These ac magnetic fluxes are reproduced as the movable head H and audio head 37 move through the ac magnetic field. They are picked up by the reproduction amplifiers 50, 51 through rotary transformers 48, 49.

The oscillation frequency $f_1$ of the oscillation circuit 47 is set to a frequency higher than the attenuation frequency limit determined by the frequency characteristic on the low-frequency side of the rotary transformers 48, 49 and lower than a frequency at which the drive current becomes difficult to supply because of the inductance of the ac magnetic field generating coil 45.

Generally, the attenuation frequency limit of the rotary transformers 48, 49 is several tens of kHz to 100 kHz. For example, suppose the number of turns of winding in the coil 45U, 45L is several hundred and that the attenuation start frequency by the inductance is 1 MHz. Then the oscillation frequency $f_1$ is set between 100 kHz and 1 MHz (100 kHz$<f_1<$1 MHz).

Figure 91B:
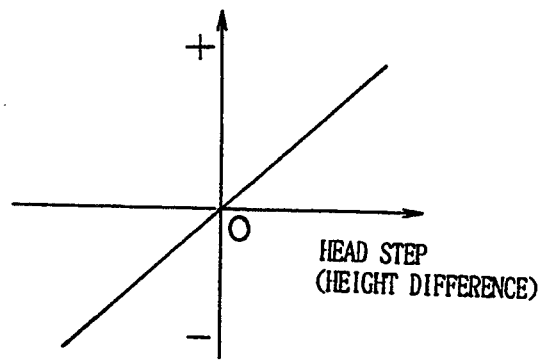

In FIG. 91, when the magnetic heads H, 37 move closely past the ac magnetic field generating coil 45, the reproduced signals of frequency $f_1$ output from the reproduction amplifiers 50, 51 have the following amplitudes.

Suppose that the intermediate position of the two coils 45U, 45L of the ac magnetic field generating coil 45 is set higher than the head height position of the audio head 37 or the head fixed height for the neutral position of the movable head H. Moving the movable head H upward (away from the deck base) increases the amplitude of the reproduced signal and moving it downward reduces the signal amplitude. When the mounting position is reverse to the above case, the attenuation direction of the reproduced signal is also reversed.

Suppose that a signal detection sensitivity output from the reproducing amplifier 50 as a reproduced signal from the stationary head (audio head) 37 and a signal detection sensitivity output from the reproducing amplifier 51 as a reproduced signal from the movable head H are set equal or they are adjusted to be equal by the gain adjustment of the reproducing amplifier 50 or 51.

The reproduced outputs of the reproducing amplifiers 50, 51 are passed through the band-pass filters 52, 53, which pass only the frequency $f_1$, to remove unwanted noise. The maximum values of the two reproduced outputs are sampled and held, or peak-held, by the sample hold circuits 54, 55. Then, the level difference between the maximum values or peaks is taken out from the differential amplifier 56. This signal represents, as a function of voltage, the height difference between the movable head H and the stationary head 37.

This signal is passed through the control system phase compensation circuit 57 such as low-pass filter. The driver 58 closes the control loop in a direction that will eliminate the head height difference, so that no height difference will occur between the movable head H and the stationary head 37 even during recording operation.

Similarly, where two movable heads Ha, Hb are mounted 180 degrees apart on the rotating drum 5 opposing each other, the head height difference among the channels can also be eliminated by providing the above-mentioned head height position fixing control system for each actuator.

The servo frequency band of the position fixing control loop need not be set so large because only the head height difference between the movable head H and the stationary head 37 and the height deviation between the two movable heads H are to be compensated for. Since the detection of the head height difference and deviation is performed every other rotation of the rotating drum 5, there is a wasted time due to 30 Hz sampling when the drum revolution speed is 1,800 rpm. Therefore, the control frequency band should be set below several Hz. Otherwise the control system will oscillate.

For this reason, the low-pass filter's time constant and gain in the compensation circuit 57 are determined so that the phase margin of more than 60 degrees can be secured for the control band of several Hz.

It is needless to say that the head height control during recording should be done in such a manner that when the movable head H is traveling on the side where the magnetic tape 20 is wound around the drum 5, the amplifier 51 works as a recording amplifier and that when the movable head H is running near the ac magnetic field generating coil 45 where the magnetic tape 20 is not wound on the drum, the amplifier 51 works as a reproducing amplifier.

FIG. 95 is a block diagram of a third conventional control system. In the system, two ac magnetic field generating coils 45, 45a-constructed in such a way that they are not affected by sensitivity variations of each head-are arranged in the circumferential direction of the rotating drum 5. Reference numeral 59 represents a first divider to determine the ratio of the stationary head reproduced output amplitudes from the two ac magnetic field generating coils 45, 45a. Denoted 60 is a second divider to determine the ratio of the movable head reproduced output amplitudes from the two ac magnetic field generating coils 45, 45a.

Now, the operation of the magnetic head actuator 7 will be explained.

In FIG. 85, the first permanent magnet 22 generates a magnetic flux D in a closed magnetic path formed by the pole piece 26, the second yoke 23 and the first yoke 21.

Similarly, the second permanent magnet 25 generates a magnetic flux E reverse to the flux D in a closed magnetic path formed by the pole piece 26, the second yoke 23 and the third yoke 24.

The flux D and flux E thus generated cross the annular gap G in the same direction, so that the sum of these fluxes of the first permanent magnet 22 and the second permanent magnet 25 pierces through the coil 31.

In this condition, when a current is applied to the coil 31 through the contact 12, electrode 13 and connections 14, 15, the coil 31, the bobbin 30 and the movable head H move together in the vertical axial direction.

As a result, the movable head H is displaced in the widthwise direction of the magnetic tape 20, tracing the magnetic recording track with high precision.

Figure 96:
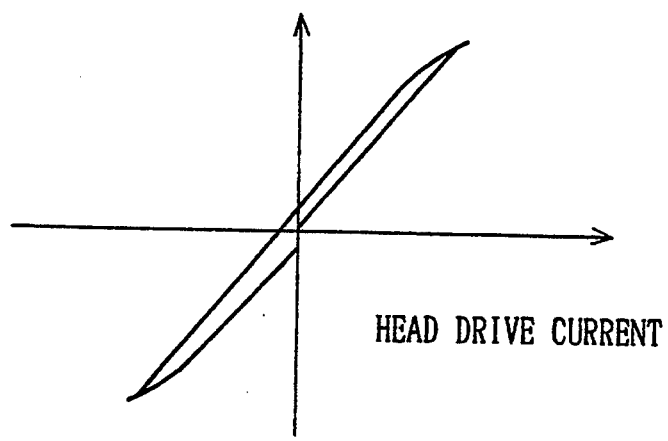
FIG. 96 is a diagram showing the hysteresis characteristic of the solenoid-driven actuator.
Figure 97:
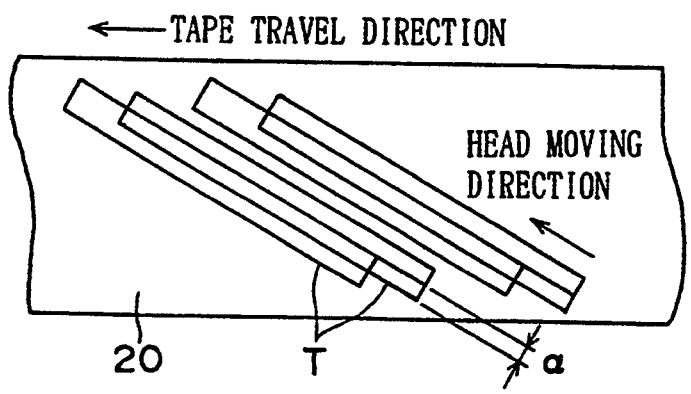
FIG. 97 is a diagram explaining the tracking error caused by the hysteresis characteristic of FIG. 96.

FIG. 96 shows a hysteresis characteristic representing the relationship between the drive current for the magnetic head actuator 7 and the displacement of the movable head H. FIG. 97 shows the recording track pattern on the magnetic tape 20 when the magnetic head actuator 7 having such hysteresis characteristic is used in recording.

As is evident from FIGS. 96 and 97, when the magnetic head actuator 7 is only adjusted at the initial stage, the reference position of the movable head H changes because of the hysteresis characteristic of FIG. 96, causing the recording tracks T to overlap by $a$.

The head height position control system is constructed in this way. In the case of the conventional system in FIG. 91, the detection sensitivities from the heads H, 37 to the amplifiers 50, 51 must be equal or adjusted equal.

In reality, however, these sensitivities often cannot be made equal due to differences in the number of head turns and the head core permeability between the stationary head 37 and the movable head H, or due to amplifier gain and temperature characteristic variations.

In the third conventional control system, two ac magnetic field generating coils 45, 45a are set to different oscillation frequencies $f_1$, $f_2$. As shown in an enlarged view A of FIG. 95(a) one ac magnetic field generating coil 45 is so set that the intermediate height position between the two coils 45U and 45L is higher than the stationary head 37. The other ac magnetic field generating coil 45a is so set that the intermediate height position between the two coils 45U and 45L is lower than the stationary head 37.

At this time, if the height of the movable head H is controlled so that the amplitude ratio between the reproduced output of frequency $f_1$ from the oscillation coil 45a and the reproduced output of frequency $f_2$ from the oscillation coil 45-both outputs being reproduced by the stationary head 37 and supplied from the reproducing amplifier 50-is equal to the amplitude ratio of the reproduced outputs from the movable head H, the height difference between the movable head H and the stationary head 37 can be eliminated regardless of differences in the number of head turns and head core permeability or of amplifier gain and temperature characteristic variations as long as there is no large difference in the frequency characteristic of $f_1$, $f_2$, from each head to the reproducing amplifier, between the stationary head system and the movable head system.

The reproduced signal amplitudes from the band-pass filters 53, 53a, which pass only the movable head reproduced output frequencies $f_1$, $f_2$, are sent to the sample hold circuits 55a or peak-hold circuits and then supplied to the divider 60 which produces a division signal. Similarly, the signal component amplitudes of frequencies $f_1$, $f_2$ in the reproduced outputs of the stationary head 37 are supplied through the band-pass filters 52, 52a and sample hold circuits 54, 54a to the divider 59, which produces a division signal. The differential amplifier 56 then calculates the difference between the two division signals to detect the height difference between the movable head H and the stationary head 37 and its direction.

For example, when the movable head H is higher than the stationary head 37 (i.e., the head H is deviated away from the deck base), the reproduced signals from the movable head H and the stationary head 37 are such that difference between the $f_1$ component, which is higher, and the $f_2$ component is greater with the reproduced signal from the movable head H than with the reproduced signal from the stationary head 37.

Thus, the output signal of the differential amplifier 56 becomes negative causing the movable head H to move downward to a position where there is no height difference between the two heads.

In this way, a precise head height control is performed even when there are sensitivity differences between the movable head H and stationary head 37 or between head amplifiers 50 and 51. In the conventional control system of FIG. 95, however, dividers 59, 60 with high precision are required, which will increase the cost.

Figure 98:
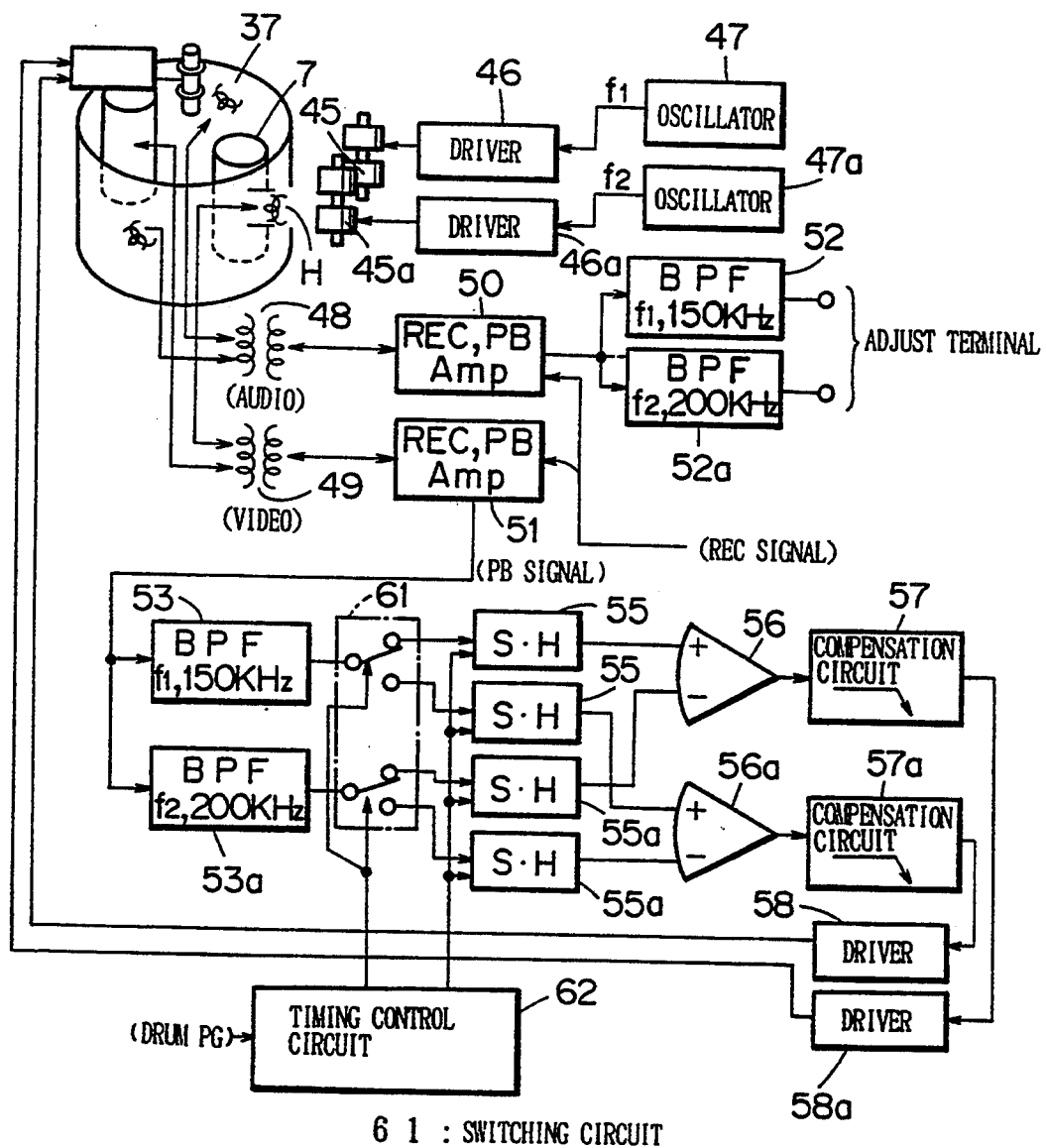
FIG. 98 is a conceptual diagram showing a fourth example of the conventional magnetic head position controller using the ac magnetic field generator.

FIG. 98 shows a fourth example of the control system that does not employ the dividers. In the figure, designated 61 is a switching circuit, and 62 a timing control circuit to control the hold timing of the sample hold circuits 55, 55a.

In this fourth example of the conventional control system, the output of the reproducing amplifier 50a for the stationary head 37 is supplied to the band-pass filters 52, 52a, which pass only the frequencies $f_1$, $f_2$. The outputs of the band-pass filters 52, 52a are monitored at the adjust terminal when adjusting the mounting position of the ac magnetic field generating coils 45, 45a and the drive output voltages of the drivers 46, 46a so that the amplitudes of the output signals of the frequencies $f_1$ (=150 kHz) and $f_2$ (=200 kHz) are equal.

By performing the height position control so that the amplitudes of the reproduced signal components of frequencies $f_1$, $f_2$ from the movable head H are equal, it is possible to eliminate the head height difference between the movable head H and the stationary head 37 without using the divider.

In this example of the conventional system where two movable heads H are mounted 180 degrees apart on the rotating drum 5, the reproduced signals from each channel are distributed to four sample hold circuits 55, 55a by an analog switch 61 provided after the band-pass filters 53, 53a. In this case, there must be provided two each of the differential amplifiers 56, 56a, compensation circuits 57, 57a, and drivers 58, 58a.

Such multiple channels can be dealt with similarly in the second and third conventional examples. The second and third conventional examples also have the same setting of the control frequency band as in this example, and the compensation circuits 57, 57a compensate for the gain and phase.

The magnetic head generally picks up a magnetic flux in the tangential direction with respect to the circumference of the rotating drum, so that when the ac magnetic field generating coils 45, 45a are shaped as shown in FIG. 92, the reproduced outputs of the head are obtained as reproduced envelopes as shown in FIG. 99.

In the configuration of FIG. 98, since the reproduced outputs of the stationary head 37 are adjusted so that the amplitudes of $f_1$ and $f_2$ are equal, the outputs will be as shown in FIG. 99(a). Hence, if there is deviation in amplifier sensitivity between the movable head system and the stationary head system, the control causes the $f_1$ and $f_2$ components to be equal, as shown in FIG. 99(c), eliminating the head height difference.

In the example of FIG. 98, a case is shown in which it is possible to make equal the reproduced signal amplitudes of the $f_1$ and $f_2$ components from the stationary head by adjusting the mounting position of the ac magnetic field generating coil 45 and the drive voltage level. There may, however, be cases where the $f_1$ and $f_2$ components cannot be made equal in amplitude by the adjustment of the mounting position and the drive voltage level, or where the system cannot be made available for practical use only by making the initial adjustment because of temperature characteristic variations or characteristic degradation over time.

Figure 100:
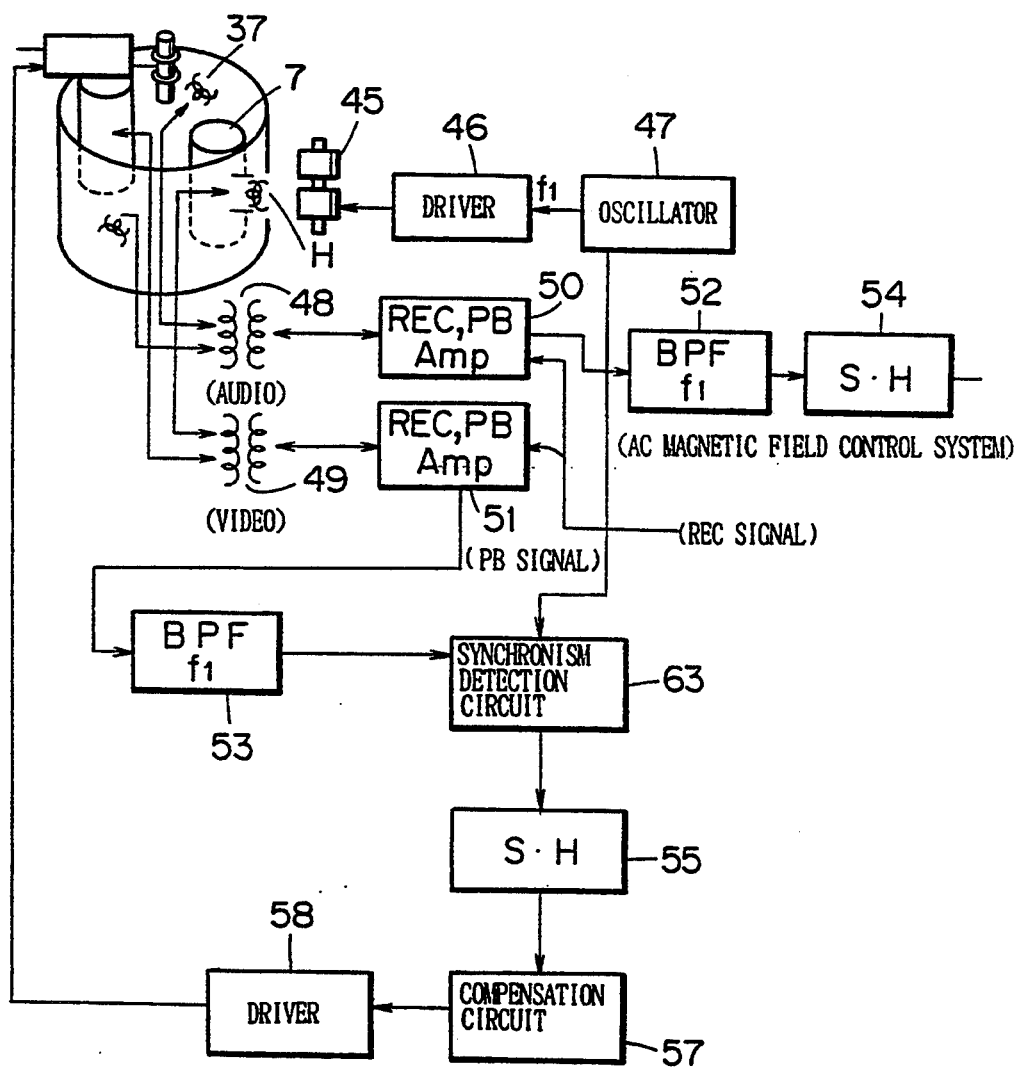
FIG. 100 is a conceptual diagram showing a fifth example of the conventional magnetic head position controller using the ac magnetic field generator.
Figure 101:
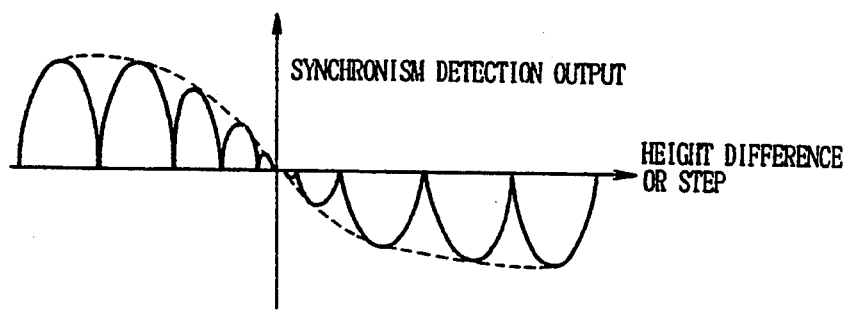
FIG. 101 is a diagram showing the relationship between the head height difference and the synchronism detection output.

FIG. 100 shows a block diagram of a fifth example of the conventional control system. As in the configuration of a differential transformer used generally for fine displacement measurement, the intermediate height position between the two coils 45U, 45L of the ac magnetic field generating coil 45 is set equal to the height of the movable head H. When the movable head H deviates vertically, a synchronism detection circuit 63 detects the phase shift, which occurs with the change in the amplitude of the reproduced signal, as shown in FIG. 101. In this way, the amount of head height difference and its direction are detected.

The processing performed after the synchronism detection sample hold is the same as with the second through fourth example.

If, during recording, the height difference between the movable head H and the stationary head 37 can be controlled to be zero, there is no need to mount the stationary heads 35, 36 dedicated for recording on the rotating drum. This permits the movable head H mounted in the actuator 7 to perform recording, reproducing and special reproducing of the video signal. And because the height difference with respect to the stationary head 37 can be adjusted, it is possible, as shown in FIG. 102, to arrange on the rotating drum 5 a high-fidelity audio head 37 and an erase head 38 for tape-connected recording and mount the EP head 35 and SP head 36 on the actuator 7, making the head arrangement very simple.

Figure 103:
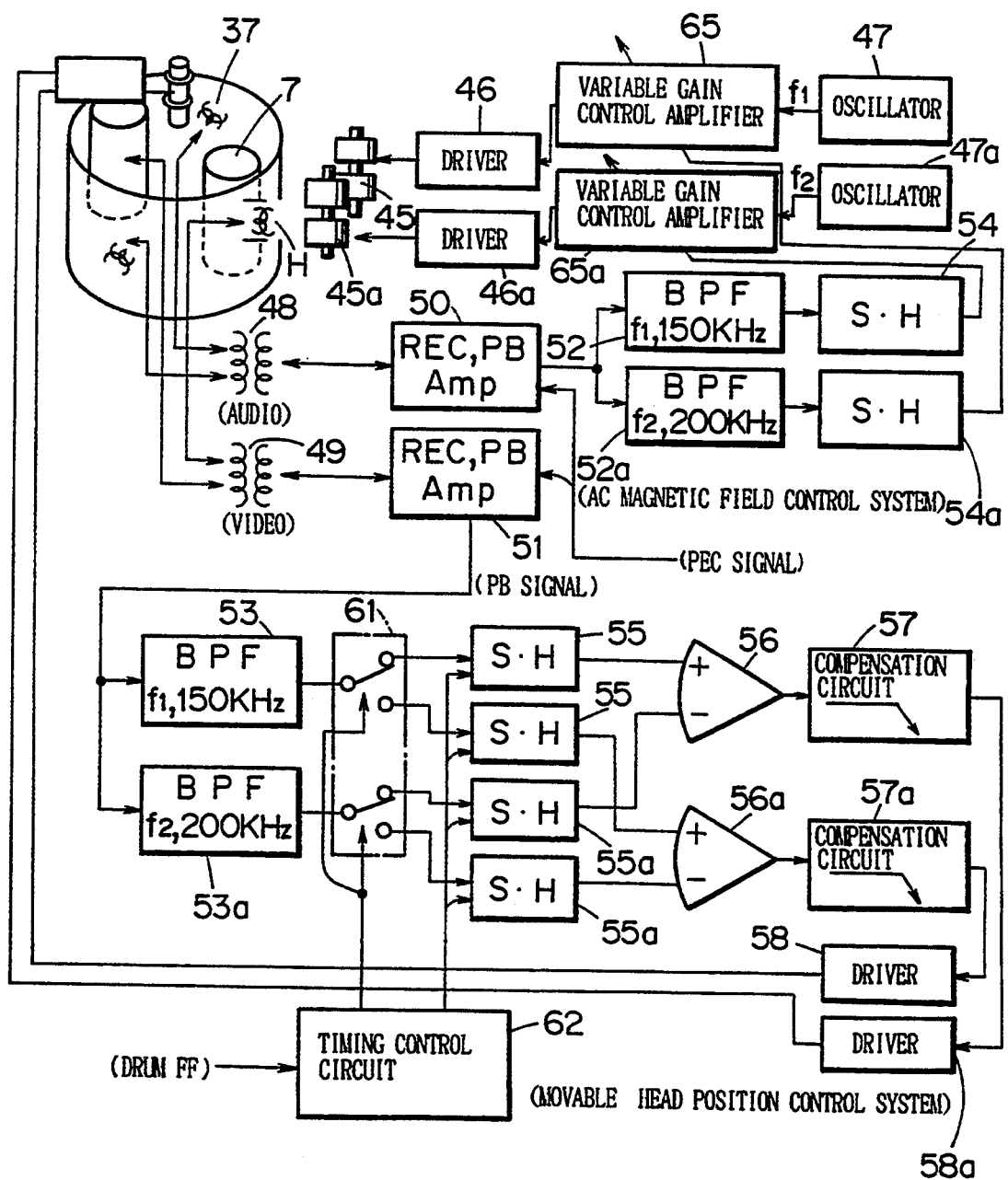
FIG. 103 is a conceptual diagram showing a sixth example of the conventional magnetic head position controller using the ac magnetic field generator.

FIG. 103 is a block diagram of a sixth example of the conventional control system. An ac magnetic field generation control system is provided which, when the amplitudes of the reproduced outputs of the stationary head 37 are not equal depending on the adjustment of the mounting position of the ac magnetic field generating coils 45, 45a, will automatically and electrically make an appropriate adjustment. In the figure, denoted 65, 65a are variable gain control amplifiers to control the level of the ac magnetic fields produced by the coils 45, 45a.

In this conventional system, the outputs of the sample hold circuits 54, 54a are supplied to the gain control input terminals of the variable gain control amplifiers 65, 65a, which control the output signal amplitude levels of the band-pass filters 52, 52a for the stationary head 37 to be equal at all times, i.e., the variable gain control amplifiers provide control to make the amplitudes of the $f_1$ and $f_2$ components of the reproduced output from the stationary head equal at all times. The amplitudes of the $f_1$ and $f_2$ components are controlled at a constant value at all times even when there are variations in mechanical position adjustment of the ac magnetic field generating coils 45, 45a, temperature variations and degradation over time.

Figure 104:
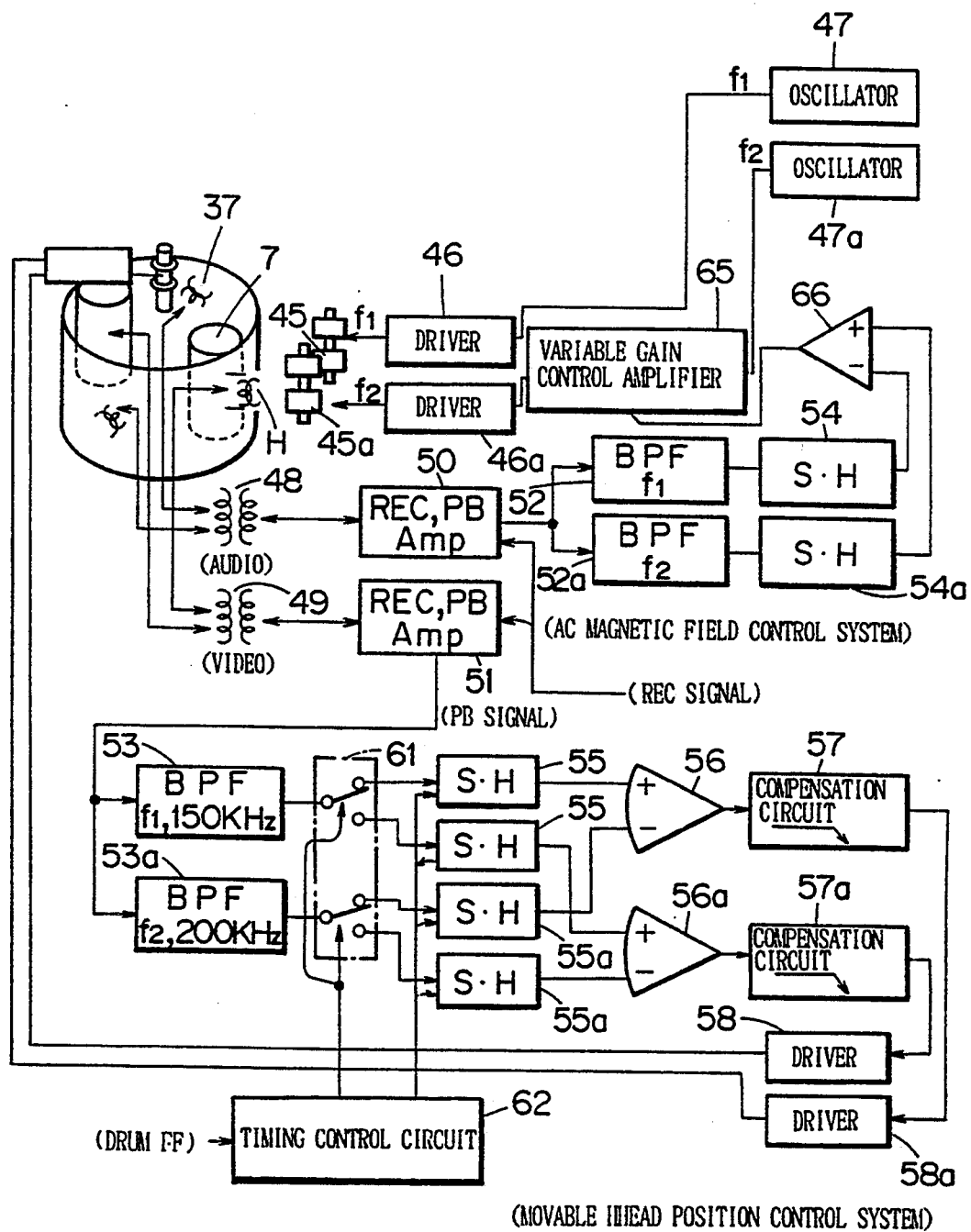
FIG. 104 is a conceptual diagram showing a seventh example of the conventional magnetic head position controller using the ac magnetic field generator.

FIG. 104 is a block diagram of a seventh example of the conventional control system. In this example, the magnetic field level control described in the example of FIG. 103 is performed by adjusting only one ac magnetic field generating coil 45a. Designated 66 is a differential amplifier.

In this example, the $f_1$ and $f_2$ signal components of the reproduced outputs from the stationary head 37 are picked up by the band-pass filters 52, 52a and supplied to the sample hold circuits 54, 54a. The sample-held values are compared by the differential amplifier 66 to produce a difference signal, which represents a drive voltage level for one ac magnetic field generating coil 45a. The drive voltage level for the ac magnetic field generating coil 45a is fed to the variable gain control amplifier 65 that provides control so that the reproduced output levels from the ac magnetic field generating coil 45a and from the other ac magnetic field generating coil 45 are equal. This control produces the similar effect to the one obtained in the conventional example of FIG. 103.

The provision of the magnetic field generation control system for the ac magnetic field generating coils 45, 45a makes it possible to maintain the follow-up precision of the movable head height position control system even when there are adjustment variations in the mounting position of the ac magnetic field generating coils 45, 45a, degradation over time of the electromagnetic induction level and characteristic deterioration due to temperature variations.

While the above second through seventh example of the conventional control system employs an analog circuit, it is also possible to form the system with a digital circuit in which the outputs of the reproducing amplifiers 50, 51 or band-pass filters 52, 53 are analog-digital converted to be processed by microcomputer software and then digital-analog converted to drive the actuator 7.

Next, the construction of the ac magnetic field generating coil 45 that produces the above-mentioned magnetic field will be described in detail.

To change the magnetic flux density sharply according to locations requires the magnetic flux to be concentrated. An example method of concentrating the magnetic flux is to arrange the coils in an opposing positional relationship, as shown in FIG. 93, and apply current to the coils so that they repel each other.

As shown in FIG. 94, the magnetic flux concentrates in the region between the two coils. As the flux moves away from the coil core, it rapidly disperses, reducing the flux density. In this way, the flux density changes sharply according to positions. This is convenient for control.

The flux density change as referred to here represents, not the change in the number of flux lines at a particular position, but the change in the density of the magnetic flux that the movable head can detect in a direction of head movement, i.e., in a direction of axis of the rotating drum. So, the direction of flux of the ac magnetic field generating coil 45 must be examined.

Figure 105:
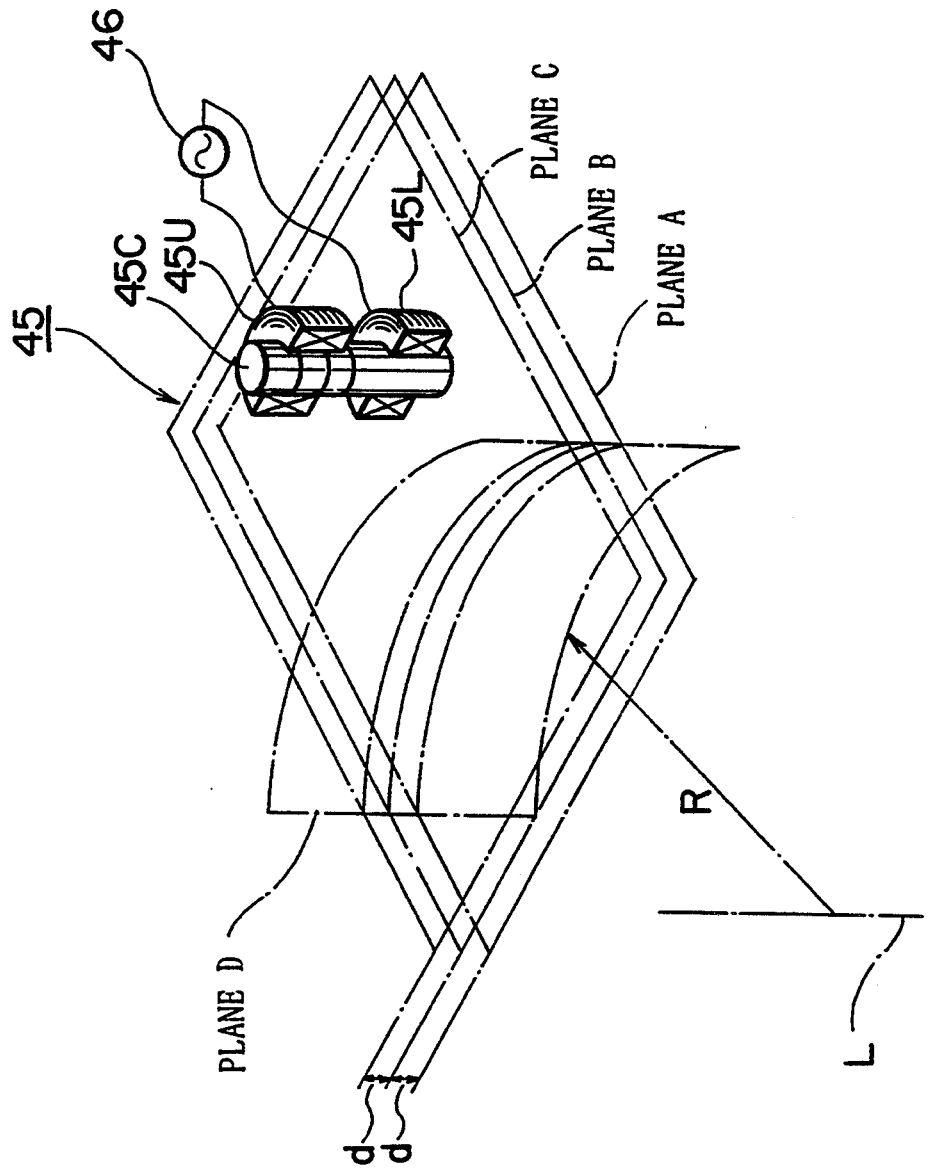
FIG. 105 is a schematic view showing the relationship between the ac magnetic field generator and the rotating drum.

FIG. 105 is a diagram showing the coordinate plane to examine the magnetic field distribution of the ac magnetic field generating coil 45. Designated 45U, 45L are coils; 45c a core made of soft magnetic material such as soft iron; 46 an ac power source to supply the two coils; and A a plane which is normal to the center axis L of the core 45c and which crosses the center between the two coils 45U, 45L.

The plane B is parallel to the plane A and only a small distance d from the plane A; the plane C is parallel to the plane A and B and is only a small distance d from the plane B and a small distance 2d from the plane A; and the plane D is a part of the side surface of a cylinder with radius R which has its center axis aligned in the same direction as the center axis L of the core 45. The plane D represents the side surface of the rotating drum 5 and the intersection between the plane D and other planes is considered to describe the locus of the movable head.

Figure 106:
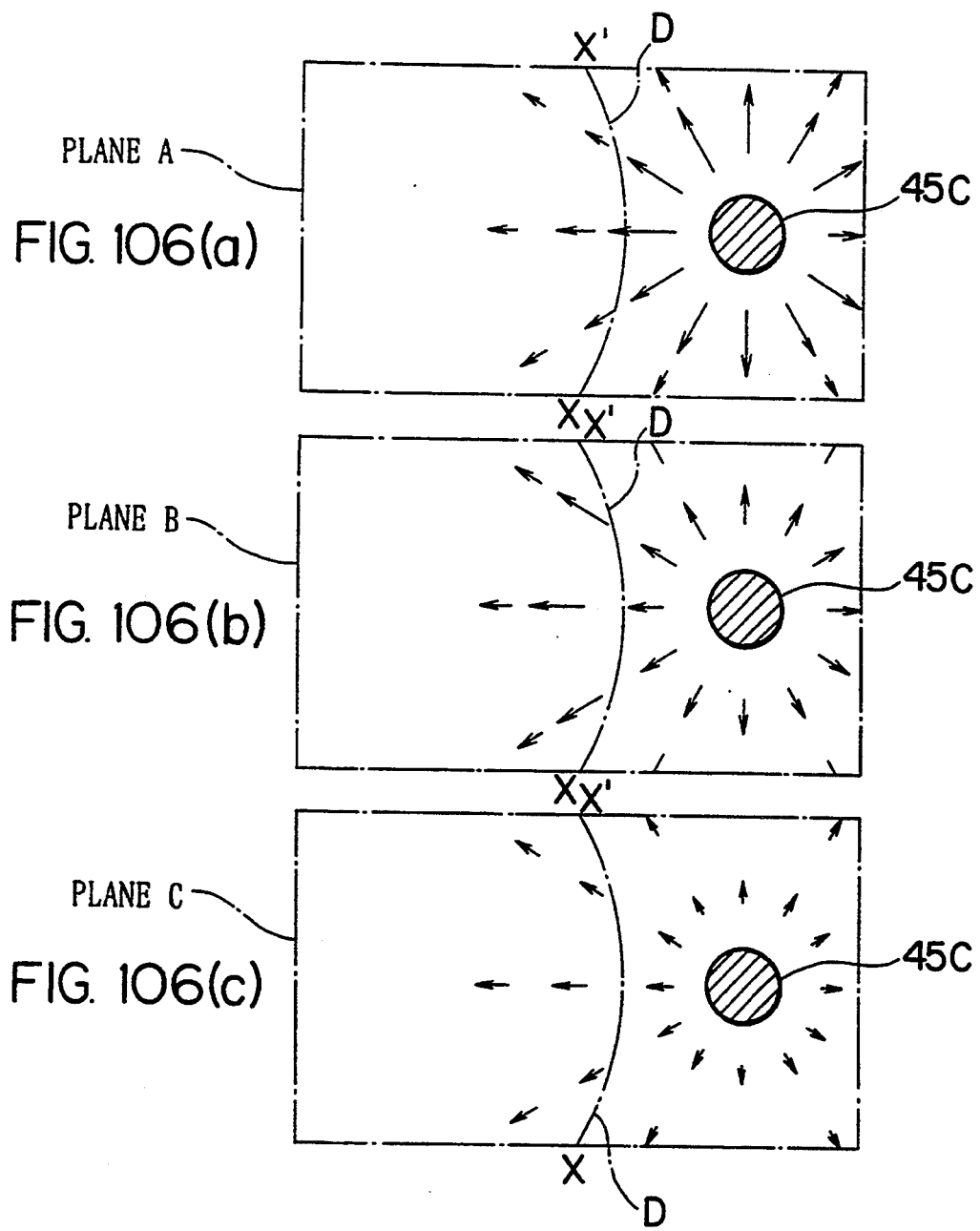
FIGS. 106(a), 106(b) and 106(c) are schematic diagrams showing in more detail the relationship between the magnetic flux generated by the ac magnetic field generator and the rotating drum.

The coils 45U and 45L are actually applied with ac current. For simplicity in the explanation of the working principle, however, let us consider a case where a dc current is applied. FIG. 106 shows the vector representation of the flux generated on each plane when the dc current is applied to the coils 45U and 45L so that these two coils' poles repel each other. The circles in the figure indicates the cross section of the core 45c and a curve X—X' indicates the intersection between the plane D and other planes.

Looking first at the plane A, illustrated in FIG. 106(a) the flux vector on the plane A near the core 45c is large in magnitude. As it moves away from the core 45c, the flux disperses, sharply decreasing the flux vector on the plane A.

On the plane B illustrated in FIG. 106(b) a distance d away from the plane A, since the flux flows in a curved direction, the flux vector on the plane B becomes maximum in a region a certain distance away from the core 45c.

The same situation as the plane B also applies to the plane C, as illustrated in FIG. 106(c). Since the flux flows in a curved direction and the flux vector on the plane C progressively approaches zero, the absolute value of the vector is smaller than on the plane B.

The curve X—X' on each plane in FIG. 106, as mentioned earlier, represents the locus of the movable head. The direction of magnetic flux detectable by the movable head is tangent to the curve X—X'.

Figure 107:
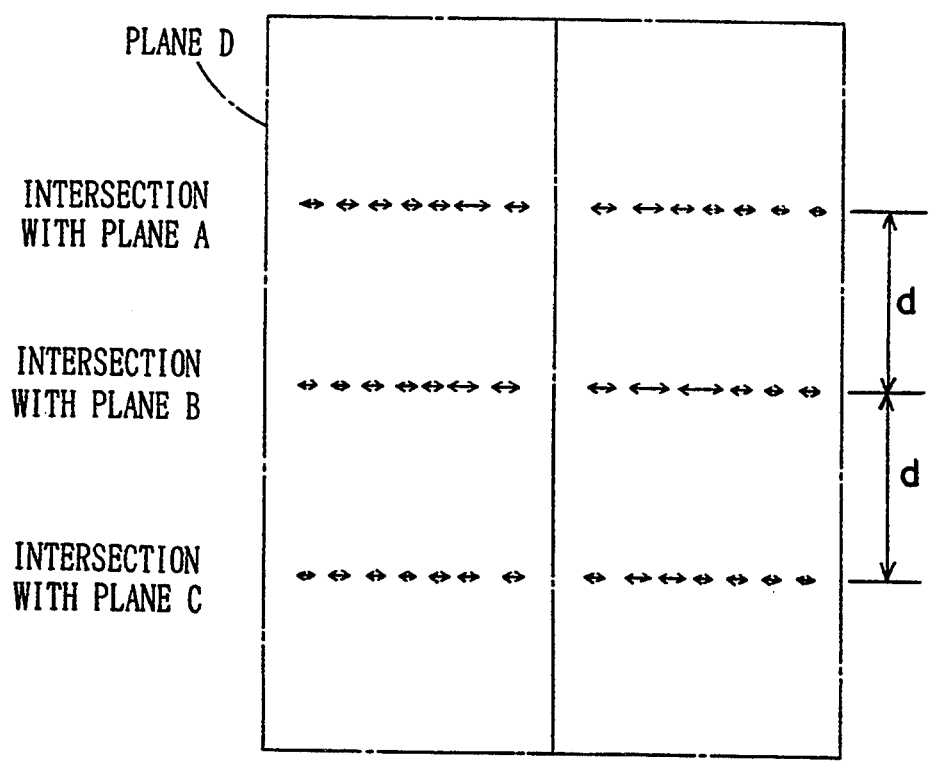
FIG. 107 is a diagram showing the flux of FIG. 106 developed over a plane.

With the flux in FIG. 106 taken as ac flux, the curved plane D is developed into a flat plane as shown in FIG. 107. In the figure, arrows represent the magnetic flux vectors on the plane D along the intersection between the plane D and other planes. Since the magnetic flux is ac flux, the flux vectors each consist of a pair of apposite arrows.

FIG. 108 shows the output waveforms produced by the induced electromotive force of the movable head when the movable head passes through the intersection between plane A and plane B and between plane C and plane D subjected to the magnetic flux distribution shown to the left in the figure.

As is seen from the output waveforms, the peak level differs from one plane to another. In this example, the plane B has the maximum peak level.

In other words, the peak level is a non-linear function that depends on the displacement in the direction of the rotating drum axis of the movable head. By detecting the peak level of the output waveform, it is possible to know the absolute position of the movable head.

Considering the fact that the movable head is position-controlled as the position sensor, the ac magnetic field generating coil 45 should be mounted so that the movable head can be fixed in a region where the rate of change of the output waveform peak level that occurs as the head changes its height is large, i.e., in the region between plane A and plane B or between plane B and plane C in FIG. 107, in order to increase the sensor sensitivity.

The magnetic field distribution described so far is generated by applying a particular voltage to the ac magnetic field generating coil 45. The field distribution is a function that depends on the voltage amplitudes. Hence, the voltage value should be adjusted so that the rate of change of the output waveform peak level that occurs as the head changes its height becomes maximum.

When the ac magnetic field generating coil 45 is installed inside the drum deck, noise may enter the linear audio head or the information on the magnetic tape may be erased.

Figure 110:
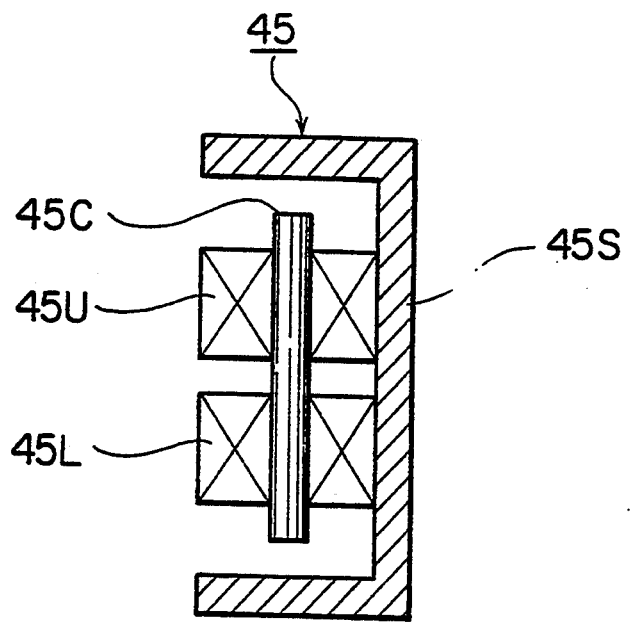
FIG. 110 is a cross section of an essential portion taken along the line 110—110 in FIG. 109.

To prevent this, a part of the magnetic field generating element is enclosed by a soft magnetic material 45s, as shown in FIG. 109, to provide a magnetic shield. FIG. 110 shows the cross section taken along the line 110—110 in FIG. 109. This structure eliminates the adverse effects mentioned above.

Figure 111:
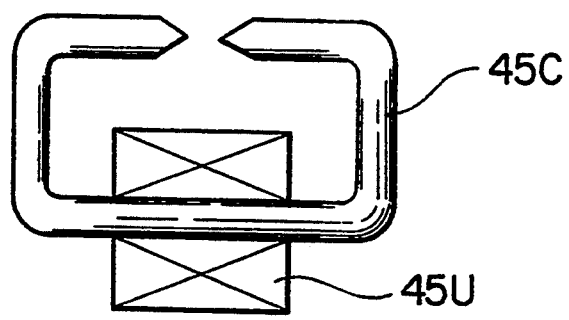
FIG. 111 is a conceptual diagram of another example of the ac magnetic field generating coil.
Figure 112:
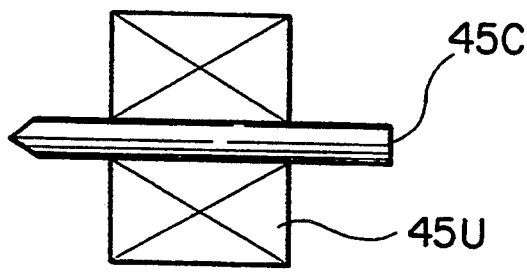
FIG. 112 is a conceptual diagram of still another example of the ac magnetic field generating coil.

While the above conventional example employs the construction of FIG. 110 for the ac magnetic field generating coil 45 to concentrate the flux, it is also possible to use the construction shown in FIG. 111 or FIG. 112 although the sensor sensitivity in these cases is somewhat deteriorated.

As mentioned above, in the conventional structure, the ac magnetic field generating coil 45 of FIG. 89 can be mounted with a sufficiently high mechanical precision that takes into account the characteristic degradation over time and temperature variations. That is, since the movable head height can be aligned with the mounting position of the ac magnetic field generating coil 40, it is necessary to set the mounting precision of the coil 40 higher than the movable head's position fixing allowable precision.

In a rotating drum with multiple movable heads as shown in FIG. 89, even when the mounting precision of the coil 40 is bad, it is possible to make the relative heights of the movable heads equal or make their heights equal to the height of other stationary head on the drum. However, the absolute height of the movable head from the deck base-which supports the rotating drum-cannot be controlled.

In such a conventional method, the movable head can be controlled at a height equal to that of the ac magnetic field generating coil 40 or at an absolute height position of other stationary head. It is also possible to control the multiple movable heads at equal relative heights.

However, in currently available systems such as VHS and β formats, the movable head may have to be controlled at a position slightly deviated from the height of the other stationary head, rather than at a position equal to the other stationary head.

In other systems such as 8 mm videos and D-1 and D-2 digital VTRs, if the absolute height of the movable head from the deck base can be controlled at a specified position, it is possible to form an accurate recording track based on the respective tape format during recording.

Considering the machining accuracy and ease of adjustment, the coil 40 that does not require too strict a mounting precision helps in forming a less expensive system and there are needs for a detecting means to check if the movable head is at the specified height.

Since the conventional system can only detect the head height at a predetermined point in one drum rotation, the movable head may be shifted or vibrated in one drum rotation due to variations of tape-head sliding friction resulting from tape tension variations or apparatus vibrations. Hence, it is necessary to increase the stiffness of the gimbals spring of the movable head actuator to reduce the mechanical resonance.

Detection of the absolute height reference value of the movable head in the embodiment described below is done by an ac magnetic field detection means mounted on the rotating drum. The movable head is controlled at the same height of the ac magnetic field detection means.

In this invention, the movable head is positioned and fixed in one drum rotation by the movable head position detection means installed inside the movable head actuator while at the same time the actuator is damped by the state estimator which electrically estimates the speed of the movable head to prevent a possible positional shift due to vibrations.

Figure 54A:
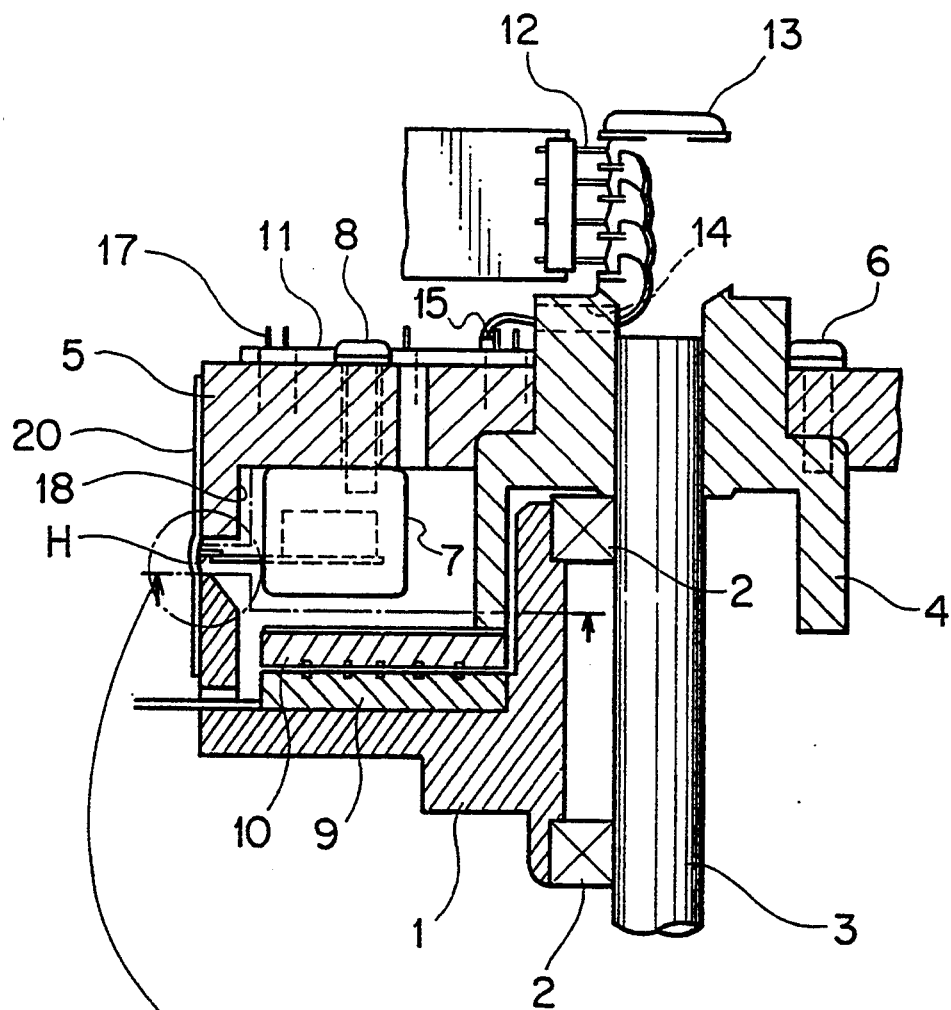
FIG. 54(a) is an enlarged cross section of an example of the rotating drum used in the embodiment and FIG. 54(b) is an enlarged view of two heads mounted to the gimbals spring.
Figure 54B:
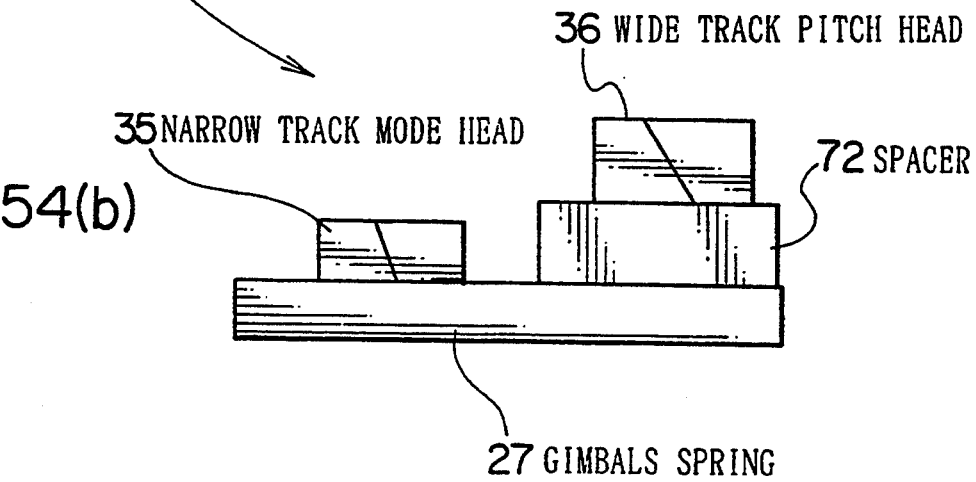

FIG. 54 shows the construction of the rotating head section of the ninth embodiment of the invention. The movable head in the rotating head section in the current VTR system of FIG. 82 has a narrow track head 35 for long hour mode mounted on gimbals spring 27 and a wide track pitch head 36 mounted through a spacer 72 on the gimbals spring 27.

Figure 55:
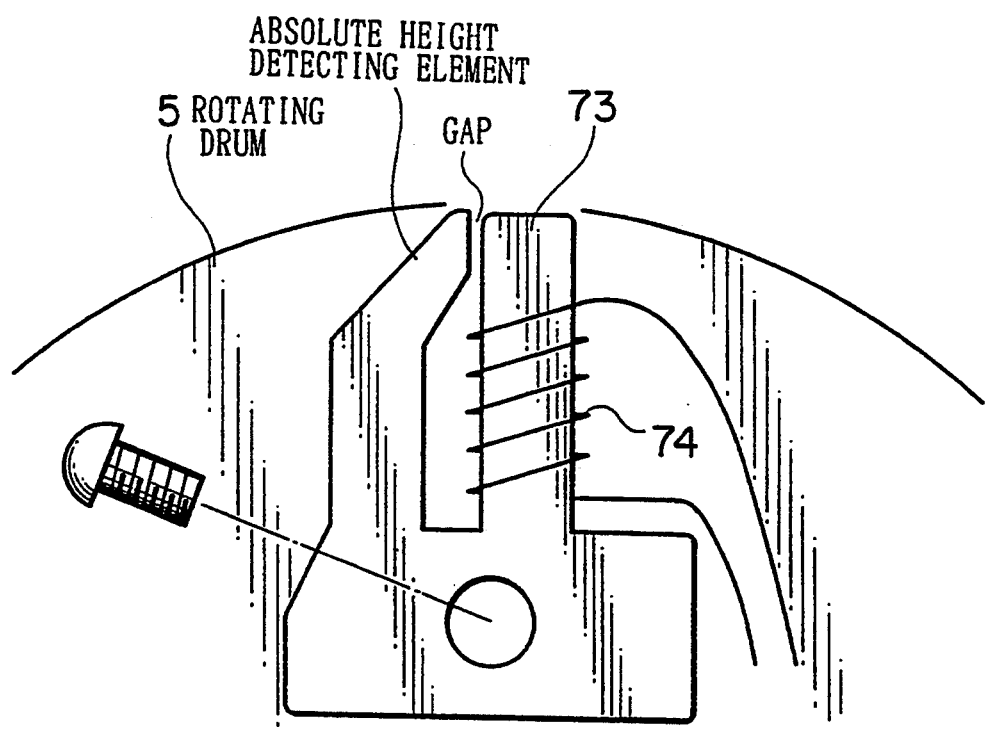
FIG. 55 is an enlarged plan view of a preferred example of an absolute height detection element used in the embodiment.

FIG. 55 shows the external view of the absolute height detection element 73 mounted on the rotating drum 5. Denoted 74 is detection coil.

Figure 56:
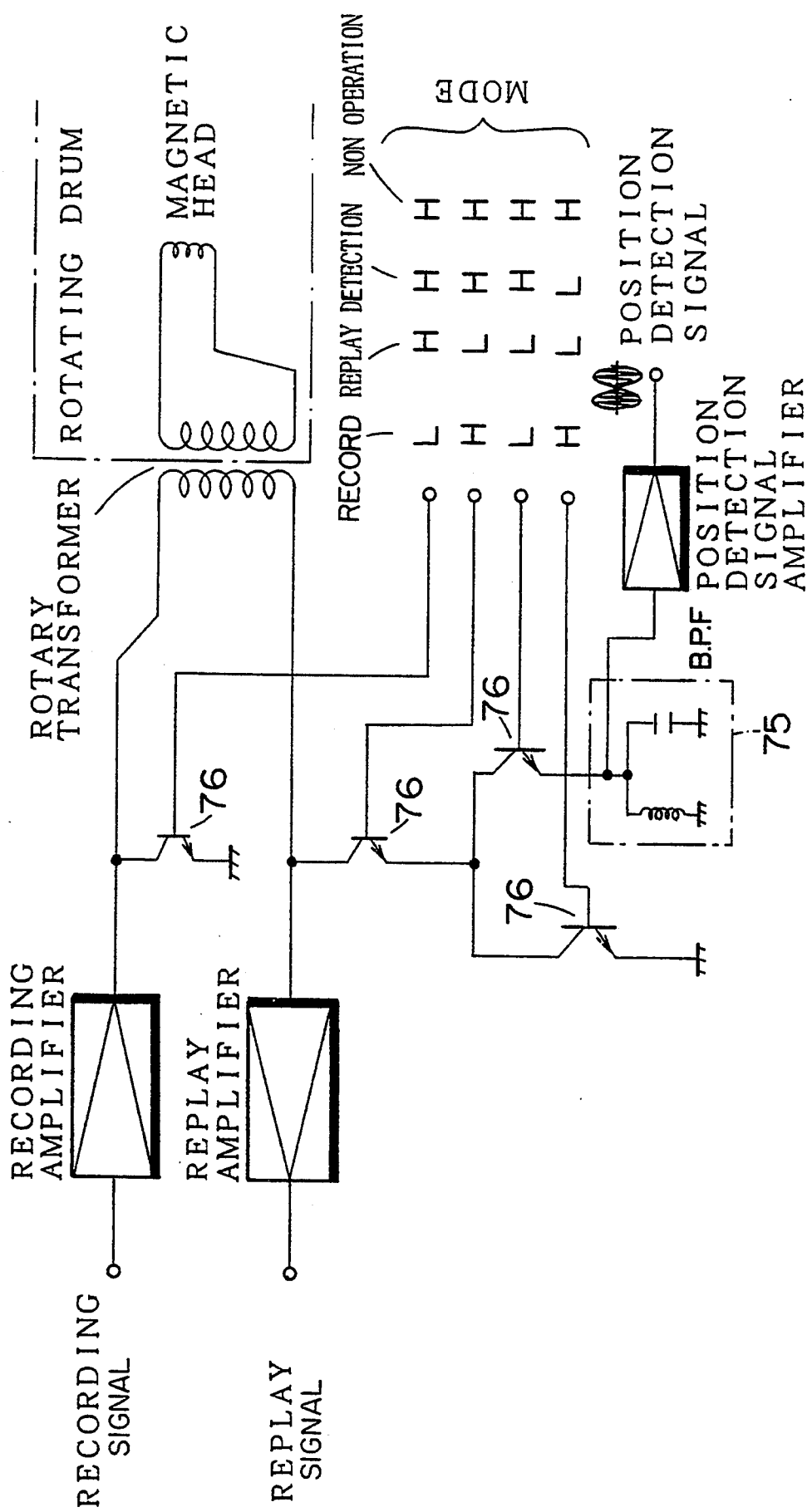
FIG. 56 is a circuit diagram showing a detection signal amplifying unit of the absolute position detection circuit, used in the embodiment.

FIG. 56 is a circuit diagram showing the detection signal amplifier section of the absolute position detection circuit. In the diagram, designated 75 is a band-pass filter and 76 a switching transistor.

Figure 57:
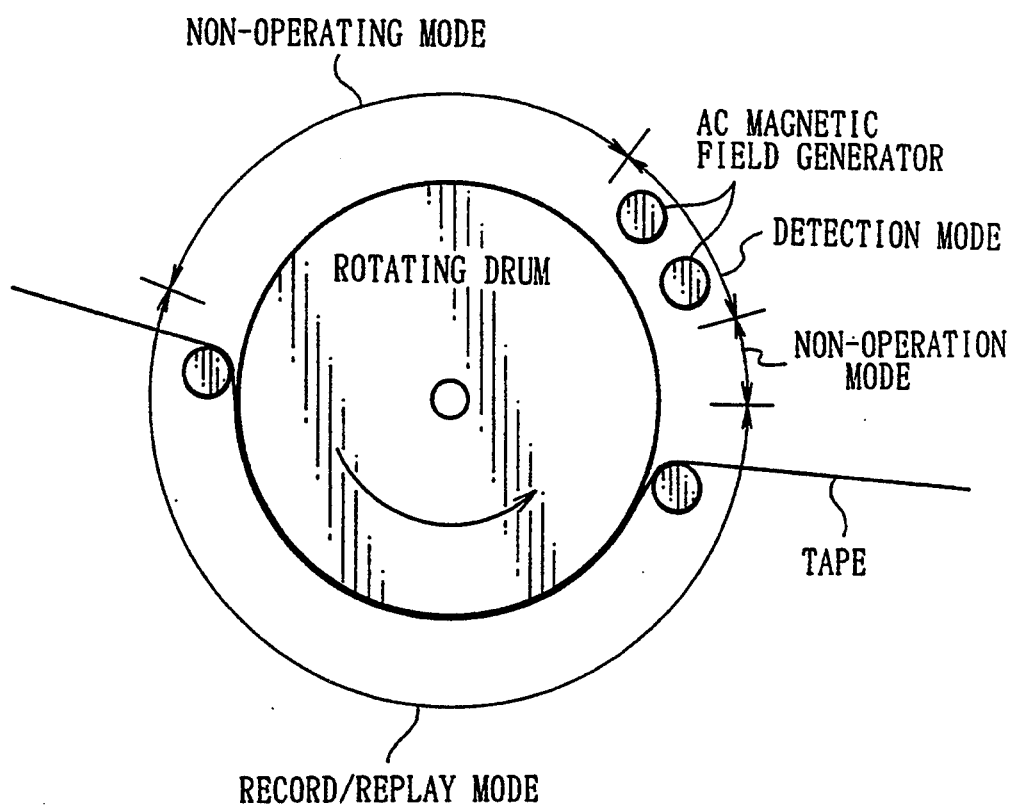
FIG. 57 is an explanatory diagram showing the operation mode of a switching transistor of FIG. 56 in relation to the rotating angle of the drum.

FIG. 57 shows the operation modes of the switching transistor 76 of FIG. 57 in relation to the rotating angle of the drum.

Figure 58:
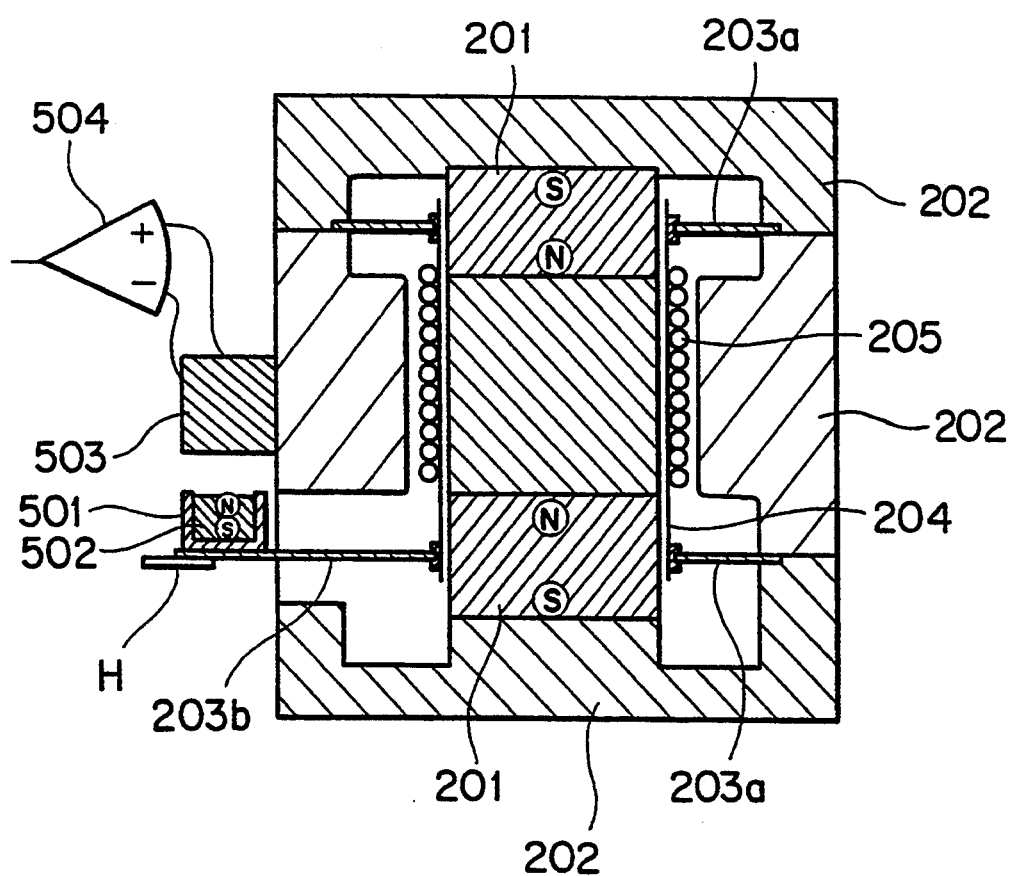
FIG. 58 is a cross section showing a preferred example of the head actuator having the absolute height detector, used in the embodiment.

FIG. 58 shows an example construction for detecting an actuator movable section position by a hole sensor. In the figure, denoted 501 is a magnet holder for reducing the magnetic flux leakage into the magnetic head 112; 502 is a magnet for generating a magnetic flux; 503 a hole sensor to detect the magnitude of the flux of the magnet 502; and 504 a differential amplifier to amplify a weak signal from the hole sensor 503 to produce a position signal.

Figure 59:
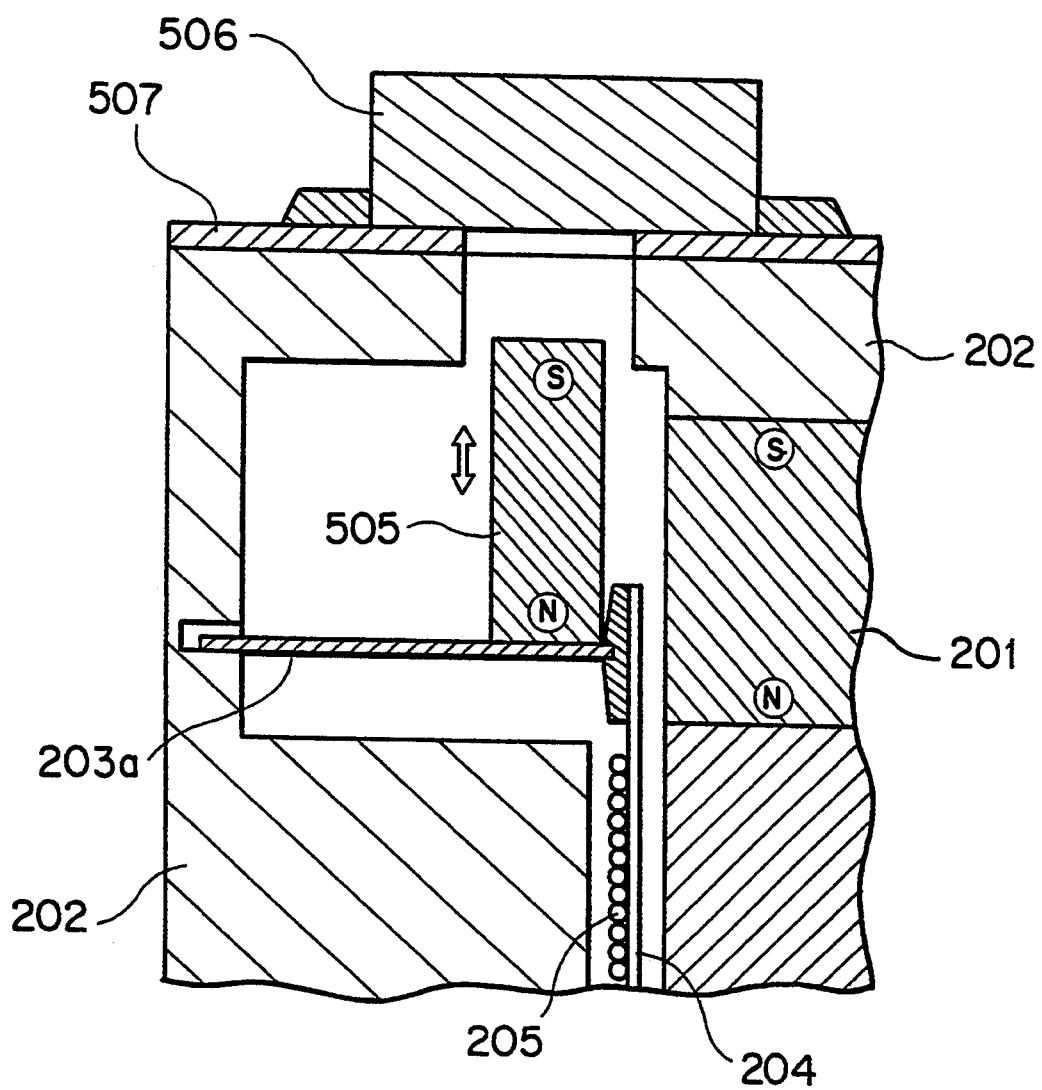
FIG. 59 is an enlarged cross section of an essential portion of the hole sensor in the modified absolute height detector of FIG. 58.

FIG. 59 is a variation of FIG. 58. Reference numeral 505 represents a magnet; 506 a hole sensor; and 507 a base plate for securing the hole sensor.

Figure 60:
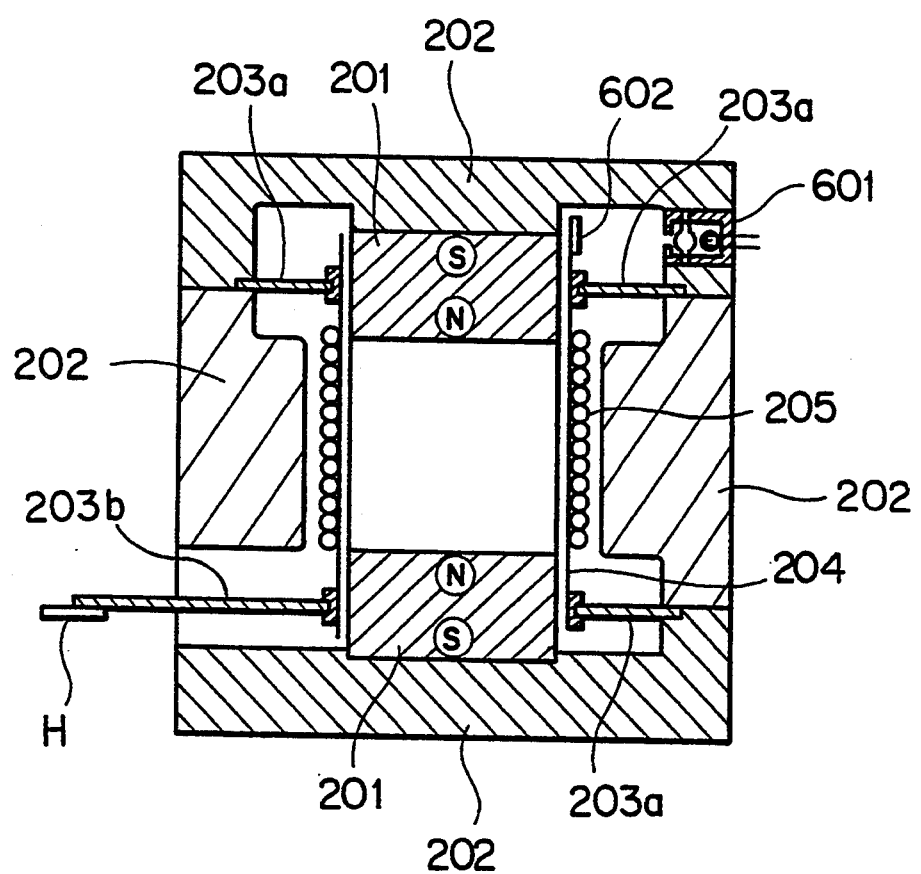
FIG. 60 is a cross section of an example of solenoid-driven actuator whose absolute height detector is formed of a light sensor.

FIG. 60 is an example construction in which a position detection means using an optical sensor is mounted to the actuator. Denoted 601 is a light emitting section that emits a parallel-ray beam; and 602 a detector (light receiving section) consisting of a photodiode divided into two sections.

Figure 61:
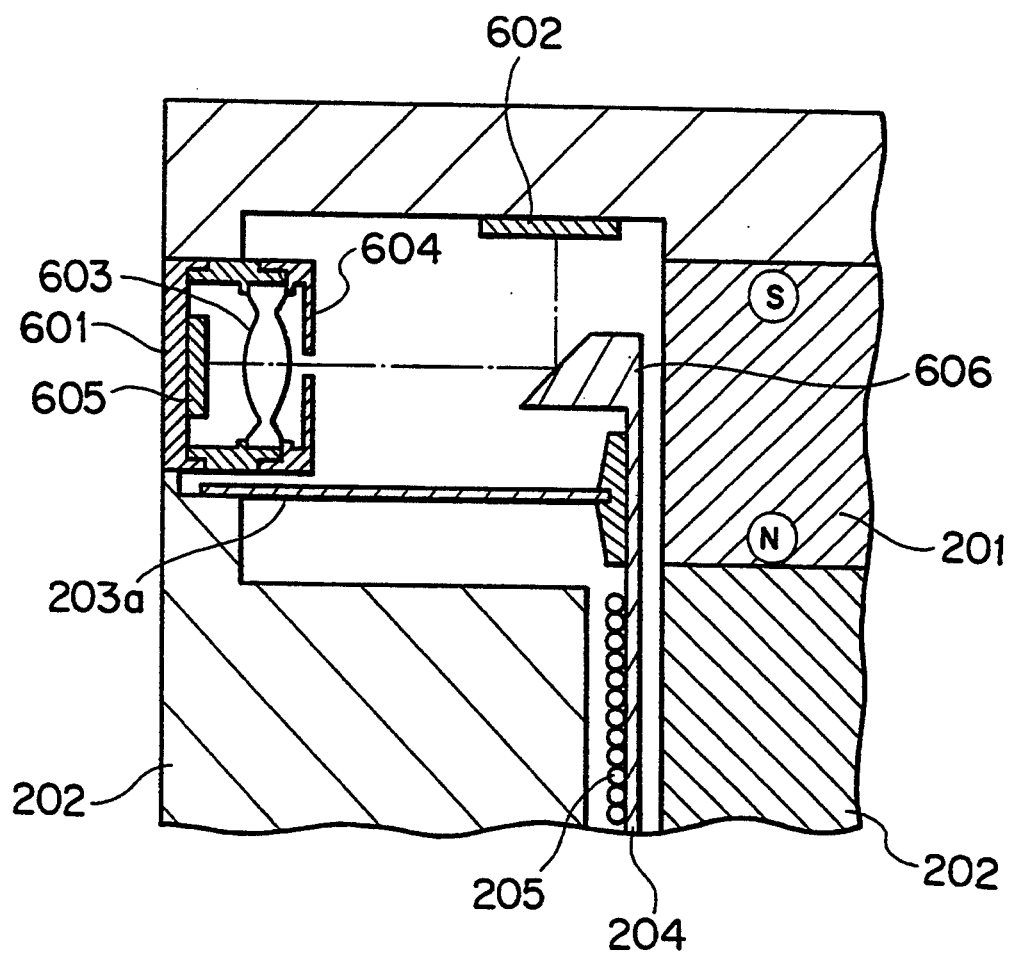
FIG. 61 is a cross section of another example of solenoid-driven actuator whose absolute height detector is formed of a light sensor.

FIG. 61 is a variation of FIG. 60. Denoted 603 is a lens for forming the light emitted from the light emitting element 605, such as an LED, into a parallel-ray beam; 604 a light emitting window (throttle); and 606 a mirror to reflect the parallel-ray beam from the level 603.

Figure 62:
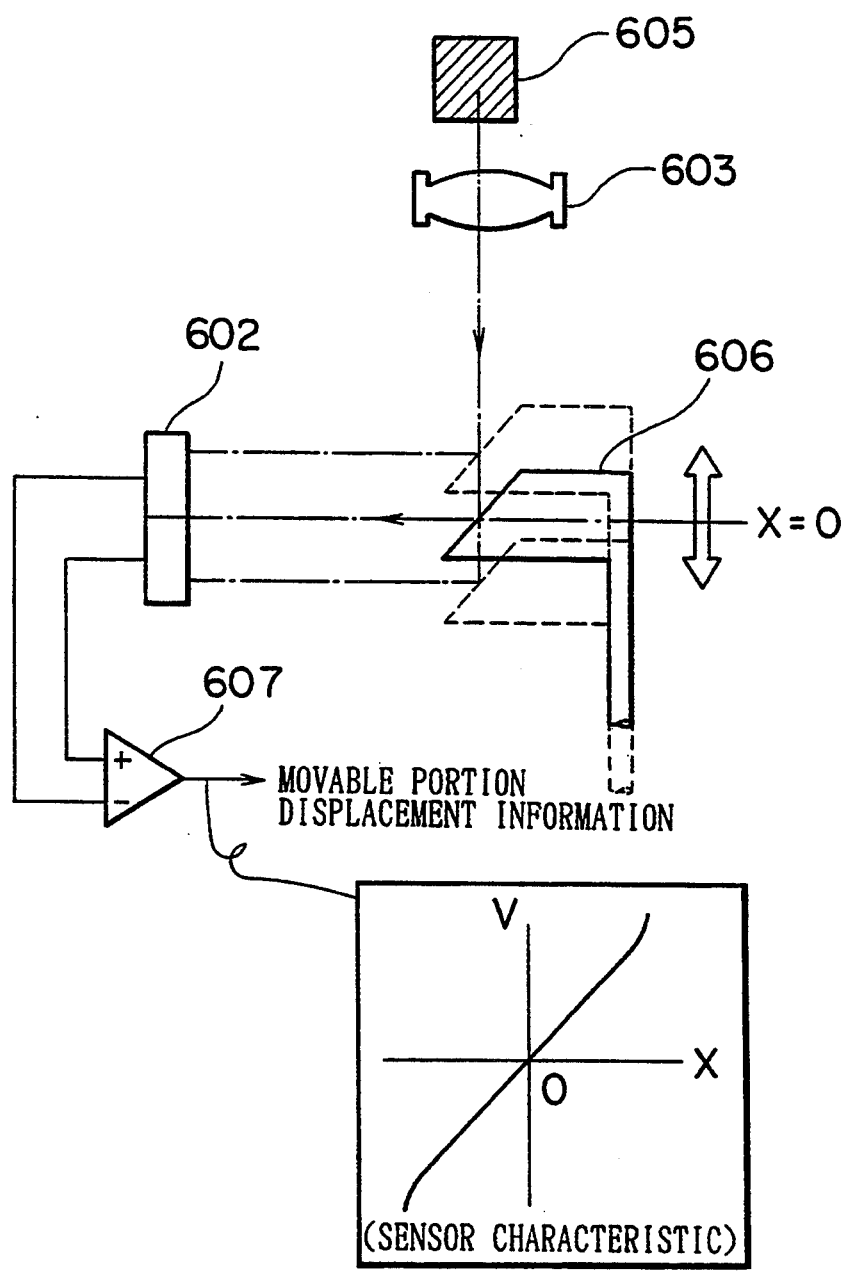
FIG. 62 is a schematic diagram showing the principle of detecting the displacement of the movable portion by the light sensor.

FIG. 62 is a diagram showing the principle of detecting the displacement of the movable portion of the optical sensor in FIG. 61. Designated 607 is a differential amplifier that takes a difference between light currents from the two-section detector 602.

Figure 63:
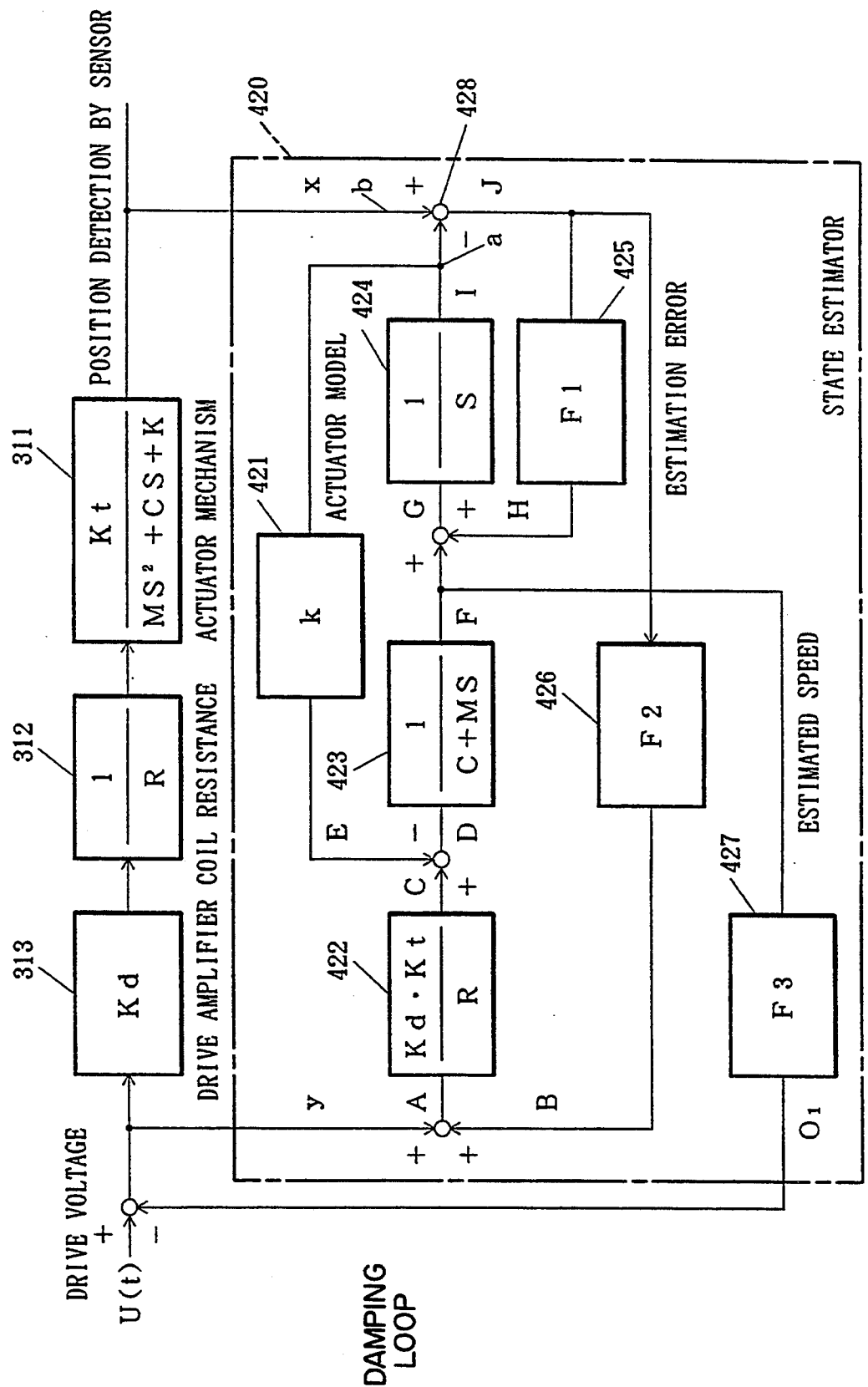
FIG. 63 is a block diagram showing a ninth embodiment of the magnetic head position controller in the magnetic recording and reproducing apparatus of this invention by using a transfer function of the control logic.

FIG. 63 is a block diagram representing this embodiment with the transfer function of the control logic. The elements 311–313 represent the transfer functions of the actuator characteristic. Element 311 is a transfer function of the actuator mechanism that drives the movable magnetic head H. Element 312 is a coil resistance of the actuator. Element 313 is a gain of the drive amplifier. Equivalent circuits 421–428 in the state estimator 420 represent observer transfer functions to estimate the speed of the actuator. Denoted 421 is an equivalent circuit of the spring constant in the actuator model; 422 an equivalent circuit representing an actuator coil resistance, an actuator torque constant and a drive amplifier gain; 423 an equivalent circuit representing a viscosity constant an a movable portion mass of the actuator; 424 a transfer function of the integral characteristic; 425 an observer gain inserted to stabilize the loop that converges the difference or error between the actual measurement and the state model made up of 421–424; 426 an observer loop gain for converging the difference similar to the one for the observer gain 425; and 427 a speed feedback gain to feed back the estimated speed. FIGS. 62(a) and 64(b) are comparisons of the actuator transfer characteristics (gain characteristic and phase characteristic) when the damping loop is applied by the observer and when it is not.

Figure 65:
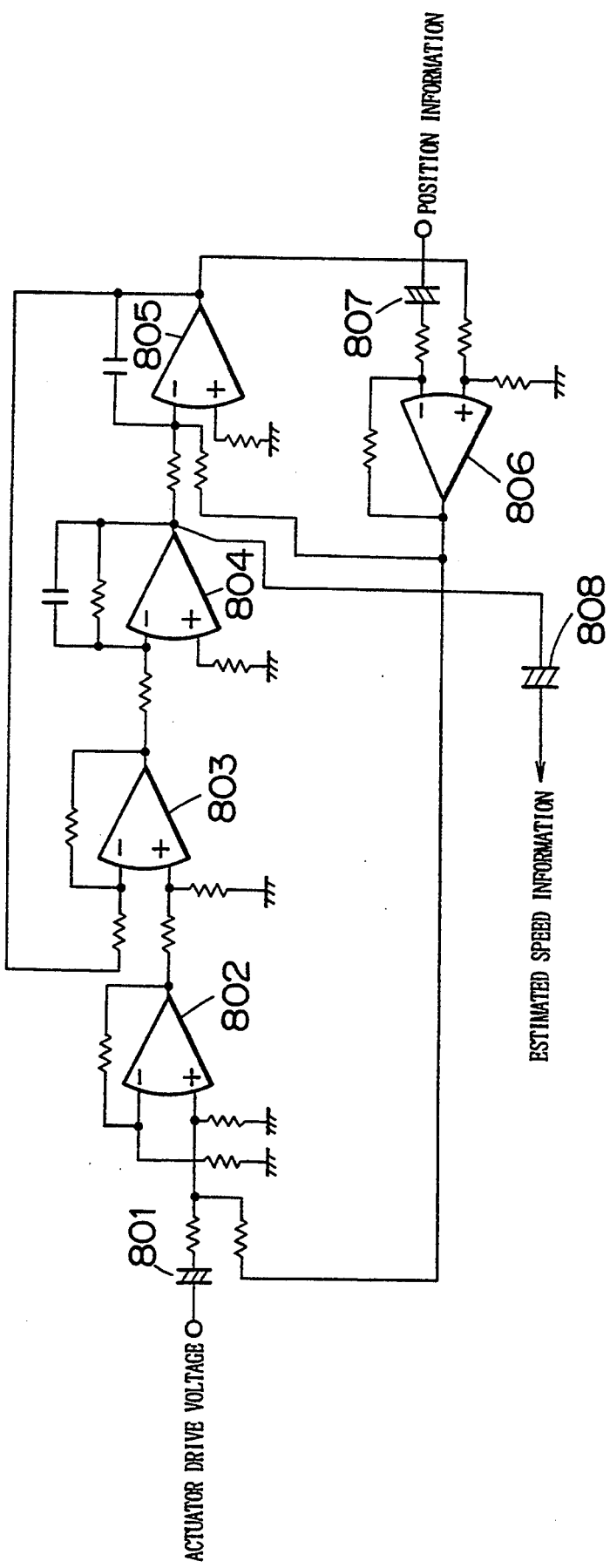
FIG. 65 is a circuitry showing an example electric circuit of the ninth embodiment.

FIG. 65 shows one example circuit configuration of the above-mentioned observer. In the figure, reference numeral 801 denotes a capacitor for picking up only the ac component of the actuator drive voltage; 802 an amplifier for adding the feedback signal and the drive signal within the observer and amplifying the sum signal; 803 an amplifier for feeding back the loop that simulates the spring constant in the observer; 804 a filter used to realize the transfer characteristic that simulates the actuator viscosity and mass in the observer; 805 a filter forming the integrator in the observer; 806 a comparator to derive a difference between the position information and the estimated position information in the observer; 807 a capacitor to pick up only the ac components contained in the position information; and 808 a capacitor to pick up only ac components contained in the estimated speed information.

Figure 67A:
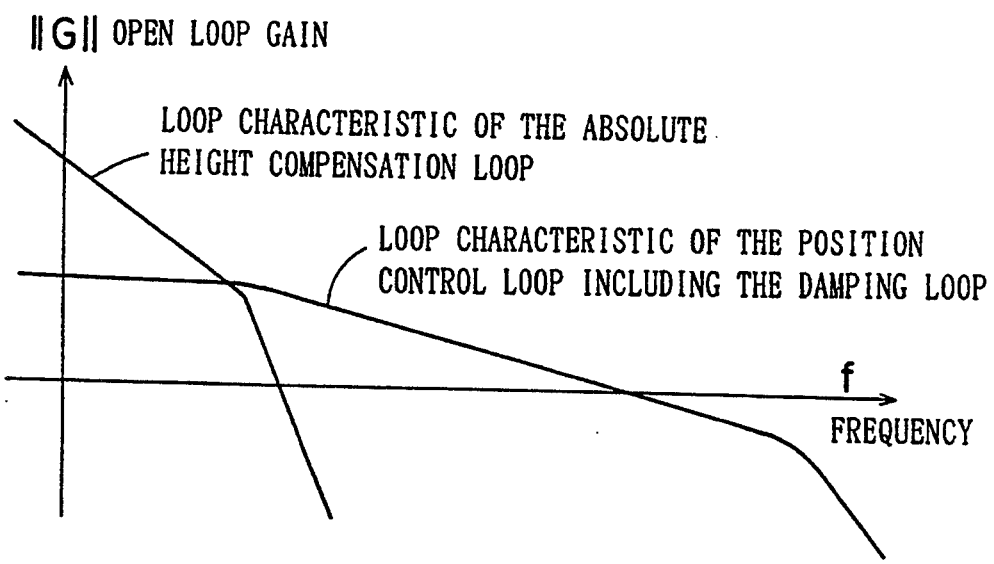
FIGS. 67(a) and 67(b) are open loop characteristics of the position controller of FIG. 66.
Figure 67B:
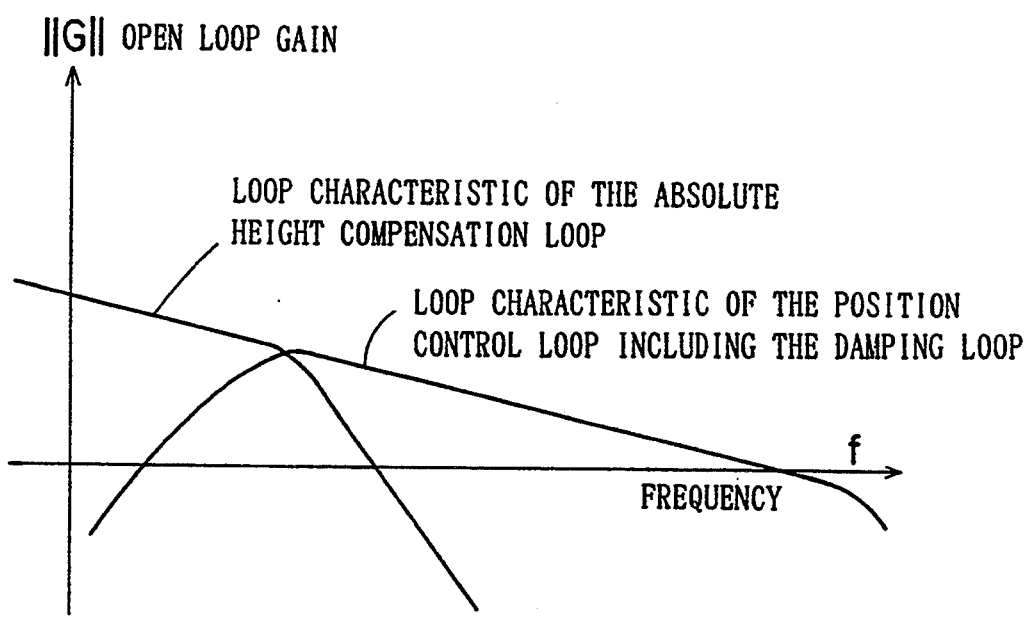

FIG. 66 is an example block diagram of the invention, in which a damping loop and a position loop are formed by using the position sensor (FIGS. 58–62) of the actuator movable portion and the state estimator 103 and in which the low range (dc component) of the position control loop of FIG. 66 is compensated for by the absolute height detection circuit 105 of the conventional circuit of FIG. 91 or improved circuit of FIGS. 95, 98, 100 and 103 according to the output of the absolute height sensor 106, which uses the conventional ac magnetic field generating coil 45 and the ac magnetic field detection circuit (FIG. 56). FIG. 67a is a graph showing the open loop characteristic for the block diagram of FIG. 66. FIG. 67b is a graph showing the open loop characteristic when a compensation method different from that of FIG. 67a is employed.

Figure 68A:
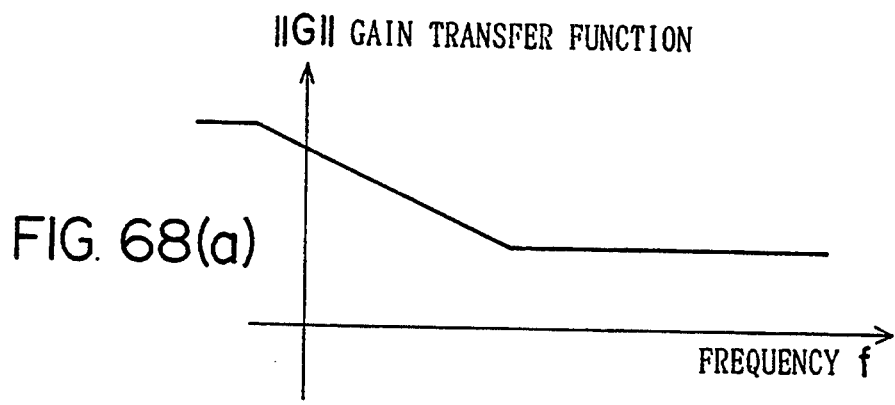
FIG. 68a is a block diagram of the low-frequency compensation circuit in the magnetic head position controller shown in FIGS. 66 and 68(a)–68d are its gain transfer characteristic.
Figure 68B:
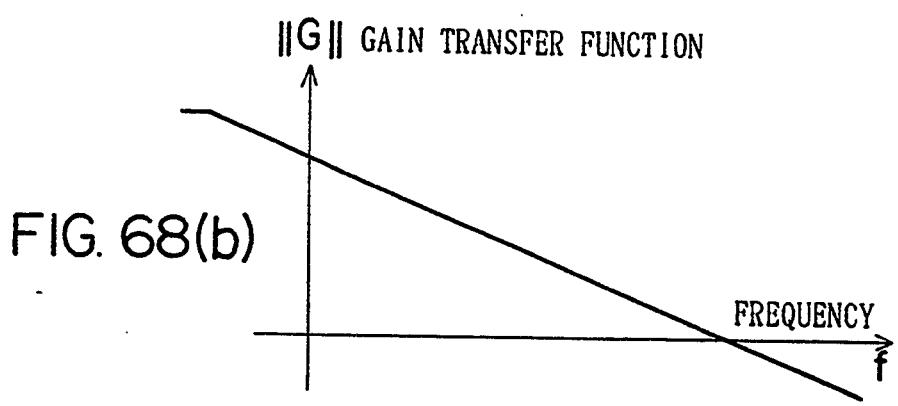
Figure 68C:
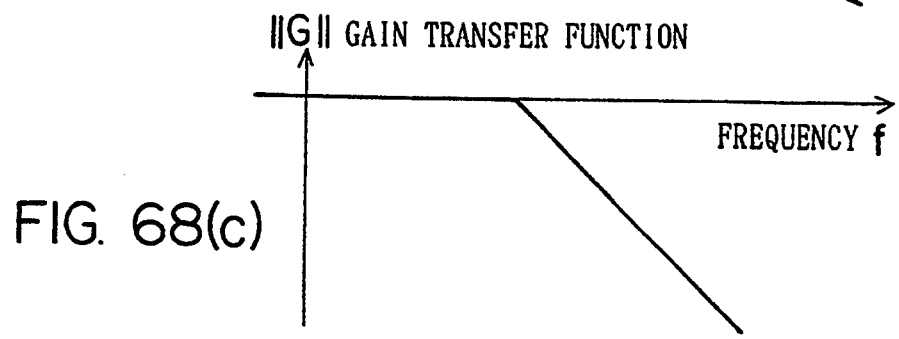
Figure 68D:
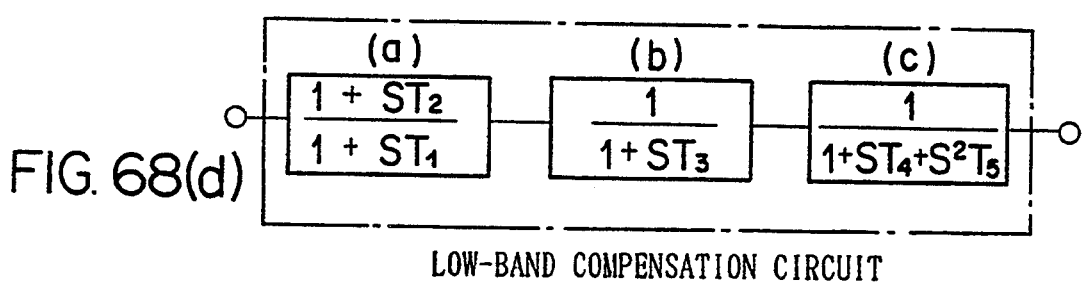

FIG. 68 shows the detail of the low-range compensation circuit 101 in the block diagram of FIG. 66, with FIGS. 68(a) to 68(c) representing the transfer characteristics of the compensation filters.

Figure 70:
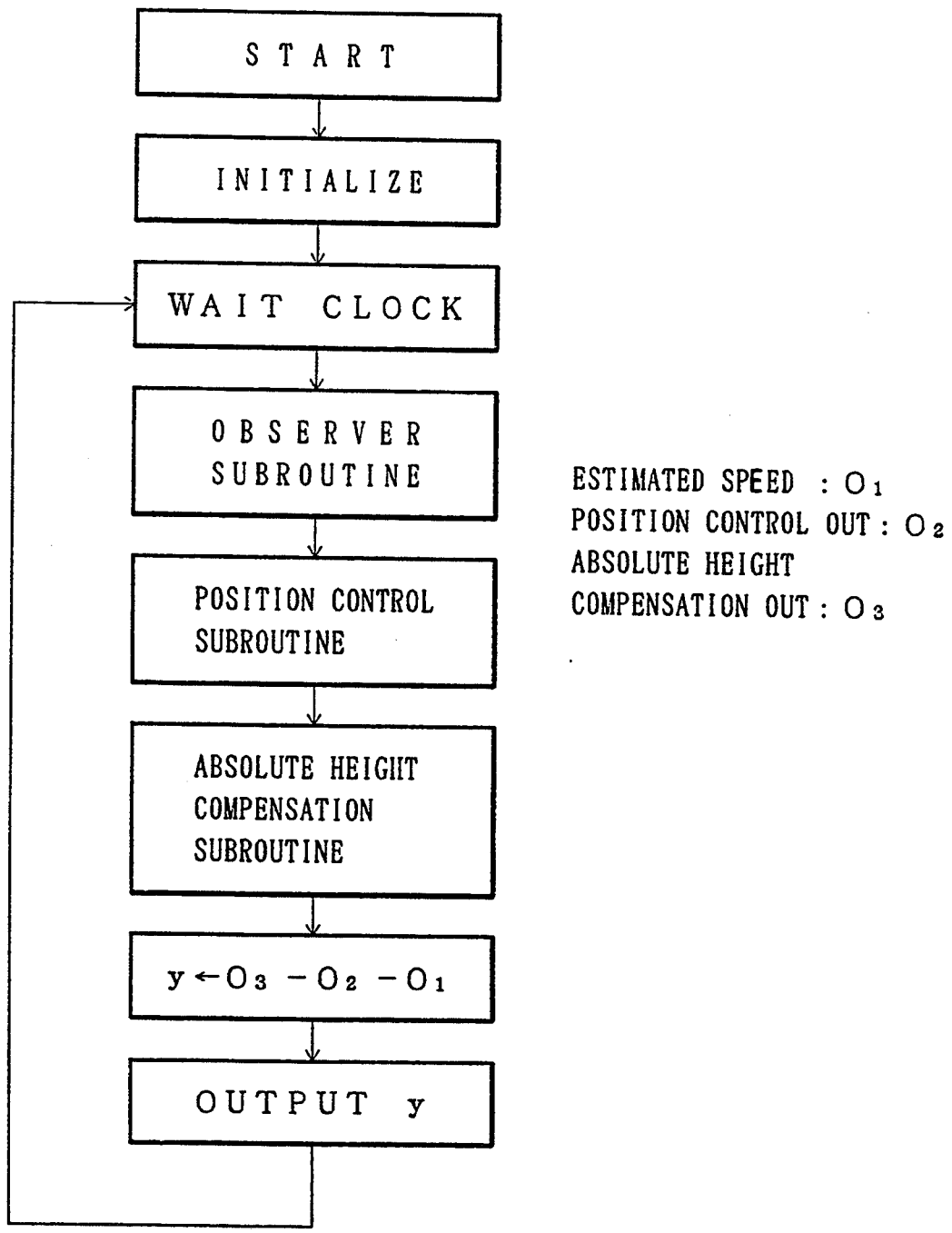
FIG. 70 is a flowchart of the main program when the control system of the ninth embodiment is realized by software.

FIG. 70 is a flowchart of the main program when the control system in the block diagram of FIG. 66 is realized by software calculation.

Figure 71:
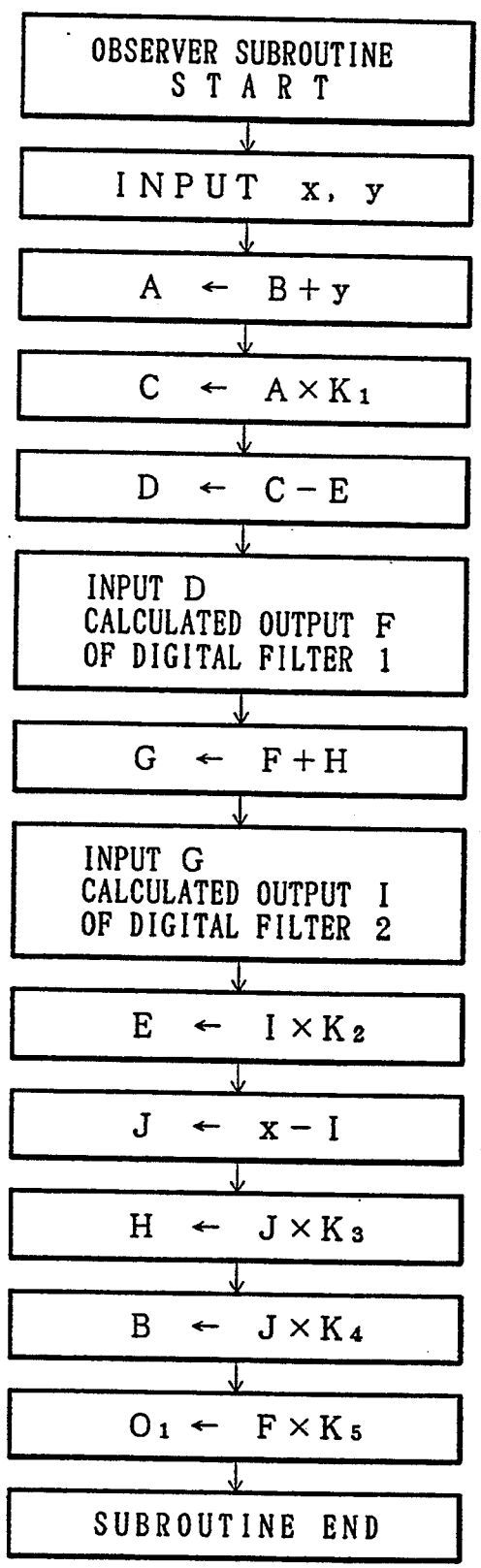
FIG. 71 is a flowchart of the subroutine program of the state estimator when the control system of the ninth embodiment is realized by software.

FIG. 71 is a flowchart of a subroutine program of the speed estimation observer which represents the operation performed by software of the state estimator 103 in the block diagram 66.

Figure 72:
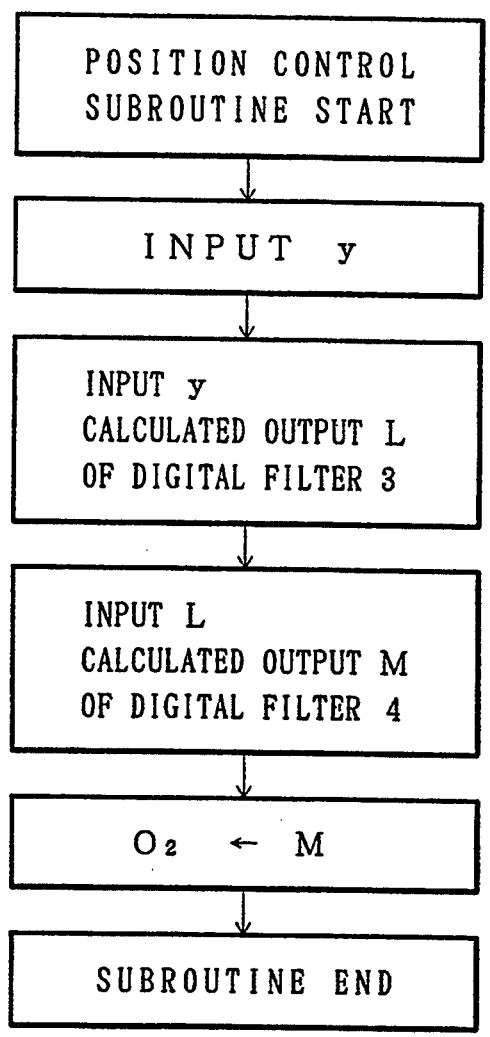
FIG. 72 is a flowchart of the subroutine program of the position control compensator when the control system of the ninth embodiment is realized by software.

FIG. 72 is a flowchart of a subroutine program of the position control compensator which represents the operation performed by software of the position control compensator 102 in the block diagram 66.

Figure 73:
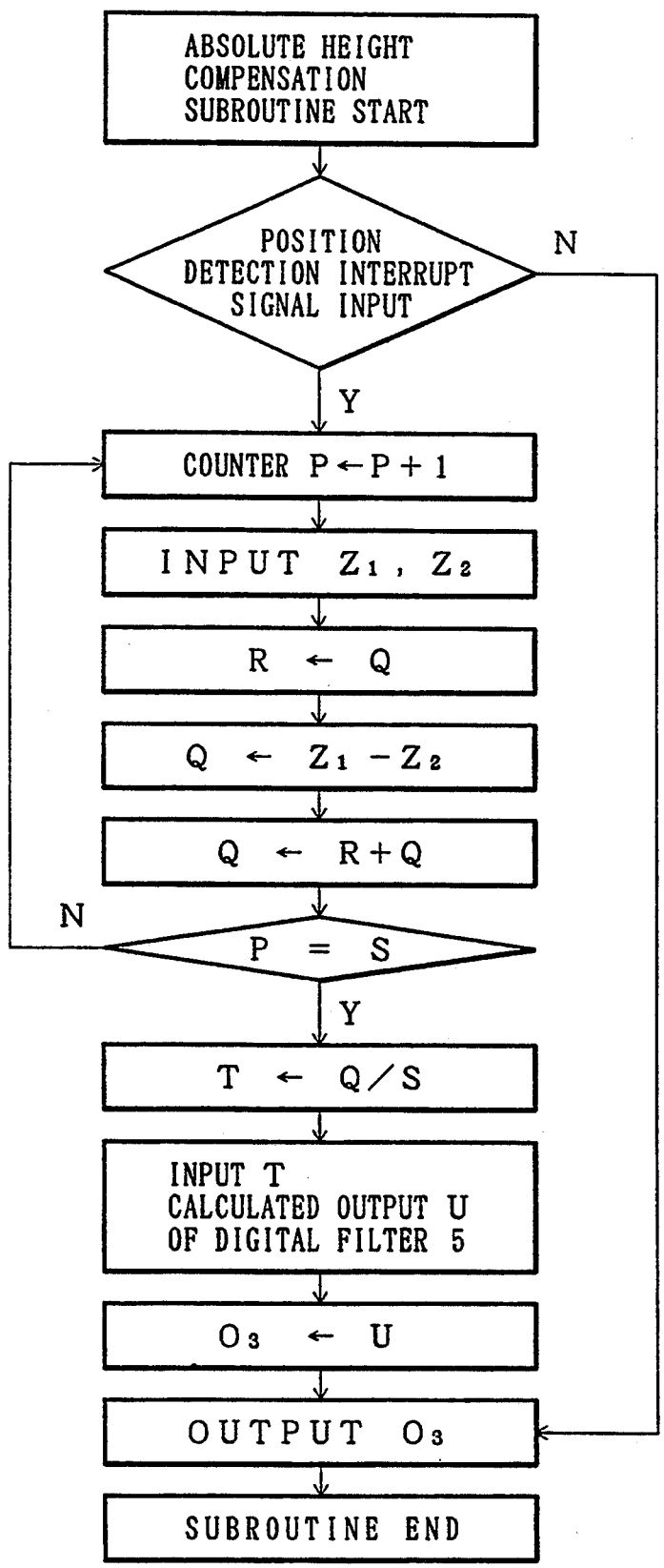
FIG. 73 is a flowchart of the absolute height compensation subroutine program when the control system of the ninth embodiment is realized by software.

FIG. 73 is a flowchart of a subroutine program of the absolute height compensation loop which represents the operation performed by software of the absolute height compensation loop in the block diagram 66.

FIG. 74(b) is an example configuration of the control system using the above-mentioned observer that performs according to the position detection by the hole sensor. In FIG. 74(a) reference numeral 510 represents a printed circuit card incorporated in the drum.

Figure 75:
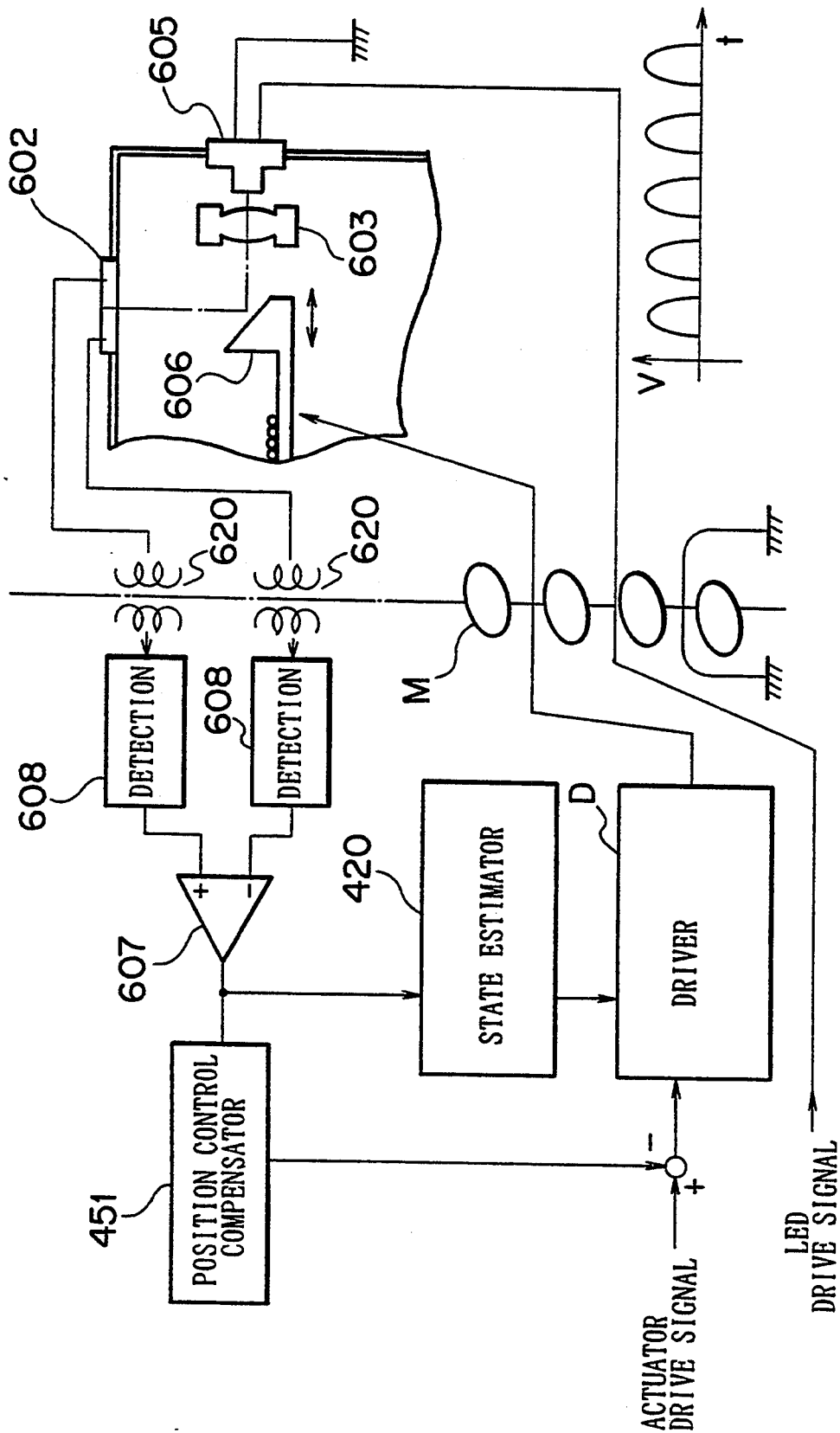
FIG. 75 is an overall configuration of the actuator position detecting device of the ninth embodiment.

FIG. 75 shows an example configuration which detects the actuator position by an optical sensor and which does not incorporate the above-mentioned observer circuit and driver circuit in the rotating drum. In the figure, denoted 608 is a detection circuit.

Figure 76:
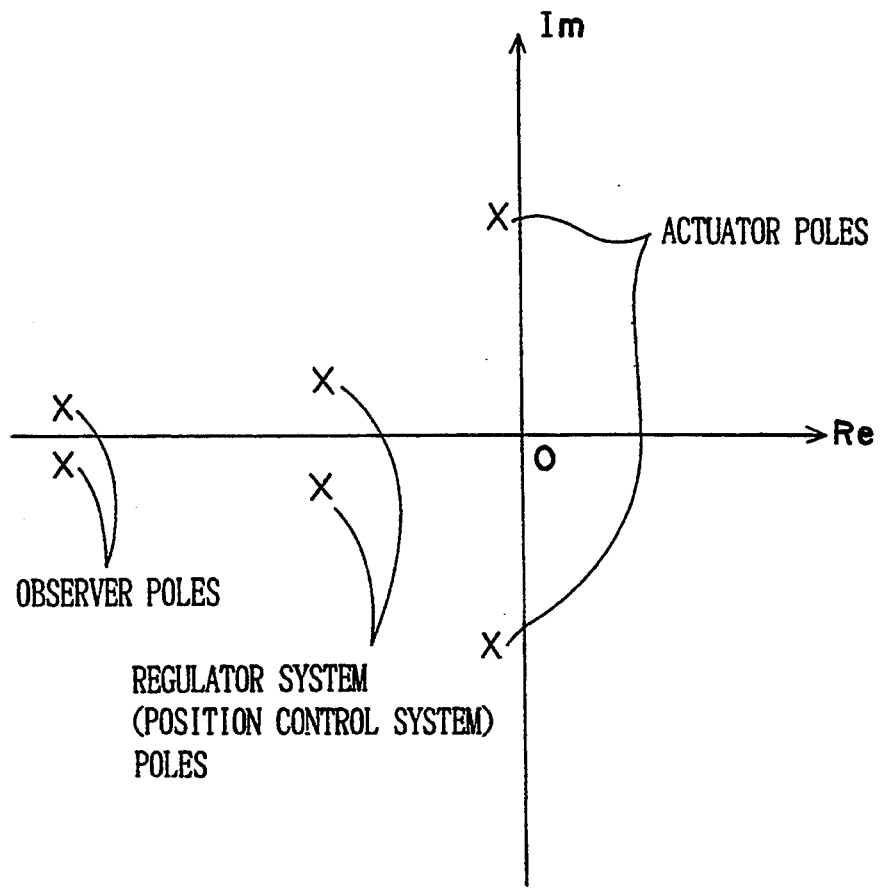
FIG. 76 is a schematic view showing the pole arrangement of the actuator, tracking control system and observer.

FIG. 76 shows the pole arrangement of the actuator, the tracking control system and the observer.

Figure 77:
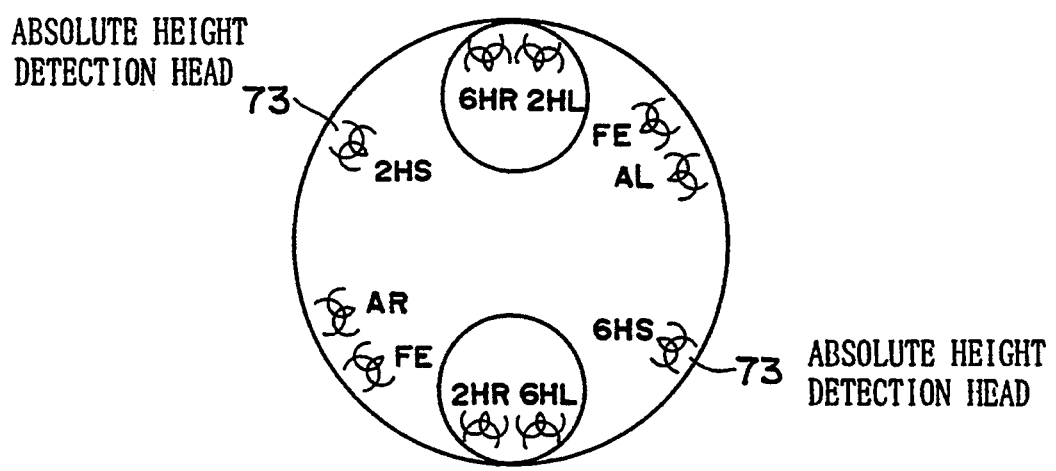
FIG. 77 is a diagram showing the head arrangement on the rotating drum of the magnetic head and the absolute height detection head of this embodiment.

FIG. 77 shows the head arrangement on the rotating drum of the magnetic heads and the absolute height detecting heads.

Figure 78:
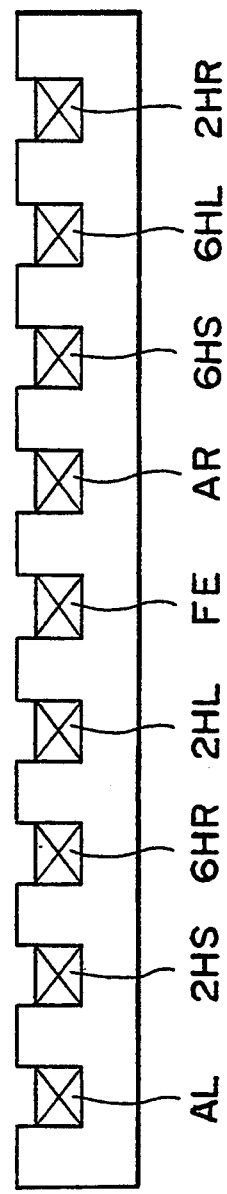
FIG. 78 is a diagram showing an example channel arrangement of a flat-plate type rotary transformer for transmitting signals from the rotating drum in the embodiment.

FIG. 78 shows one example channel arrangement of a plane type rotary transformer for signal transfer installed in the rotating drum.

Figure 79:
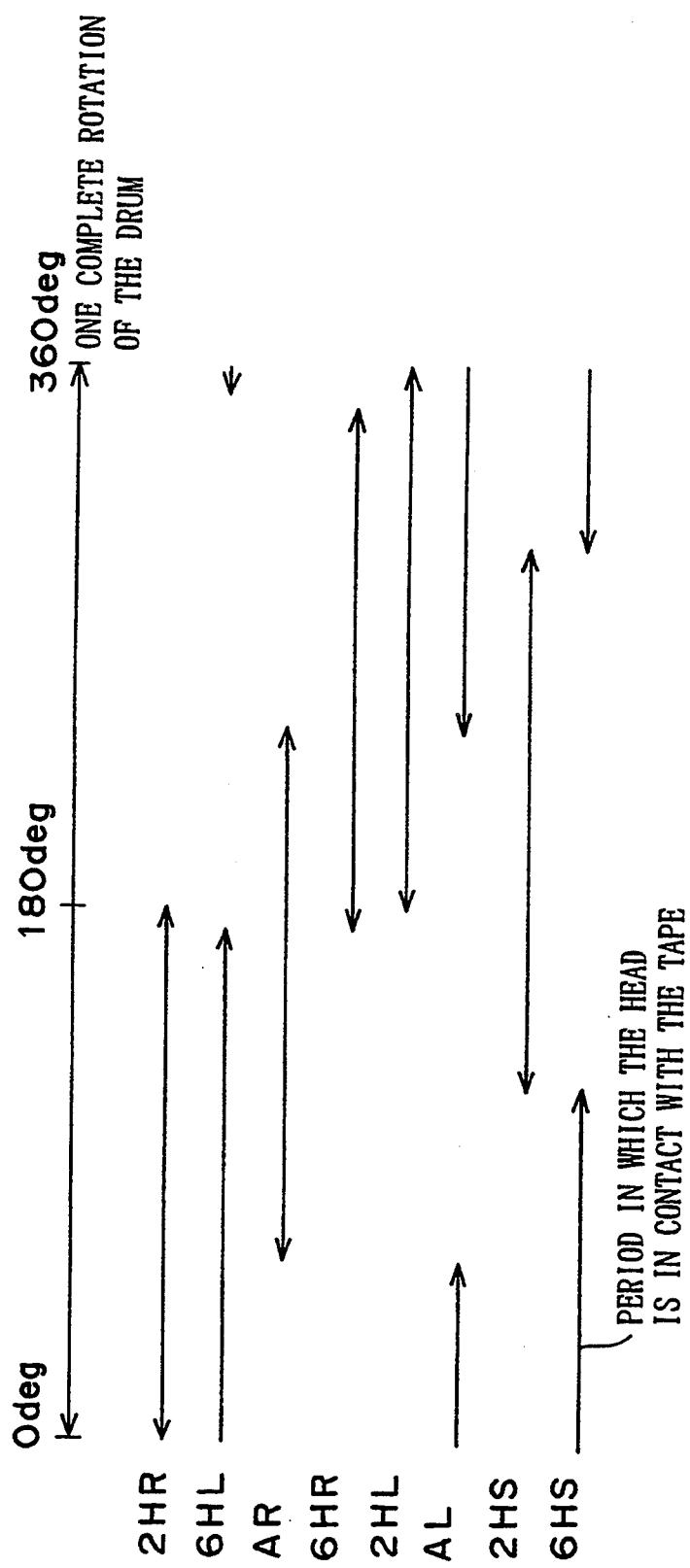
FIG. 79 is a diagram showing the period in which the magnetic head on the rotating drum of FIG. 77 is in contact with the tape of the absolute height detection element.

FIG. 79 shows the time duration in which the heads are in contact with the tape during one rotation according to the arrangement of the heads and the absolute height detection elements, with the 2HR head taken as a reference.

In the conventional system, the mounting position of the ac magnetic field generating coil 45 represents the absolute height of the movable head from the deck base.

That is, in the conventional system, when the magnetic heads are positioned at such heights that the output levels of the two ac magnetic field generating coils 45, 45a reproduced from the magnetic heads are equal, the absolute height reference varies depending on the precision of the mounting position on the deck base of the ac magnetic field generating coils 45, 45a.

Although the heights of other stationary heads can be used as the absolute height reference for the movable heads, the problem in this case is that the movable head can only be controlled to the same heights as the other stationary heads.

These drawbacks stem from the fact that since the magnetic field generated by the ac magnetic field generating coil 45 and the magnetic head-head amplifier detection sensitivity change according to temperature variations, the control system is configured to control the head position so that the difference between the two detection signals will be zero, in order to eliminate the characteristic variations.

When a recording pattern strictly conforming to the format of the tape is to be recorded in the present VTR that can cope with various recording formats, the movable heads may have to be controlled not at the same height as the other stationary heads but at a position slightly deviated from the height of other stationary heads.

This may be achieved as follows. Two magnetic heads are mounted as shown in FIG. 54, and the wide track pitch head 36 performs the magnetic recording and the narrow track pitch head 35 reproduces the height detection ac magnetic field to close the conventional magnetic head height control system. The control is performed so that the narrow track mode head 35 is at the same height as the stationary head (for example, audio head), which is taken as a reference height position. With this arrangement, the reference height of the wide track pitch head after being controlled can be shifted by as much as the height of the spacer 72.

Since the height detection ac magnetic field reproducing head does not have to perform the magnetic recording and replay on the tape, a simple magnetic field detector of the construction shown in FIG. 55 may be employed. There is no need to set the gap and the amount of projection from the drum surface with a strict precision. It is, however, noted that the projecting amount must not be so large as to damage the magnetic tape.

The magnetic field detector 73 of such a simple construction is mounted and adjusted to a desired height to which the movable head is to be controlled. During the recording and replay, the movable head can be controlled to a desired absolute height by operating the conventional control system so that the movable head is at the same height as the detector 73.

With the above means, it is possible to check if the movable head is at the desired absolute height with good precision.

The current applied to the magnetic field generating coil to produce an ac magnetic field, which is used to detect the absolute height, can be increased to an extent that the signal is not deteriorated by electromagnetic interference with the head amplifier in the VTR. Increasing the magnetic field intensity generated by the magnetic field generating coil enhances the detection sensitivity of the absolute height of the head, improving the precision of the control system's follow-up control to the target value.

In this case, if the signal reproducing amplifier incorporated in the conventional VTR system is used, the signal may become saturated because of the dynamic range of the reproducing amplifier. This is because the field generated by the ac magnetic field generating coil is extremely stronger than the weak field produced by the magnetic tape.

For this reason, the height detection ac signal produced via the rotary transformer must be amplified by a separate amplifier other than the conventional amplifier, as shown in FIG. 56. FIG. 56 shows the amplifier circuit for the purpose. Since the height detection signal is produced when the detection head is on the rear side of the drum where it is not in contact with the magnetic tape, the signal can be picked up through the switching transistor of FIG. 56.

By switching the four transistors 76 into the mode shown in the figure, the amplification system can be set to the record and replay mode, the detection mode or the non-operation mode. During the recording and replay, the mode of the switching transistors need be selected according to the rotating position of the detection head, as shown in FIG. 57. When the above-mentioned simple detector 73 that reproduces only the height detection signal is used, there is no need to form the amplification circuit shown in FIG. 56 and the amplification circuit can be formed simply as a combination of the band-pass filter and the position detection signal amplifier.

The channel arrangement in the rotary transformer for the heads and the absolute height detection head on the drum must be such that the channel through which the recording current flows and the absolute height detection channel must be set apart from each other on the rotary transformer.

In the system having the head arrangement of FIG. 77 in the current VHS VTR, for example, the rotary transformer has the channel arrangement of FIG. 78. The relation between the recording current channel and the height detection channel is explained by the schematic diagram of FIG. 79, which shows the duration in which the head and the tape are in sliding contact in the head arrangement of FIG. 78 with the head 2HR taken as a reference.

In FIG. 79, the heads 2HR, 6HL, AR are in sliding contact with the tape almost at the same time and the heads 2HL, 6HR, AL are also in sliding contact with the tape almost simultaneously. Hence, the channels for the heads 2HL, 6HR, AL must be separated from those for the heads 2HR, 6HL, AR in the rotary transformer so that the height detection can be made of the heads 2HL, 6HR, AL when the heads 2HR, 6HL, AR are recording. (When the heads 2HL, 6HR, AL are recording, the other group of heads are subjected to the height-detection.)

Generally the audio head and the video head are put apart from each other to eliminate cross-talk. For this purpose, the following arrangement can be made. The channel for the flying erase head that normally is not used during the replay operation and the channels for the height detectors 2HS, 6HS are placed between the channels for the audio and video heads. During the replay, the rotary transformer terminals for these channels are shorted to provide an effect of the short ring, which is used in the current VTRs to prevent cross-talk between the rotary transformer channels.

The detector 2HS is adjusted to the reference height of the movable head 2H and the detector 6HS is adjusted to the reference height of the movable head 6H.

Since the conventional system has only one location to detect the height of the movable head during one rotation of the drum, the control can only be performed once for each rotation of the drum. In car-mounted systems or portable systems where the equipment as a whole is subjected to external vibrations, for example, the movable head may be vibrated or shifted during one rotation of the drum, resulting in a failure to perform recording in accordance with the tape format.

This problem becomes prominent particularly when the magnetic recording density is improved in the future and the track pitch becomes very narrow.

In addition to performing the absolute height control once for each drum rotation, it is therefore necessary to provide a construction in which the movable head is fixed at a specified position to make the head less susceptible to vibrations.

For this purpose, a means must be provided to allow the detection of the movable head height at all times, not just once for each drum rotation.

In this case, if the above mentioned detection means, which detects the absolute height of the drum once for each drum rotation, is also used, the absolute value of the sensor, which detects the height at all times, need not be so accurate.

That is, the head height deviation resulting from vibrations during drum rotation can be eliminated by measuring the absolute height of the movable head based on the magnetic field reproduced by the ac magnetic field generating coil and by controlling the movable head so that the output of the sensor, which can detect the movable head height at all times, is constant during the period from the first detection of the absolute height to the next detection.

A position sensor is therefore indispensable which detects the position of the movable head in the position control system during one rotation of the drum.

FIG. 58 shows one example structure of such a sensor. To detect the motion of the movable head H, the magnet 502 is connected to the movable portion 203b so that the hole sensor 503 can measure the flux density as the magnet 502 on the movable portion 203b comes near or far. The hole sensor sends the measured flux density to the amplifier 504, which produces an output representing the position of the movable portion.

The magnet 502 is enclosed by a magnet holder 501 made of a material with high permeability so that the leakage flux will not influence the magnetic head H.

FIG. 59 is a variation of FIG. 58, in which a magnet 505 is secured to one end of the gimbals spring 203a where the magnetic head is not attached and in which the yoke 202 is formed with a hole through which the magnetic flux of the magnet 505 leaks so that the leakage flux can be detected by the hole sensor 506 fixed on the base plate 507.

The intensity of the flux from the magnet 505 represents the position of the movable portion of the actuator. This is the same as in FIG. 58. In this variation, there is no need to consider the effects the leakage flux of the magnet 505 has on the magnetic head H.

In addition to the above magnetic means of detecting the head position, there is available an optical method of position detection.

FIG. 60 shows an example. The light emitted from the light emitting element 601 attached to the stationary side of the actuator (in this case, light is collimated by a lens) is detected by a light receiving element 602 such as a two section photodiode attached to the movable portion of the actuator.

As the movable portion moves, the amount of light striking one of the two divided portions of the photodiode 602 becomes larger than that on the other. By taking the difference between the photocurrents in the two divided portions of the photodiode 602, it is possible to detect the position of the movable portion.

FIG. 61 shows a variation of FIG. 60, in which the movable portion of the actuator is attached with a mirror 606 that reflects light and the light emitting element 601 and the light receiving element 602 such as a photodiode are fixed to the stationary side.

In this case, too, the light emitted from the light emitting element 605 made up of LED or semiconductor laser is collimated by the lens 603 into a parallel-ray beam. To produce a parallel-ray beam, the light emitting element 605 must be put on the rear focal point of the lens 603.

The optical sensor of FIG. 61 performs the position detection in the same principle of FIG. 62.

In FIG. 62, when the mirror 606 integral with the movable portion of the actuator moves parallelly (in this configuration, the mirror is restricted by the gimbals spring so that it can move in only one axis direction), the parallel-ray beam moves over the light receiving element 602, causing a difference between the amounts of photocurrents in two divided portions of the photodiode 602 with the result that the differential amplifier 607 produces a position detection signal.

The optical means for position detection may also have the light emitting element attached to the movable portion and the light receiving element on the stationary side and still produce the same effect.

In addition to the above magnetic and optical position detecting means, there are other methods available. For example, an element generally called a strain gauge, which changes its magnetic resistance when strained, may be bonded to a leaf spring or gimbals spring in the movable head actuator so that the deformation of the leaf spring or gimbals spring can be detected as a change in the resistance value. This can be done either by reading a change in the voltage when a specified current is applied to the strain gauge or by reading a voltage across a current detection resistor inserted in series with the strain gauge when applied with a specified voltage.

The following arrangement is also possible. A sensor to detect a capacitance is provided near the movable portion of the actuator in such a way that the distance between the capacitance sensor and the movable portion changes as the movable portion moves. By electrically measuring the capacitance of the capacitance sensor, it is possible to determine the position of the movable portion.

Where the conventional bimorph type actuator is used, it is possible to pick up a quantity other than the dc component in the bimorph displacement by cutting a part of the bimorph as shown in the conventional example.

In this case, although the displacement output does not include the dc component, since the movable head position control during one rotation of the drum does not necessarily require the dc component, the displacement output can be entered as the position detection signal which is used for the position control.

Another possible arrangement is that the output of the position sensor, which detects the movable head height at all times, is used to form an electrical damping loop made up of a state estimator, thereby suppressing the mechanical resonance of the actuator, improving the controllability of the movable head height, and making the head more resistant to external vibrations.

The above-mentioned position control loop, which uses the output from the continuously detectable position sensor, has a function of preventing the control frequency band from being limited to a low frequency range as will be caused by the mechanical resonance of the movable head actuator.

The magnetic head must be moved only in one direction in the drum, i.e., in a direction parallel to the rotating axis of the drum. In the conventional examples of bimorph type or solenoid-driven type, a cantilever member or a leaf-spring member must be used to set the magnetic head apart from the driving portion or the head must be mounted at the end of the plate-like member.

In this construction of the conventional bimorph type or solenoid-driven type actuator, there is a large mechanical resonance, characteristic of the leaf-spring structure, as seen in the actuator transfer characteristic (displacement-drive voltage or displacement-drive current characteristic).

This large mechanical resonance shifts by 180 degrees the phase of frequencies near the resonance frequency, so that the position control system, which compensates for the phase delay, can have only a control frequency band sufficiently lower than the first-order resonance frequency, or generally in the range of 1/10 to 1/several tens of the first-order resonance frequency.

This is because a sufficient phase margin of the control system cannot be secured as a result of phase shift at frequencies near the resonance frequency and also because a large resonance peak gain reduces the gain margin for the frequencies beyond the control frequency band, rendering the control system unstable. (Generally, the control system open loop gain must be in the range of −10 to −20 dB at frequencies which are higher than the control frequency band and whose phase is −180 degrees.)

Where the phase advance compensation is performed and the control band is put between the first-order and the second-order resonance, it is necessary that the first-order mechanical resonance frequency be sufficiently apart from the second-order resonance frequency or the anti-resonance frequency. In a system having a leaf-spring-like movable portion as in the movable head actuator of VTR, however, a difference cannot be taken between the first-order resonance frequency and the frequencies beyond the second-order resonance frequency and thus the above-mentioned phase advance compensation is not often used.

Therefore, it is necessary to convert the actuator into the one with good controllability by electrically damping large mechanical resonance characteristics, representative of the movable head actuator of VTR. If, however, the system is formed of differential circuits as in the conventional examples, the noise of the position sensor is amplified, undesirably deteriorating the tracking control performance.

When the actuator speed is estimated by the state estimator 420, which employs an integrating circuit as shown in FIG. 63, it is possible to perform the tracking control without amplifying noise and eliminate influences of high-order mechanical resonances.

The state estimator expressed by the transfer function of FIG. 63 shows an example configuration of the equal-dimension observer of the modern control logic. The state estimator includes equivalent circuits that simulate a drive amplifier 313, coil resistor 312, and actuator mechanism 311, respectively.

The drive voltage applied to the drive amplifier 313 is also supplied to the elements in the state estimator 420. The equivalent circuit 424 produces at its output a a signal I representing the position of the actuator estimated from the input of the state estimator. The signal is supplied to the input of the subtractor 428.

A signal X representing the displacement of the actuator actually measured by a sensor, which is described later, is fed to the subtractor 428. The subtractor 428 produces a difference X-I as an estimated error J.

The transfer characteristics of elements 422, 423, 424 in the state estimator simulating the actuator characteristic have second-order integral characteristic. These elements, however, do not simulate the integral characteristic of the real actuator in the initialized state, too. While the real actuator is affected with external disturbances before the integral characteristic, the equivalent circuit cannot simulate the external disturbances as well. Because of these facts, even if the equivalent circuit is identical with the real actuator in terms of the frequency characteristic, the dynamic characteristic, which is an output value of the equivalent circuit after specified intervals of time, is not the same as that of the real actuator.

For this reason, the feedback is applied through gains $F_1$, $F_2$ of the equivalent circuits 425, 426 so that the estimated error will converge to zero.

Hence, after a certain period of time the feedback gains in the state estimator work to converge the estimated difference to zero, so that the estimated position I output from the equivalent circuit 424 and the actually measured position X become equal.

At this time, the equivalent circuit 423 that performs the function of $1/(C+MS)$ differentiates the position and its output F is equal to the speed of the actuator.

Feeding back the actuator speed, estimated in the principle shown above, to the control loop through the gain $F_3$ of the equivalent circuit 427 forms a new speed feedback loop, as in the regulator of modern control logic, applying damping to the mechanical resonance characteristic of the actuator.

Figure 64:
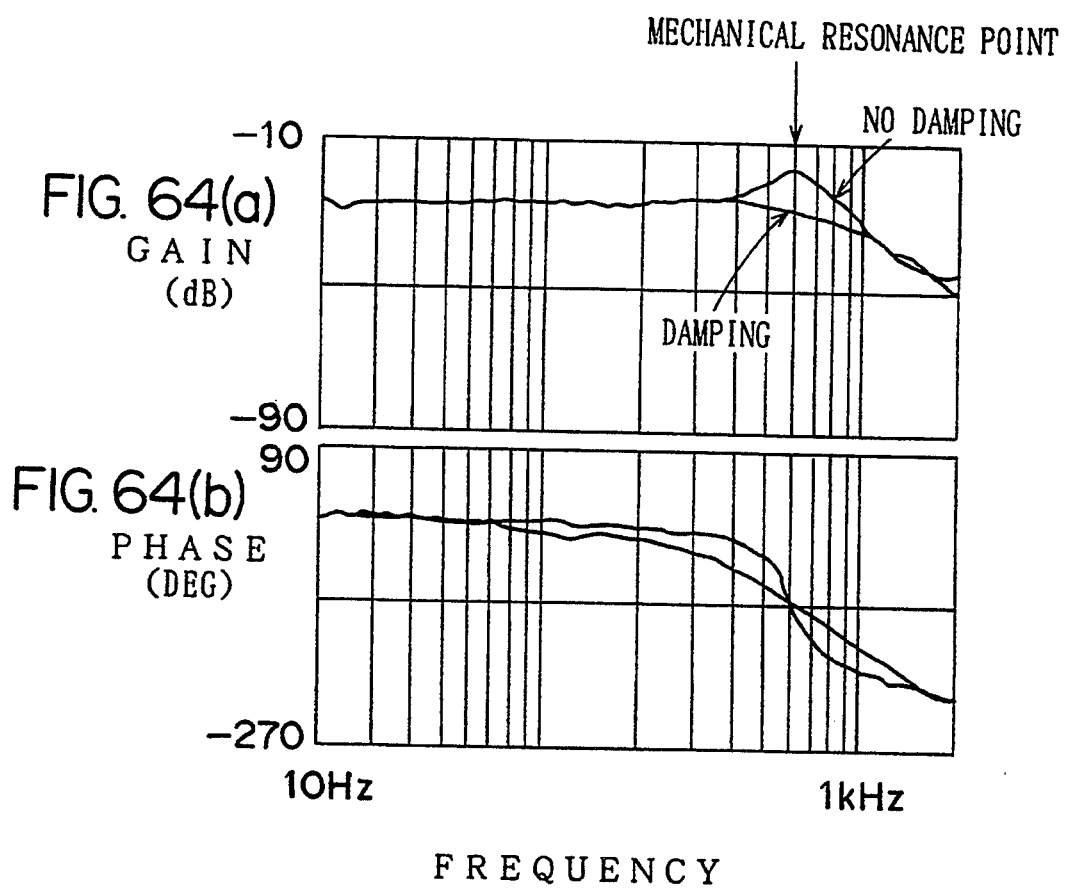
FIGS. 64(a) and 64(b) are graphs showing an improvement in the characteristic of the solenoid-driven actuator of the ninth embodiment.

FIG. 64 is a graph showing the measured actuator frequency characteristic that verifies the above. It is seen that the dynamic characteristic of the actuator when the speed feedback is provided by the state estimator is damped, reducing the resonance peak gain.

What is described in the foregoing refers to a case where the state estimator 420 that estimates the actuator speed is formed of an equal-dimemsion observer of modern control logic. The same effect can be obtained if the state estimator is formed of a minimal-dimension observer.

In this case, the elements mentioned above that simulate the actuator characteristic are not used. The state equation representing the actuator characteristic is solved by the general minimal-dimension observer algorithm and the solved result is realized by circuits.

Let M stand for an actuator movable portion; k for an actuator mass; C for an actuator viscosity; $(x_1-)$ for an estimated actuator position; $(x_2-)$ for an estimated actuator position; u for an input; Ce for an estimated error; and $(y-)$ for a state estimator output. Then the actuator state equation is given by $$\frac{d}{dt}\begin{bmatrix}(x_1-)\\(x_2-)\end{bmatrix}=\begin{bmatrix}0 & 1\\-k/M & -C/M\end{bmatrix} \quad \text{(Equation 1)}$$

$$\begin{bmatrix}(x_1-)\\(x_2-)\end{bmatrix}+\begin{bmatrix}0\\1/M\end{bmatrix}u-\begin{bmatrix}F_1\\F_2\end{bmatrix}Ce$$

If we let the observer polarities be $-\alpha_1$ and $-\alpha_2$ in accordance with the definition of the arbitrary pole arrangement in the modern control logic, the gains $F_1$ and $F_2$ are expressed as $$\begin{bmatrix} F_1 \\ F_2 \end{bmatrix} = \begin{bmatrix} \alpha_1 + \alpha_2 - C/M \\ \alpha_1\alpha_2 - k/M - (\alpha_1 + \alpha_2)C/M - C^2/M^2 \end{bmatrix} \quad \text{(Equation 2)}$$

Solving the above equation gives the gains $F_1$, $F_2$.

However, since the convergence of the loop including the gain $F_1$ (element 425) and of the loop including the gain $F_2$ (element 426) in the state estimator 420 must be sufficiently faster than the convergence of the tracking control system as a whole, the value of $\alpha_1$, $\alpha_2$ in Equation 2 should be set sufficiently to the left (on the side of a large negative real number=on the fast convergence side) of the regulator system pole (tracking control system pole) for the pole position in a diagram representing the response of the system in the control logic of FIG. 76.

The actual state estimator may be formed with analog circuitry as shown in, for example, FIG. 65.

Since the analog differential amplifier easily produces an offset due to temperature drift, it is preferred that capacitors 801, 807 be inserted to remove dc components from the actuator drive voltage input to the state estimator 420 and the position information input from the position sensor.

In this tracking control system, because the main frequency range that requires damping is close to the frequency where mechanical resonance exists, the dc components are not needed. Therefore, the use of capacitors does not pose any problem.

The circuit of FIG. 65 simulates the observer transfer characteristic of FIG. 63 R, Kd, Kt, k, $F_1$, $F_2$ in FIG. 63 exist as the gains of the operational amplifiers in FIG. 65. The equivalent circuit 423 of $1/(C+Ms)$ is formed of an active filter of the operational amplifier 804, and the integrator 307 is formed of an operational amplifier 805.

The subtracting portion X-I in FIG. 63 is formed of an operational amplifier 806. The output of the operational amplifier 806 is fed back to the input terminal of the operational amplifier through the gains corresponding to $F_1$, $F_2$ of FIG. 63.

In the configuration of FIG. 65, the operational amplifiers 803, 804 may be formed as a single active filter to eliminate one operational amplifier.

Although the above configuration is an example analog circuit of the state estimator, it is possible to describe the transfer function of FIG. 63 by software for use with a microprocessor as described later and provide the similar effects.

FIG. 66 shows the block diagram of the movable head height control system which uses both the sensor for detecting the movable head height and the sensor using the ac magnetic field generating coil for detecting the absolute height.

The damping loop made up of the state estimator, which estimates the actuator speed, improves the controllability of the actuator 107. In addition to this loop, a position control loop is formed which includes a position control compensator.

The absolute height, a dc component of the position control loop, is compensated for by the absolute height compensation loop made up of the ac magnetic field generating coil.

In the system of FIG. 66, if the position control loop and the damping control loop are not provided, only the absolute height control for each drum rotation is performed, making the height deviation during one rotation easy to occur.

If only the damping loop is not provided, the control band for the position control loop cannot be increased, weakening the height deviation suppression factor during one rotation, with the result that the head is easily vibrated. When only the position control loop is not provided, the vibration becomes hard to occur but the height deviation factor during one rotation becomes nearly zero.

Even when the above two minor loops are eliminated from the absolute height compensation loop, there is no problem if the mechanical characteristic of the actuator movable portion has high stiffness or high viscosity. In that case, the configuration of FIG. 66 with these minor loops eliminated can be realized.

In the system of FIG. 66, the open loop gain characteristic of the absolute height compensation loop and of the position control loop including the damping loop are so set that the gain is higher for the absolute height compensation loop in the low frequency side and, in the high frequency side, is higher for the position control loop. This realizes a system in which the movable head is controlled to the specified absolute height at all times during the drum rotation.

There are two methods to realize this system. One is to set the gain of the absolute height control loop in the form of second-order delay and perform the low-frequency band compensation, as shown in FIG. 67a. The other method is to cut the dc component of the position control loop to reduce the gain on the low frequency side as shown in FIG. 67b.

For example, to realize the open loop characteristic as shown in FIG. 67a, it is necessary to insert a filter having the frequency characterictic of FIG. 68 in the low-frequency band compensation circuit of FIG. 66.

FIG. 68a represents the frequency characteristic of a lag/lead filter; FIG. 68b represents the frequency characteristic of a low-pass filter (primary); and FIG. 68c represents the frequency characteristic of a low-pass filter (secondary). These are generally well-known.

Figure 69A:
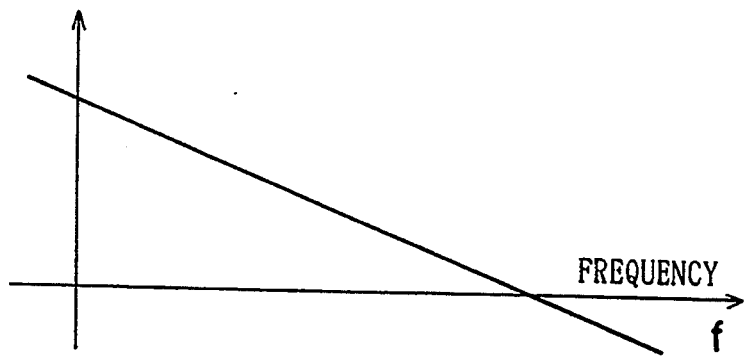
FIG. 69(c) is a block diagram of the position control compensator in the magnetic head position controller shown in FIGS. 66 and 69(a) and 69(b) are its gain transfer characteristic.
Figure 69B:
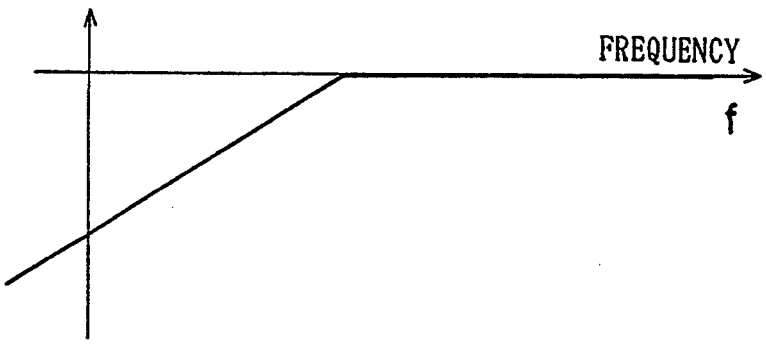
Figure 69C:
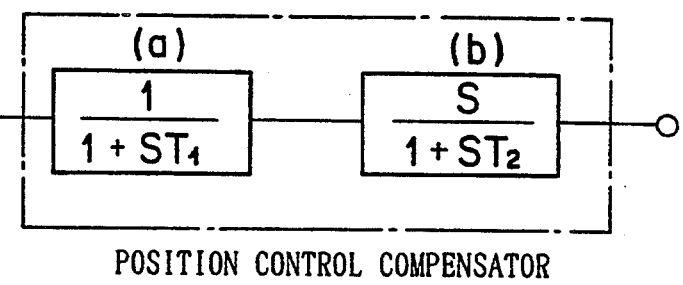

The position control compensator should have the configuration of FIG. 69, in which FIG. 69a represents the frequency characteristic of a low-pass filter and FIG. 69b represents the frequency characteristic of a high-pass filter.

These can be readily realized by an analog circuit made up of a capacitor and a resistor or by a digital circuit.

Each compensator is not shown with amplifier gain for gain compensation. To realize the configuration of FIG. 67 requires each compensator to have an appropriate gain compensation.

While the system of FIG. 66 can of course be formed with an analog circuit, it is also possible to realize the control system by using a high-speed digital calculator such as microprocessor.

For example, FIG. 70 shows the main flow of the position control system of FIG. 66 realized by software. It consists of a speed estimation calculation subroutine for the state estimator that is performed for each block that specifies the calculation cycle; a calculation subroutine for the position control, particularly for the position control compensator; and a calculation subroutine for the absolute height compensation system, particularly for the absolute height detection and low-frequency range compensation. These subroutines are successively carried out, and the calculation results of the first two subroutines are subtracted from the absolute height compensation signal to produce an actuator drive signal.

Each subroutine is performed as follows.

The calculation of the state estimator is done by setting constants (Kd·Kt)/R, K, $F_1$, $F_2$, $F_3$ to $K_1$–$K_5$ and calculating the variables (A–J, $0_1$) successively.

The variables A–J correspond to the displayed values on each signal line in the state estimator block diagram.

FIG. 72 shows a subroutine for the position control compensator 102, which receives actuator height information through two digital filters and produces a calculated output.

FIG. 73 shows a subroutine for the absolute height compensation, which takes the average of the absolute height information $Z_1$, $Z_2$ and repeats the averaging P times, P being the counter value, pass the result through the digital filter to provide a low-frequency range compensation and then outputs the compensated result.

The outputs of the two conventional ac magnetic field generating coils are picked up by the abosolute height detection head 73 and the movable head, are amplified by the amplifier circuit of FIG. 56, are detected, and then peak-held or sample-held. The held signals are A/D-converted and then fed as $Z_1$, $Z_2$ of the two ac magnetic field generating coils to the microprocessor.

Figure 74:
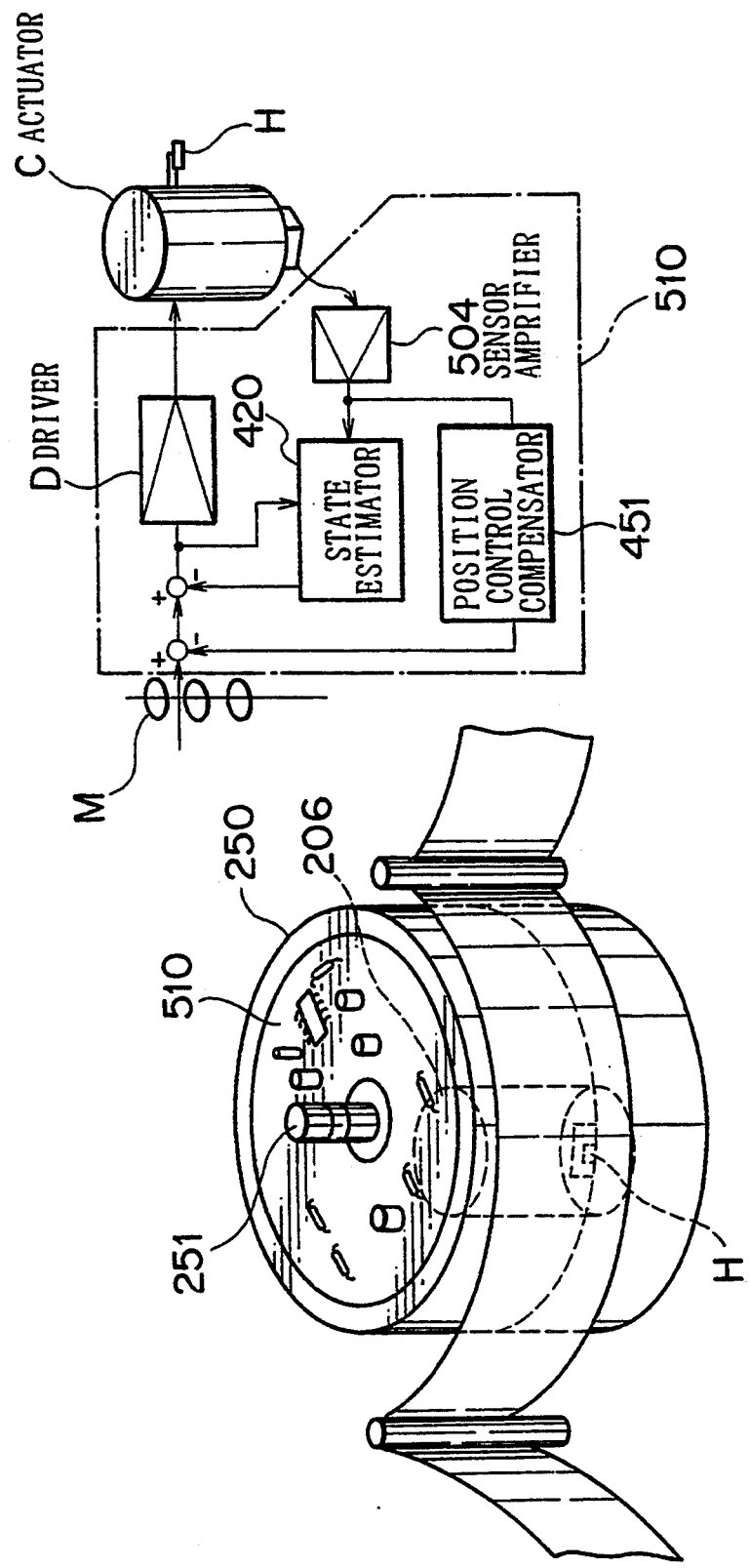
FIGS. 74(a) and 74(b) are schematic perspective views showing an example of the rotating drum and the control unit in the magnetic head position controller of the ninth embodiment.

The movable head position control system described above can be formed with hardware of, for example, FIG. 74.

When the position of the movable head is to be detected by the position sensor, the detected signal may not be able to be taken out of the drum because of the considerations of the limit on the number of channels in the rotary transformer and the effects of sliding noise of the slip ring M.

In this case, it is possible to form the actuator driver D and the state estimator 420 in the printed circuit card built into the drum and control the actuator having an electrical damping from outside the drum through the slip ring M, as shown in FIG. 74.

It is also possible to pick up the position detection signal out of the rotating drum and form the position control circuit and the driver outside the drum.

FIG. 75 is one such example, in which the LED or laser that forms the light emitting element 605 of the optical sensor is made to blink by the vibration signal. The frequency of blinking is set sufficiently higher than the observer band and in the pass frequency range of the rotary transformer 620.

In the figure, the drive signal for the light emitting element 605 is fed from the slip ring M. It is also possible to send the drive signal from a large-capacity rotary transformer, or to supply power from other means (such as large-capacity rotary transformer or slip ring) and send only the command signal to the light emitting element. These methods can similarly flash the light emitting element.

The light driven to blink in this way is reflected by the mirror 606 to the light receiving element 602 where it is converted to an ac photocurrent. This photocurrent is a photocurrent signal in the pass frequency range of the rotary transformer, so that it can easily pass through the rotary transformer 620. The photocurrent is then converted by the detection circuit 608 outside the drum into the amount of light received by the light receiving element 602. The light is fed to the differential amplifier 607 which outputs the displacement of the actuator movable portion.

In the above capacitive sensor, instead of the optical sensor of FIG. 75, the capacitance and coil of the sensor may be used to form an LC oscillation circuit. The ac signal from the oscillation circuit may be taken out of the rotary transformer and then frequency-voltage converted (F/V-converted) to produce a movable portion position signal.

In addition to these methods, the signals may be picked out of the drum through the rotary transformer 620 by the voltage-frequency conversion (FM modulation) circuit, the voltage-pulse width conversion (PWM modulation) circuit, or the voltage-ac amplitude conversion (AM modulation).

When the movable portion position signal is taken out of the rotary transformer at all times, the control system can be formed by the above-mentioned software algorithm or by an analog circuit.

When the control system is to be realized by the state estimator circuit and the position control circuit on the rotating drum, it may have to be formed as an analog circuit because of the limitation of the circuit capacity. In this case, the dc component of the position signal input to the state estimator must be cut in order to prevent drifts in the analog calculated value of the state estimator.

It should be noted here that the dc component must also be removed from the drive voltage imput to the state estimator. Otherwise, a dc prediction error occurs in the estimation error, resulting in a failure of the state estimator.

This configuration poses no problem since the observer covers the high frequency range of the position control system. This is equivalent to the pole arrangement of FIG. 76 remaining almost unchanged.

This ninth embodiment becomes somewhat complicated in structure because the actuator damping requires an actuator position sensor in the drum, a damping printed circuit card in the drum and a mechanism for taking the position signal out of the drum.

This problem can be solved by applying the control system, which was described in connection with the first to eighth embodiment, to the ninth embodiment. The configuration except for the damping control is the same as that of the ninth embodiment.

Figure 80:
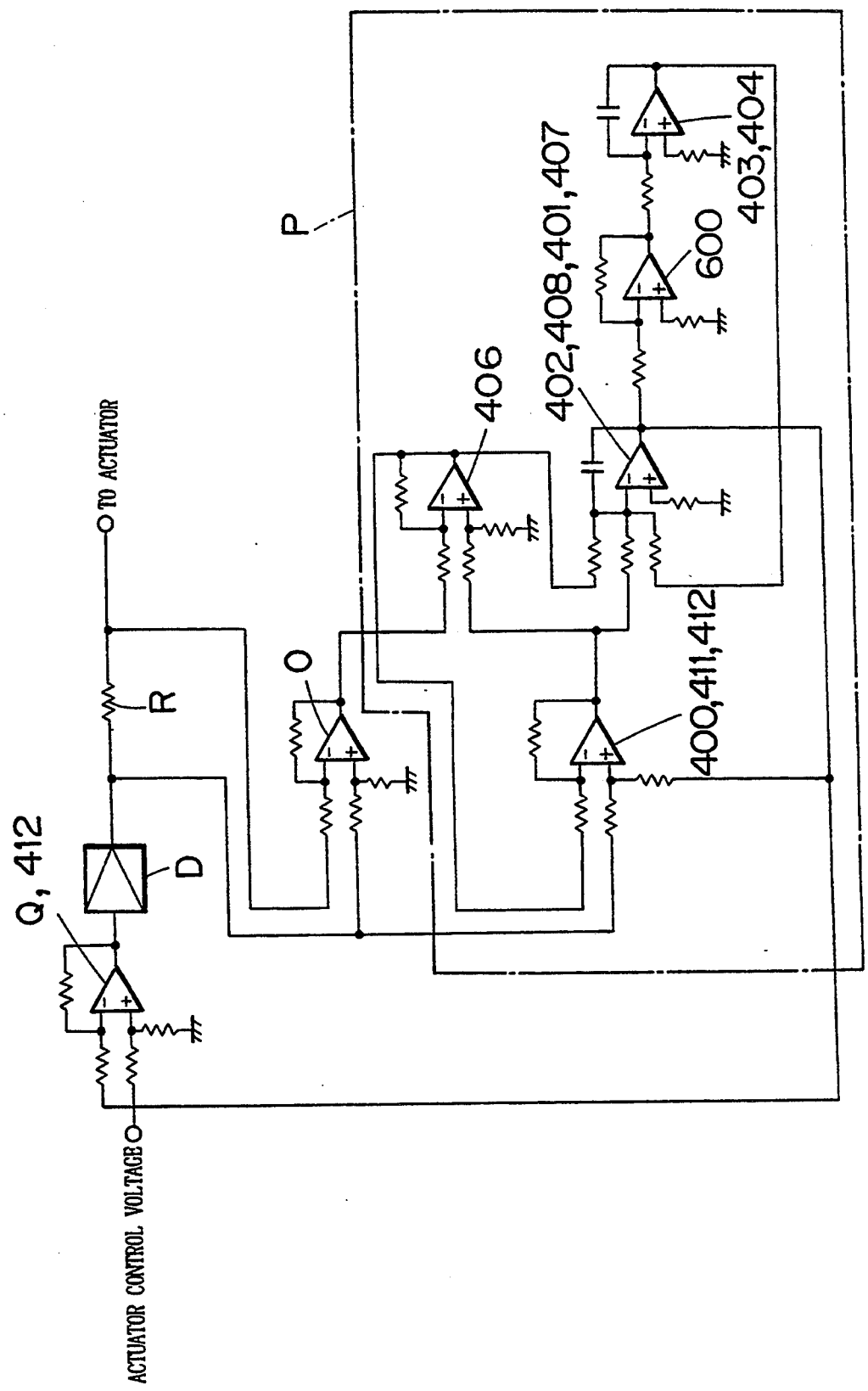
FIG. 80 is a circuitry showing an example electric circuit of the ninth embodiment.

An example of such a control system is shown in FIG. 80, which is realized by an analog circuit used for the first embodiment and explained in FIGS. 1 to 3. The detailed description is not given here. The operational amplifiers making up this circuit are given the same reference numerals of the corresponding equivalent circuit of FIG. 2.

The above-mentioned damping control enables an electrical damping of the actuator, suppressing the oscillation of the movable head caused by periodical disturbances induced by drum rotation or by other non-periodical external disturbances.

Tenth Embodiment

The above state estimator can not only estimate the speed of the head but also estimate and output a signal representing the magnetic head position. Since the dc component of the estimated position signal cannot be estimated, it is difficult to form the position control loop by feeding back only the estimated position signal.

However, as in the first embodiment, a system can be realized in which the movable head is controlled to the specified absolute height at all times during the drum rotation, by setting the open-loop gain characteristic of the position control system higher for the absolute height compensation loop on the low frequency side and by setting the open-loop gain higher for the estimated position signal-based position control loop on the high frequency side.

Figure 81:
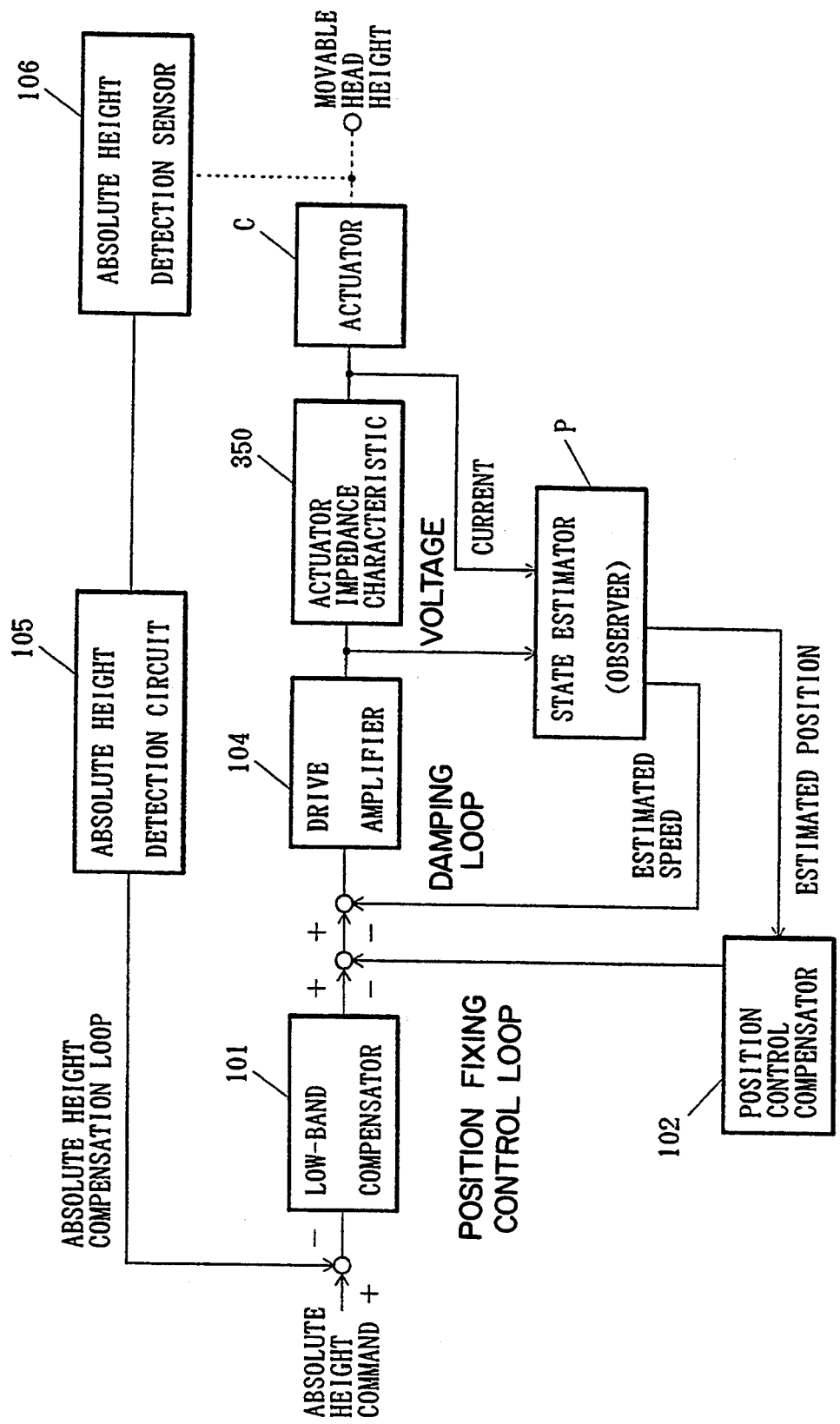
FIG. 81 is a block diagram showing the overall configuration of the magnetic head position controller of the 10th embodiment.

The block diagram of such a circuit is shown in FIG. 81. This is identical with FIG. 66 described in conjunction with the ninth embodiment. The process of compensation for the position control is the same and its explanation omitted.

The movable head position control device of this embodiment detects a specified reference height in each drum rotation by the absolute height reference value detector located on the rotating drum and controls the movable head height to the specified reference height.

Further, the movable head position control device of this invention detects the position of the movable head during the rotation of the drum by the movable head position detector installed in the movable head actuator, and fixes the head height by the position control loop according to the detected value. At the same time, the movable head position control device forms a speed control loop using the estimated speed electrically determined from the detected position, thus preventing height shift due to vibrations during recording.

Moreover, the movable head position control device according to this invention detects the position of the movable head during the rotation of the drum by using a signal from the absolute height reference value detector for the low frequency component of the position signal including the dc component and by using a signal from the movable head actuator position estimator for the high frequency component of the position signal. According to the detected value, the position control loop fixes the head height to a specified value. At the same time, the movable head position control device forms a speed control loop using the estimated speed electrically determined from the detected position. This configuration prevents height deviations due to vibrations during recording.

Other Embodiment

The foregoing description has dealt only with the damping of the movable head actuator in VTR. By using the same method, this invention can also be applied to voice coil solenoid-driven actuators, such as voice coil speaker, hard disk tracking swing arm actuator, and linear motor for tracking optical disk like CD.

As mentioned above, this invention obviates the need for the actuator position information in detecting the speed and position of the solenoid-driven actuator and detecting the load disturbance. This in turn makes it unnecessary to provide a position sensor to the actuator and pick up the position signal out of the rotating drum. Hence, it is possible to realize the damping control and the load disturbance control only by attaching an external add-on circuit without changing the conventional mechanical construction.

Since no differentiator is used for the speed detection, there is no risk of amplifying the detected noise. With inexpensive electric circuits, this invention ensures stable damping even when there are characteristic variations in detection systems, and characteristic degradation or variations over time of the object to be controlled. By feeding back the estimated position the resanance frequency can be apparently increased, providing an inexpensive actuator with improved response and excellent controllability.

Furthermore, this invention permits the movable head to be controlled at a desired absolute height, and prevents the electromagnetically induced signal of the absolute height detection ac magnetic field from being interfered with by the cross-talk from the recording signal current on the rotary transformer. The invention also allows the amplifier gain of the height detection signal amplifier to be isolated from the gain of the information signal amplifier, assuring accurate height detection.

At the same time, during the drum rotation, the position control system consisting of the position sensor incorporated in the actuator fixes the magnetic head at a specified position. In addition, the speed estimation state estimator controls the damping of the head, preventing possible vibrations and positional deviations of the movable head which would otherwise be caused by device vibrations.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic head position controller for a magnetic recording and reproducing apparatus having a solenoid-driven actuator to move a magnetic head in a tracking direction, the magnetic head position controller comprising:
    a state estimator including
        an equivalent circuit that simulates an impedance characteristic of the solenoid-driven actuator for outputting an estimated actuator driven current signal upon receipt of an actuator driven voltage,
        means for outputting an error signal by comparing a measured actuator driven current and the estimated actuator driven current, and
        a feed back loop for feeding back the error signal to said equivalent circuit to converge the error signal to zero; and
    a damping control loop for feeding back an estimated speed signal output from said state estimator to the actuator driven voltage.

2. A magnetic head position controller for a magnetic recording and reproducing apparatus having a solenoid-driven actuator to move a magnetic head in a tracking direction, the magnetic head position controller comprising:
    a state estimator including
        an equivalent circuit that simulates an impedance characteristic of the solenoid-driven actuator for outputting an estimated actuator driven current signal upon receipt of an actuator driven voltage, and
        means for outputting an error signal by comparing a measured actuator driven current and the estimated actuator driven current; and
    a damping control loop for feeding back an estimated speed signal output from said state estimator to the actuator driven voltage signal through a band-pass filter having a center frequency set to a resonance frequency of the solenoid-driven actuator.

3. A magnetic head position controller for a magnetic recording and reproducing apparatus having a solenoid-driven actuator in a rotating drum for moving a movable magnetic head along a tracking direction of a magnetic tape, the magnetic head position controller comprising:

position detecting means for estimating the height of the movable magnetic head;

at least one magnetic field generating coil, mounted close to the rotating drum on a side where the magnetic tape is not wound on the rotating drum, for generating an ac magnetic field, said at least one magnetic field generating coil being fixed to a deck mechanism supporting the rotating drum;

magnetic field detection means mounted at a specified height within the rotating drum for detecting the generated ac magnetic field; and actuator control means for controlling the height of the movable magnetic head wherein
  (a) when ac signals are produced by said magnetic field detection means and the movable magnetic head when moved past said at least one magnetic field generating coil, the ac signals have amplitudes in a specified relationship, and
  (b) when the ac signals are not produced by said magnetic field detection means and the movable magnetic head, position control is performed in accordance with the estimated height of the movable magnetic head, said position detecting means comprising a state estimating means for electrically simulating the performance of the solenoid-driven actuator and for estimating the height and moving speed of the movable magnetic head in accordance with a drive voltage and a drive current applied to the solenoid-driven actuator and for feeding back an estimated speed signal indicative of the estimated moving speed to the drive voltage to control damping of the solenoid-driven actuator.

4. The magnetic head position controller of claim 3, further comprising a signal transmission rotary transformer mounted inside the rotary drum, the magnetic recording and reproducing apparatus further including a stationary head and an additional stationary head mounted upon the rotating drum, said signal transmission rotary transformer having successive channels with windings from the movable magnetic head and said stationary head arranged close together on the rotating drum and a winding from said magnetic field detection means inserted within a channel to isolate said additional stationary head from the movable magnetic head and said stationary head to prevent cross-talk, the ac signals produced by said magnetic field detection means being amplified by a dedicated amplifier coupled to said signal transmission rotary transformer via switching means.

5. A magnetic head position controller for a magnetic recording and reproducing apparatus having a solenoid-driven actuator to move a magnetic head in a tracking direction, the magnetic head position controller comprising:

a state estimator which electrically simulates modeled characteristics of the solenoid-driven actuator for estimating a moving speed of the solenoid-driven actuator from a drive voltage and a drive current supplied to the solenoid-driven actuator and for outputting an estimated speed signal; and a damping control loop for feeding back the estimated speed signal output by said state estimator to the drive voltage to control damping of the solenoid-driven actuator.

6. The magnetic head position controller of claim 5, wherein said state estimator is an equivalent circuit that simulates an impendance characteristic including coil reactance of the solenoid-driven actuator.

7. The magnetic head position controller of claim 6, wherein the equivalent circuit that simulates the impedance characteristic including the coil reactance of the solenoid-driven actuator is a low-pass filter.

8. The magnetic head position controller of claim 6 or 7, wherein the estimated speed signal output from said state estimator is fed back through said damping control loop, which includes a band-pass filter having a center frequency set at the resonance frequency of the solenoid-driven actuator.

9. The magnetic head position controller of claim 5, wherein said state estimator comprises a combination of equivalent circuits that electrically simulate the modeled characteristics of the solenoid-driven actuator.

10. The magnetic head position controller of claim 9, wherein said state estimator comprises equivalent circuits that electrically simulate a drive coil resistance and inductance characteristic of the solenoid-driven actuator; a force constant of a magnetic circuit of the solenoid-driven actuator; and an inertia, a spring constant, and a counter electromotive force of the solenoid-driven actuator.

11. The magnetic head position controller of claim 10, wherein said state estimator supplies the drive voltage to an equivalent circuit which electrically simulates an actuator drive coil resistance and inductance characteristic, to estimate the drive current not including a counter electromotive force and to compare the estimated drive current with a drive current affected by an actual counter electromotive force of the solenoid-driven actuator to estimate the moving speed of the solenoid-driven actuator.

12. The magnetic head position controller of any one of claims 5 through 11, wherein a current feedback loop is provided inside said damping control loop to feedback the drive current to compensate for variations over time including temperature variations of the solenoid-driven actuator.

13. The magnetic head position controller of any one of claims 5 through 11, wherein said state estimator estimates the drive current for the solenoid-driven actuator not including the counter electromotive force and feeds the estimated drive current back to compensate for variations over time including temperature variations of the solenoid-driven actuator.

14. The magnetic head position controller of any one of claims 5 through 11, wherein said state estimator produces an estimated position signal representing the position of the solenoid-driven actuator and feeds the estimated position signal back to the drive voltage to increase the apparent resonance frequency of the solenoid-driven actuator.

15. The magnetic head position controller of any of claims 5 through 11, wherein said state estimator produces an estimated disturbance signal representing load disturbance of the solenoid-driven actuator and feeds the estimated disturbance signal forward to the drive voltage to cancel the load disturbance of the solenoid-driven actuator.

16. A method of driving a magnetic head comprising:
  (a) driving the magnetic head, with a solenoid-driven actuator, a desired direction;

(b) modeling the performance and estimating a moving speed of the solenoid-driven actuator, in accordance with a drive voltage and a drive current supplied to the solenoid-driven actuator, to produce an estimated speed signal; and (c) modifying the drive voltage with the estimated speed signal in a damping control loop to control damping of the solenoid-driven actuator.

17. The method of driving a magnetic head of claim 16, wherein said step (b) of modeling comprises electrically simulating characteristics of the solenoid-driven actuator with equivalent circuits.

18. The method of driving a magnetic head of claim 17, wherein said step (b) of modeling comprises electrically simulating a drive coil resistance and inductive characteristic of the solenoid-driven actuator; a force constant of a magnetic circuit of the solenoid-driven actuator; and an inertia, a spring constant, and a counter-electromotive force of the solenoid-driven actuator.

19. The method of driving a magnetic head of claim 18, wherein said step (b) of modeling comprises driving the equivalent circuit which electrically simulates the drive coil resistance and inductive characteristic to estimate a drive current which does not include a counter electromotive force and comparing the estimated drive current with a drive current affected by an actual counter electromotive force of the solenoid-driven actuator to estimate the moving speed of the solenoid-driven actuator.

20. The method of driving a magnetic head of claim 16, wherein said step (b) of modeling comprises electrically simulating an impedance characteristic of the solenoid-driven actuator, including coil reactance, with equivalent circuits.

21. The method of driving a magnetic head of claim 20, wherein said step (b) of modeling comprises electrically simulating the impedance characteristic including coil reactance with a low-pass filter.

22. The method of driving a magnetic head of claim 21, wherein said step (c) of modifying comprises feeding the estimated speed signal back through a band-pass filter which has a center frequency set at a resonance frequency of the solenoid-driven actuator.

23. The method of driving a magnetic head of claim 16, wherein said step (c) of modifying comprises feeding the estimated speed signal back through a band-pass filter which has a center frequency set at a resonance frequency of the solenoid-driven actuator.

24. The method of driving a magnetic head of any one of claims 16–19, further comprising:
(d) feeding back the drive current in a current feedback loop, provided inside the damping control loop, to the drive voltage to compensate for variations over time including temperature variations of the solenoid-driven actuator.

25. The method of driving a magnetic head of any one of claims 16–19, wherein said step (b) of modeling further comprises estimating a drive current for the solenoid-driven actuator which does not include counter electromotive force and feeding the estimated drive current back to the drive voltage to compensate for variations over time including temperature variations of the solenoid-driven actuator.

26. The method of driving a magnetic head of any one of claims 16–19, wherein said step (b) of modeling further comprises estimating a position of the solenoid-driven actuator to produce an estimated position signal and feeding the estimated position signal back to the drive voltage to increase an apparent resonance of the solenoid-driven actuator.

27. The method of driving a magnetic head of any one of claims 16–19, wherein said step (b) of modeling further comprises estimating a load disturbance of the solenoid-driven actuator to produce an estimated disturbance signal and feeding the estimated disturbance signal forward to the drive voltage to cancel a load disturbance of the solenoid-driven actuator.

28. A drive system for driving a magnetic head comprising:
an actuator for driving the magnetic head in a desired direction;
a model for electrically simulating the performance of said actuator and for estimating a moving speed of said actuator in accordance with a drive voltage and a drive current supplied to said actuator to produce an estimated speed signal; and
a damping feedback path for modifying the drive voltage with the estimated speed signal to control damping of said actuator.

29. The drive system for driving a magnetic head of claim 28, wherein said model comprises a state estimator including equivalent circuits which electrically simulate a drive coil resistance and inductance characteristic of said actuator; a force constant of a magnetic circuit of said actuator; and an inertia, a spring constant, and a counter electromotive force of said actuator.

30. The drive system for driving a magnetic head of claim 29, wherein the drive voltage is supplied to the equivalent circuit which electrically simulates the actuator drive coil resistance and inductance characteristic to estimate a drive current which does not include a counter electromotive force,
said model comparing the estimated drive current with a drive current affected by an actual counter electromotive force of said actuator to estimate the moving speed of said actuator.

31. The drive system for driving a magnetic head of claim 28, wherein said model comprises a state estimator including an equivalent circuit which simulates an impedance characteristic including coil reactance of said actuator.

32. The drive system for driving a magnetic head of claim 31, wherein the equivalent circuit that simulates the impedance characteristic and coil reactance comprises a low-pass filter.

33. The drive system for driving a magnetic head of claim 28, further comprising a current feedback path, provided inside said damping feedback path, for modifying the drive voltage with the drive current to compensate for variations over time including temperature variations of said actuator.

34. The drive system for driving a magnetic head of claim 28, wherein said model estimates a drive current of said actuator which does not include a counter electromotive force,
the drive system further comprising a current feedback path for modifying the drive voltage with the estimated drive current to compensate for variations over time including temperature variations of said actuator.

35. The drive system for driving a magnetic head of claim 28, wherein said model estimates a position of said actuator to produce an estimated position signal,
the drive system further comprising a position feedback path for modifying the drive voltage with the estimated position signal to increase an apparent resonance frequency of said actuator.

36. The drive system for driving a magnetic head of claim 28, wherein said model estimates a load disturbance of said actuator to produce an estimated disturbance signal, the drive system further comprising a disturbance feed forward path for modifying the drive voltage with the estimated disturbance signal to cancel a load disturbance of said actuator.

37. The drive system for driving a magnetic head of claim 28, wherein said damping feedback path comprises a band-pass filter having a center frequency set at a resonance frequency of said actuator.

38. A magnetic head driving apparatus for driving a magnetic head mounted upon a rotary head drum in an axial direction of the rotary head drum, comprising:

actuator means for moving the magnetic head in the axial direction;

speed estimating means, coupled to said actuator means, for modeling the performance and estimating the moving speed of said actuator means and for generating an estimated speed signal in accordance with a drive voltage and a drive current supplied to said actuator means; and a damping feedback path for modifying the drive voltage with the estimated speed signal to control damping of said actuator means.

39. The magnetic head driving apparatus for driving a magnetic head of claim 38, wherein said speed estimating means comprises a state estimator including equivalent circuits which electrically simulate a drive coil resistance and inductance characteristic of said actuator means; a force constant of a magnetic circuit of said actuator means; and an inertia, a spring constant, and a counter electromotive force of said actuator means.

40. The magnetic head driving apparatus for driving a magnetic head of claim 39, wherein the drive voltage is supplied to the equivalent circuit which electrically simulates the drive coil resistance and the inductance characteristic to estimate a drive current which does not include a counter electromotive force, said speed estimating means comparing the estimated drive current with a drive current affected by an actual counter electromotive force of said actuator means to estimate the moving speed of said actuator means.

41. The magnetic head driving apparatus for driving a magnetic head of claim 38, wherein said speed estimating means comprises a state estimator including an equivalent circuit which simulates an impedance characteristic including coil reactance of said actuator means.

42. The magnetic head driving apparatus for driving a magnetic head of claim 41, wherein the equivalent circuit that simulates the impedance characteristic and coil reactance comprises a low-pass filter.

43. The magnetic head driving apparatus for driving a magnetic head of claim 38, further comprising a current feedback path, provided inside said damping feedback path, for modifying the drive voltage with the drive current to compensate for variations over time including temperature variations of said actuator means.

44. The magnetic head driving apparatus for driving a magnetic head of claim 38, wherein said speed estimating means estimates a drive current of said actuator means which does not include a counter electromotive force, the magnetic head driving system further comprising a current feedback path for modifying the drive voltage with the estimated drive current to compensate for variations over time including temperature variations of said actuator means.

45. The magnetic head driving apparatus for driving a magnetic head of claim 38, wherein said speed estimating means estimates a position of said actuator means to produce an estimated position signal, the magnetic head driving system further comprising a position feedback path for modifying the drive voltage with the estimated position signal to increase an apparent resonance frequency of said actuator means.

46. The magnetic head driving apparatus for driving a magnetic head of claim 38, wherein said speed estimating means estimates a load disturbance of said actuator means to produce an estimated disturbance signal, the magnetic head driving system further comprising a disturbance feed forward path for modifying the drive voltage with the estimated disturbance signal to cancel a load disturbance of said actuator means.

47. The magnetic head driving apparatus for driving a magnetic head of claim 38, wherein said damping feedback path comprises a band-pass filter having a center frequency set at a resonance frequency of said actuator means.

* * * * *